(12) United States Patent
Rivas et al.

(10) Patent No.: US 12,025,288 B2
(45) Date of Patent: Jul. 2, 2024

(54) FORWARD COOLING HEADLIGHT

(71) Applicant: MATRIX RAILWAY CORPORATION, West Babylon, NY (US)

(72) Inventors: Nelson Rivas, East Meadow, NY (US); Gary Provenzano, Boca Raton, FL (US)

(73) Assignee: MATRIX RAILWAY CORPORATION, West Babylon, NY (US)

( * ) Notice: Subject to any disclaimer, the term of this patent is extended or adjusted under 35 U.S.C. 154(b) by 0 days.

(21) Appl. No.: 18/126,339

(22) Filed: Mar. 24, 2023

(65) Prior Publication Data

US 2023/0235872 A1  Jul. 27, 2023

Related U.S. Application Data

(63) Continuation-in-part of application No. 18/111,584, filed on Feb. 19, 2023, which is a continuation-in-part
(Continued)

(51) Int. Cl.
*F21S 45/46* (2018.01)
*F21S 41/143* (2018.01)
(Continued)

(52) U.S. Cl.
CPC ............ *F21S 45/46* (2018.01); *F21S 41/143* (2018.01); *F21S 41/148* (2018.01);
(Continued)

(58) Field of Classification Search
None
See application file for complete search history.

(56) References Cited

U.S. PATENT DOCUMENTS

2006/0245202 A1  11/2006  Moreth et al.
2013/0249375 A1   9/2013  Panagotacos et al.
(Continued)

FOREIGN PATENT DOCUMENTS

CN          204901381 U  * 12/2015

OTHER PUBLICATIONS

U.S. Office Action in U.S. Appl. No. 17/481,194 dated Apr. 18, 2022.
(Continued)

*Primary Examiner* — Elmito Breval
(74) *Attorney, Agent, or Firm* — Collard & Roe, P.C.; William Collard

(57) ABSTRACT

There is disclosed a forward cooling headlight comprising a body, a lens coupled to the body and a heatsink coupled to the body. There is also a heatpipe and at least one light. The light is coupled to the heatsink, wherein the heatpipe is coupled to the heatsink at a first end, and to the body at a second end. The heatsink draws heat away from the light, via the heatpipe and towards the body. There can be at least one synthetic jet coupled to the heatpipe to aid in cooling the light. In addition, in at least one embodiment, there can be at least two lights with at least two different drivers with a first driver driving a first light and a second driver driving a second light wherein when each of the lights is lit it is capable of generating a different focal point.

20 Claims, 93 Drawing Sheets

Related U.S. Application Data of application No. 17/481,194, filed on Sep. 21, 2021, now Pat. No. 11,585,513.

(60) Provisional application No. 63/081,288, filed on Sep. 21, 2020.

(51) Int. Cl.
| | |
|---|---|
| *F21S 41/148* | (2018.01) |
| *F21S 41/151* | (2018.01) |
| *F21S 45/47* | (2018.01) |
| *F21V 23/00* | (2015.01) |

(52) U.S. Cl.
CPC ............. *F21S 41/151* (2018.01); *F21S 45/47* (2018.01); *F21V 23/006* (2013.01)

(56) References Cited

U.S. PATENT DOCUMENTS

| | | |
|---|---|---|
| 2014/0078737 A1 | 3/2014 | Lin et al. |
| 2016/0046262 A1 | 2/2016 | Van Straten |
| 2016/0146447 A1 | 5/2016 | Leeper |
| 2019/0249857 A1* | 8/2019 | Wandrey ............... F21V 29/507 |
| 2020/0116329 A1 | 4/2020 | Kim |
| 2022/0341580 A1* | 10/2022 | Edwards ................ F21V 29/59 |

OTHER PUBLICATIONS

U.S. Notice of Allowance in U.S. Appl. No. 17/481,194 dated Sep. 19, 2022.

\* cited by examiner

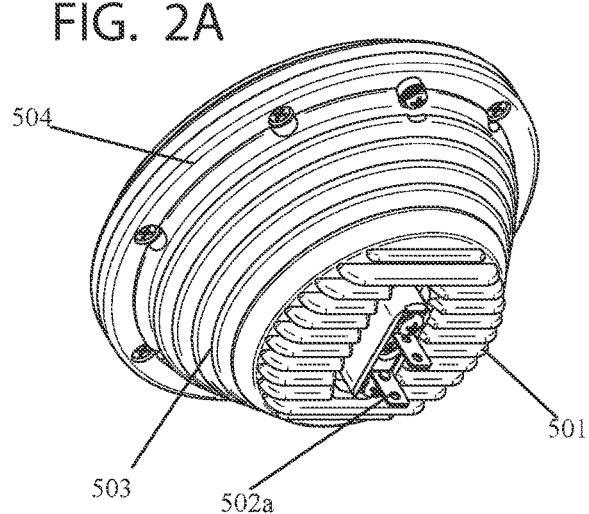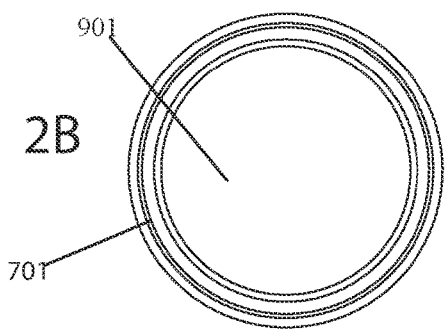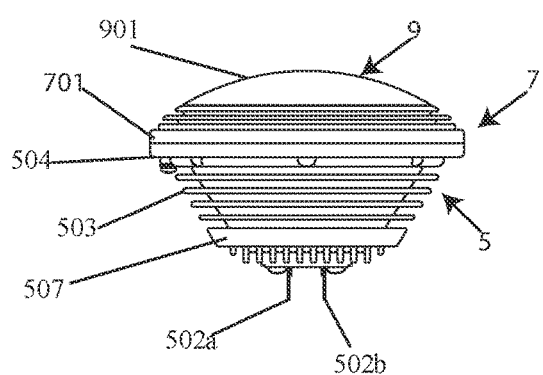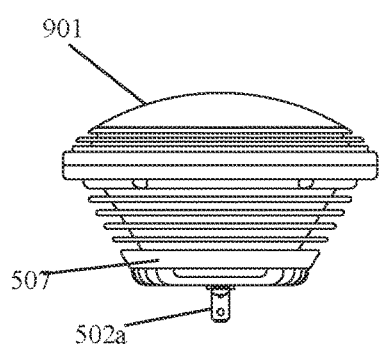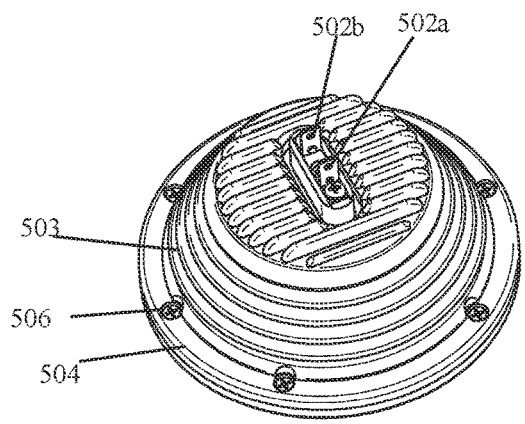

SECTION C-C

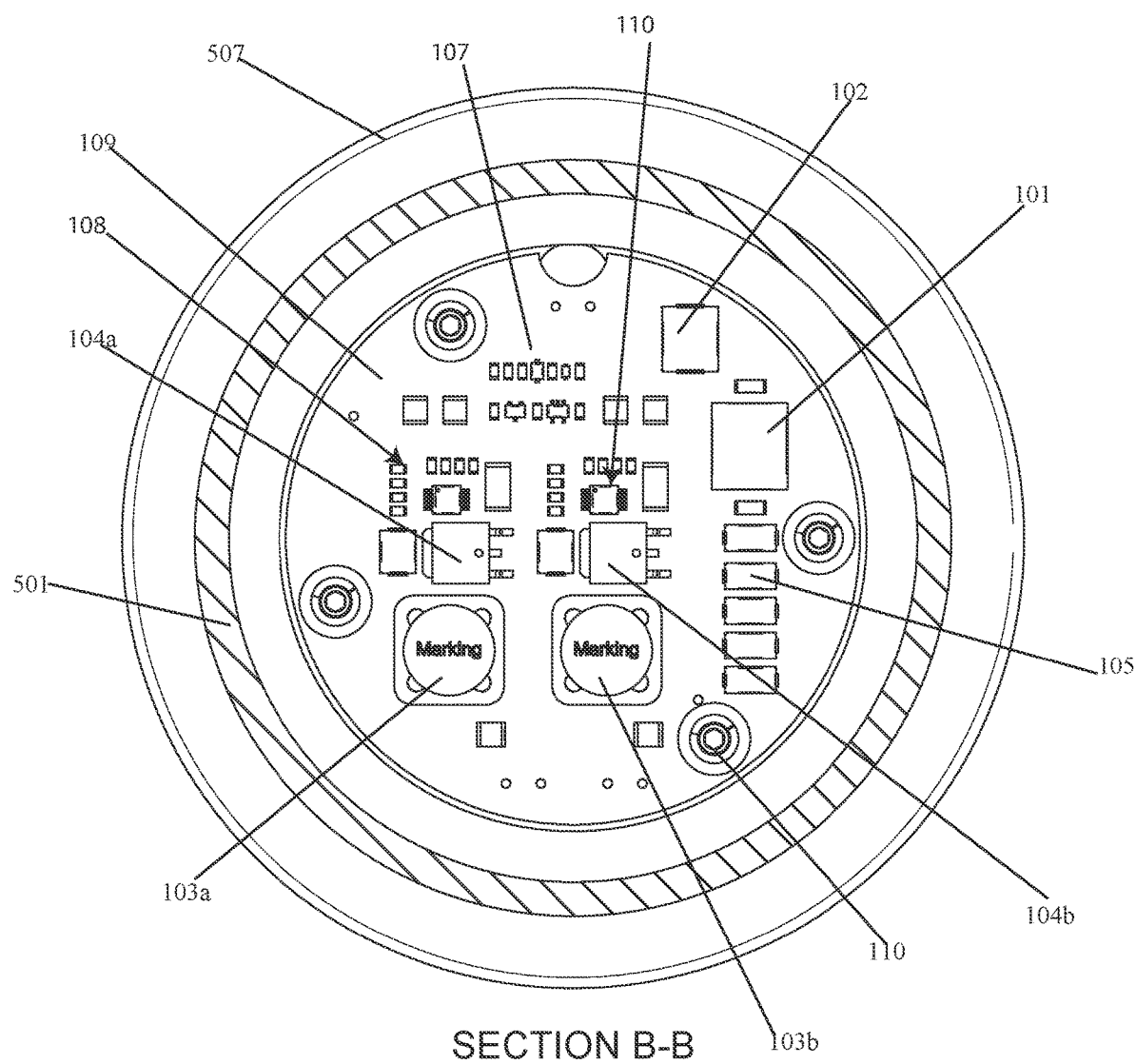

DETAIL G

Detail E

SECTION A-A

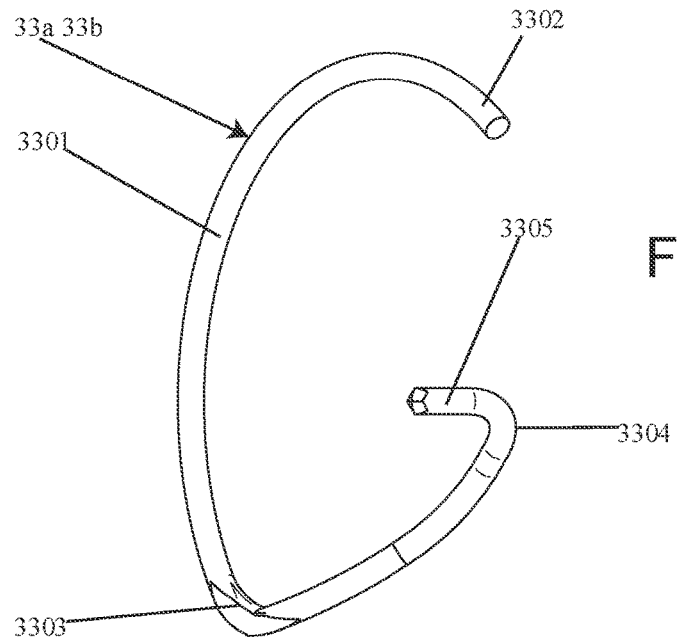
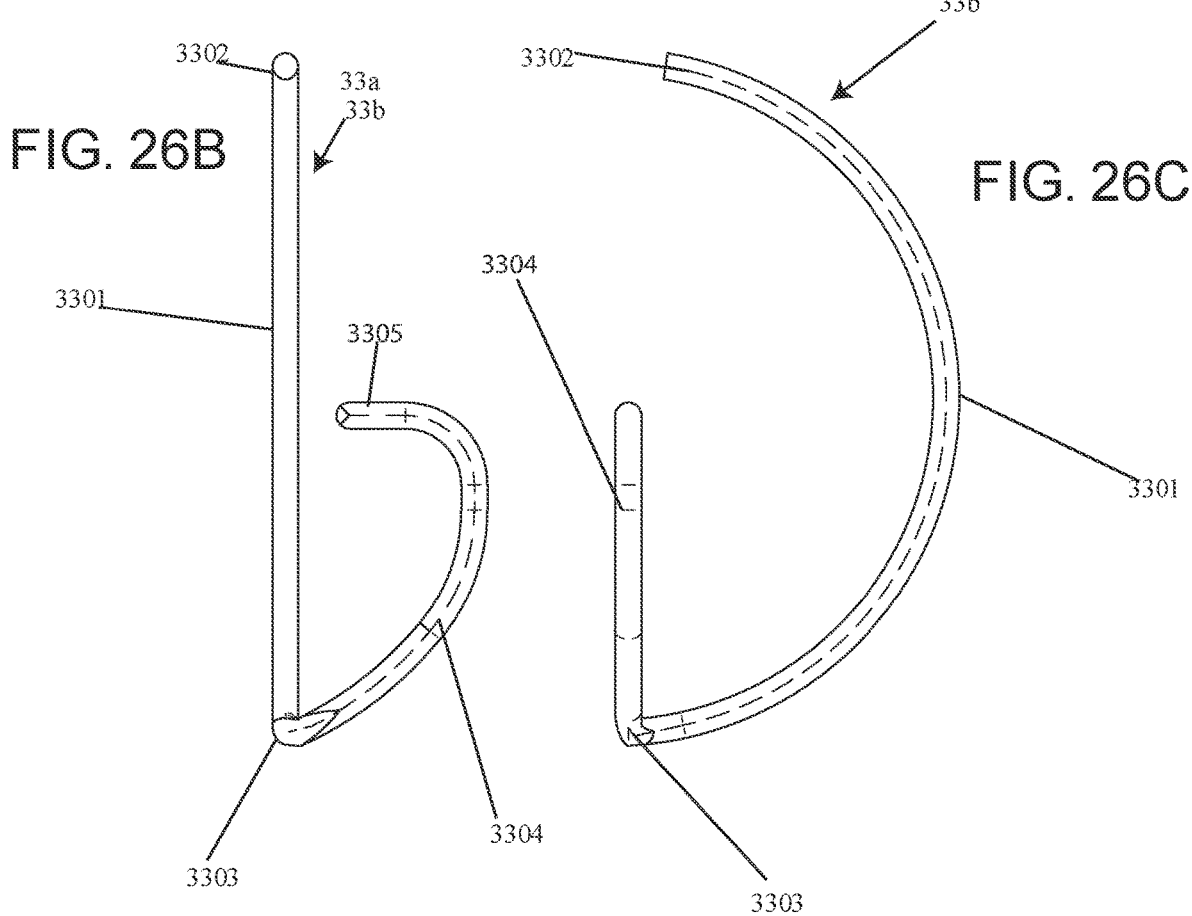

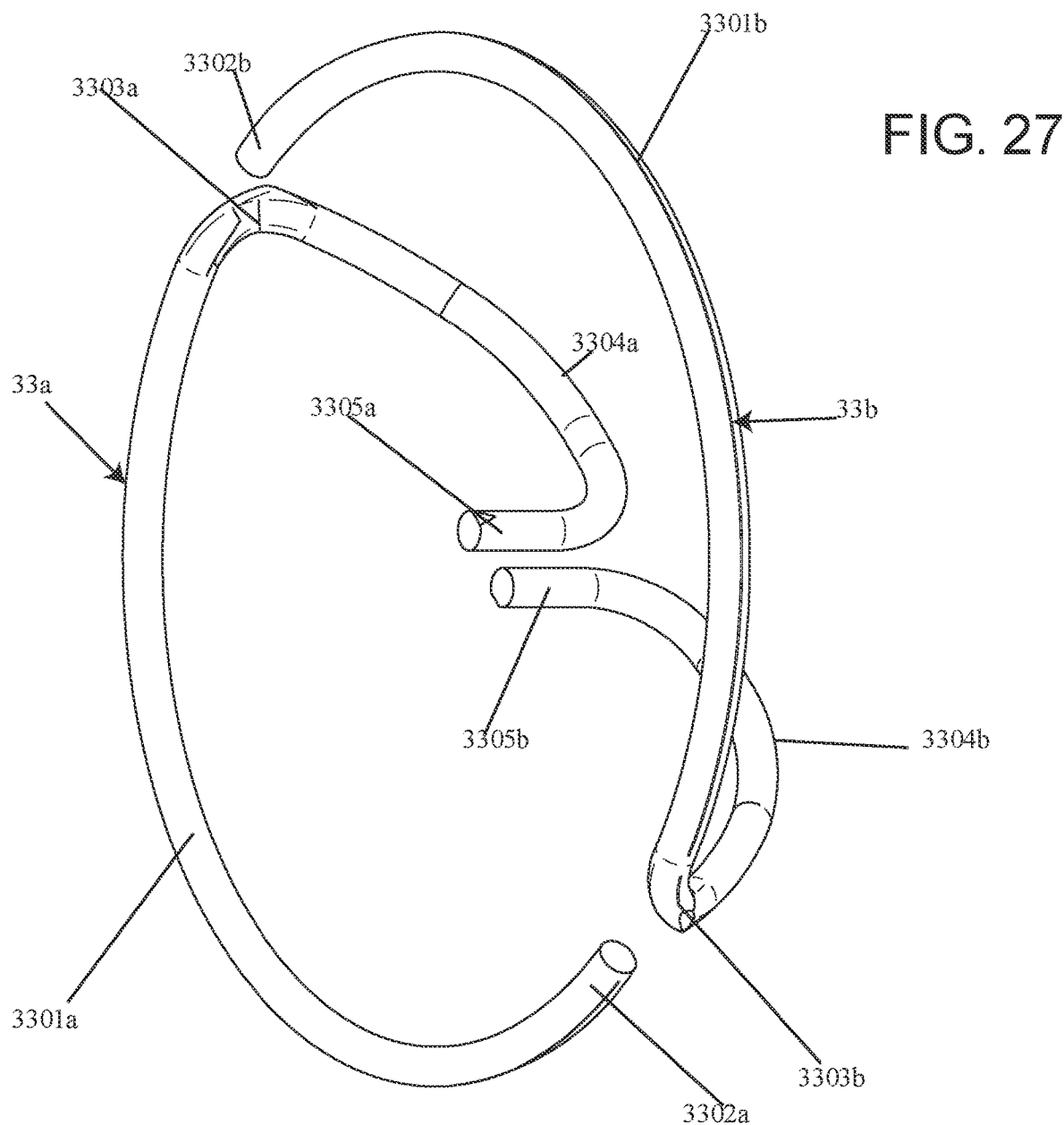

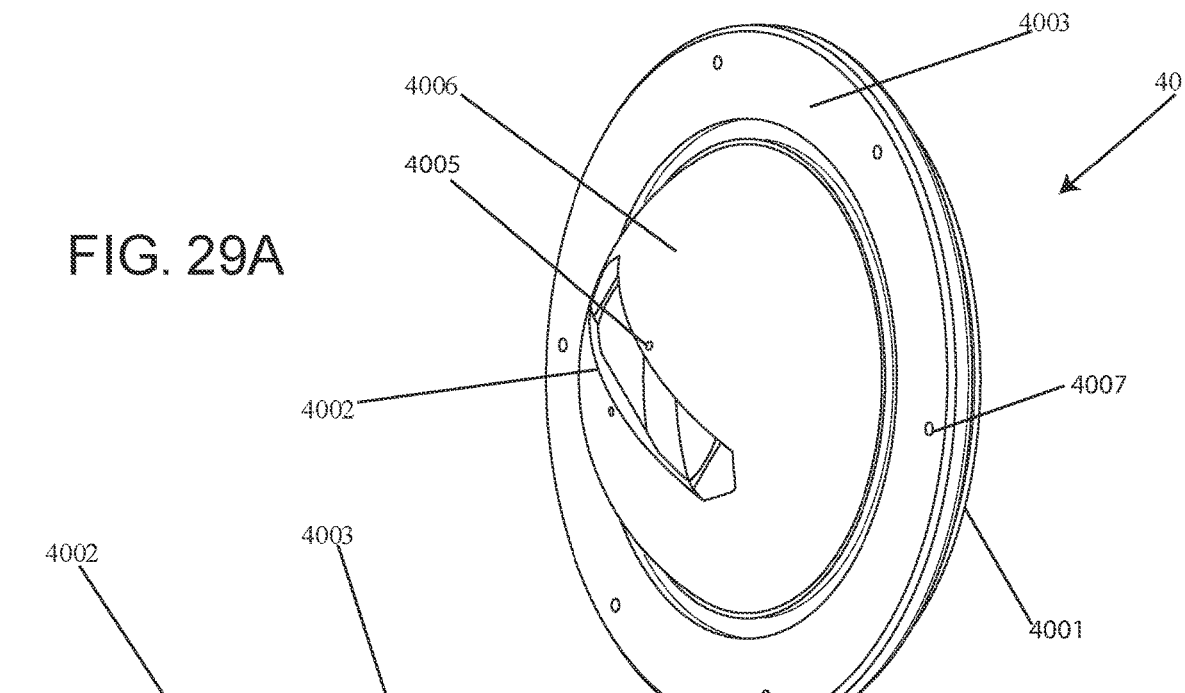
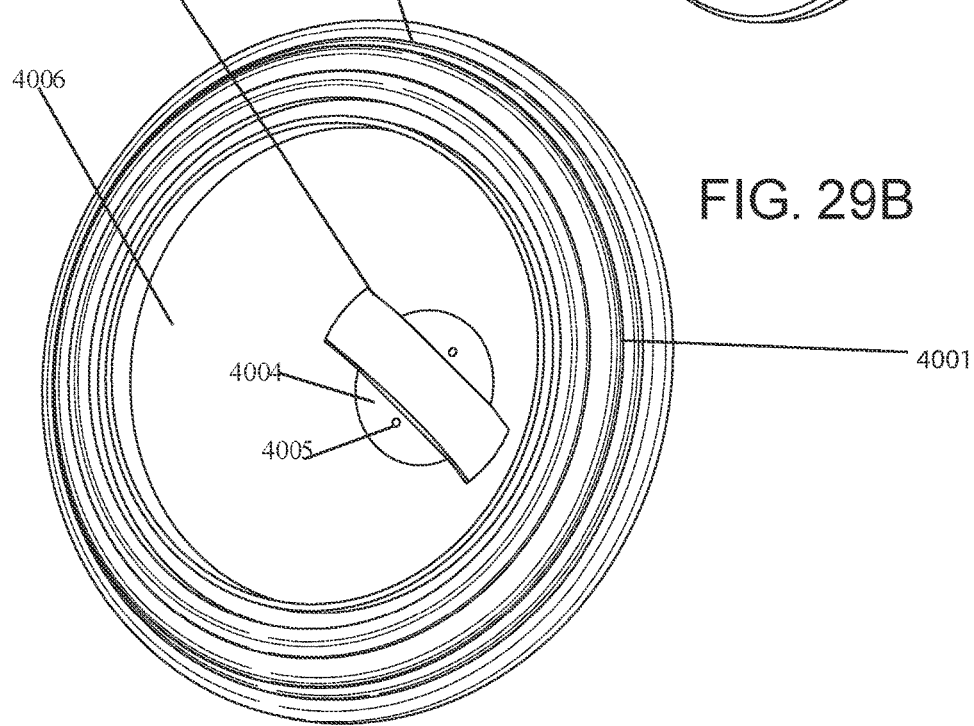

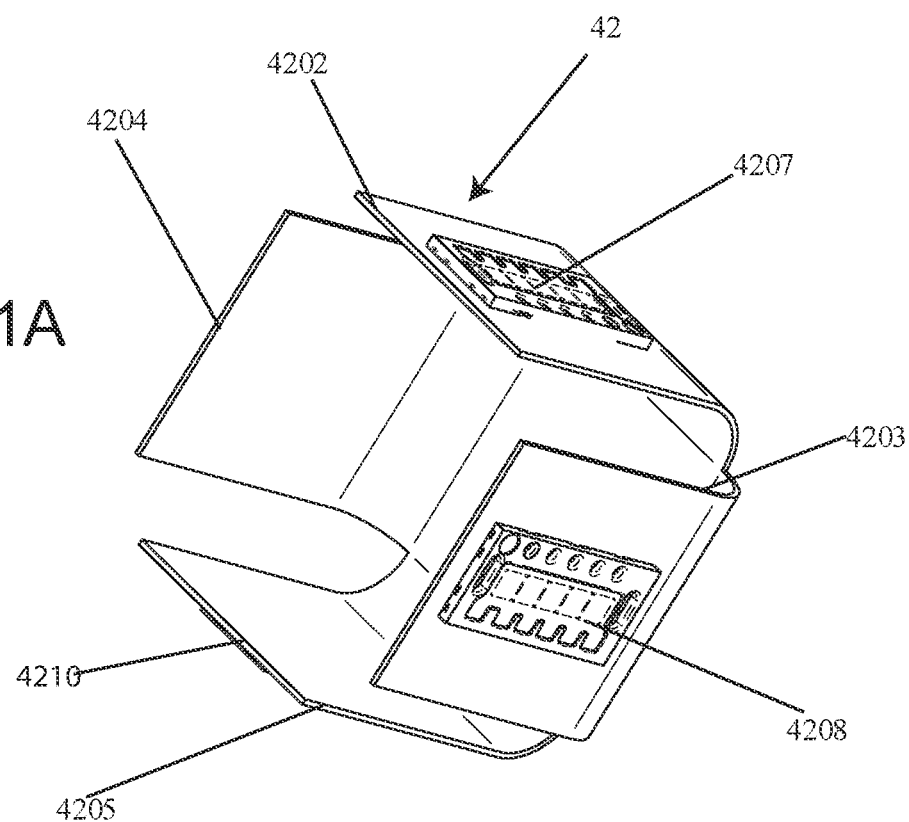
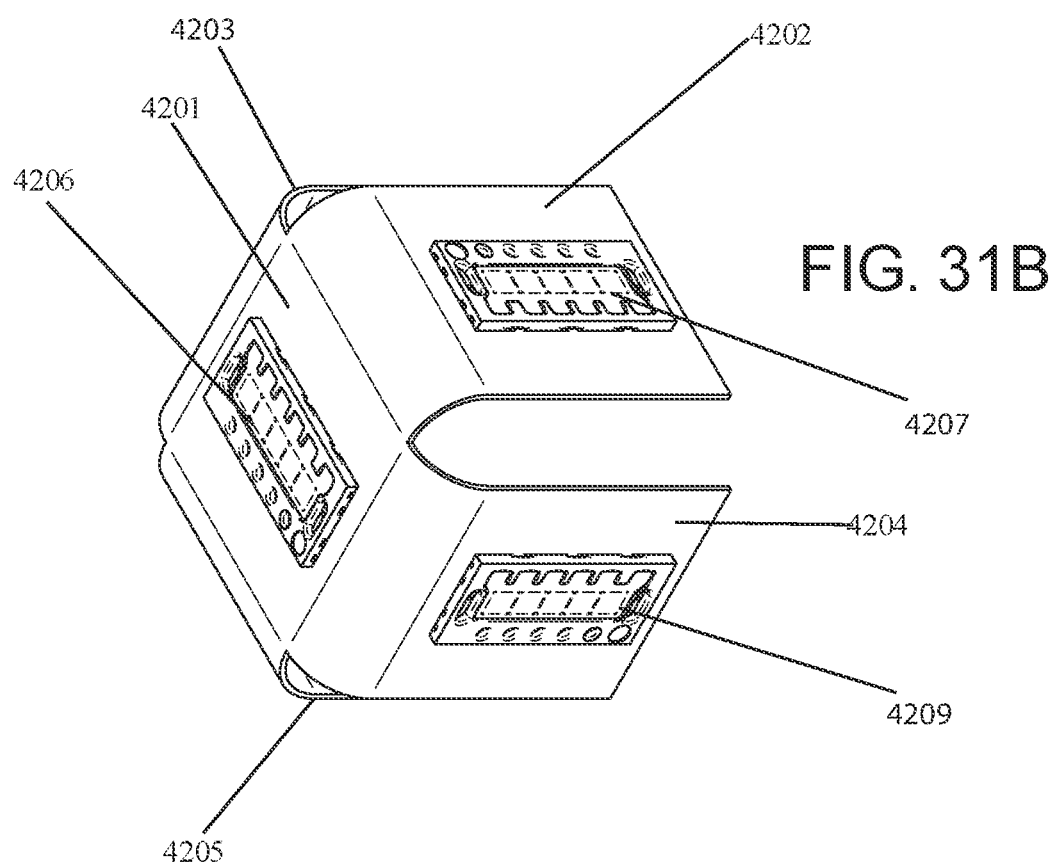

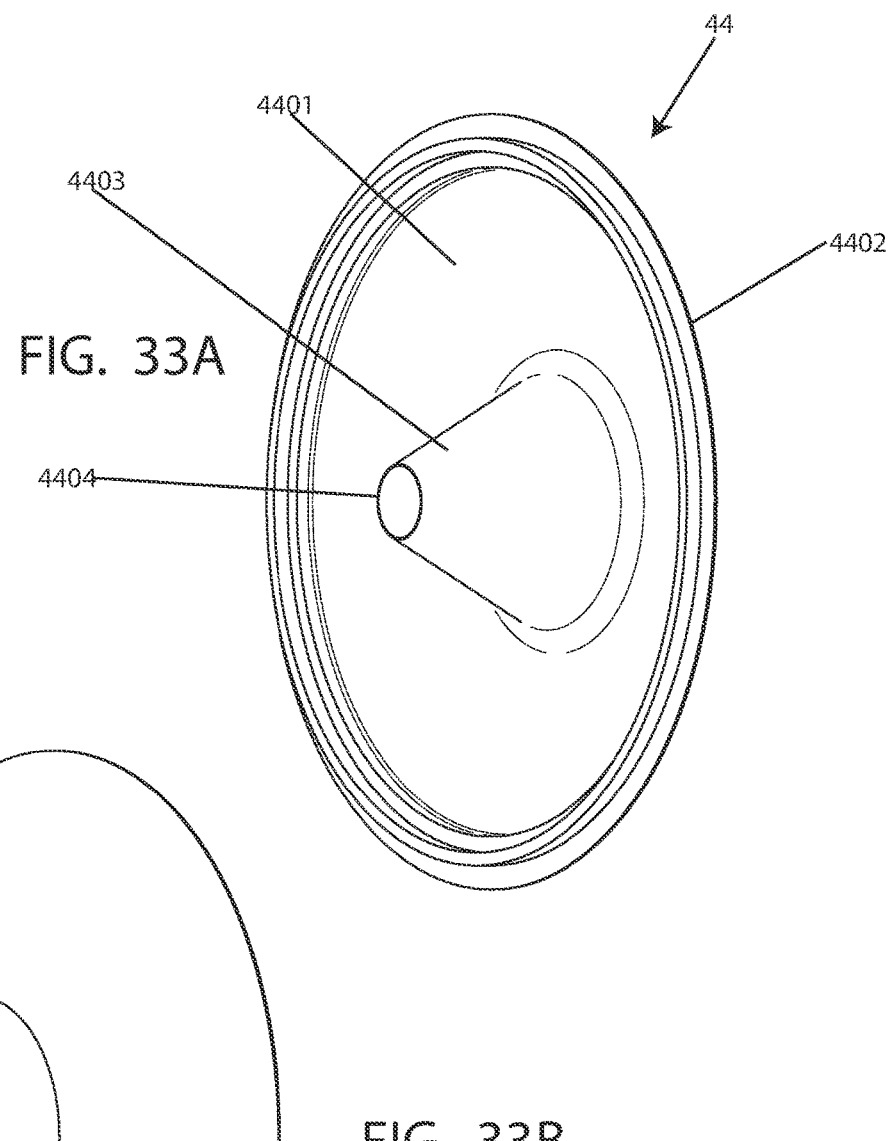

33a, 33b 33a, 33b

FIG. 40A
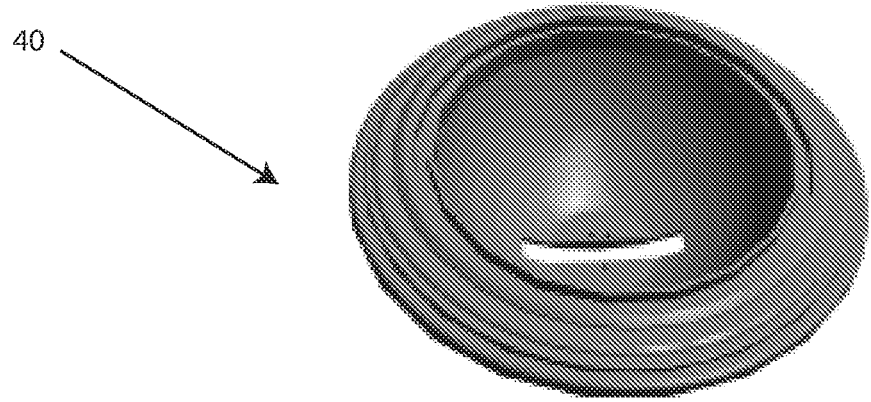
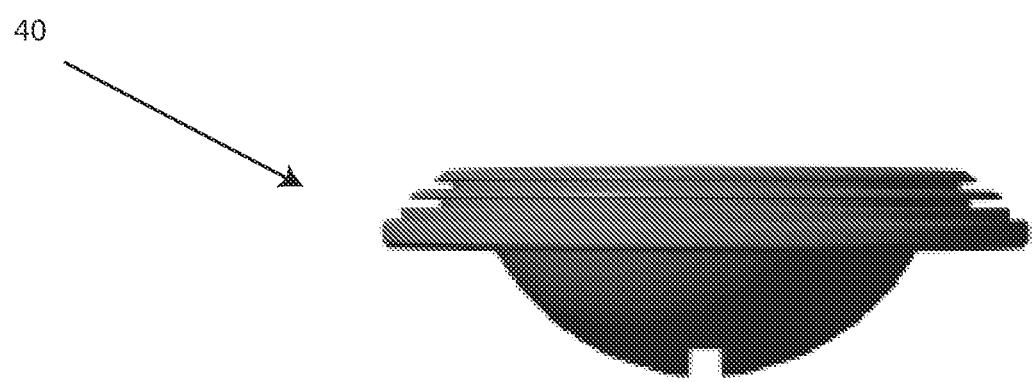
FIG. 40B 606, 811

49a, 49b, 49c, 49

42a, 42b, 42c, 42d, 42e, 42

SECTION A-A

SECTION C-C

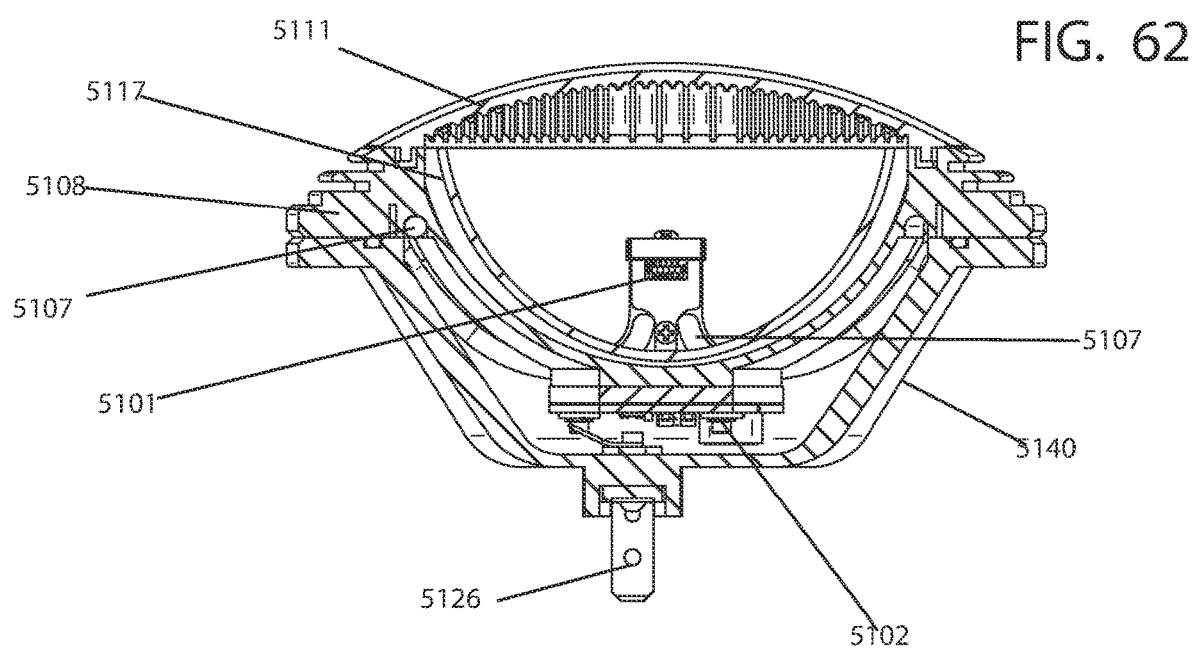

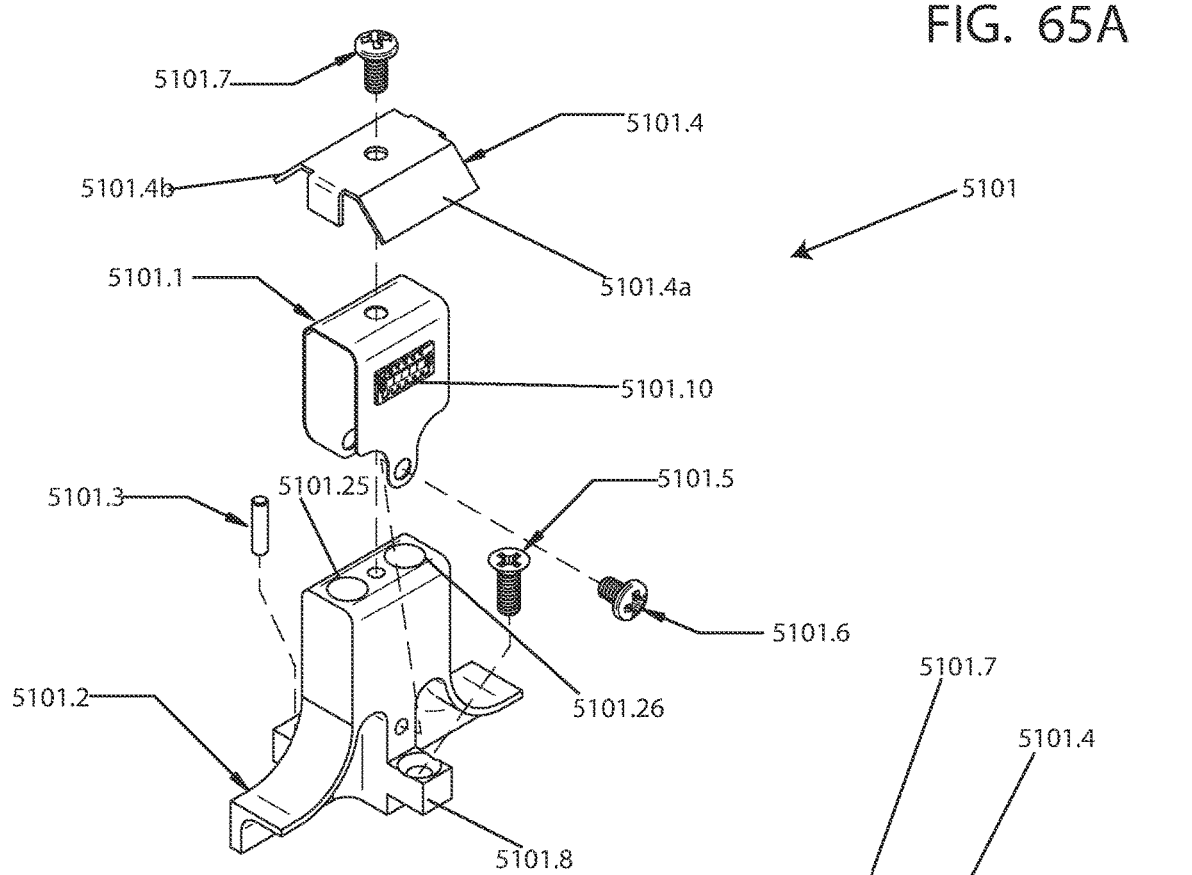
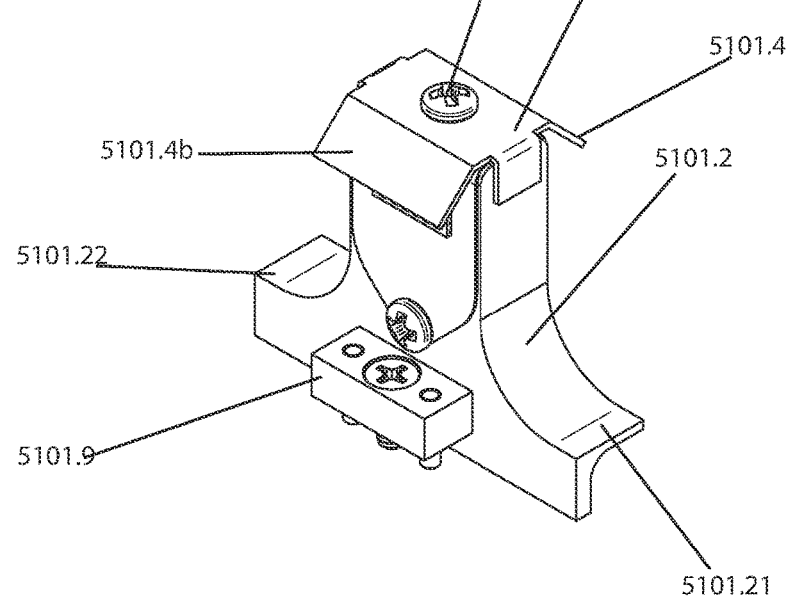

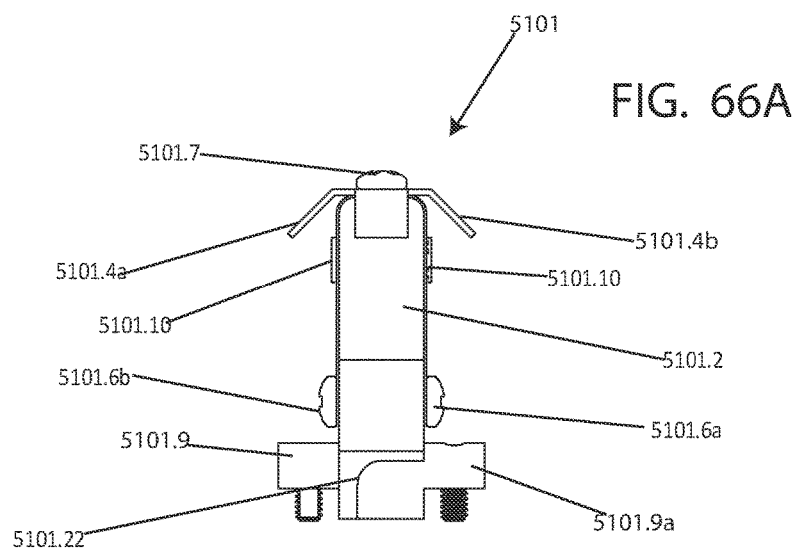
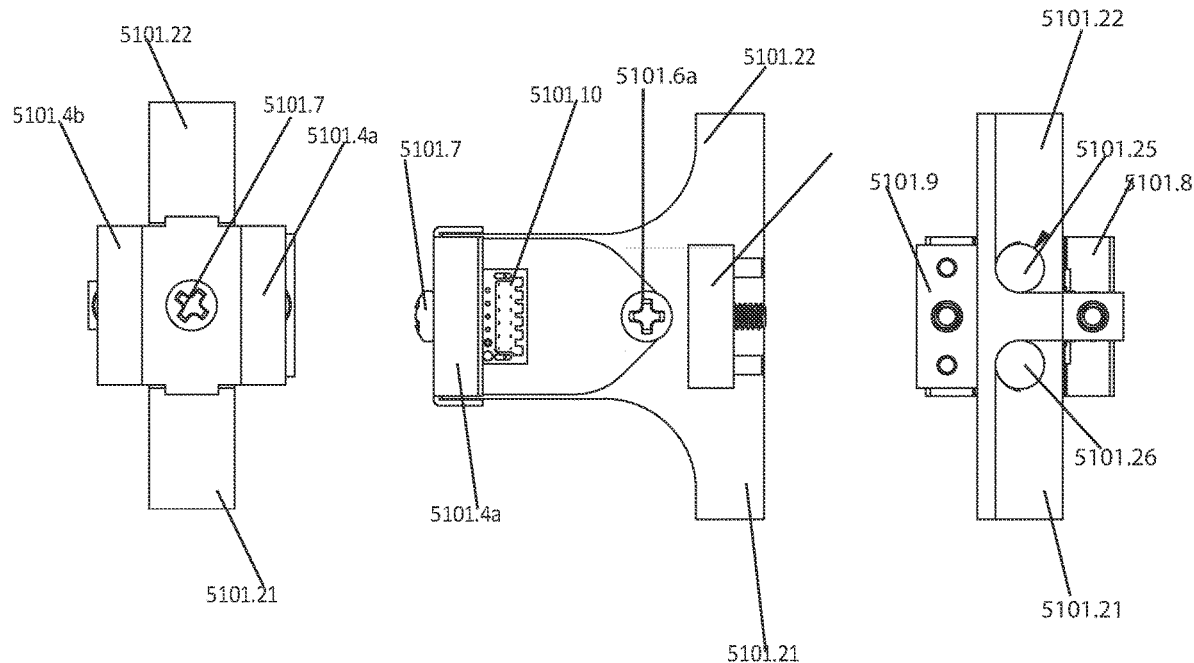
FIG. 66B  FIG. 66C  FIG. 66D

DETAIL G

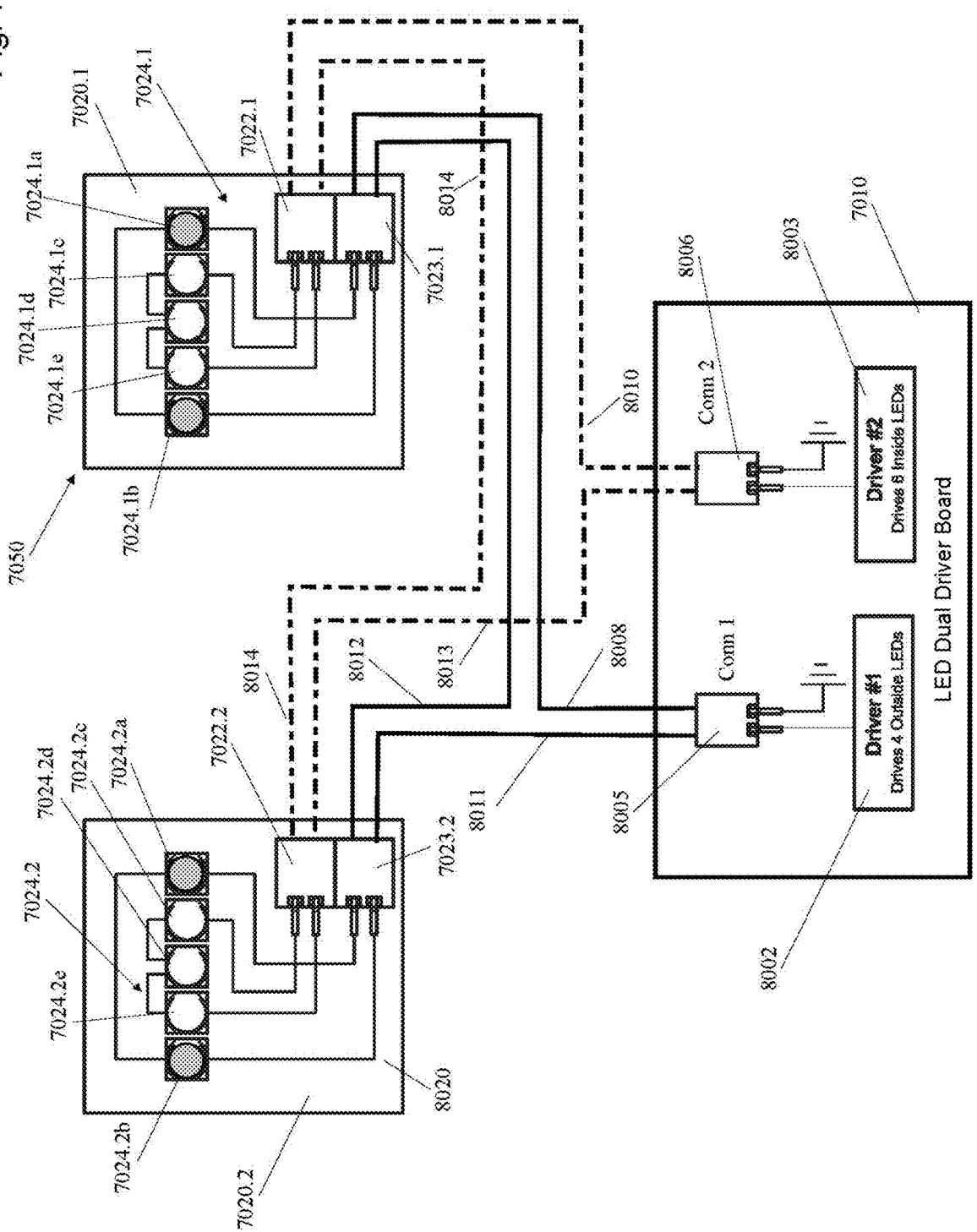

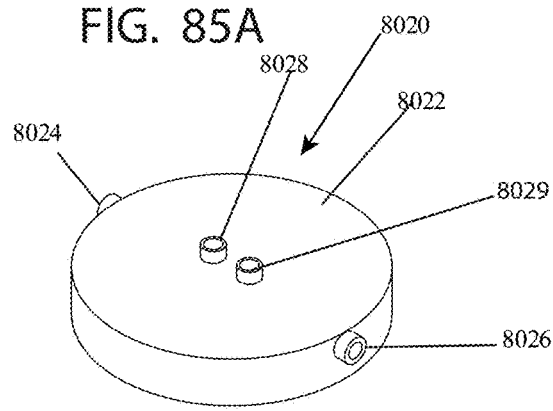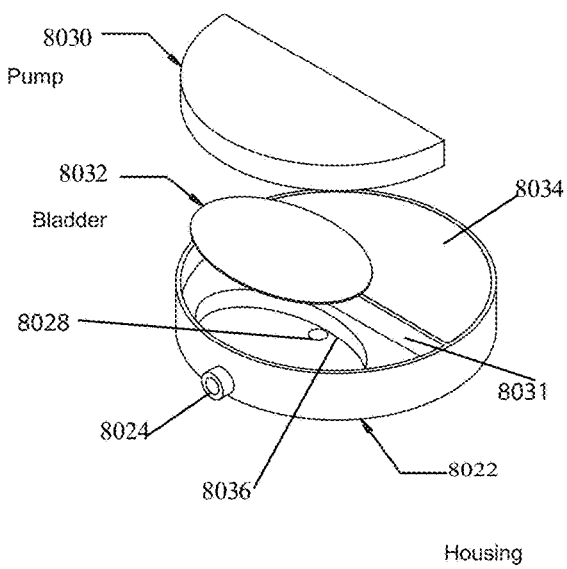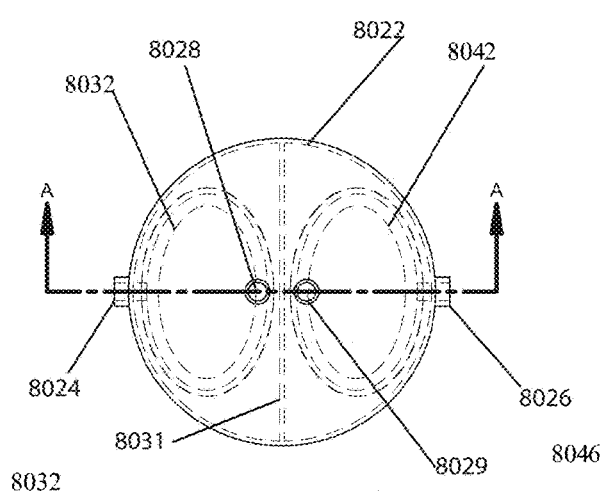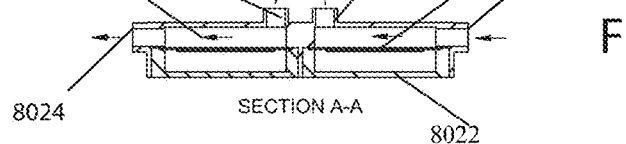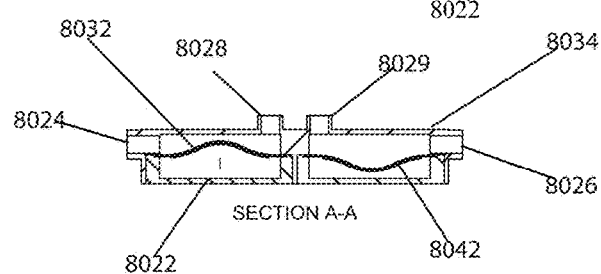

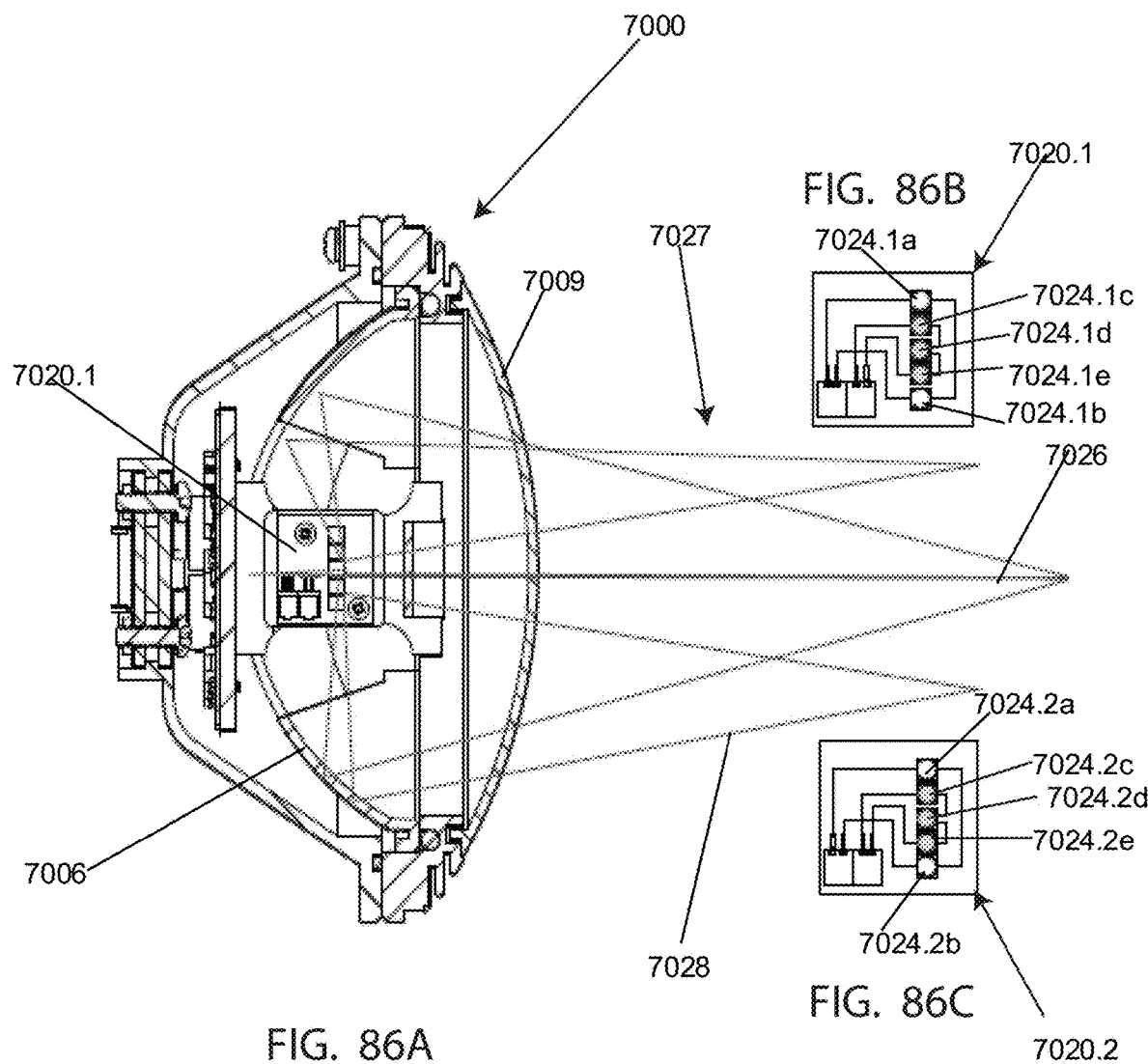

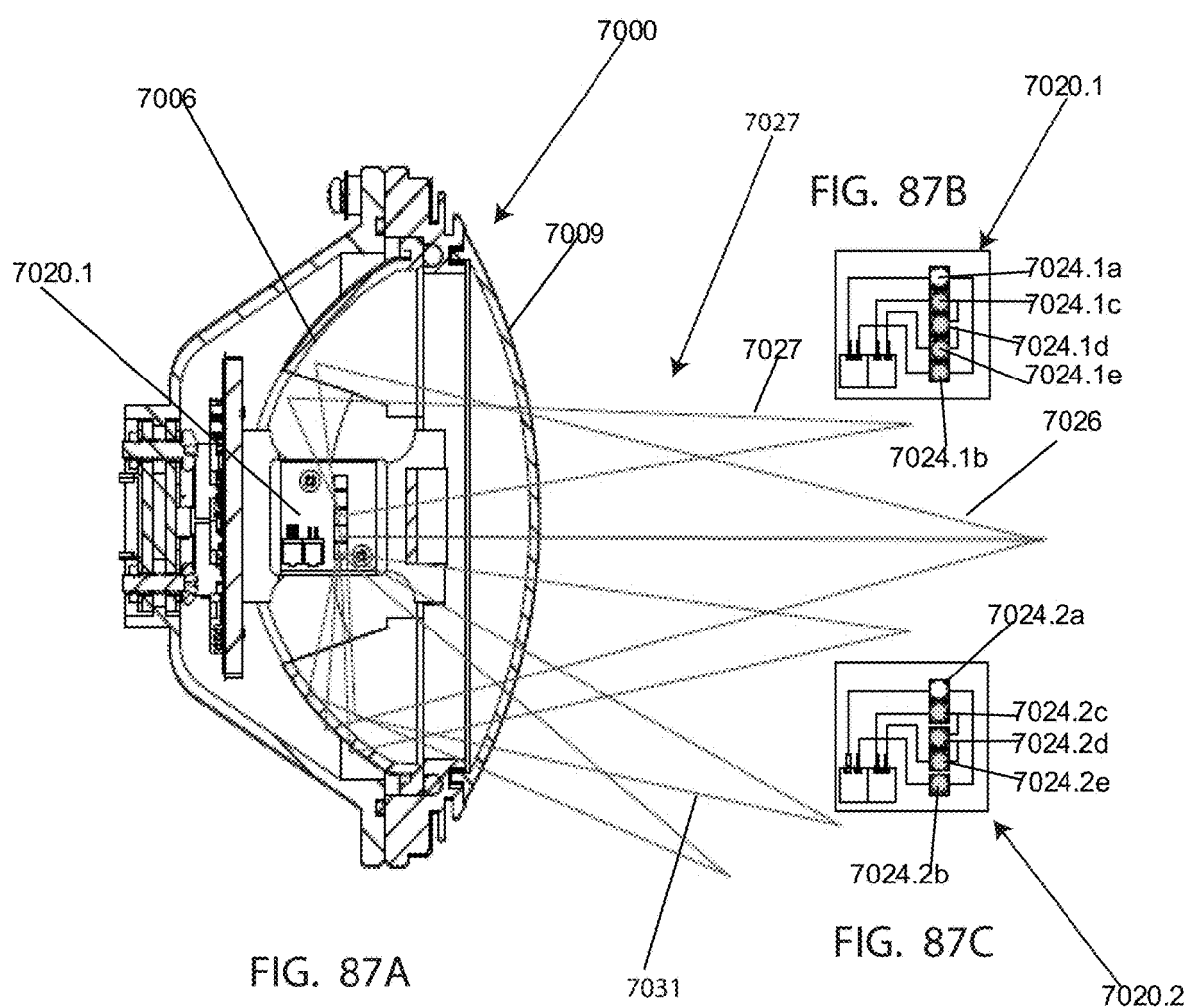

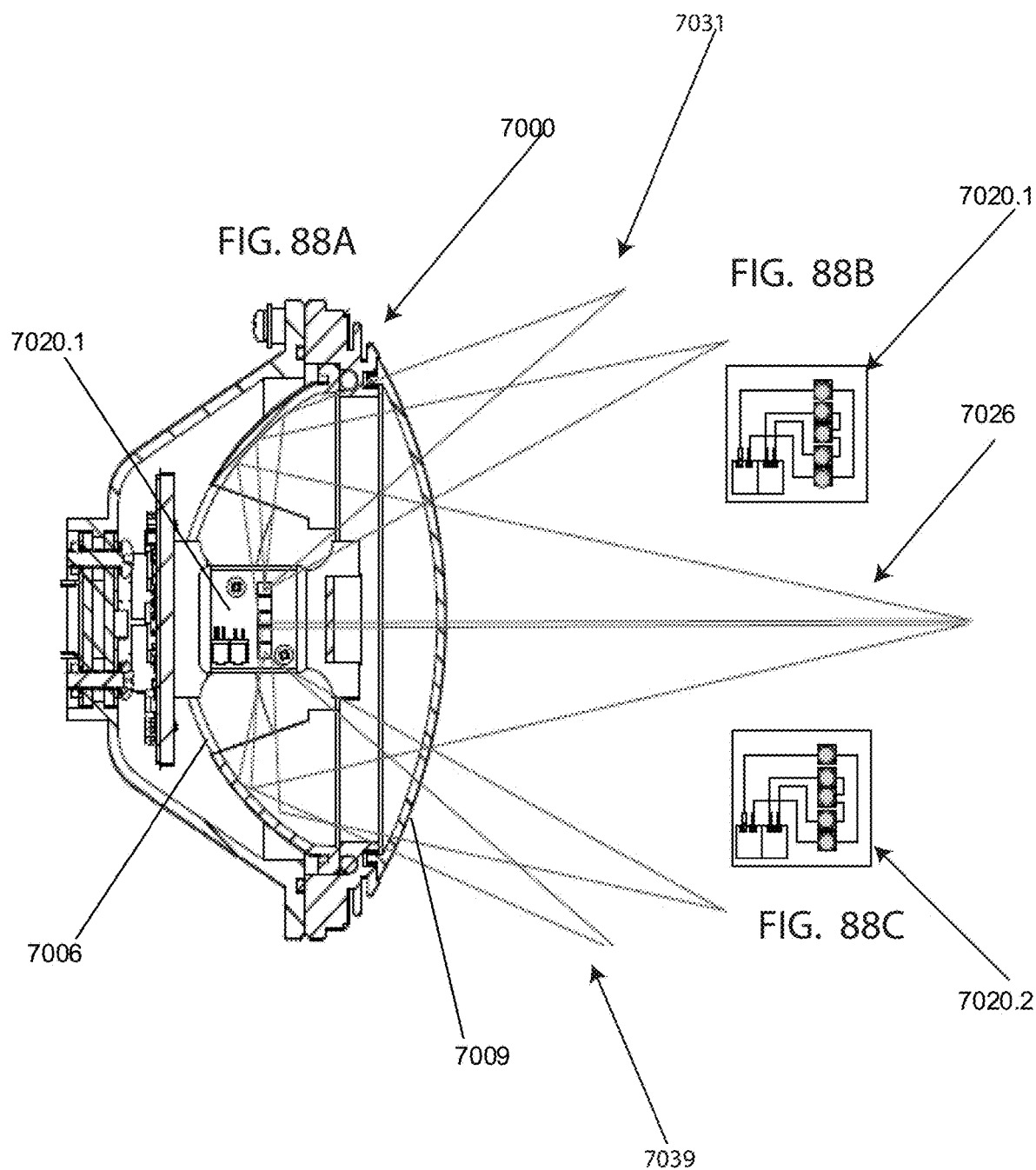

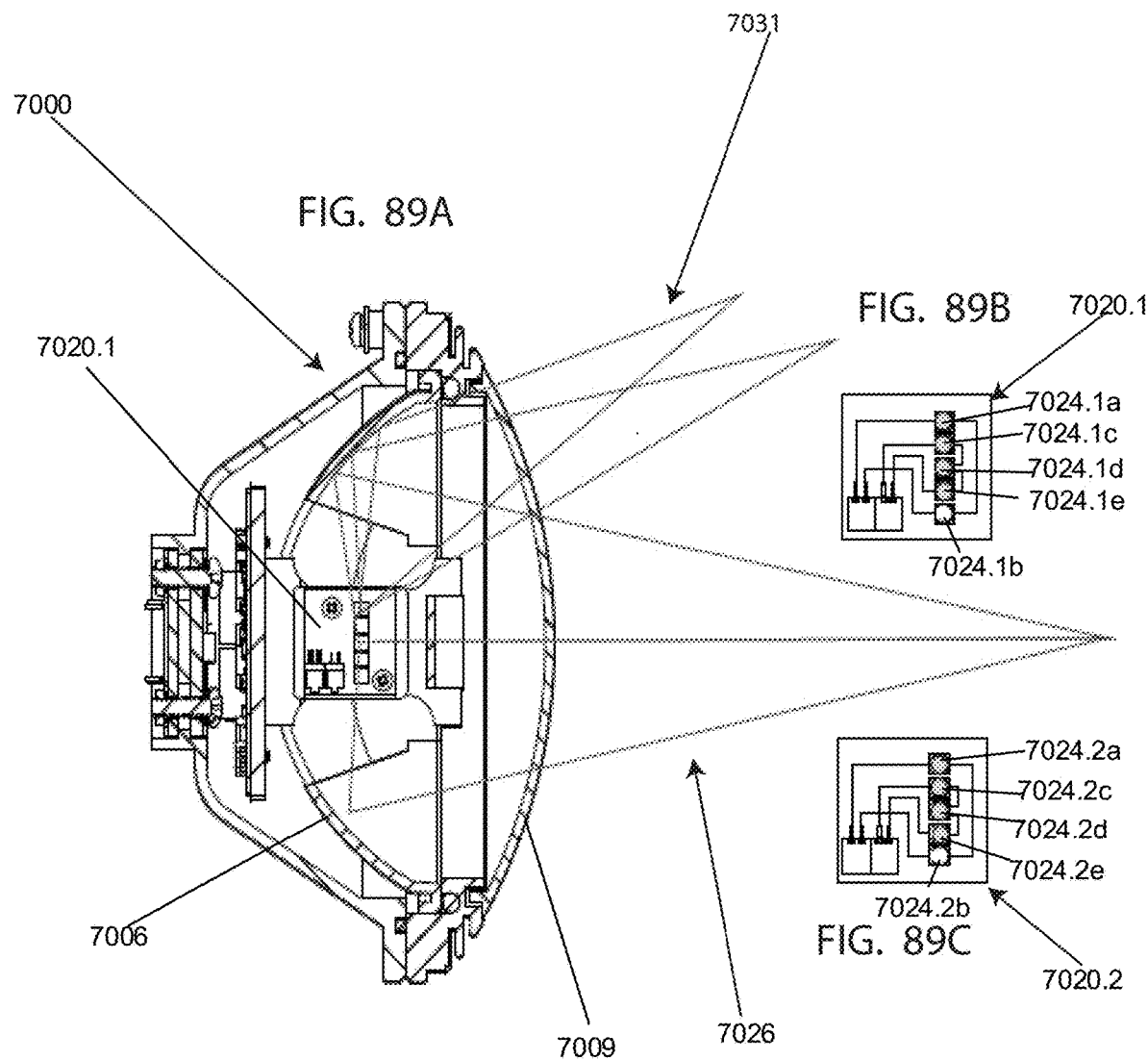

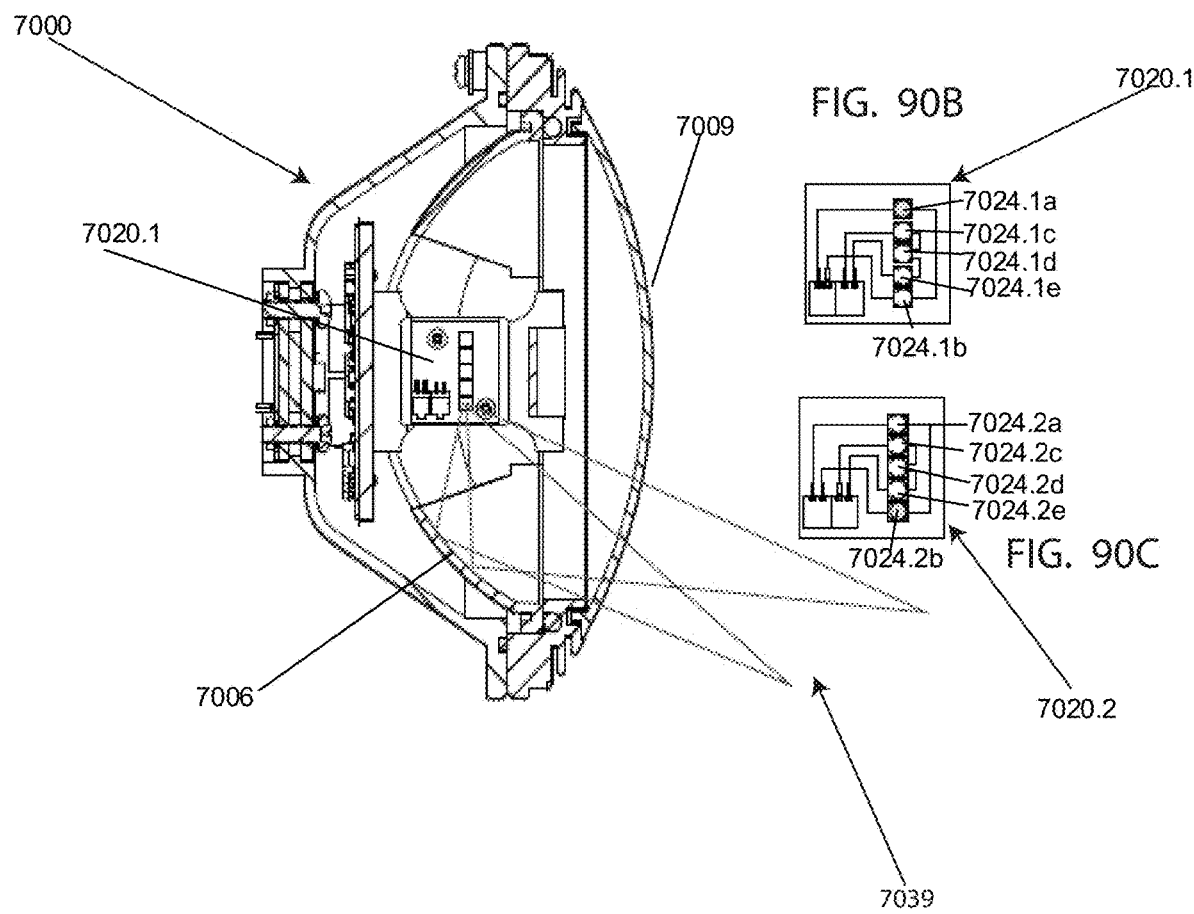

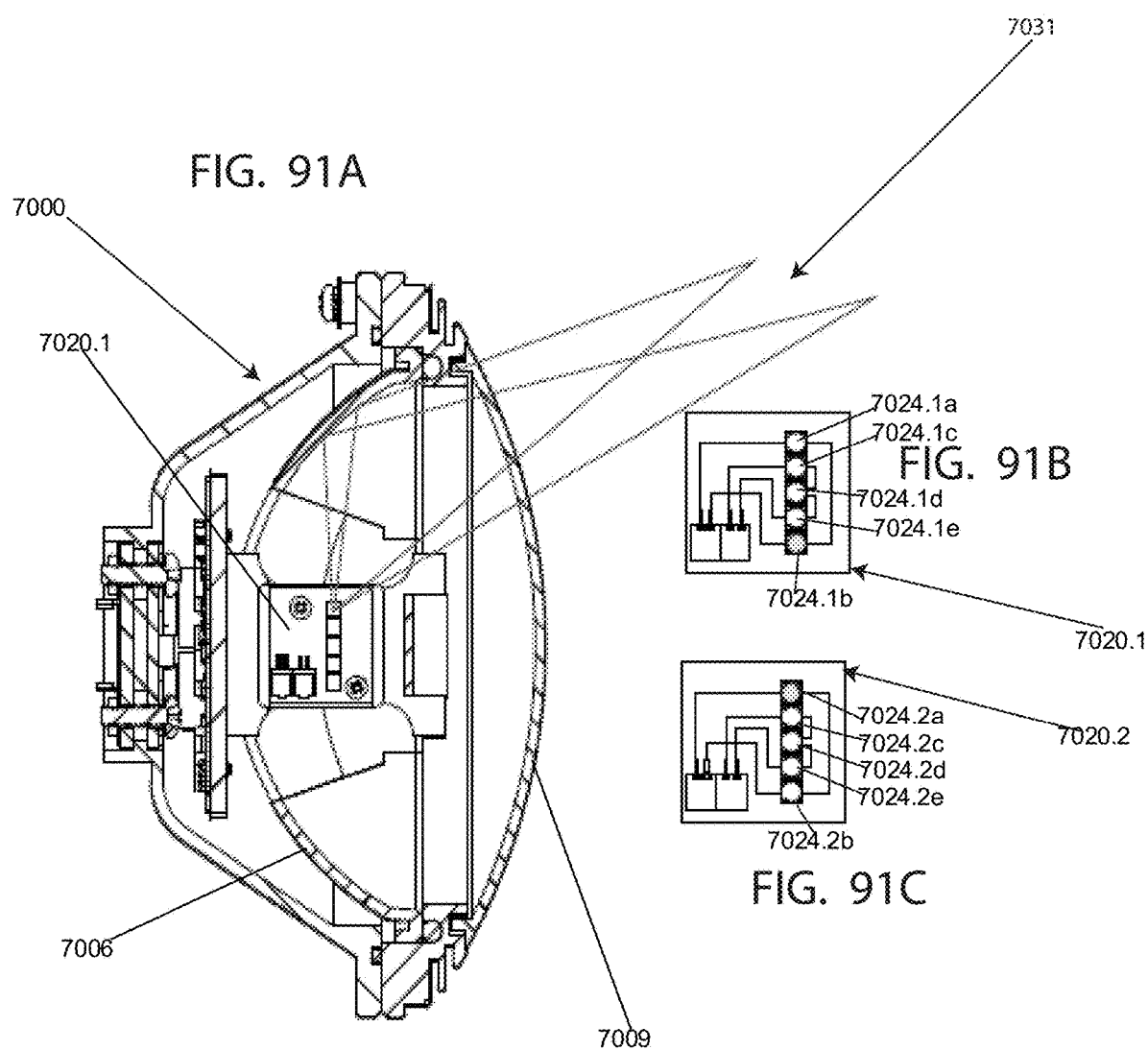

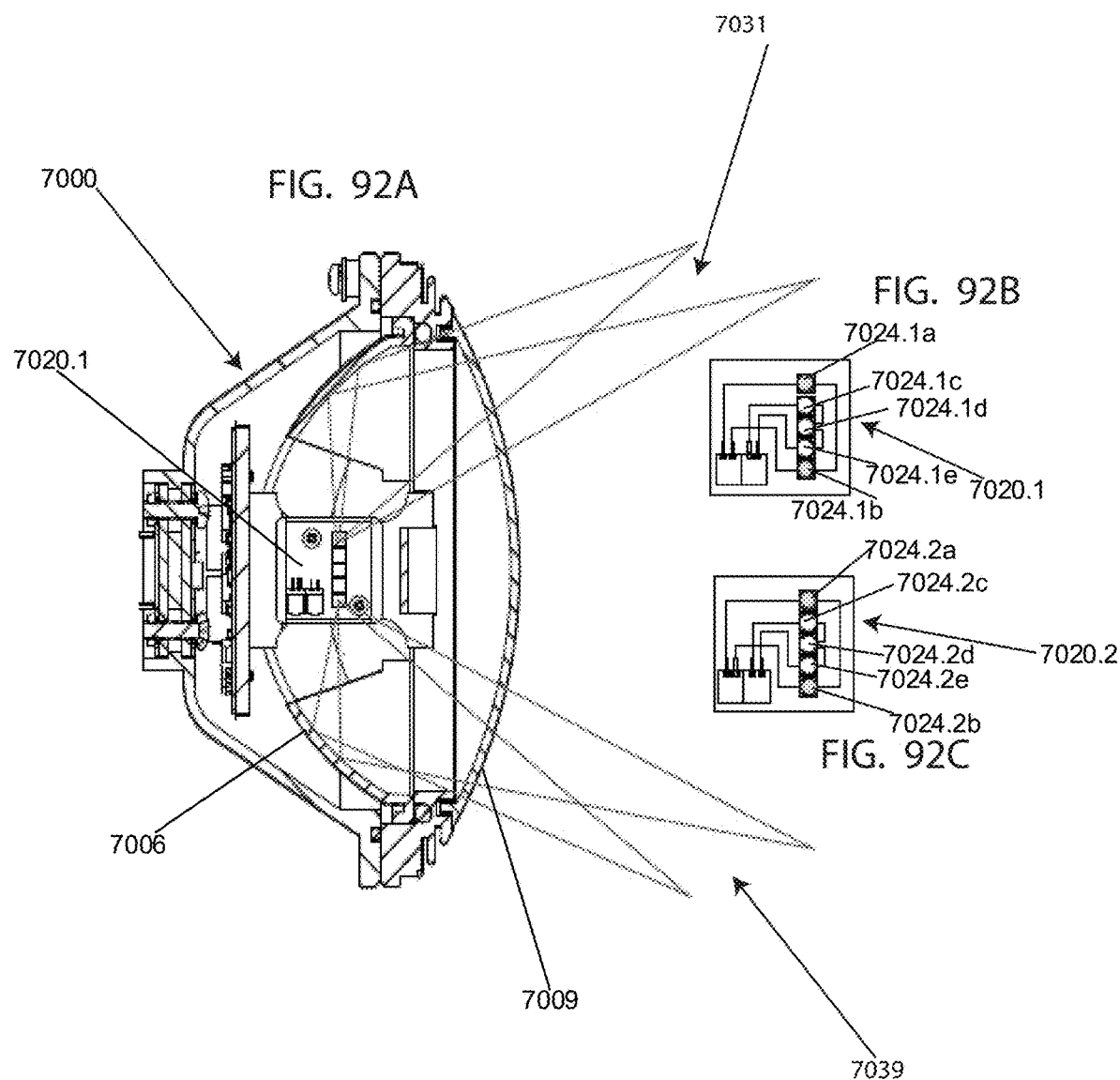

FORWARD COOLING HEADLIGHT

CROSS REFERENCE TO RELATED APPLICATIONS

This application is a continuation in part application of U.S. patent application Ser. No. 18/111,584 filed on Feb. 19, 2023 which is a continuation in part application of U.S. patent application Ser. No. 17/481,194 filed on Sep. 21, 2021, which is a non-provisional application of U.S. Provisional Application Ser. No. 63/081,288 filed on Sep. 21, 2020, the disclosure of these applications are hereby incorporated herein by reference in its entirety.

BACKGROUND OF THE INVENTION

At least one embodiment of the invention relates to a headlight that transfers all or much of the heat generated by the LED Light Engine to the front of the headlight, and dissipates such heat to the environment using a finned circular heatsink located in front of the light, such heat is used to melt ice or snow build up, and or evaporate moisture normally deposited in front of the headlight by unusual of severe weather conditions. Imbedded Heat pipes are used to transfer the heat from the LED Light Engine to the finned circular heatsink, allowing the headlights to normally illuminate the front of the vehicle under extreme weather conditions, during dub-zero temperatures and high wind conditions, an imbedded heater inside the front heatsink can generate additional heat and maintain the lens above freezing temperatures, free of ice, snow and moisture, always maintaining the lens with clear visibility and always allowing for maximum light output. Headlights for vehicles such as trains, trucks, airplanes, boats, cars or other vehicles are subject to illumination obstructions such as moisture, ice and snow.

SUMMARY OF THE INVENTION

One embodiment of the invention relates to a forward-cooling/self-deicing light comprising a body and a cover coupled to the body. Disposed inside of the cover and the body is at least one circuit board and at least one LED, wherein the LED is in communication with the circuit board. There is also at least one heat transfer device disposed in the body wherein the heat transfer device is configured to transfer heat from one component to another component where one is located inside the body, and another is located outside of the body. There is also at least one temperature sensor disposed in the body, wherein the temperature sensor configured to determine a temperature inside of the body of the light. There is also at least one heating element configured to generate heat around the perimeter of the front of the headlight wherein the heating element is coupled to the front circular heatsink which is coupled to the body. There is also at least one switch, configured to provide power to the heating element when the temperature sensor determines that the temperature inside of the light body is below a predetermined temperature

SUMMARY OF THE INVENTION

One embodiment of the invention relates to a forward LED cooling & lens deicing LED light comprising of a body and a heatsink cover coupled to the body.

Disposed inside of the cover and the body of the LED light is at least one circuit board, at least one LED, and at least one heat transfer device located behind the LED, used to quickly move to the heat generated by the LED to the heatsink cover, preventing a thermal runaway condition experienced when High intensity LEDs are operating at full output capacity.

One benefit of the invention is that it allows for remote heatsinking, which involves bringing heat from LEDs directly in touch with the environment, thus, it increases the heat transfer surface area to more than 10-fold.

The embodiment uses a heatsink cover coupled with a heat transfer device to distribute the heat generated at the bottom of LED about the much larger area of the heatsink cover. The heatsink cover is located in the outside of its mounting fixtures and in direct contact with the environment. The rear housing separates LED heat from circuit board heat, can be designed to dissipate greater amount of heat by increasing heatsink fin configuration.

One embodiment uses a rear housing which provides additional heatsinking for medium and light intensity applications. The back of housing has fins that are dedicated for the cooling of the driver board and can provide additional cooling with fins on its side when a high intensity application requires them.

The design of the heat pipes are such that they are additional heat transfer devices with circular shaped heat transfer device which is able to transfer heat away from the LEDs at a very fast rate and distribute such heat uniformly about a circular heatsink.

Thus, this embodiment uses the heat transfer device for two purposes, first, to remove the heat generated by the LED, and transporting it to the heatsink cover in front of the light, to melt ice buildup and evaporate moisture normally deposited in the front of the LED light during a wet, snowy, or icy day.

The LED driver controls light intensity, and heater to melt or evaporate any snow, ice, or moisture build up in the form of the light.

There is also a multifunctional dual channel LED driver board disposed in the body wherein the device is configured to drive the LEDs independently, control the intensity of the LED, and monitor the LED's functions and thermal conditions.

There is also at least one temperature sensor disposed in the body of the circuit board, wherein the temperature sensor is configured to determine a temperature of the circuit board which is correlated the temperature of heatsink cover.

The heating element is strategically located inside the LED mounting block which stabilizes temperature signature during sub-zero degree weather and maintains such temperature until severe weather is no longer present.

There is also at least one heating element coupled to one end of the heat transfer devise configured to generate additional heat inside the body of heat transfer device when then capacity of the heat generated by the LEDs in not enough to remove the snow, and ice deposited in the heatsink cover.

In at least one embodiment, a mounting apparatus that mounts the heat transfer devices and the LEDs in many configuration with passage ways to for the heat transfer device conduit heat toward the front heatsink cover.

The is also at least one LED/Mounting tombstone configured to provide a mounting platform for the LEDs board, and the heat transfer devises. The tombstones are further configured to allow many LED mounting configurations which depend on the requirements of the LED light.

In addition, the lens design allows for use in combination with facetted or parabolic reflectors and can be prismatic or smooth shape with internal nano particles that increase the temperature of the lens, taking advantage of the radiative heat generated by the LEDs.

There is also at least one lens configured to protect the inside of the body of the light. The invention also provides for the lens to be reconfigured with prismatic shapes that will split the light beam in many directions for the purposes meeting certain light footprint requirements as required by industry lighting standards. Another feature of this invention is to impregnate nano steel particles into the lens for the purposes of using the radiated light to heat up the lens and aid in the melting of the ice, snow, and evaporating moisture from the form of the light.

There is also facetted and parabolic reflector can be used to satisfy different applications.

There are also within the body of the light, provisions for the use multiple reflectors. There are at least to types of reflectors: facetted and parabolic. These reflectors provide different light focusing attributes used in a multitude of applications.

There is also at least one power contact coupled to the body of the light, wherein the power contact is configured to receive power into the body of the light: For example, power goes into the LED driver.

Power is fed into the two LED Drivers which are configured to regulate the input power (Voltage and Current) and deliver regulated power to LEDs. next, the LEDs light up, generating high intensity light and large amount of heat. The heat transfer device immediately moves the heat from the LEDs to the to the heatsink cover. The temperature of the board is monitored by the temperature sensor inside the circuit board. If the temperature of the board is not about a above zero water the circuit board will turn "ON" the heater and add addition heat until the any snow, ice, or moisture is evaporated from the front of the light. Once the Temperature senses that the temperature reaches a predetermined temperature, the heater will be turn "OFF" by a signal coming from circuit board. The board will keep monitoring the temperature and maintain it at a predetermine value until such time that the severe cold weather conditions get warmer.

The heatsink cover is configured so that it has groves where the heat transfer devices are mounted. The heat transfer device deposits the heat coming from the LEDs around the circular fins located around its perimeter. The heat is then dissipated by the heatsink cover fins.

The regulating LED driver board operation is such that when the temperature is below zero ice, the driver board allows more current to flow into the LEDs for the purposes of generation more heat. The heat from the LEDs is moved to the heatsink cover for the purposes of melting any ice or moisture build up in the heatsink cover. If the sensor senses that the temperature in the driver board is below zero, the driver board increases the power to the LEDs until such time that the junction temperature of the regulator is above zero ice. If the temperature still does not sense a higher temperature higher than zero-ice. In addition, the driver board will allow the solid-state switch to open and send power to the heater, until such time that the temperature on the driver board is higher than zero-ice.

Thus, there is created a smart headlamp which is configured to both act as a light and as a de-icer.

BRIEF DESCRIPTION OF THE DRAWINGS

These and other benefits and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIG. 2a shows a bottom perspective view of the embodiment shown in FIG. 1

FIG. 2B is a top view of the light;

FIG. 2C is a first side view of the light;

FIG. 2D is another side view of the light;

FIG. 2E is a bottom perspective view of the light;

FIG. 7 is a cross-sectional view taken along line B-B shown in FIG. 4;

FIG. 8B is a detail view of detail D shown in FIG. 8a;

FIG. 26A is a first perspective view of the heat pipe;

FIG. 26B is a side view of the heat pipe;

FIG. 26C is a top view of the heat pipe;

FIG. 27 is a perspective view of the two heat pipes;

FIG. 29A is a bottom perspective view of a reflector of a new embodiment;

FIG. 29B is a top perspective view of the reflector of FIG. 29A;

FIG. 31A is a bottom perspective view of the LED lights on their mounting plate;

FIG. 31B is a top perspective view of the LED lights on their mounting plate;

FIG. 33A is a bottom view of the lens;

FIG. 33B is a top view of the lens;

FIG. 40A is a front perspective view of a back heat sink;

FIG. 40B is a side view of a back heat sink;

FIG. 53 is another block diagram for the electrical system for the headlight;

FIG. 54 is another block diagram for the electrical system for the headlight;

FIG. 55 is another block diagram for the electrical system for the headlight; and FIG. 56 is a flow chart for the process for heating the headlight;

FIG. 57 is an exploded view of another embodiment of a headlight;

FIG. 58A shows a side exploded view of the headlight of FIG. 57;

FIG. 58B shows a side view of the assembled headlight of FIG. 57;

FIG. 58C shows a top perspective view of the assembled headlight of FIG. 57;

FIG. 59 is a bottom view of the headlight of FIG. 57;

FIG. 60A is a side cross-sectional view of the headlight of FIG. 57 taken along line A-A of FIG. 59;

FIG. 60B is a side cross-sectional view of the headlight taken along section line B-B;

FIG. 60C is a side cross-sectional view of the headlight taken along section C-C;

FIG. 61A is a close-up detailed view of a section of the embodiment of FIG. 57;

Figure 57:
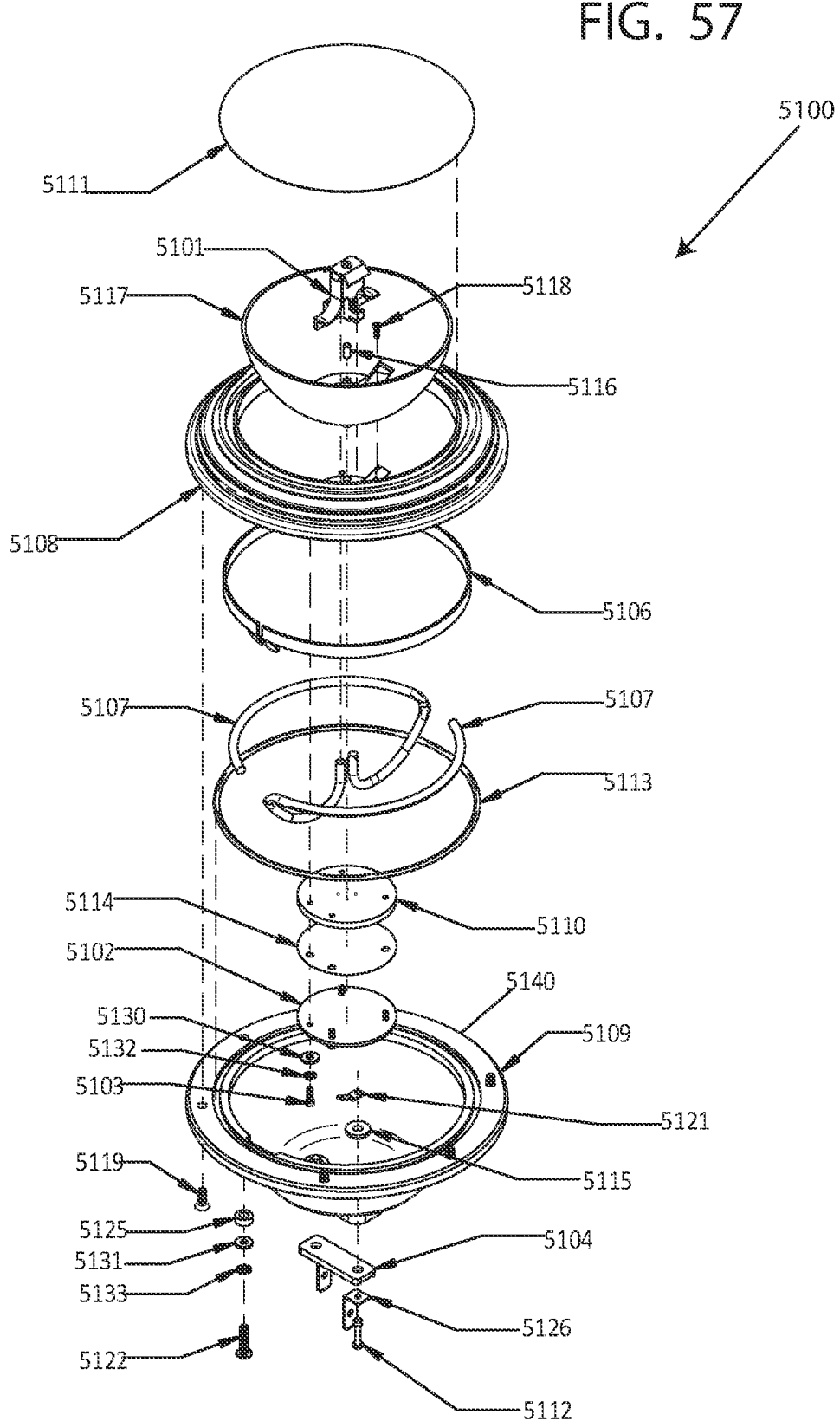
Figure 61A:
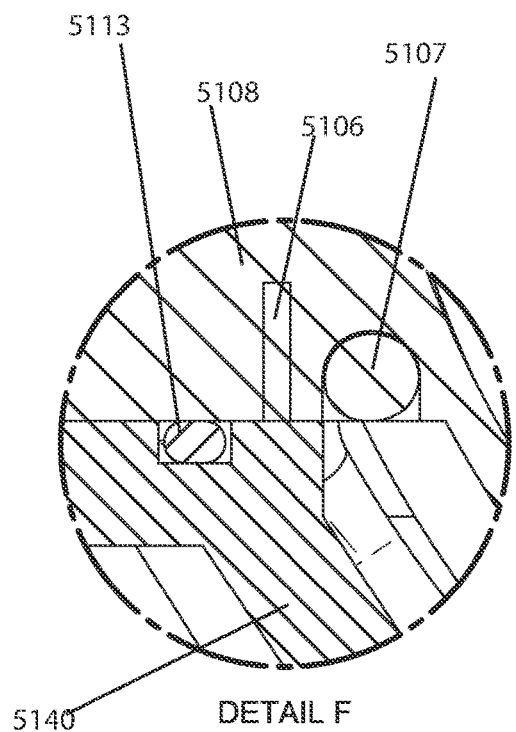
Figure 61B:
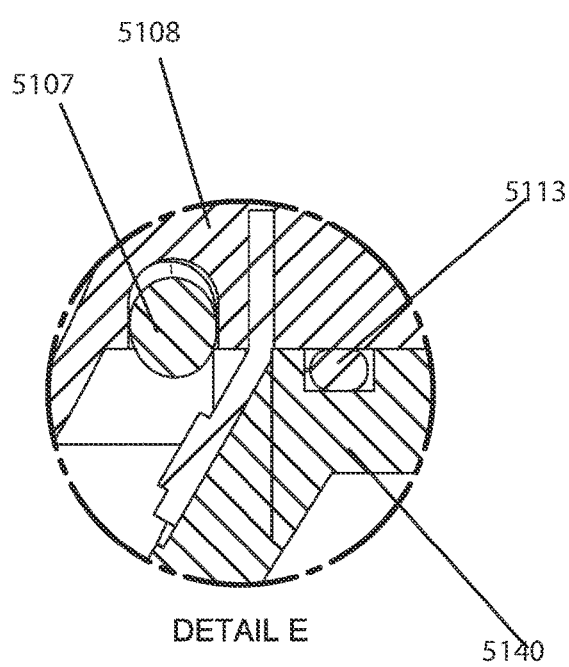
Figure 63:
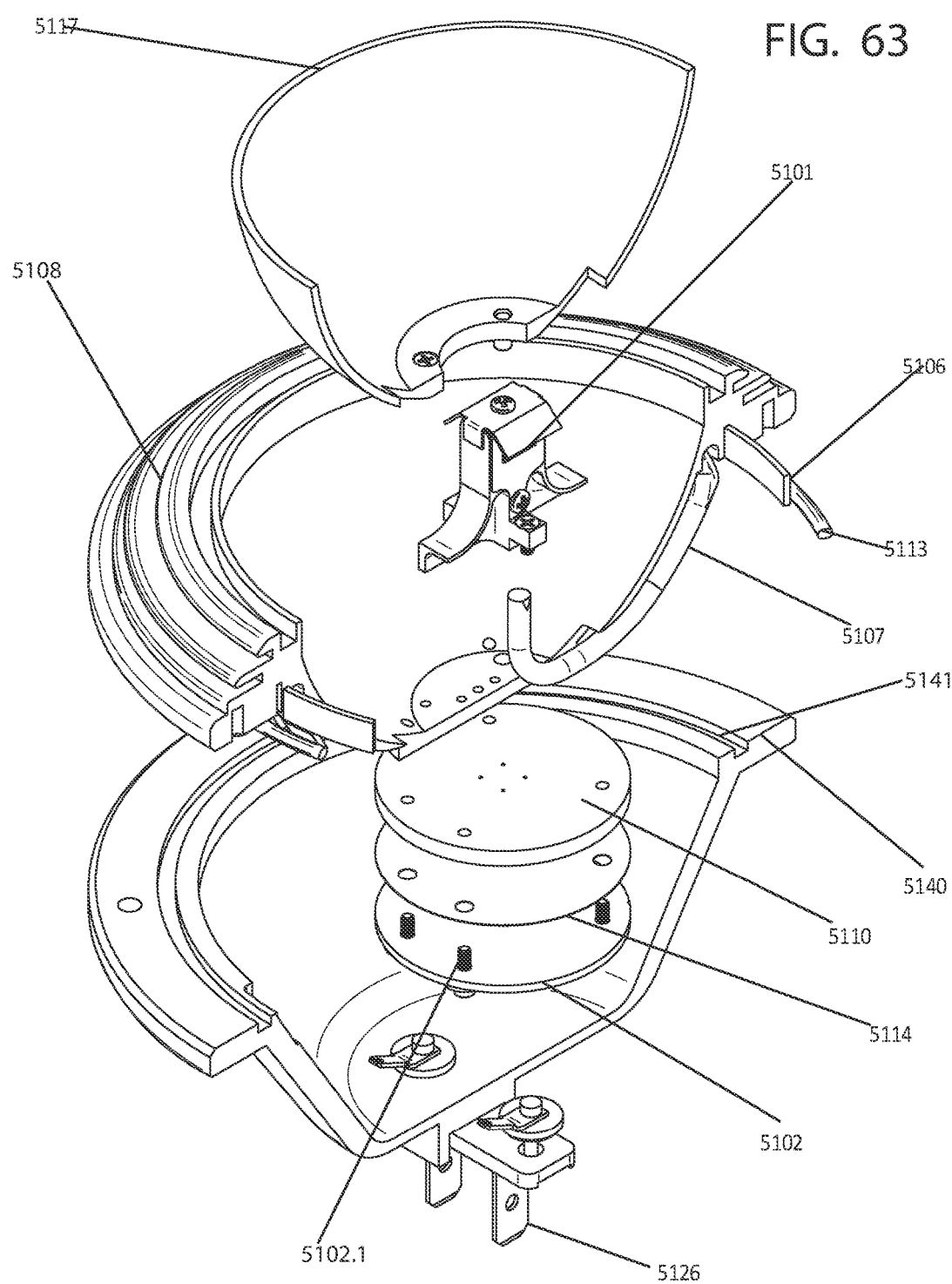
Figure 64:
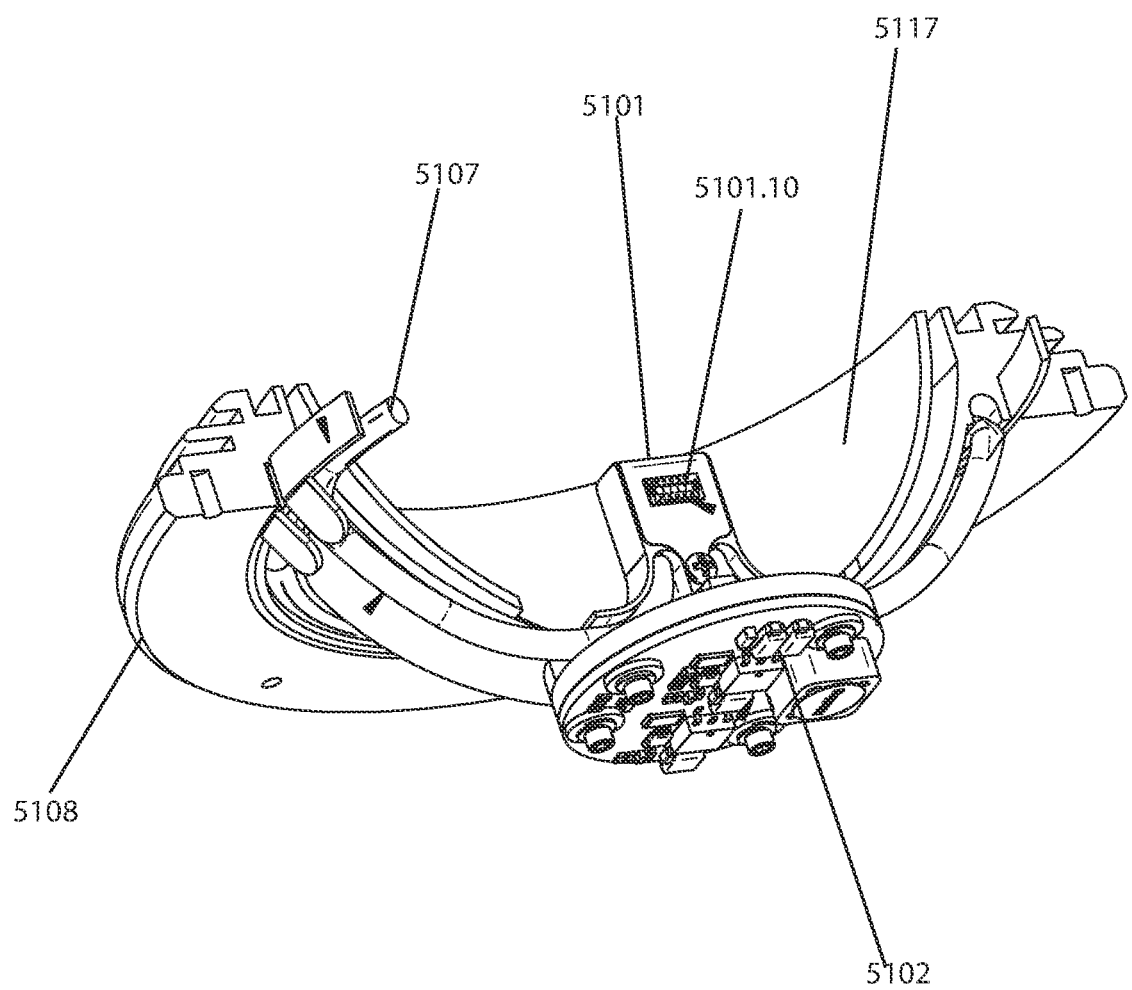
Figure 67:
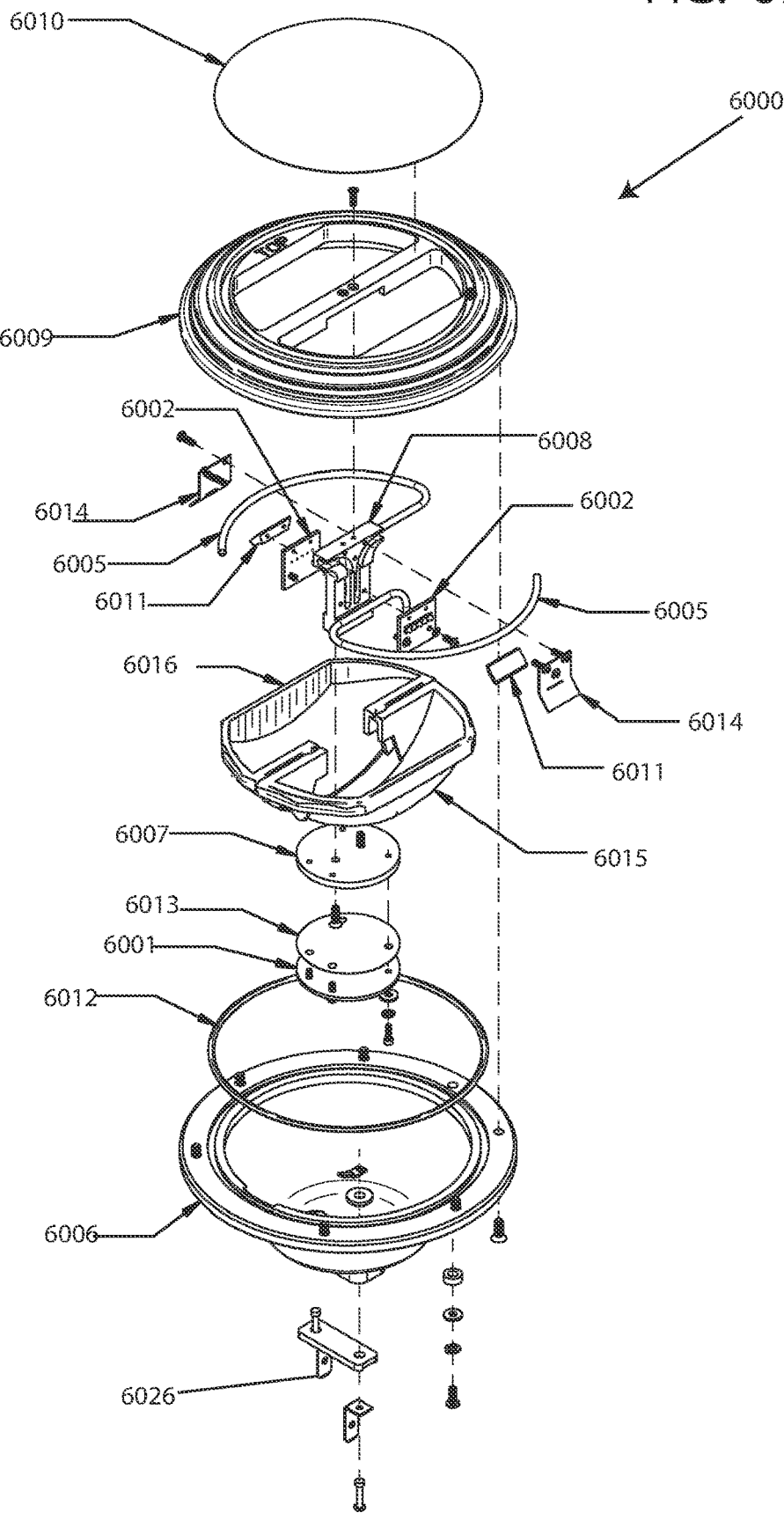
Figure 68A:
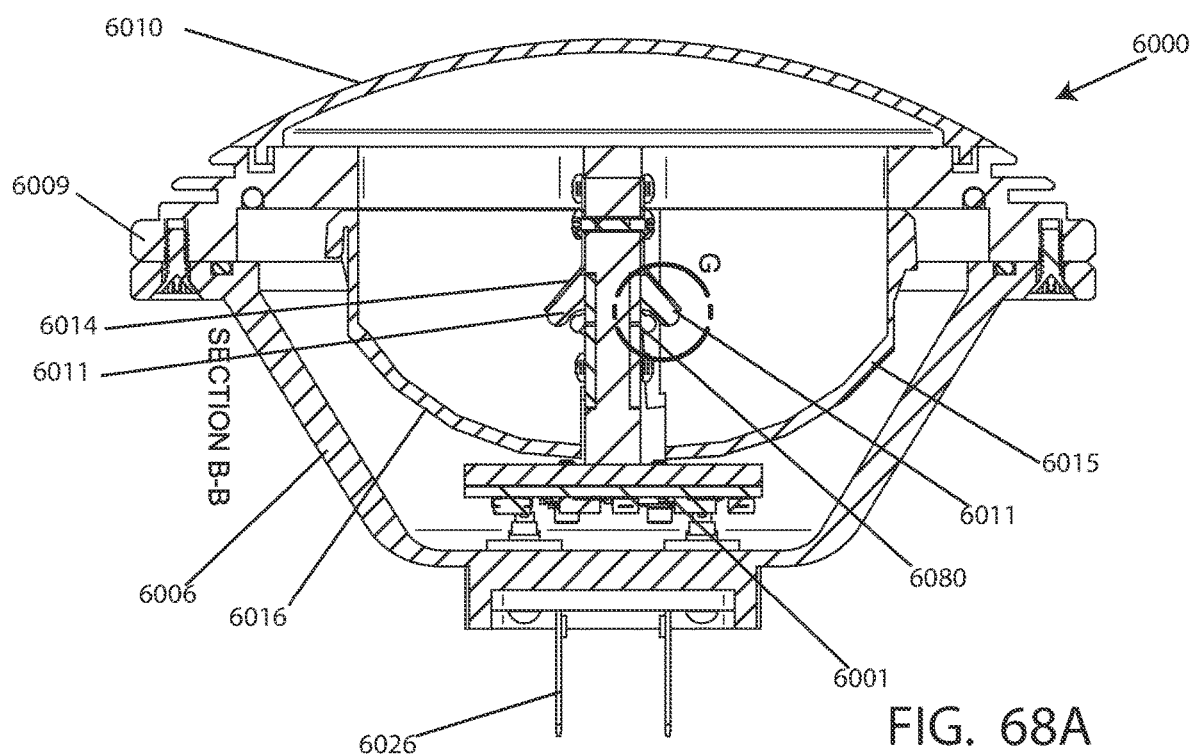
Figure 68B:
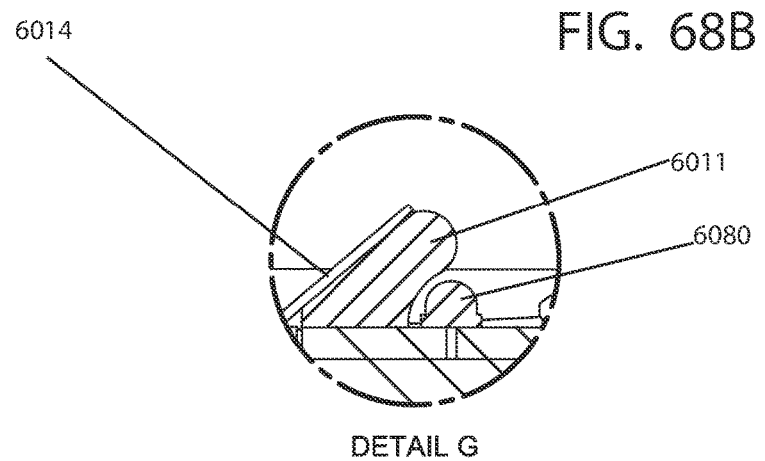
Figure 69:
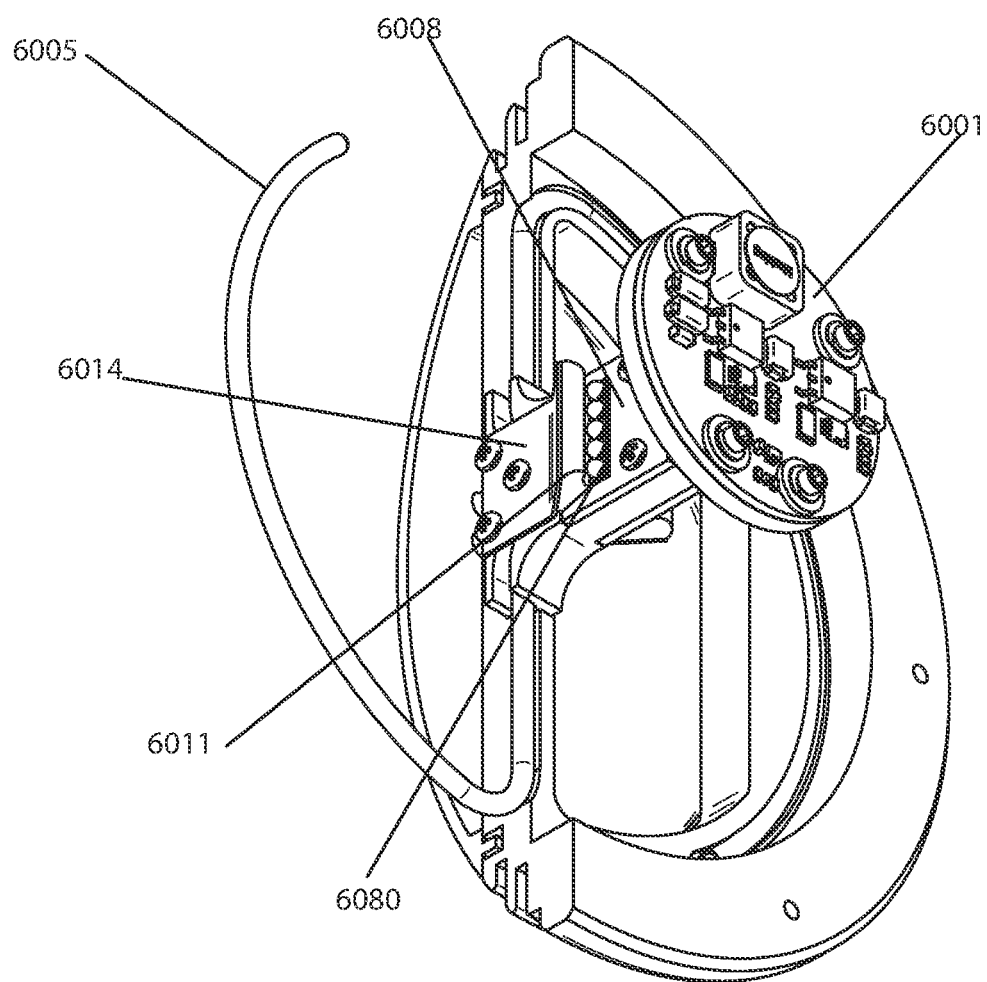
Figure 70:
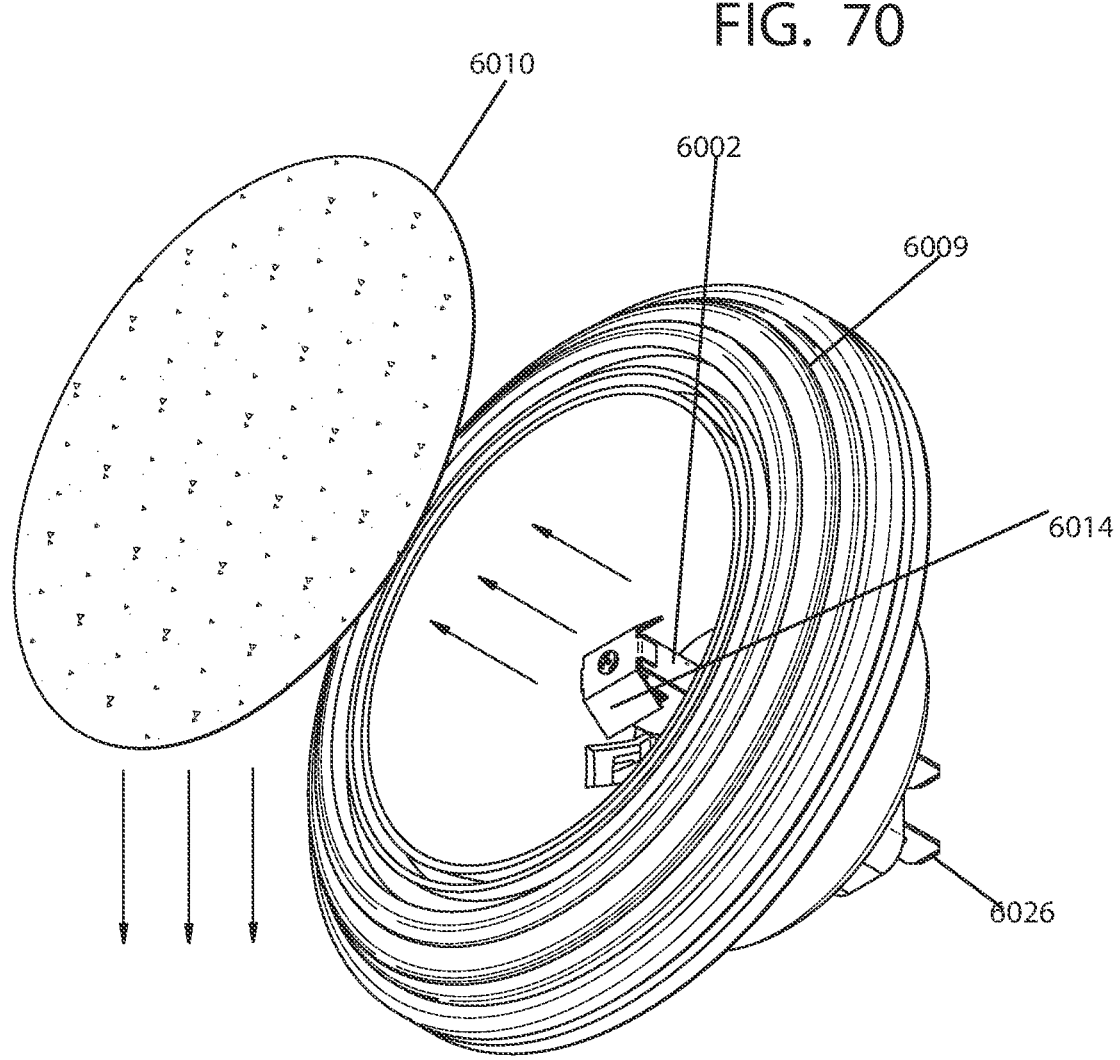
Figure 71:
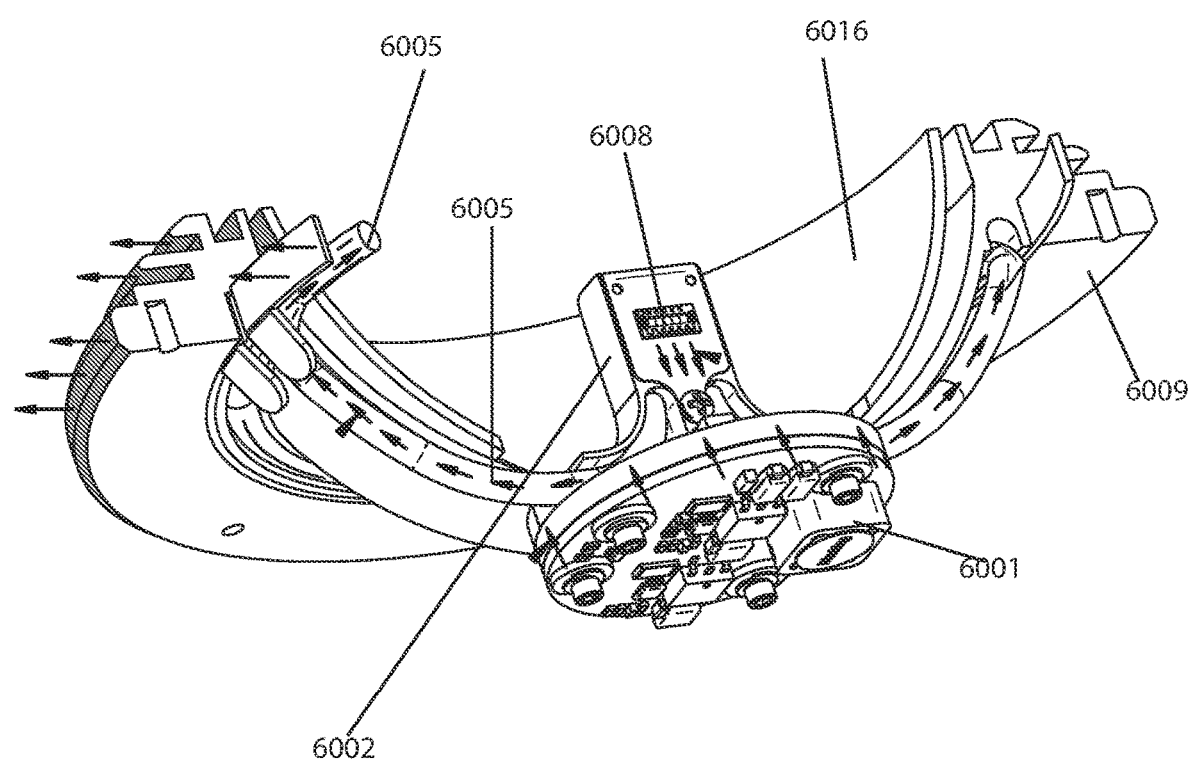

FIG. 61B is a close up detailed sectional view of the embodiment of FIG. 57;

FIG. 62 is a side view of the embodiment shown in FIG. 57;

FIG. 63 is a side exploded perspective sectional view of the embodiment shown in FIG. 57;

FIG. 64 is a side sectional view of the embodiment shown in FIG. 57;

FIG. 65A is a side exploded view of a tombstone heat sink with a light;

FIG. 65B is an assembled side top perspective view of the heatsink of FIG. 65A;

FIG. 66A is a side view of the heatsink of FIG. 65A;

FIG. 66B is a top view of the heat sink of FIG. 65A;

FIG. 66C is a side assembled view of the heat sink of FIG. 65A;

FIG. 66D is a bottom assembled view of the heat sink of FIG. 65A;

FIG. 67 is a perspective view of another embodiment of a headlight;

FIG. 68A is a side cross sectional view taken along section line B-B of the light of FIG. 67;

FIG. 68B shows a detailed view of the light in detail G showing the lens;

FIG. 69 is a side perspective view of heat pipes and motherboard assembly coupled to the circular heat sink;

FIG. 70 is a perspective view of the headlight of FIG. 67 with the lens removed;

FIG. 71 is a side perspective cut-away view of the headlight of FIG. 67

Figure 72A:
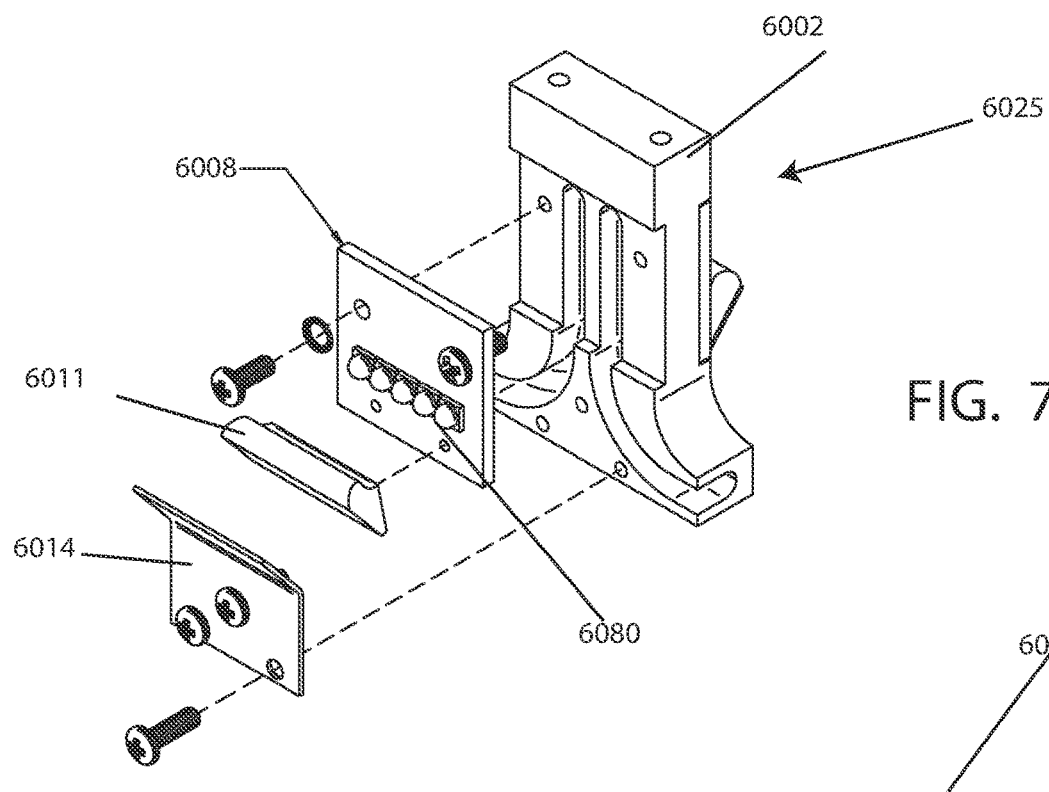
Figure 72B:
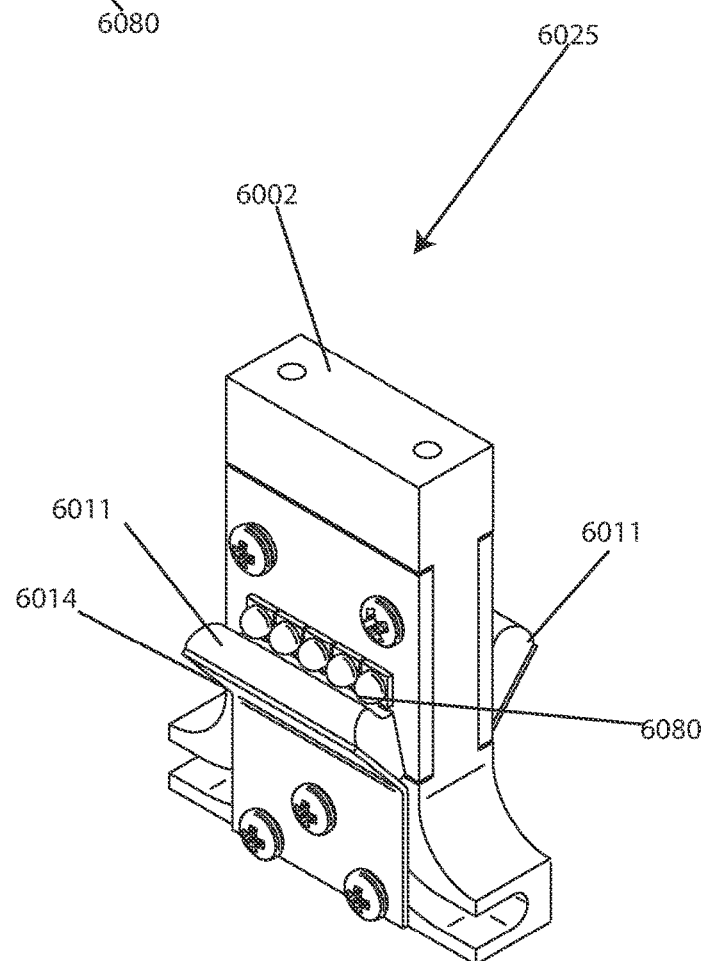
Figure 73A:
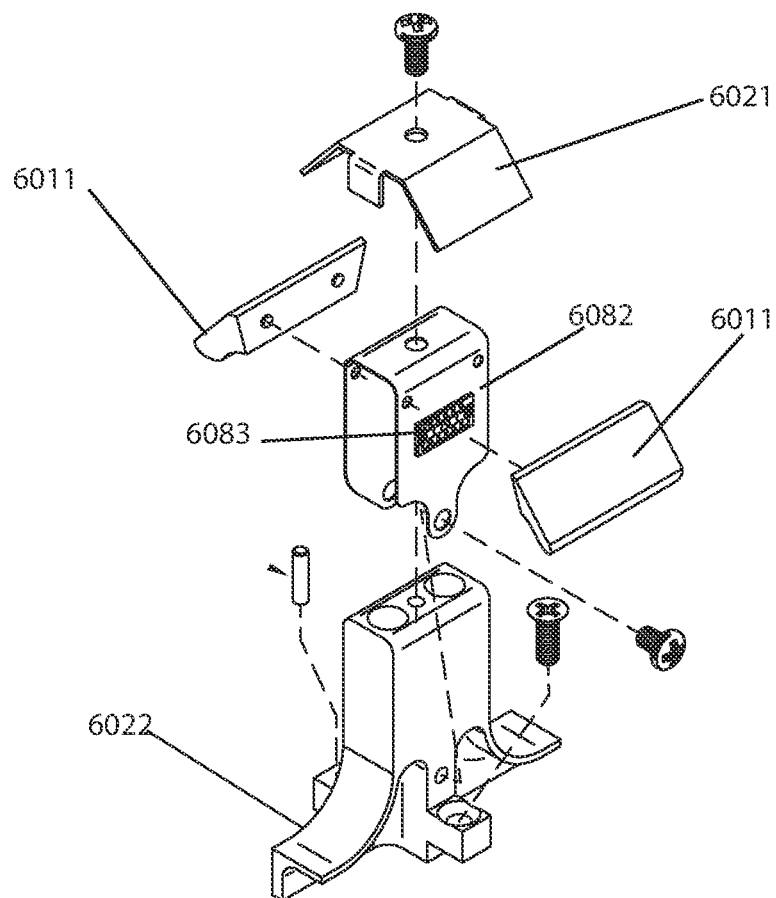
Figure 73B:
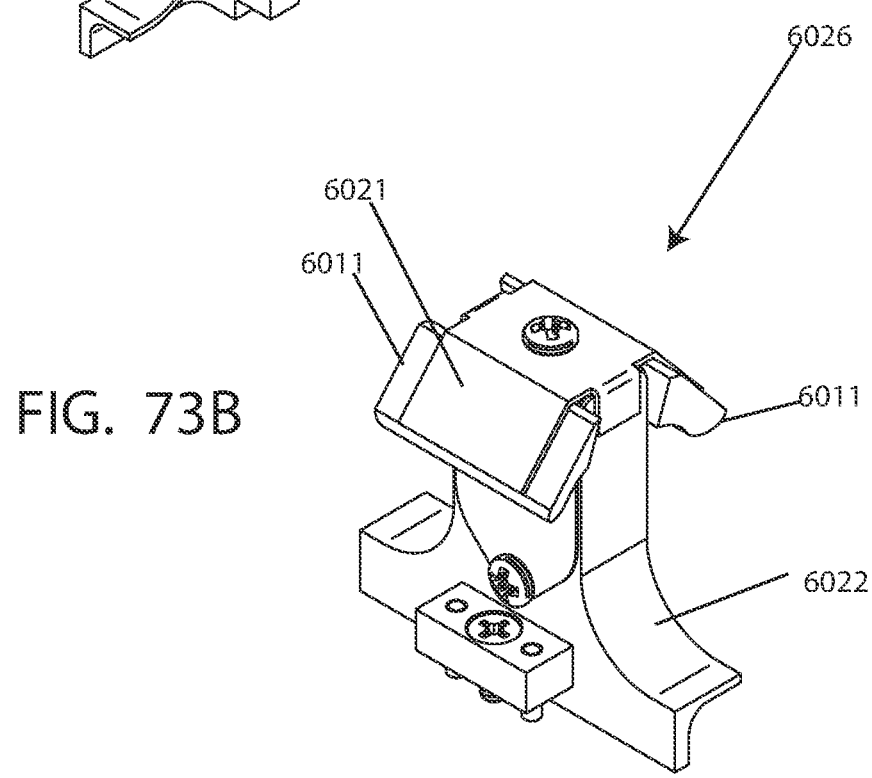
Figure 74A:
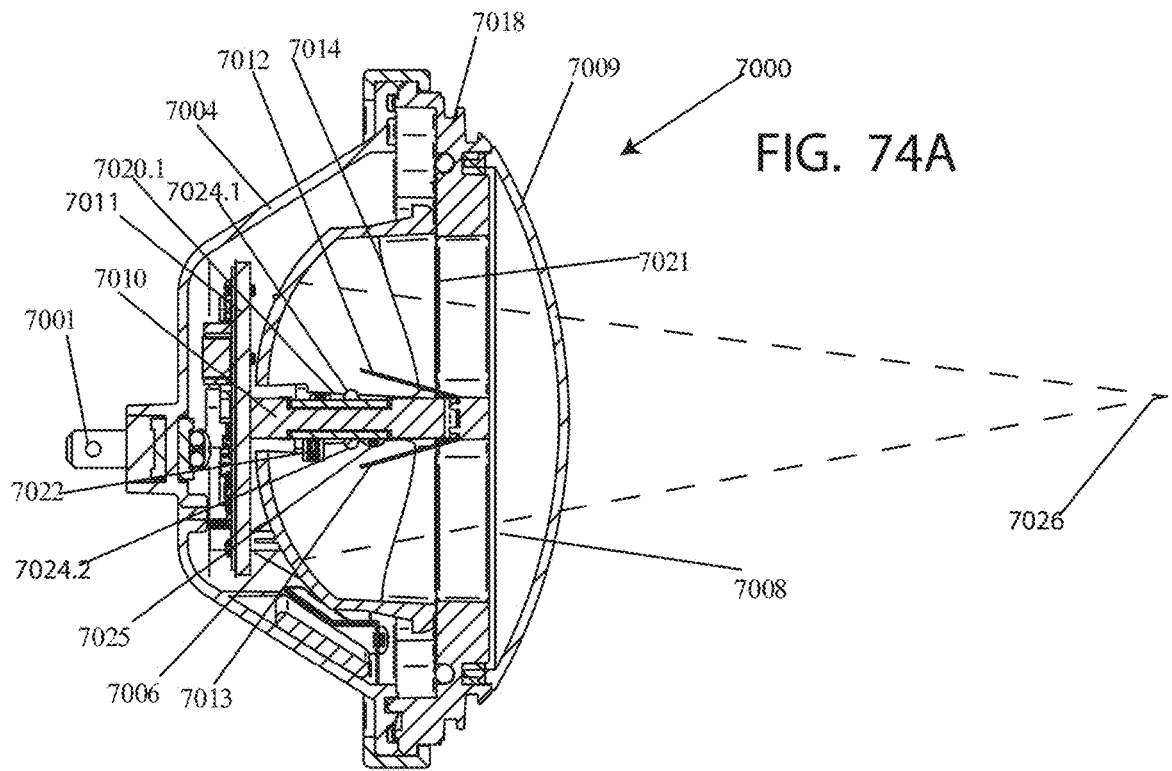
Figure 74B:
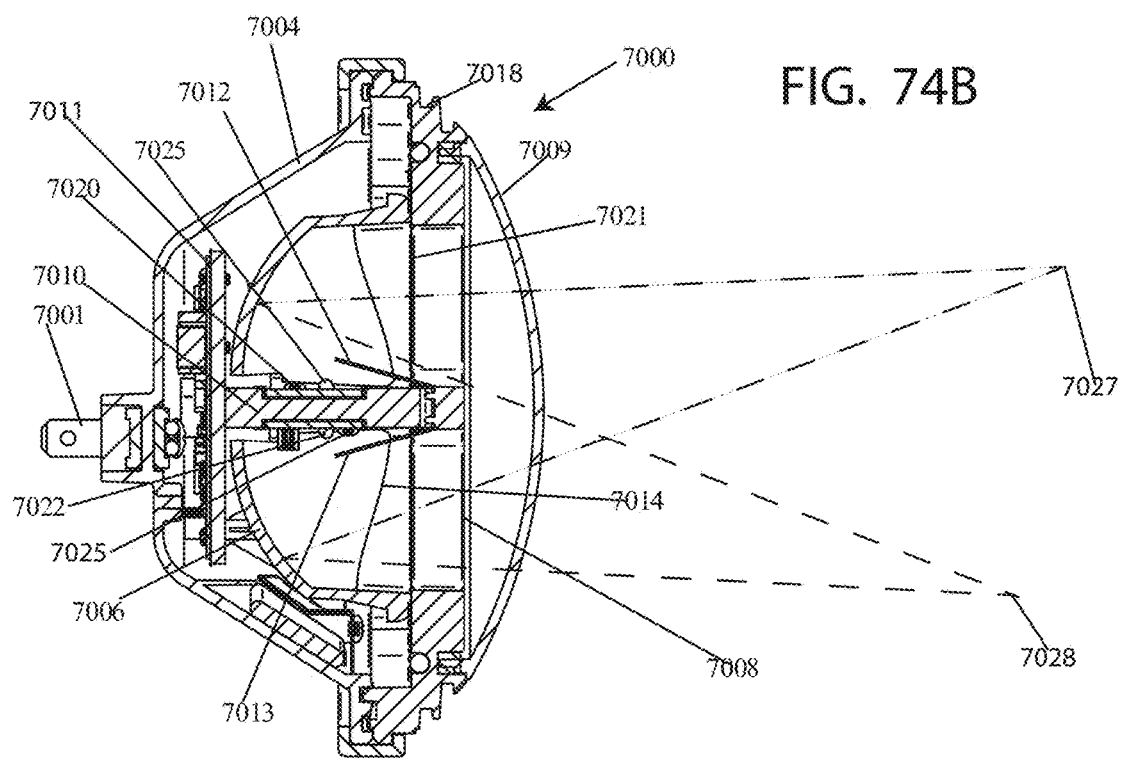
Figure 76:
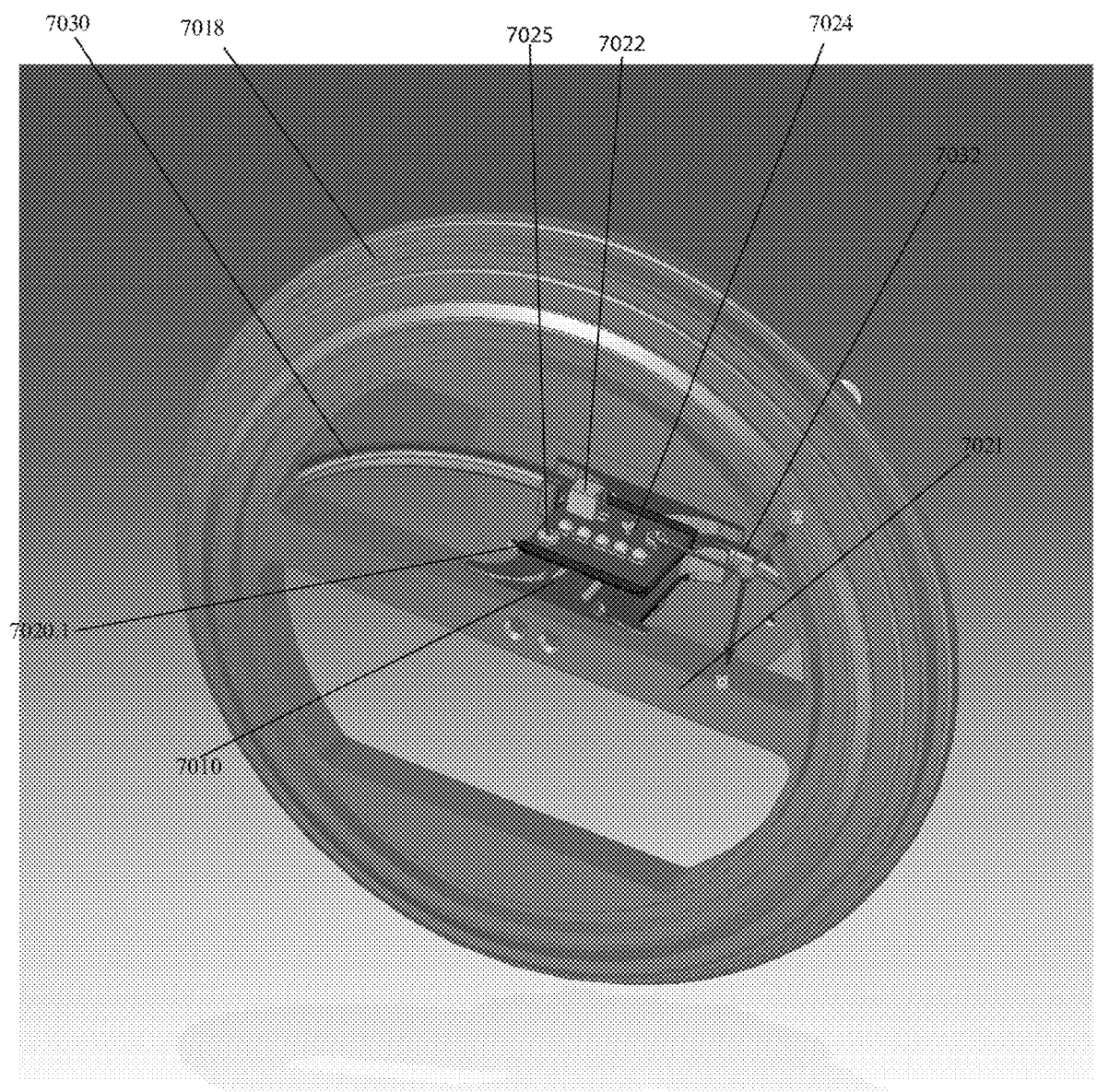
Figure 77:
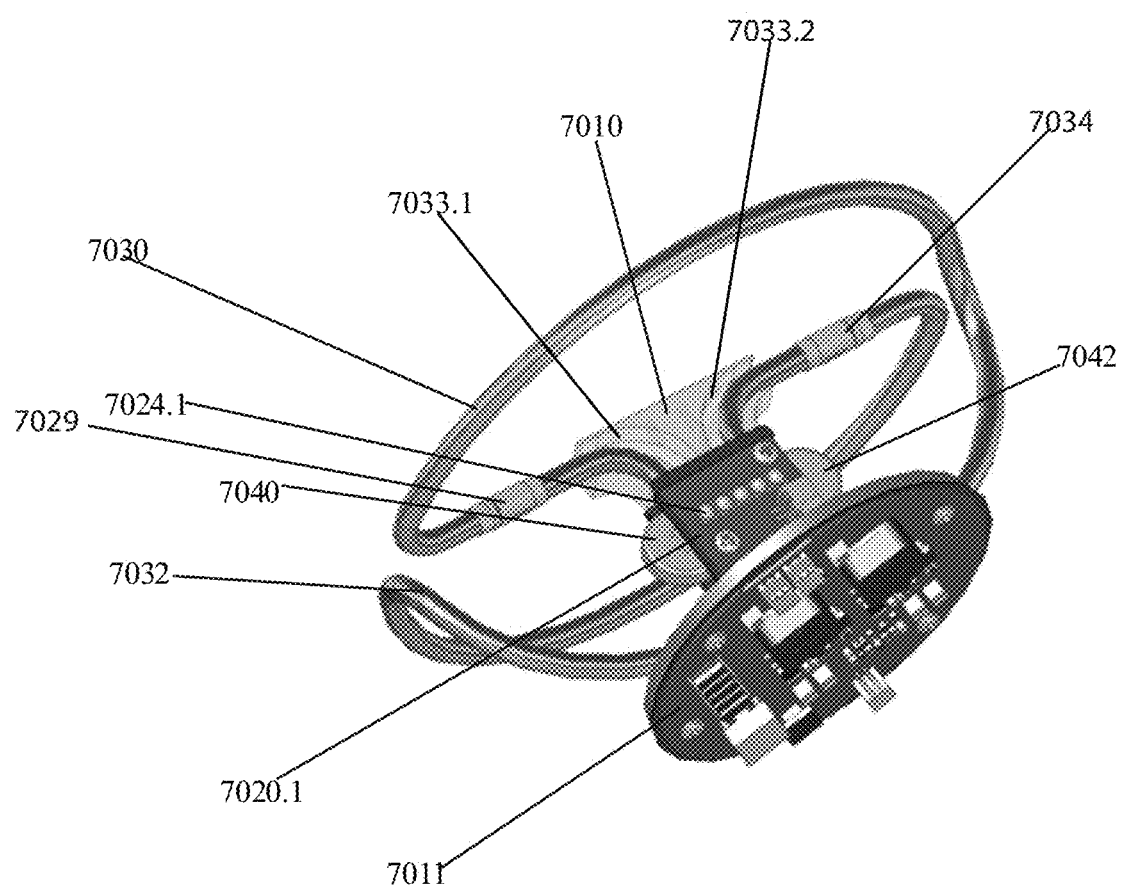
Figure 78:
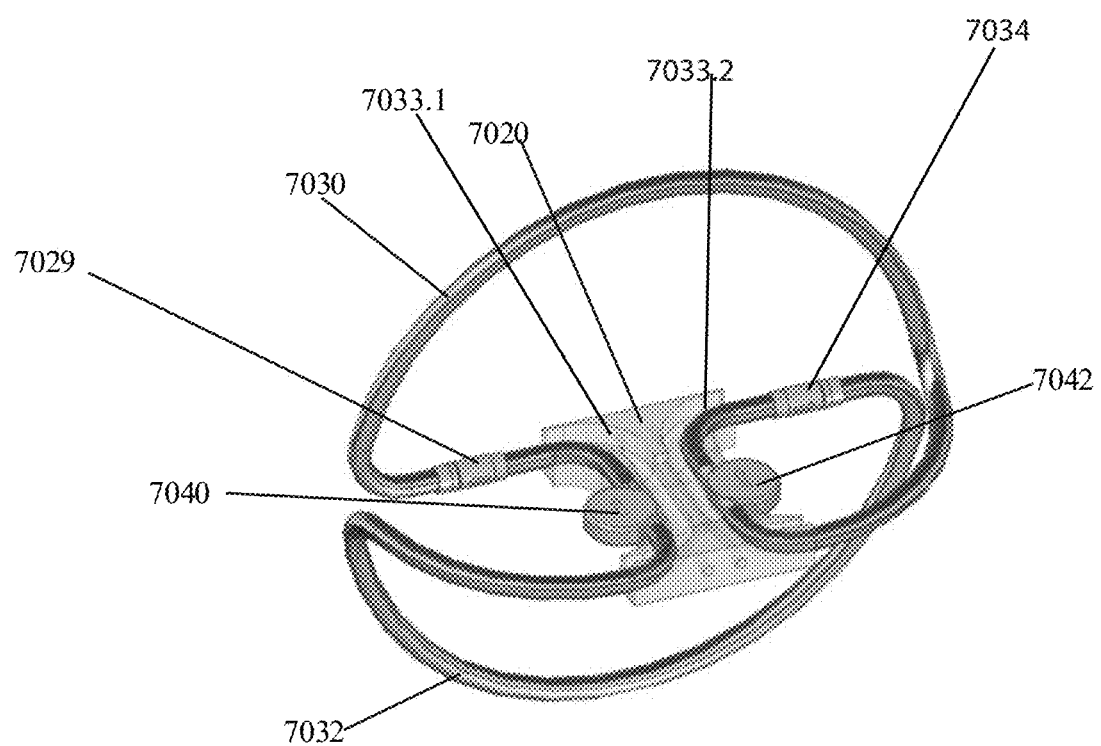
Figure 79:
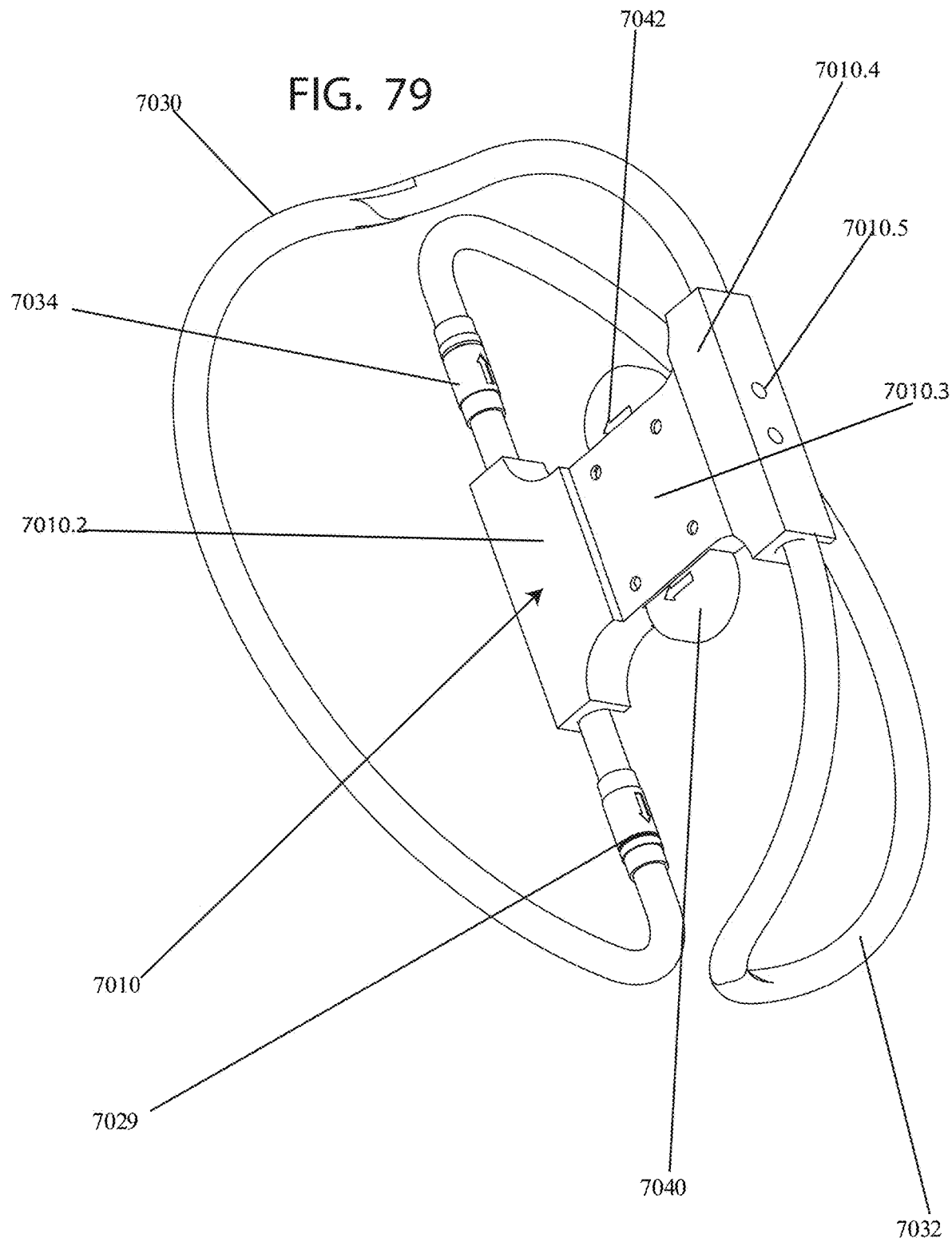
Figure 80:
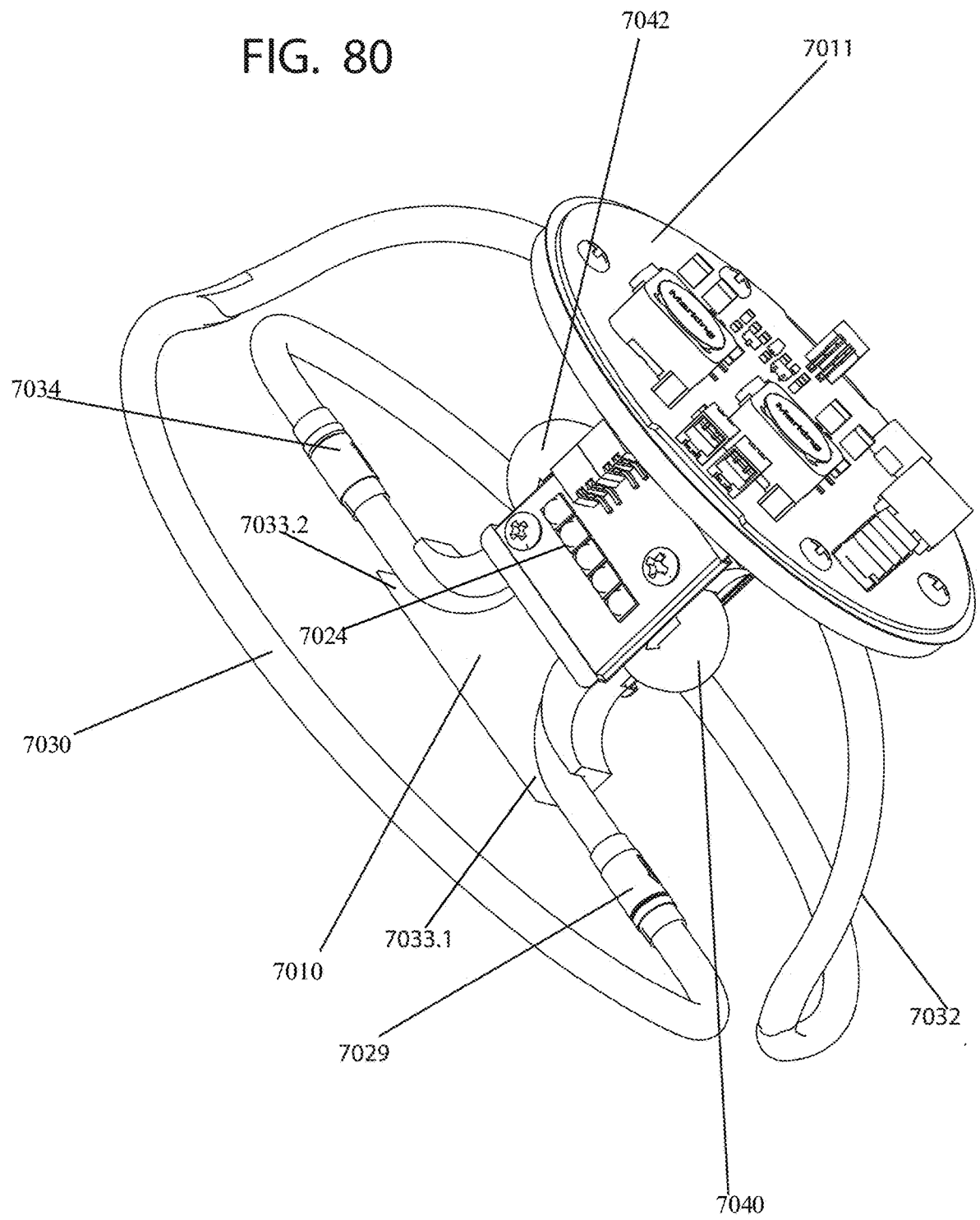
Figure 81:
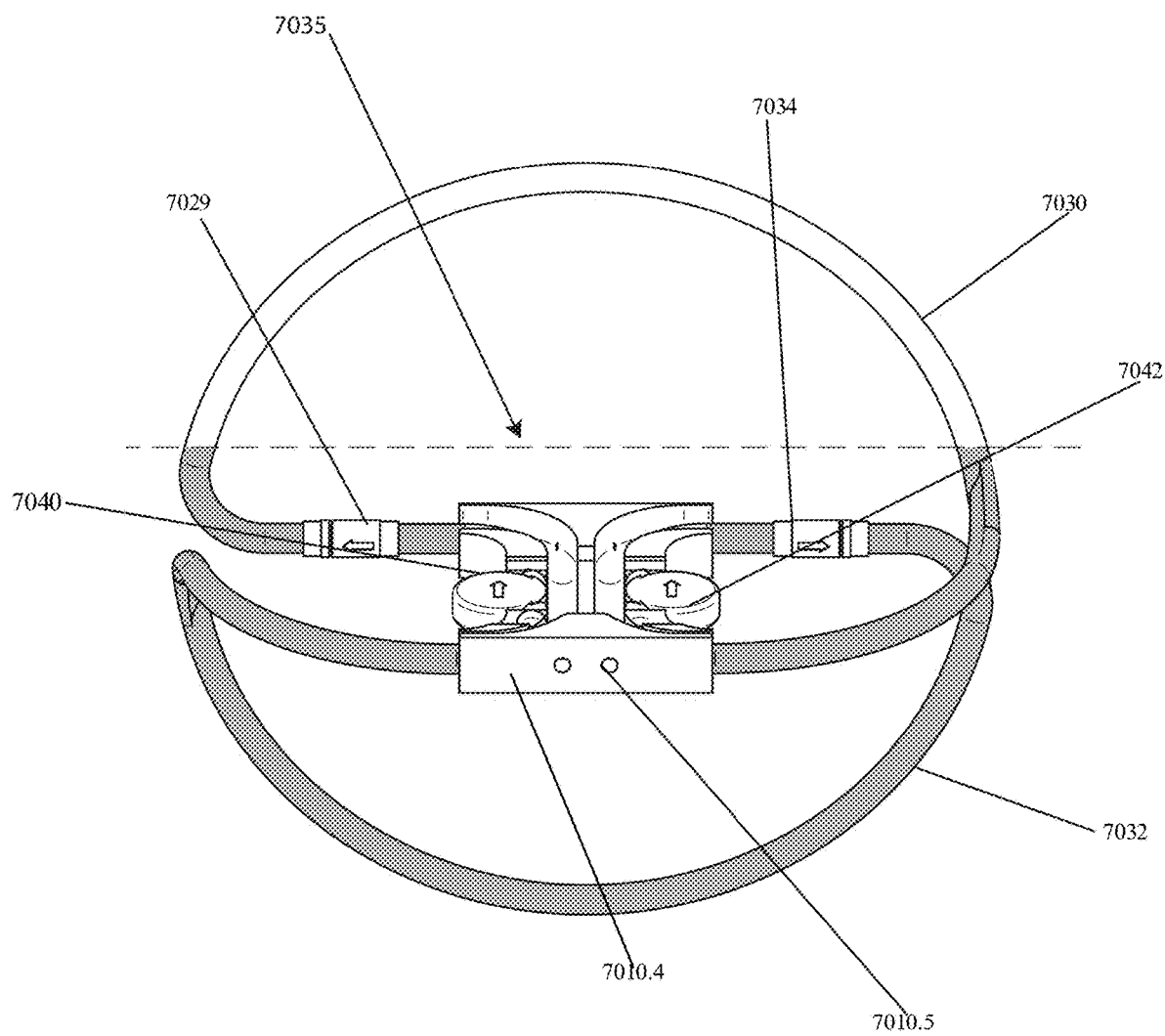
Figure 82:
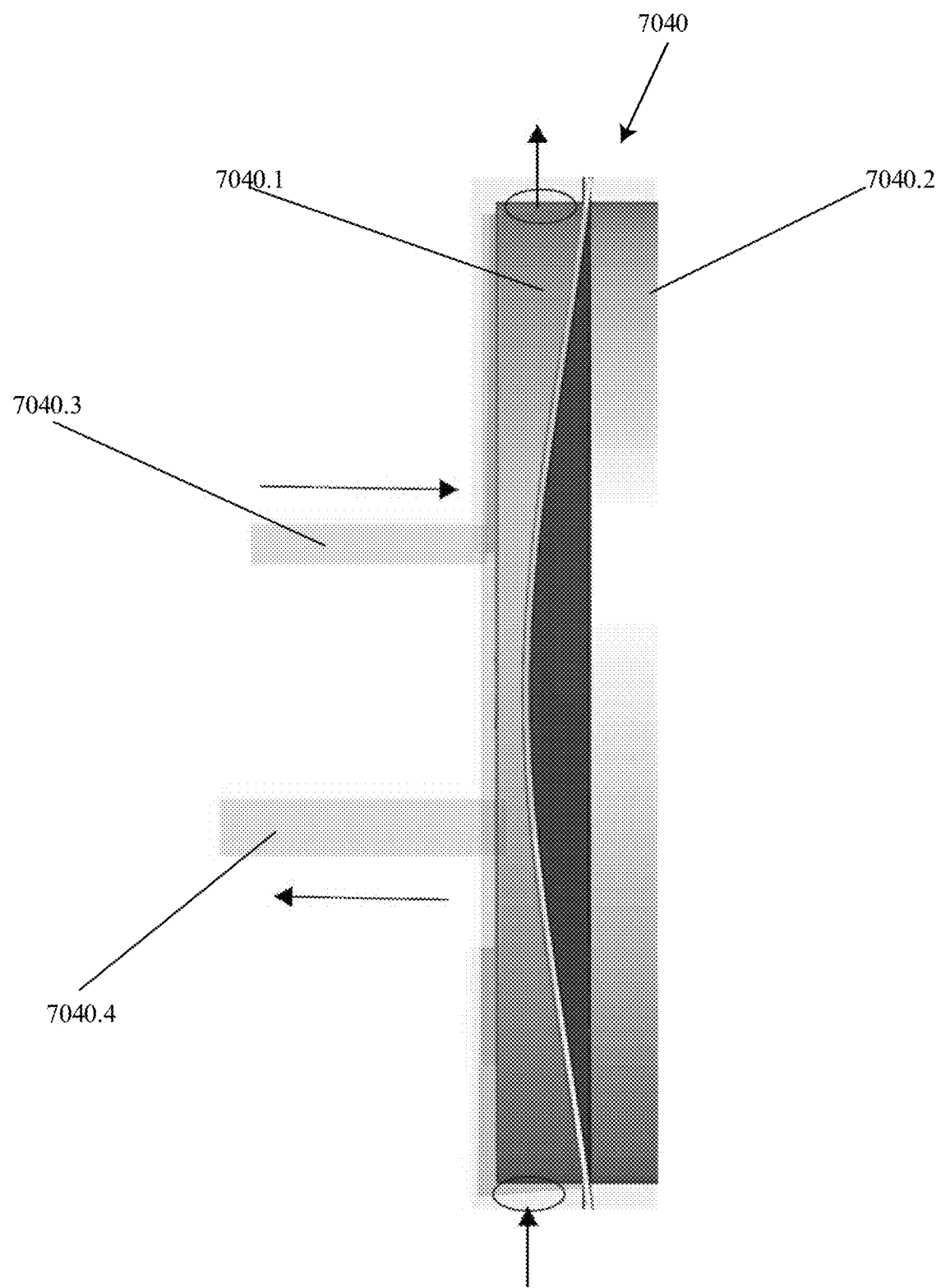
Figure 83:
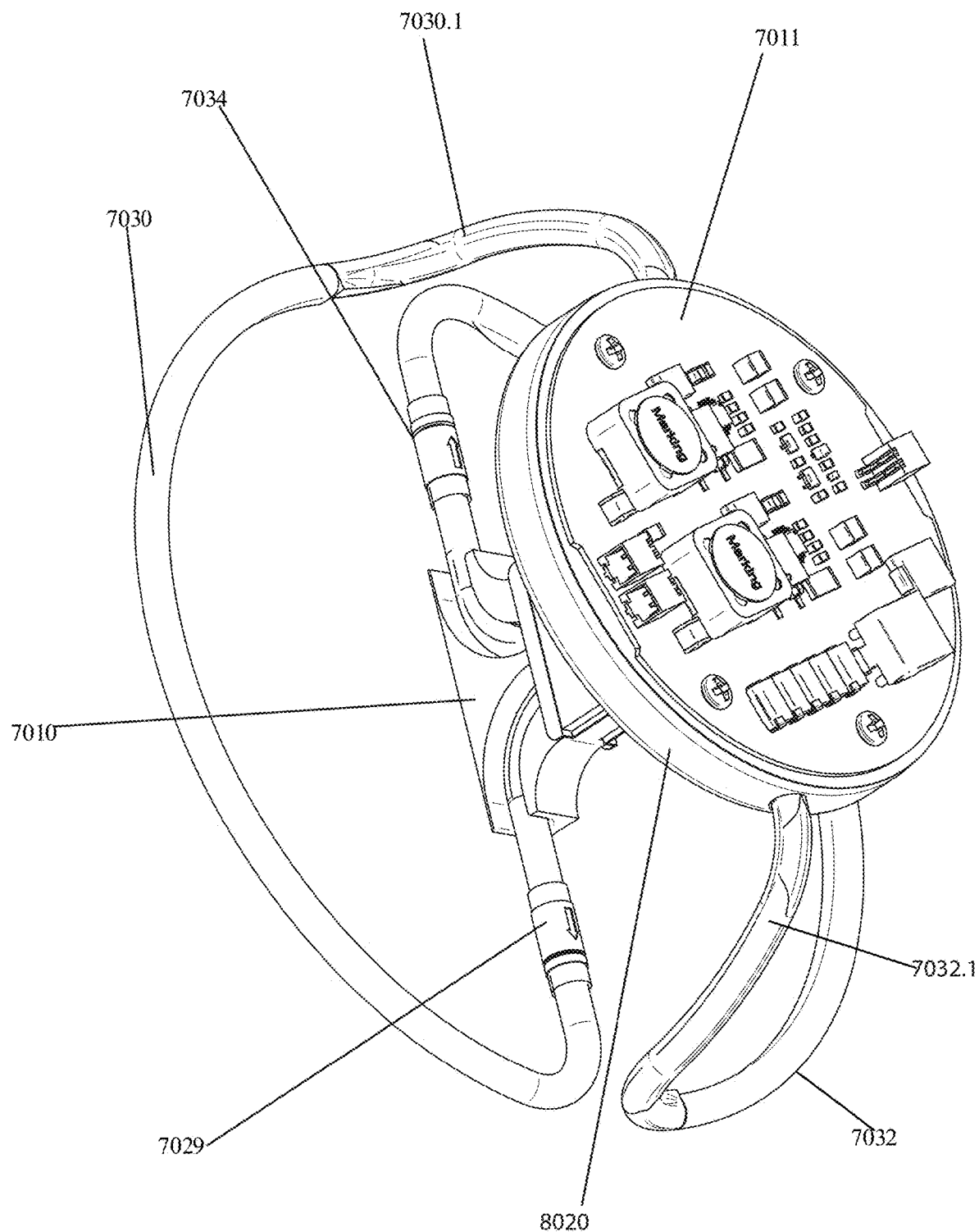
Figure 84:
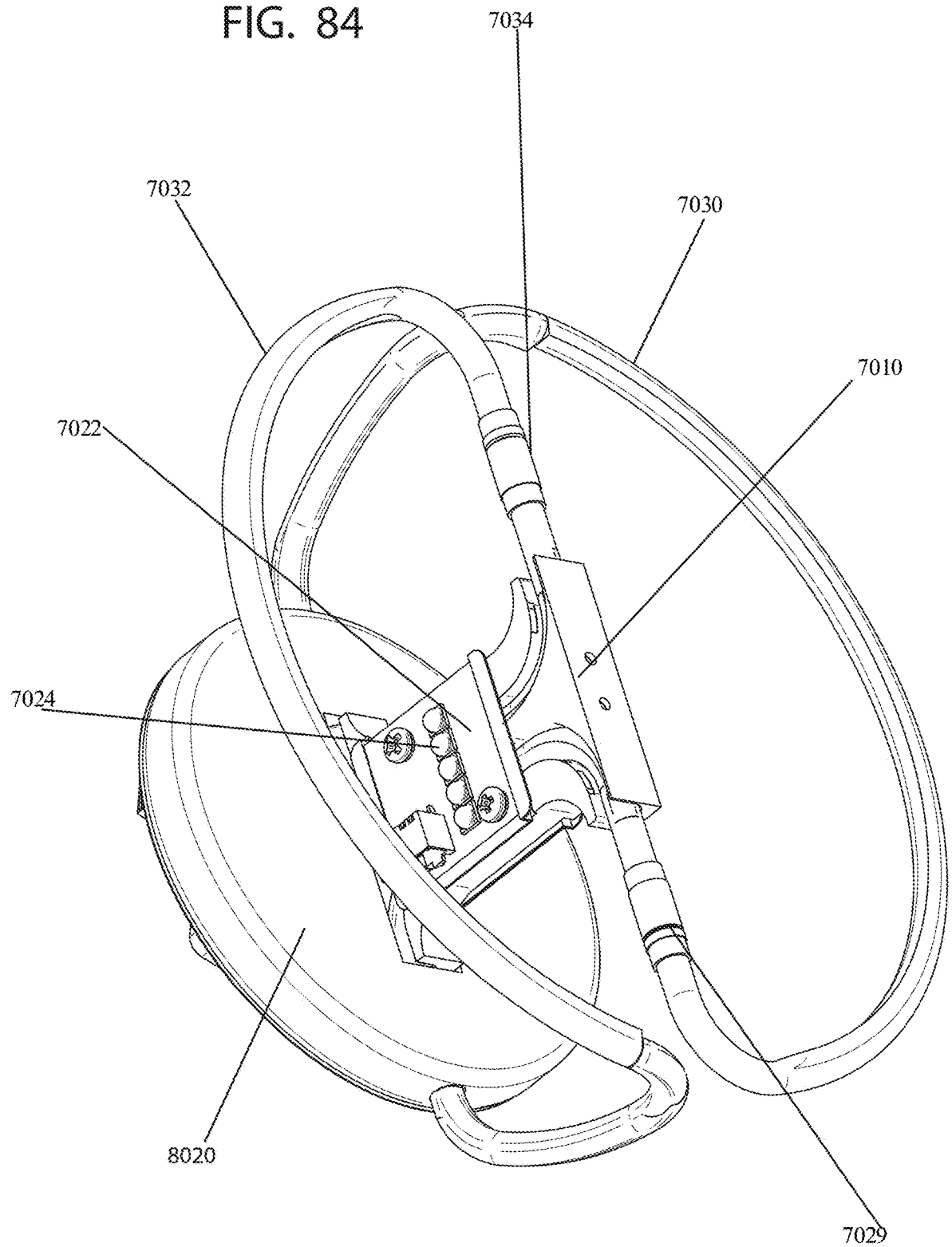
Figure 93:
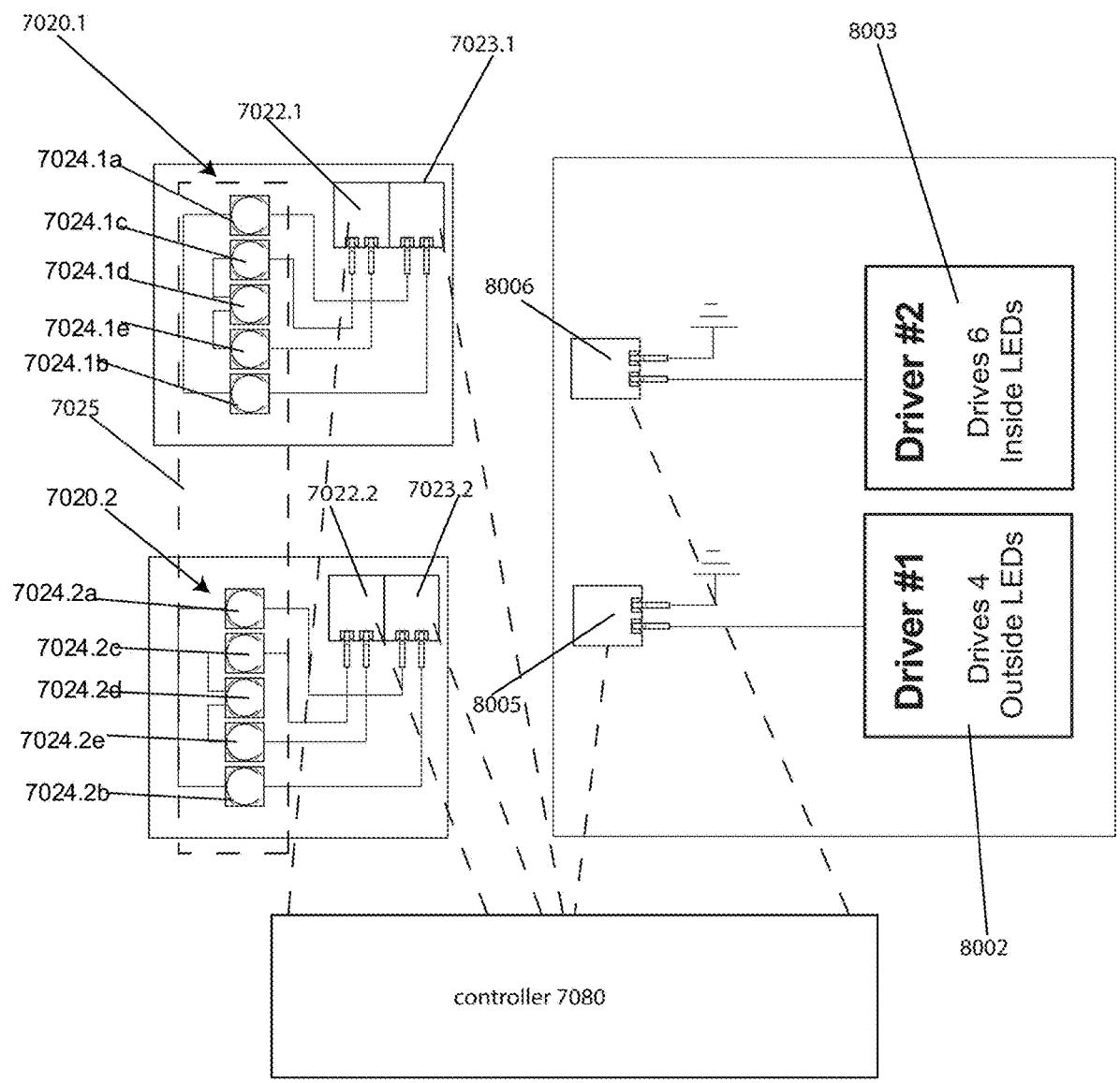

FIG. 72A is a side perspective exploded view of a first heat sink assembly for a LED light;

FIG. 72B is a side perspective assembled view of the heat sink assembly;

FIG. 73A is a side exploded view of another heat sink assembly;

FIG. 73B is an assembled view of the embodiment of FIG. 73A;

FIG. 74A is a side view of another embodiment which shows a side view of a first embodiment which is projecting light to a single focal point;

FIG. 74B is a side view of another embodiment which projecting light onto two focal points;

FIG. 75 is an electrical block diagram of dual driver circuit board which are independently energizing two LED arrays that reside on each of the two boards;

FIG. 76 is a three-dimensional view of the embodiment shown in FIGS. 74A and 74B;

FIG. 77 is a back perspective view of another embodiment having synthetic jets;

FIG. 78 is a back perspective view of the embodiment shown in FIG. 77, wherein this view has synthetic jets;

FIG. 79 is a back perspective view of the embodiment of FIG. 77 without the circuit boards being attached;

FIG. 80 is a back perspective view of the embodiment of FIG. 77 with the circuit boards attached;

FIG. 81 is a perspective view of heatpipes, heatsinks and synthetic jets wherein the heatpipes have fluid disposed therein;

FIG. 82 is a side view of a synthetic jet;

FIG. 83 is a perspective view of another embodiment having an additional heatsink;

FIG. 84 is another embodiment which shows a front perspective view of the embodiment shown in FIG. 83;

FIG. 85A is a view of a dual synthetic jet shown in FIGS. 83 and 84;

FIG. 85B shows the underside of the dual synthetic jet in an exploded view;

FIG. 85C is a transparent view of the dual synthetic jet;

FIG. 85D is a side cross-sectional view taken along line A-A of FIG. 85C with the bladders unmoved; and FIG. 85E is a side cross-sectional view taken along line A-A with the bladders being inflated and deflated;

FIG. 86A is a side cross-sectional view of a headlight;

FIG. 86B is a view of a LED circuit board;

FIG. 86C is a view of another LED circuit board;

FIG. 87A is a side cross-sectional view of a headlight;

FIG. 87B is a view of a LED circuit board;

FIG. 87C is a side cross-sectional view of a LED circuit board;

FIG. 88A is a side cross-sectional view of a headlight;

FIG. 88B is a view of a LED circuit board;

FIG. 88C is a view of a LED circuit board;

FIG. 89A is a view of a headlight;

FIG. 89B is a view of a LED circuit board;

FIG. 89C is a view of a LED circuit board;

FIG. 90A is a side cross-sectional view of a headlight;

FIG. 90B is a view of a LED circuit board;

FIG. 90C is a view of a LED circuit board;

FIG. 91A is a side cross-sectional view of a headlight;

FIG. 91B is a view of a LED circuit board;

FIG. 91C is a view of a LED circuit board;

FIG. 92A is a side cross-sectional view of a headlight;

FIG. 92B is a view of a LED circuit board;

FIG. 92C is a view of a LED circuit board;

FIG. 93 is a view of the electronic components of the LED circuit boards; and

Figure 94:
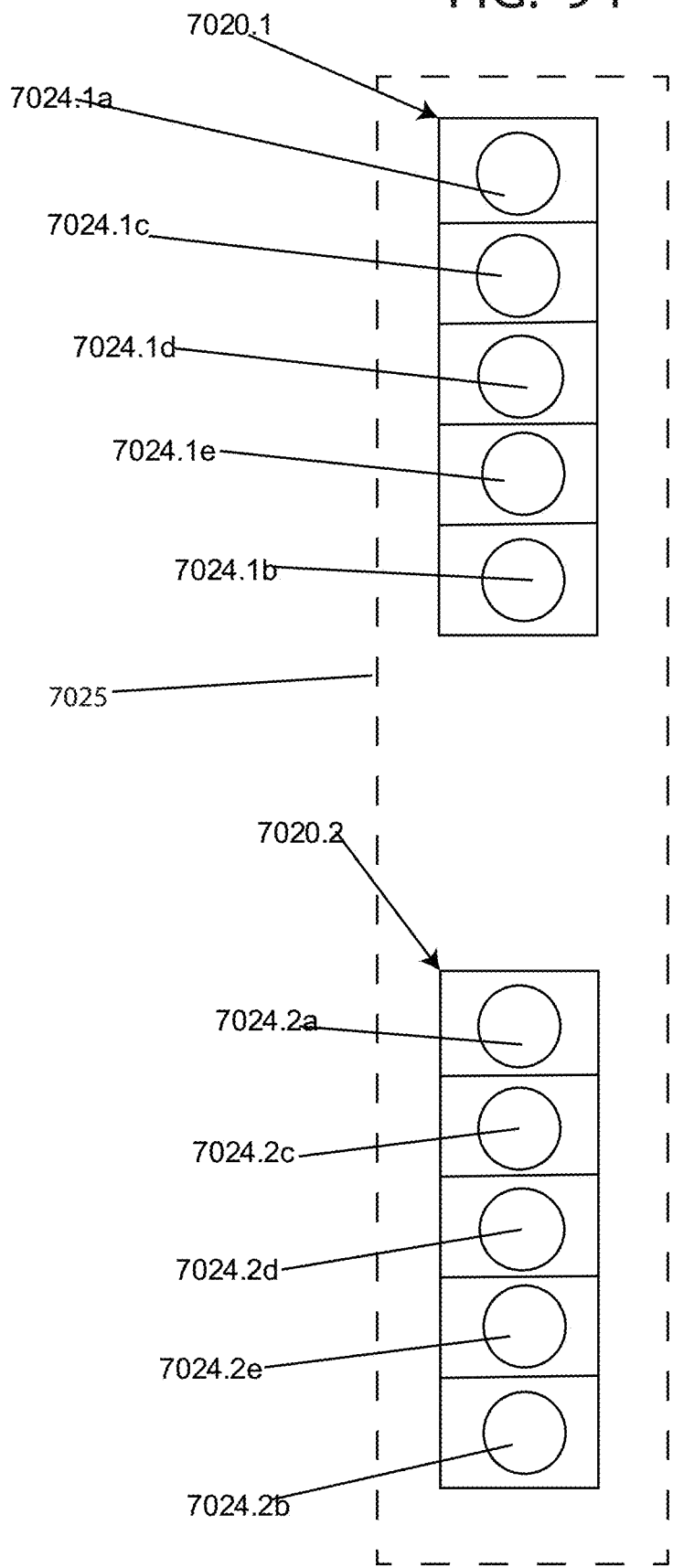

FIG. 94 is a close up view of the LED array.

DETAILED DESCRIPTION

Figure 1:
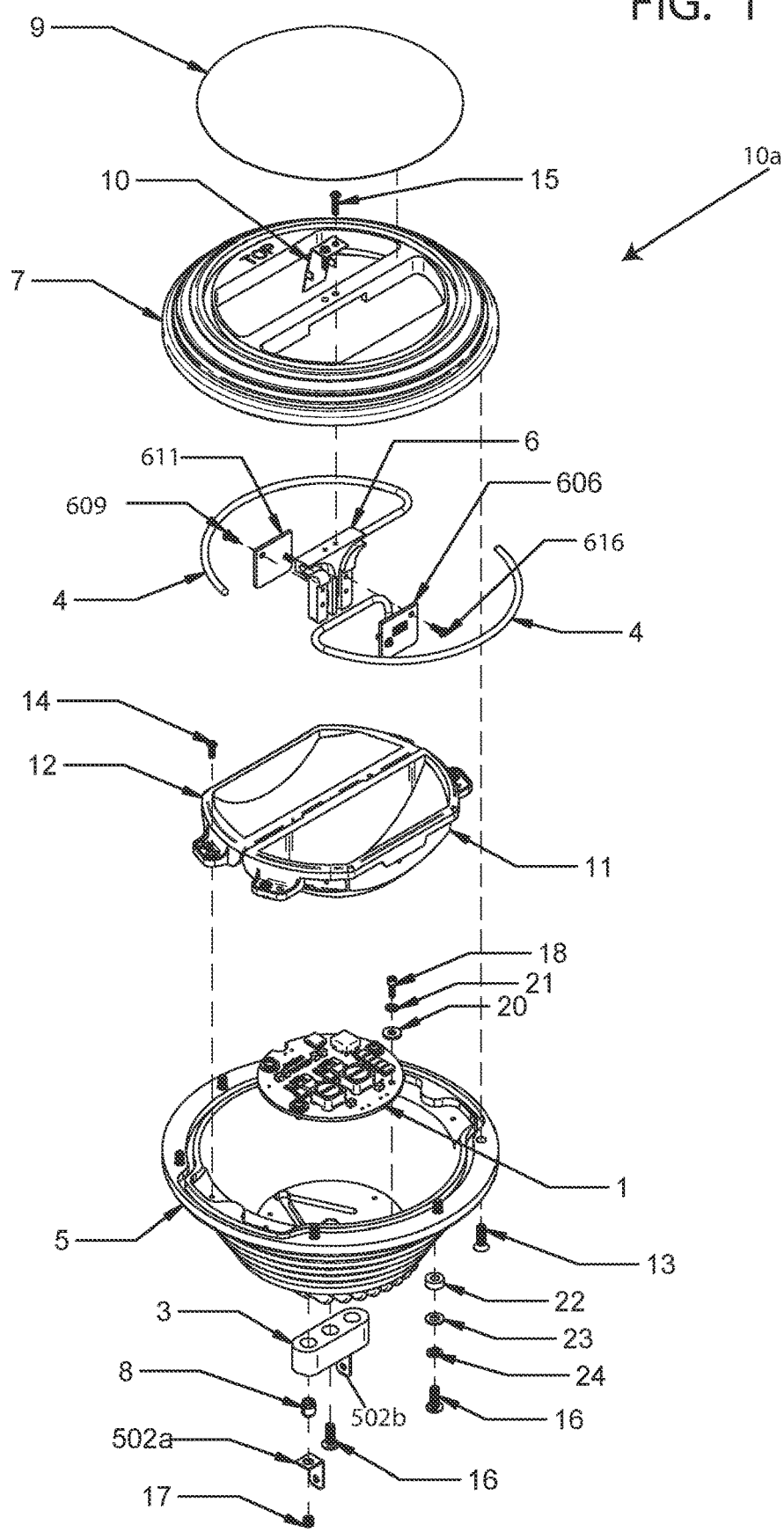
FIG. 1 shows an exploded view of a first embodiment of the invention.

FIG. 1 shows an exploded view of a first embodiment of the invention wherein in this view there is a first embodiment of a light 10a comprising a circuit board 1 which can comprise a printed circuit board or PCB. In addition to a main printed circuit board there are additional circuit boards or plates 606 and 611. Each of these additional printed circuit boards 602 and 614 include lights or LEDs which are disposed thereon. There is also a block or pole mount 3 disposed towards one end of the light. At least one heat pipe 4 is shown, wherein in this case there are two heat pipes shown. The heat pipes can be known as heat pipes 401 and 402 shown in greater detail in FIG. 3A.

A heatsink base 5 is shown having a frusto-conical shape or a substantially dome shape. This base has a plurality of fins and is shown in greater detail in FIGS. 2A-2E.

A heatsink center or heatsink block 6 is shown which is configured to connect to a first end of the heat pipes 4 such as heat pipes 401 and 402. A second heat sink or heat sink ring 7 is formed to be coupled to the heat pipes 4 as well. With this design, the heat pipes move heat from the heat sink block 6 to the heat sink ring 7.

A lens 9 is shown, which is configured to be coupled to the heat sink ring 7. Lens 9 is shown in greater detail in FIGS. 16A-16D. A plate blocker 725 is also shown coupled to the heat sink ring 7. A plurality of reflectors 11 and 12 are disposed inside of the heatsink base or body 5. The heatsink base or body 5 along with the lens 9 and the heat sink ring form an enclosure for the components disposed therein. A plurality of screws 13-18 are configured to fix the components together while a plurality of prongs 502a and 502b extend outside of the housing. In addition, there are a plurality of washers 20, 21, 23, and 24 along with at least one spacer 22.

FIGS. 2A, 2B, 2C, 2D and 2E show the various orientations of the enclosure of the light including the base or body 5 comprising a flange section 504, a body section 503 having fins, a lower ring section 507, and a plurality of prongs 502*a* and 502*b*. In addition, coupled to the flange section 504 is the heat sink ring 7 comprising outer ring portion of body section 701.

Figure 3A:
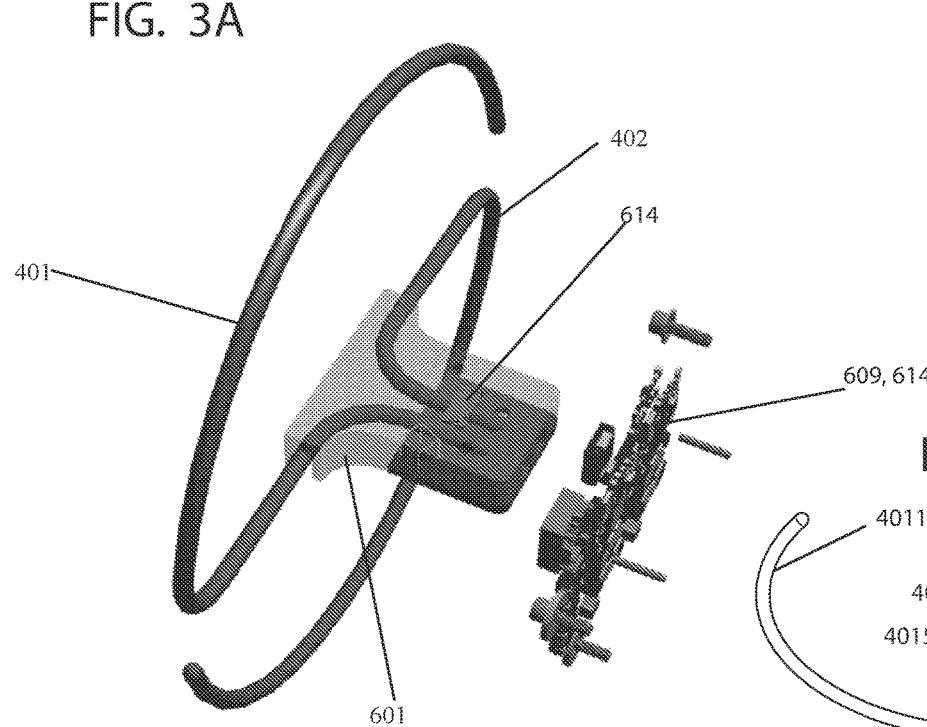
FIG. 3a is an exploded view of the heatsink.

FIG. 3*a* is an exploded view of the heatsink, which shows a heat sink block 6 having a heat sink body 601 and two different heat pipes 401 and 402 disposed therein. Each of the heat pipes 401 and 402 fit into a heat sink body 601. The heat sink body is coupled to respective LED circuit boards such as board 614.

Figure 3B:
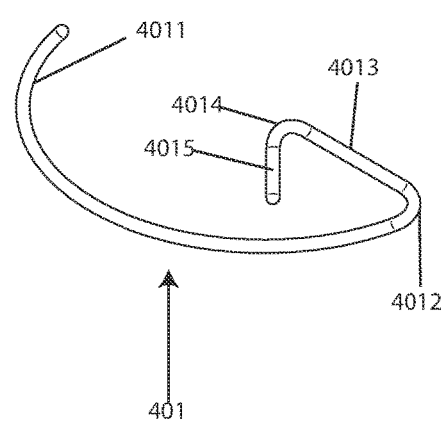
FIG. 3B shows a perspective view of the heat pipe.

FIG. 3B shows a perspective view of the heat pipe. The heat pipe 401 includes a first bend section 4011 a second bend 4012 which is a substantially 90 degree or right-angle bend, and a straight section 4013, as well as another bend section 4014 and bend which is approximately a 90 degree or right-angle bend, as well as another straight section 4015 as well. This heat pipe occupies at least two different planes and extends across at least two different levels in the light because it is configured to carry heat from at least one heat sink to another heat sink such as heat sink 6 as well as heat sink ring 7. In at least one embodiment, the heat pipe is configured to transfer heat from heat sink 6 to heat sinks 5 and 7.

Figure 3C:
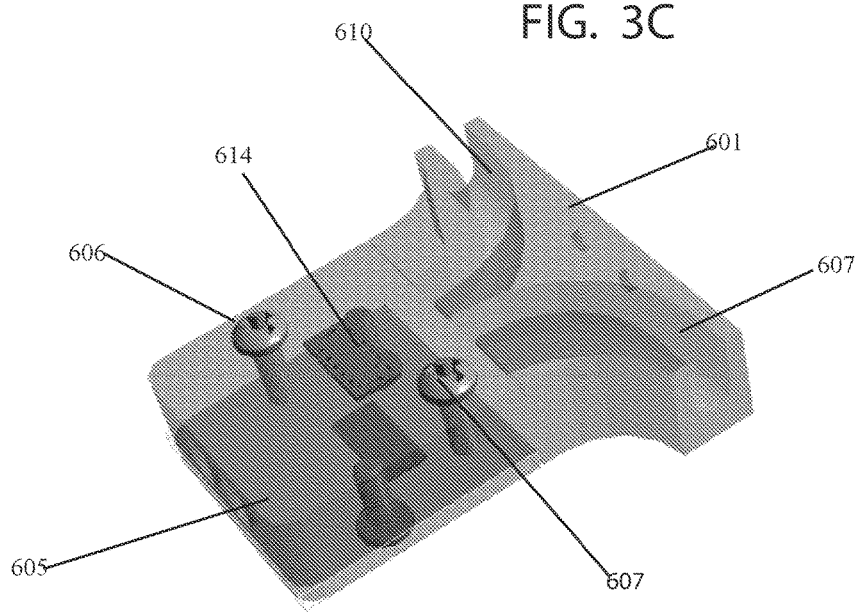
FIG. 3C shows a perspective view of the heatsink body.

FIG. 3C shows a perspective view of the heatsink block 6 which includes a body section 601 as well as heat sink channels 607 and 610. These heat sink channels are configured to receive the heat pipes such as heat pipes 401 and 402. There is also a circuit board 614 which is coupled to a heat sink plate such as heat sink plates 606 and 611. A plurality of screws such as screws 608, 609 are used to connect the heat sink plates 606 and 611 to the heat sink body such as body 601.

Figure 4:
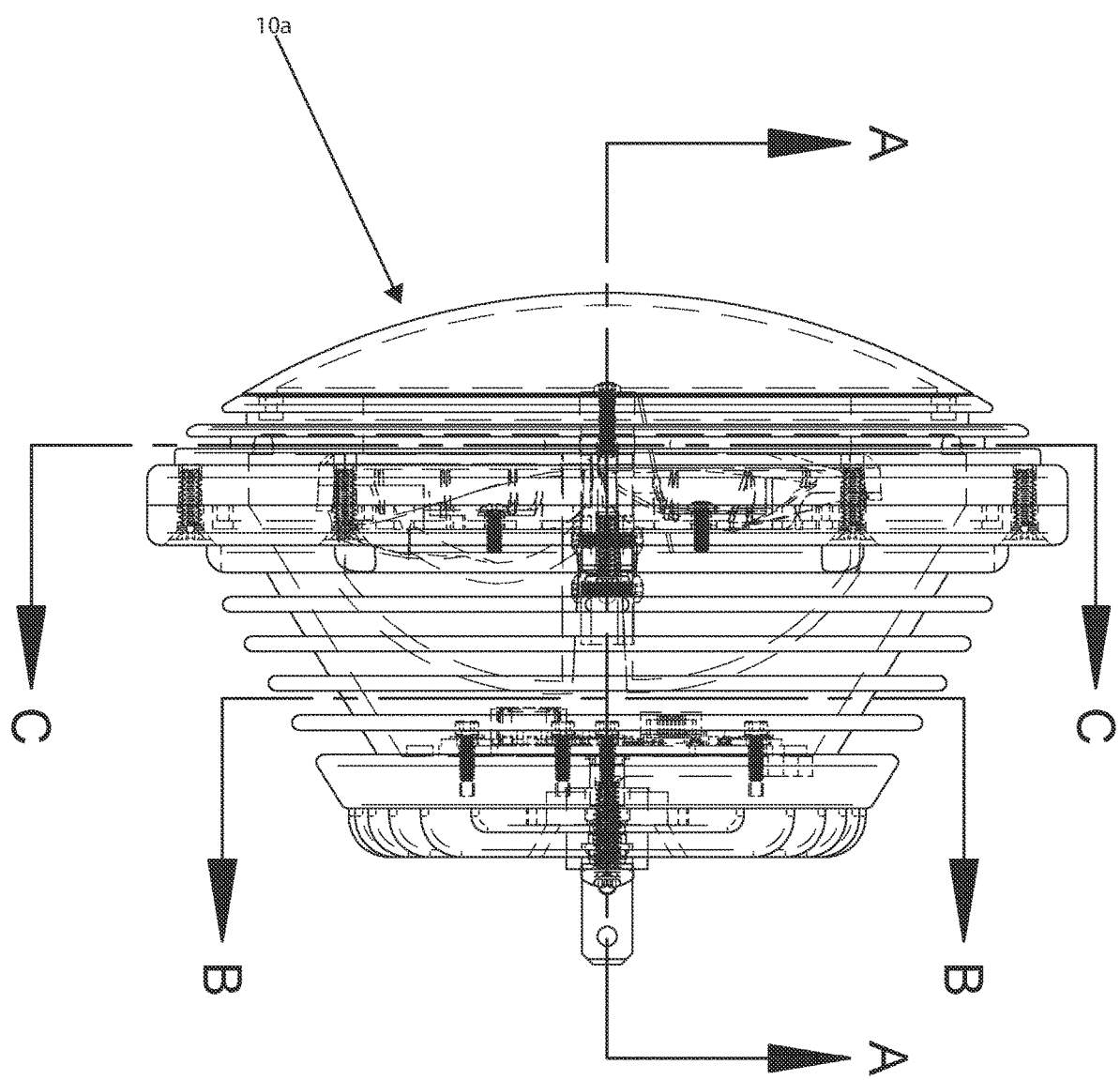
FIG. 4 is a side view of the first embodiment.

FIG. 4 is a side view of the first embodiment which shows various cross-sectional lines cutting through and across this device including cross-sectional lines A-A, B-B, C-C.

Figure 5A:
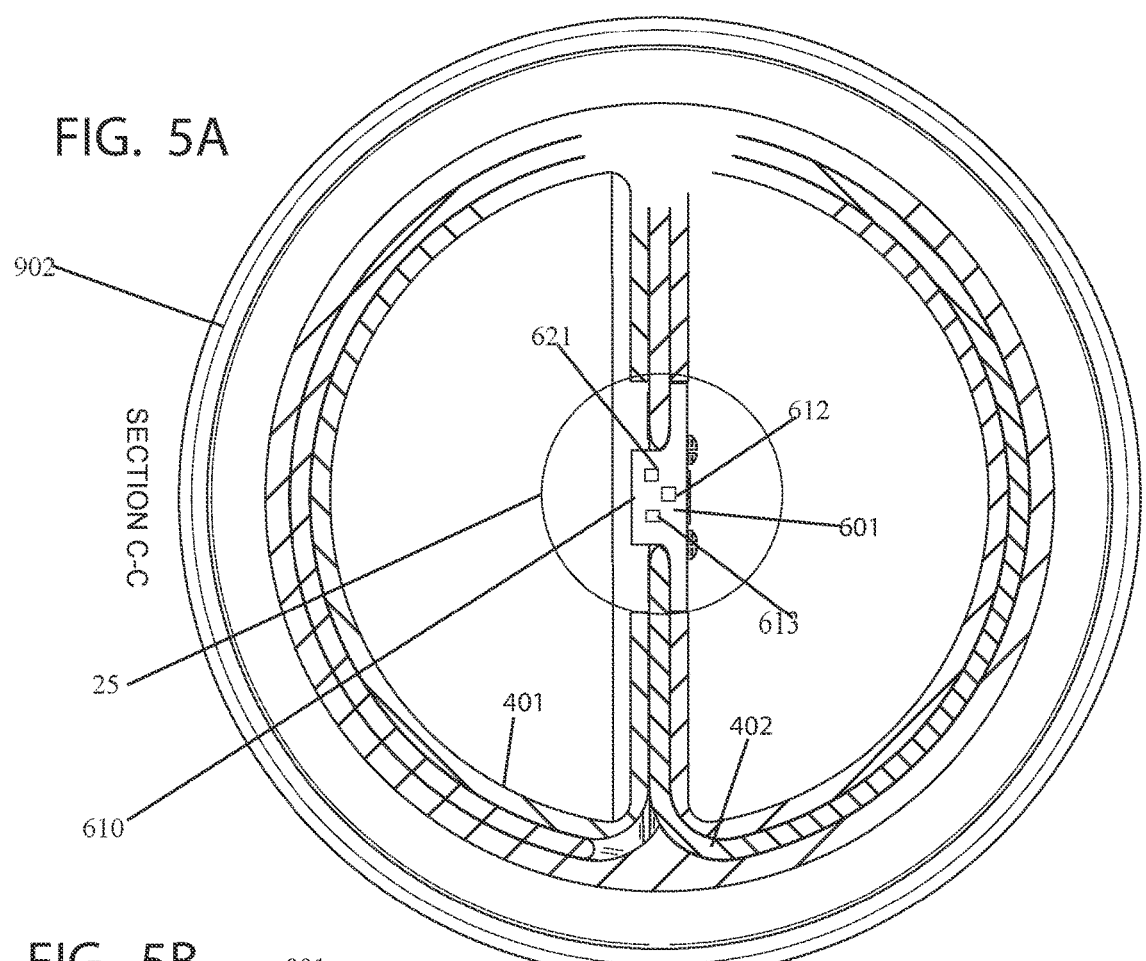
FIG. 5a is a top cross-sectional view taken along the line C-C shown in FIG. 4.

FIG. 5*a* is a top cross-sectional view taken along the line C-C shown in FIG. 4. With this view, there is shown heat pipes 401 and 402. The heat pipes extend away from heat sink block 601 which support LED lights. There are also a plurality of LED's 621, 612, and 613 which are coupled to an upper heat block 610. There is also a dome 25 which is also shown adjacent to LED lights 621, 612, and 613. In addition, there is also shown an outer rim 902 as well which is shown. This outer rim 902 is configured to be coupled to heat sink ring 7.

Figure 5B:
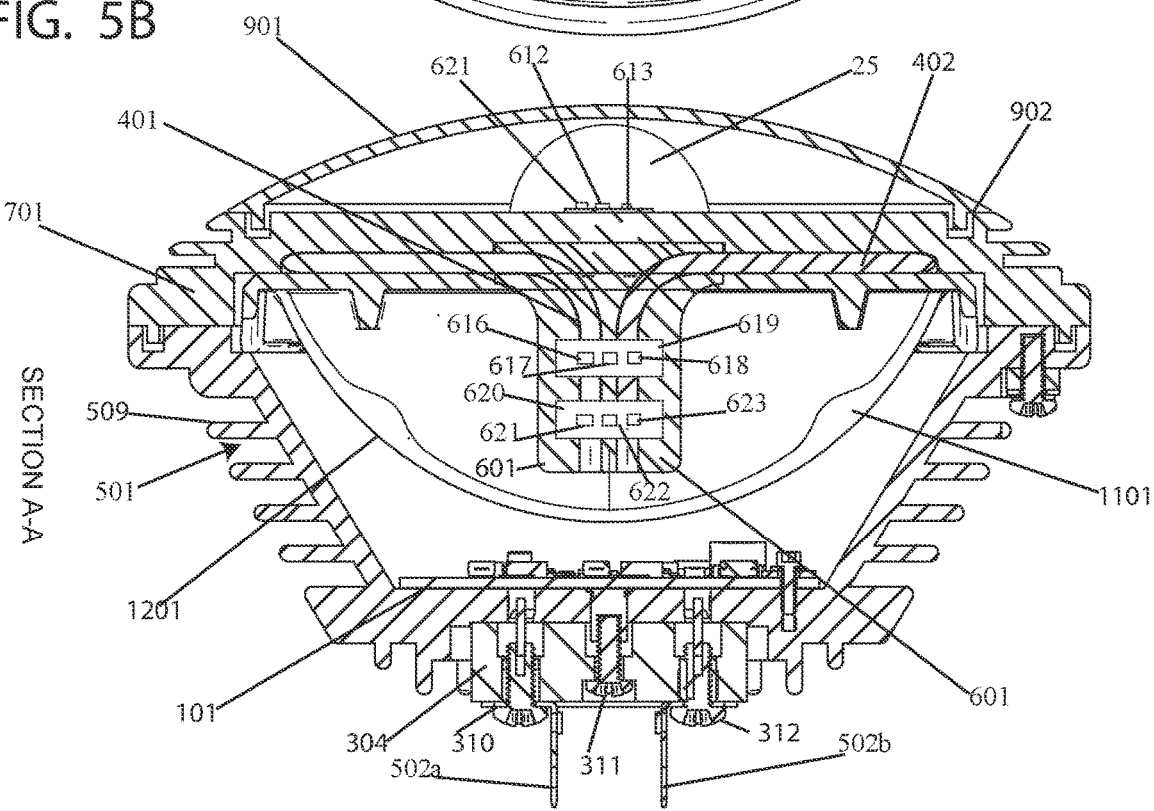
FIG. 5B is a side cross-sectional view taken along line A-A shown in FIG. 4.

FIG. 5B is a side cross-sectional view taken along line A-A shown in FIG. 4. In this view there is shown lens 901 which is positioned above a dome lens 25 as well. Lens 901 is connected to ring heat sink body section 701, which is coupled to body 501. Below the dome are lights such as LED lights 621, 612, and 613. In addition, heat pipes 401 and 402 are shown coupled to heat sink body 601 as well. A plurality of LED Lights on a light plate 619 are shown as lights 616, 617, and 618. An additional light plate 620 includes lights 621, 622, and 623 as well. Positioned adjacent to the LED lights are reflectors 1101 and 1201 which are semi-dome shaped and which are configured to reflect light from LED Lights such as lights 616, 617, 618 as well as lights 621, 622, and 623. The LED lights and reflectors are disposed inside of the lens 9 such as lens body 901 and the body such as body or base 501. Body 501 also includes fins 509 which are used to increase the surface area, and which is used to allow for greater heat transfer between the heat inside and the heat outside of the enclosure (enclosure formed by base 5 heat sink ring 7 and lens 9 together) as well as inside of the enclosure. A pole mount body 304 for a pole mount is configured to receive contacts or prongs 502*a* and 502*b* which provide power into the circuit board 109 via contact screws 310, and 312. Another contact screw 311 is also shown connecting into the pole mount body 304.

Figure 6A:
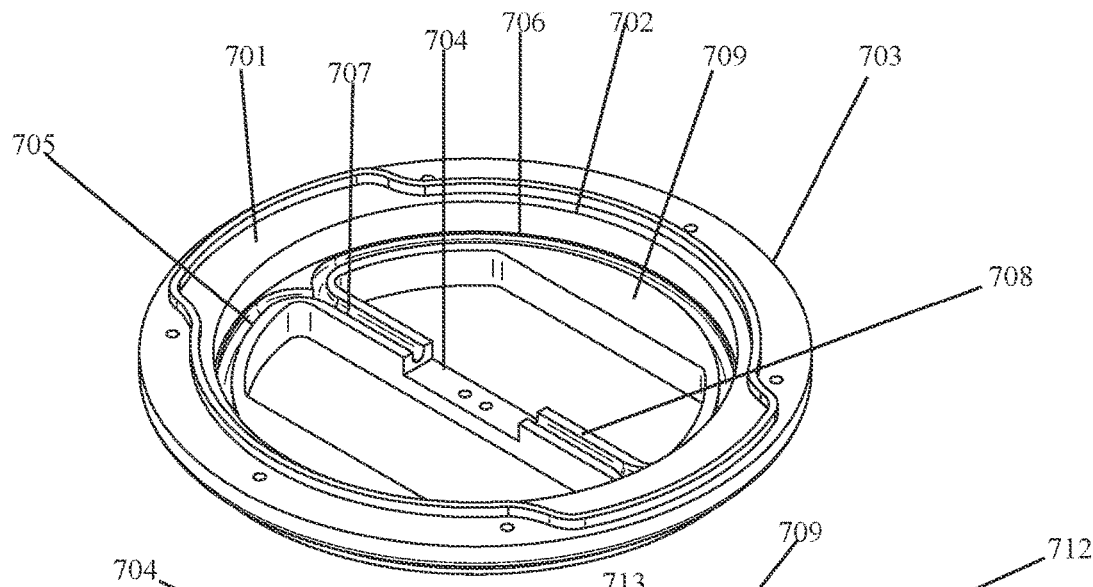
FIG. 6A a is a bottom perspective view of the heatsink.

FIG. 6A a is a bottom perspective view of the heatsink, wherein there is shown heat sink ring 7 which has a body section 701, which has an inner rim section 702 and an outer rim section 703. a bridge 704 is shown extending between two different parts of the outer rim section 703. There are tracks or channels 705 and 706 which are configured to receive heat pipes as well. In addition, channels 707 and 708 are also configured to receive the heat pipes as well. There is also a shelf section 709 as well.

Figure 6B:
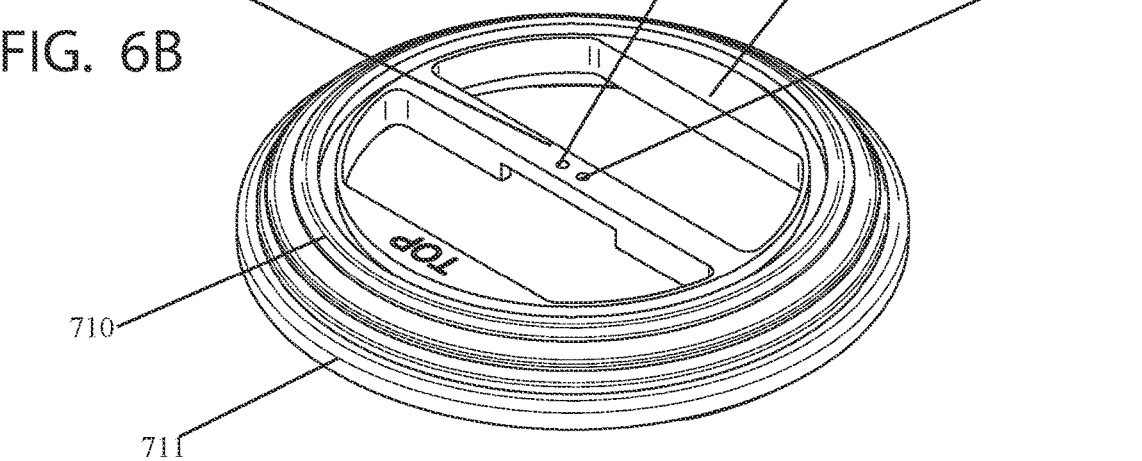
FIG. 6B is a top perspective view of the hate heatsink.

FIG. 6B shows a top side of the ring-shaped heat sink wherein there is shown bridge 704, as well as shelf section 709 a top rim 710 configured to receive an inner portion of lens 9, and an outer rim 711 which is configured to connect to body 5. There are holes 712 and 713 which are configured to receive lights such as LED lights which extend through these holes 712 and 713.

Figure 6C:
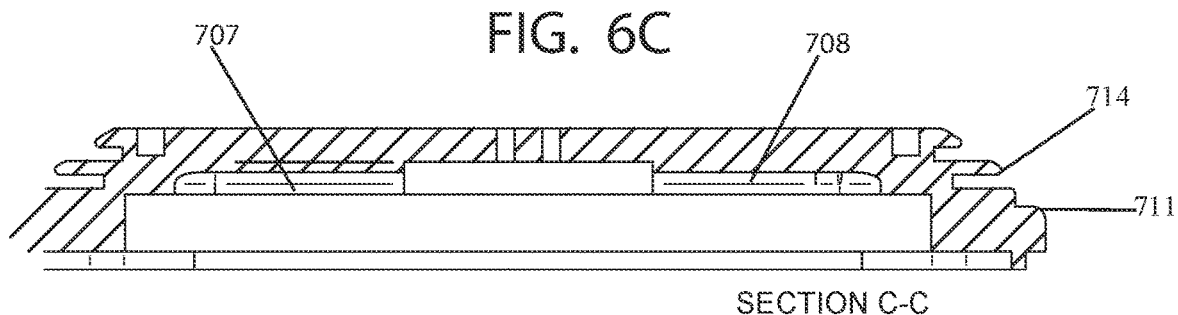
FIG. 6C is a side cross-sectional view taken along section line C-C of the heatsink.

FIG. 6C is a side cross-sectional view taken along section line C-C of the heatsink. In this view there is shown channels 707 and 708 as well as fin 714 and rim 711.

Figure 25A:
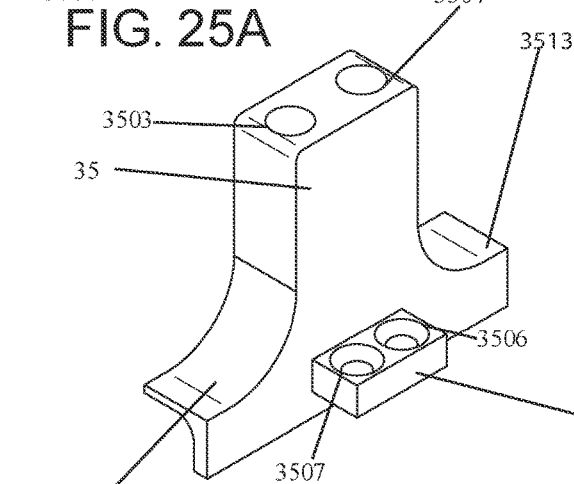
FIG. 25A is a first top perspective view of another heat sink.
Figure 25B:
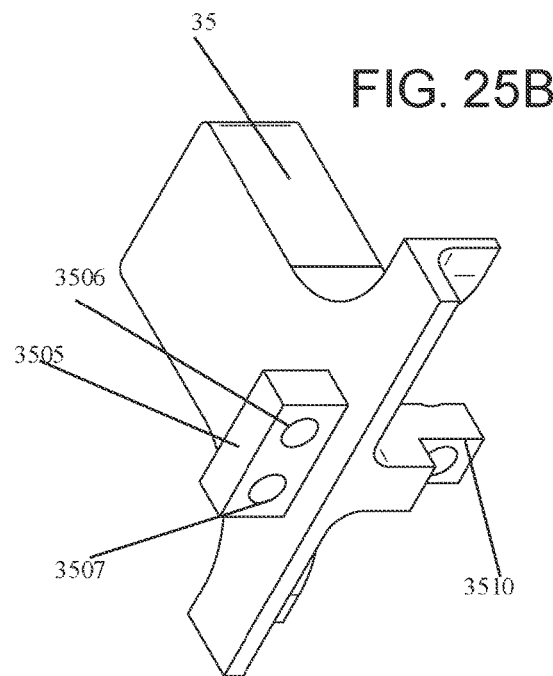
FIG. 25B is a bottom perspective view of the heat sink.
Figure 25C:
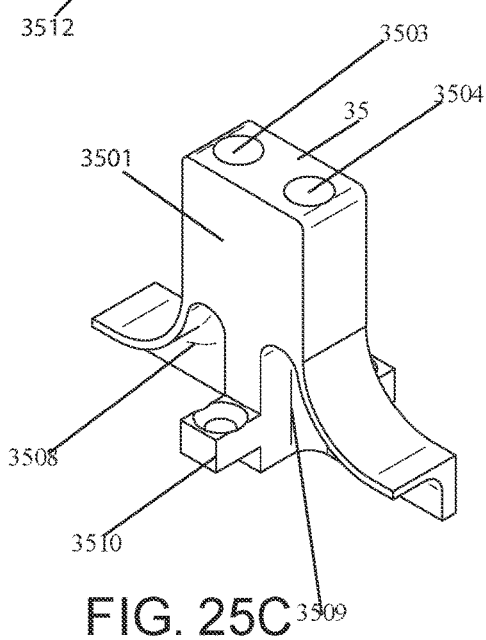
FIG. 25C is another perspective view of the heat sink.
Figure 25D:
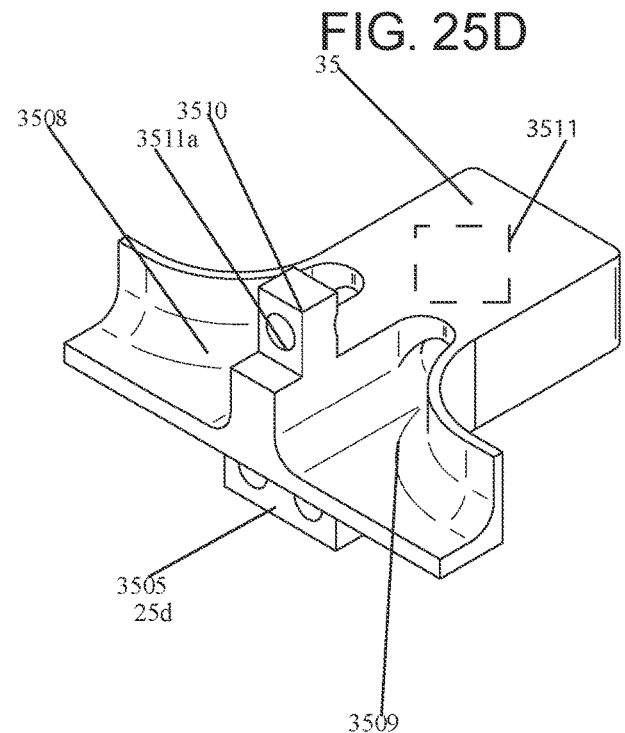
FIG. 25D is a bottom perspective view of the heat sink.

FIG. 7 is a cross-sectional view taken along line B-B shown in FIG. 4; In this view there is shown printed circuit board or motherboard or circuit board 1 which includes a motherboard section 109, a processor 101, a memory 102, a temperature sensor such as input or sensors 103*a* and 103*b*, transistors 104*a* and 104*b* which are configured to switch on or off lights or a heating element, a power supply or power input 105 which is coupled electrically to prongs 502*a* and 502*b*, an input/output I/O port 107, a first feed 108 to the lights and a second feed 110 to the heating element (see heating element 625 (FIG. 13A), heating element 3511 (See FIG. 25D) or heating element 4114 (see FIG. 30B)).

Figure 8A:
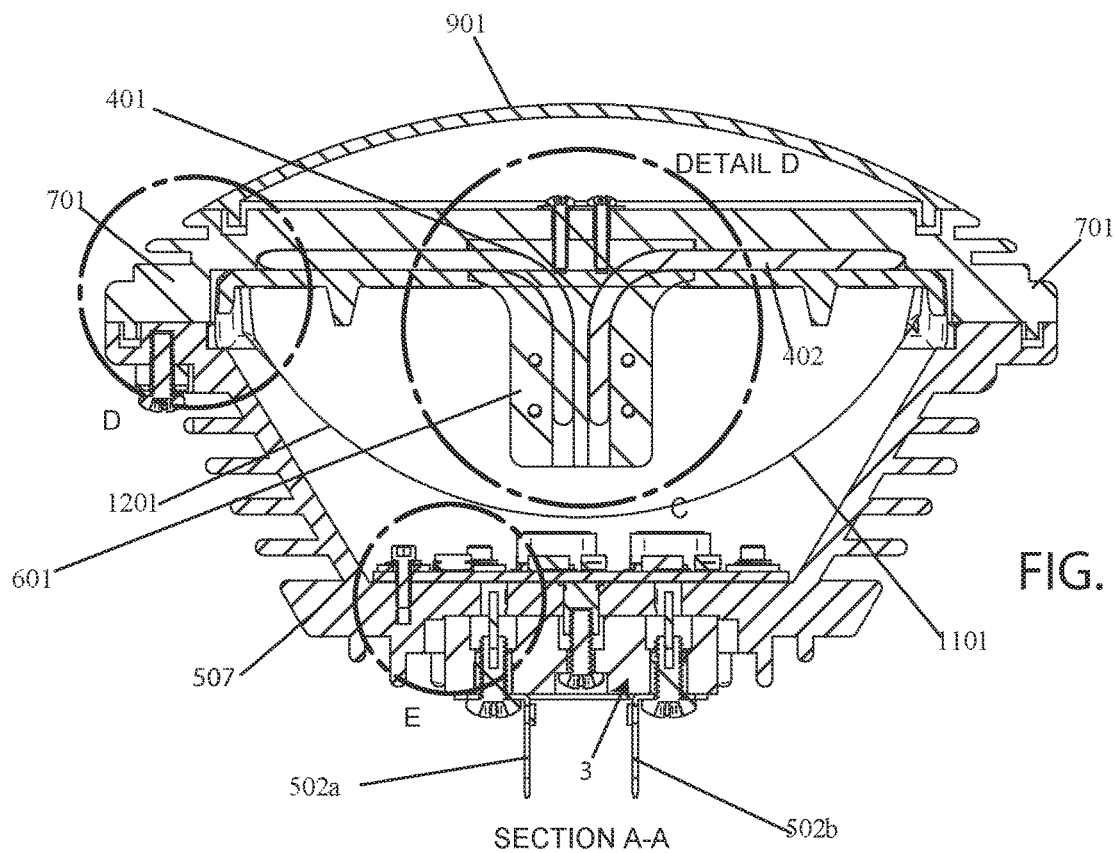
FIG. 8A a is a side cross-sectional view taken along the line

FIG. 8A is a side cross-sectional view taken along section line A-A in FIG. 4. In this view there is shown lens body 901, an outer rim 902, and across lens 903 of lens 9. Outer rim 902 is coupled to outer ring section 701. Outer ring section 701 is coupled to body section 501. Heat pipes 401 and 402 are coupled to heatsink 601 at one end and heatsink ring 7 having body section 701 at the other end. In addition, coupled to heatsink ring 7 having body section 701 are semi-dome shaped reflectors 1201, and 1101. Body section 5 extends down to ring section 507. Coupled to ring section 507 is circuit board 109. Coupled to flange region or ring section 507 is pole mount 3 having pole mount body 304. Coupled pole mount body 304 are contacts 502*a* and 502*b*. A plurality of screws such as screws 310 311 and 312 are used for coupling to pole mount body 304.

Figure 8B:
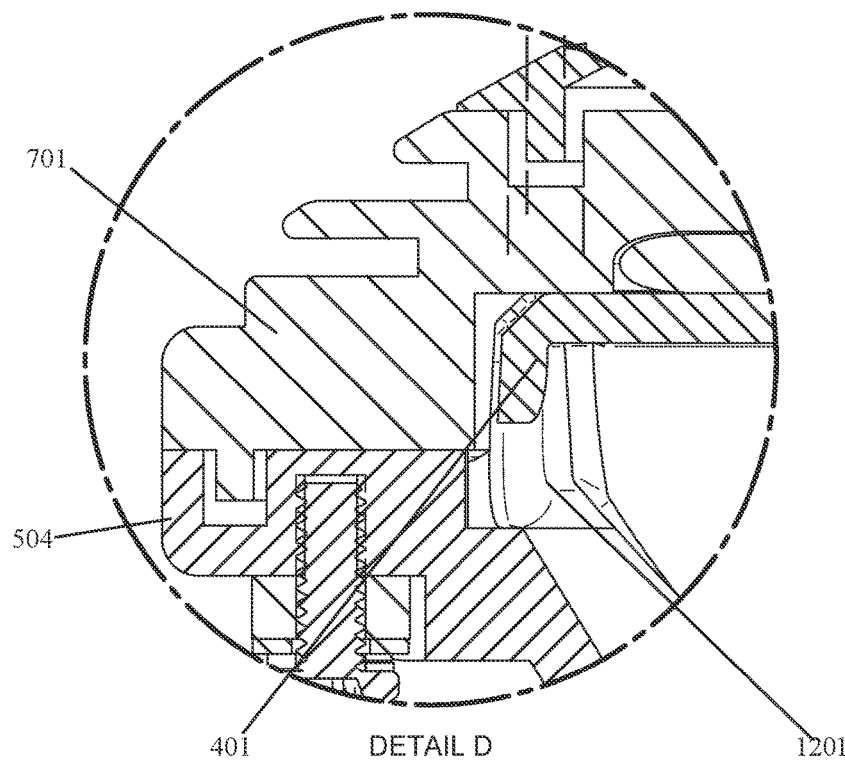

FIG. 8B is a detail view of detail D shown in FIG. 8A wherein in this view there is shown body section 701 in contact with flange section 504 of body 5. In addition, there is also shown heat pipe 401 which is coupled to body section 701 forming an outer ring portion. In addition, there is also shown dome-shaped reflector 1201.

Figure 9:
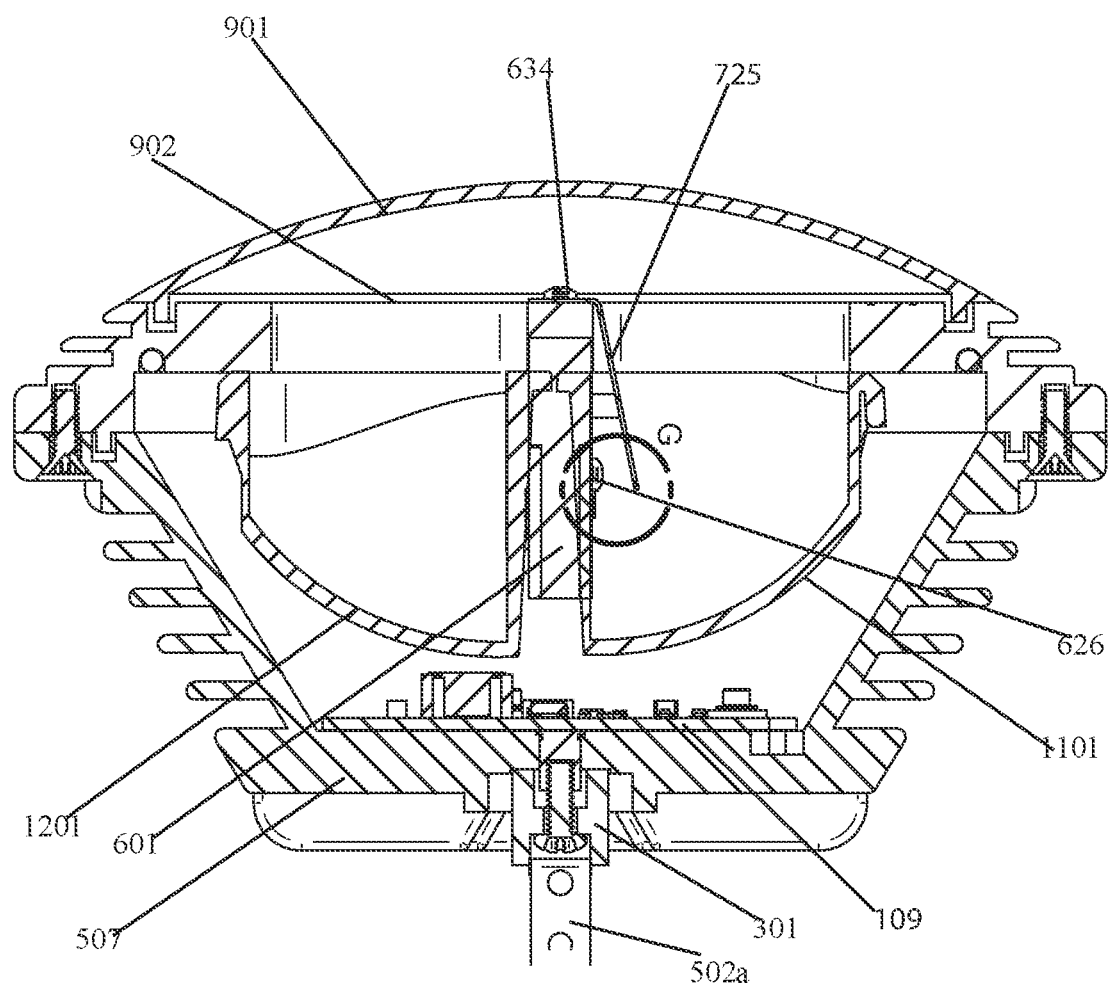
FIG. 9 is a cross-sectional view of the light.

FIG. 9A is a cross-sectional view of the light. In this view there is shown lens body 901 having cross lens 903 wherein lens body 901 is coupled to a body section 701. Reflectors 1201 and 1101 are disposed in heat sink ring 7 and inside the enclosure of body 5 heat sink ring 7 and lens 9. In addition, disposed between these reflectors 1101 and 1201 is heatsink body 601. Coupled to ring-shaped heatsink 7 is screw contact 634. A plate blocker 725 is coupled to screw contact 634. Another contact 626 is disposed on heat sink body 6 wherein plate blocker 725 is formed as a leaf spring which is configured to rotate into contact 626. As shown coupled to flange section 507 is circuit board 109 wherein coupled to circuit board 109 is pole mount 3 and at least one contact or prong 502*a*. Thus, when the light is plugged in, contact or prong 502*a* is charged with power and this power then feeds into circuit board 109 which then provides regulated power to the rest of the light.

FIG. 9B is a cross sectional view of the light being positioned inside of a light housing such as light housing 1501 which can be positioned inside of a vehicle such as a motor vehicle, a train a plane, a boat or other design.

Figure 10A:
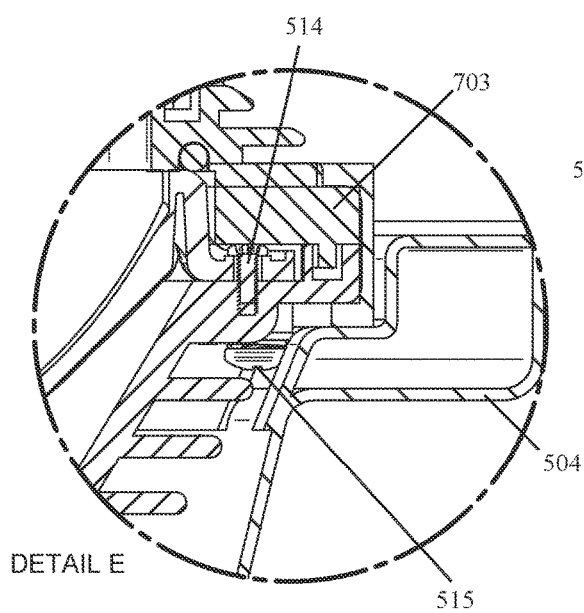
FIG. 10A is a first detailed view of a connection between the body, the heatsink and the cover.

FIG. 10A is a detailed view of a connection between the body 5, the heat sink 7 and the lens 9. In this view there is outer rim section 703 which is coupled to base or body 501 via a screw 515. The base or body is positioned inside of a light housing 1501 which includes an outer support region 1504. A screw 514 is configured to couple a dome shaped reflector such as any one of reflector 1201 or 1101 to body 501.

Figure 10B:
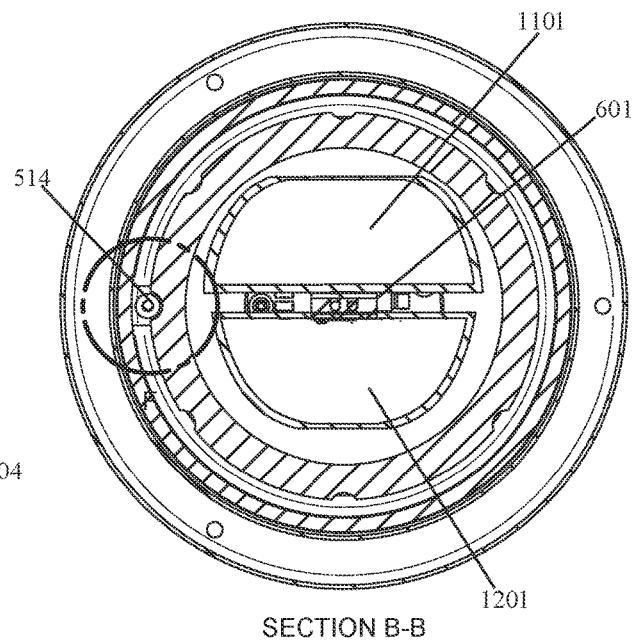
FIG. 10B is a cross-sectional view of the light.
Figure 10C:
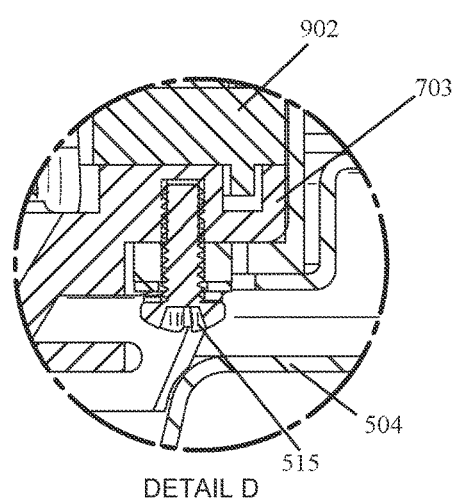
FIG. 10C is another detail view of the light, particularly the connection between the heat sink and the body.
Figure 10D:
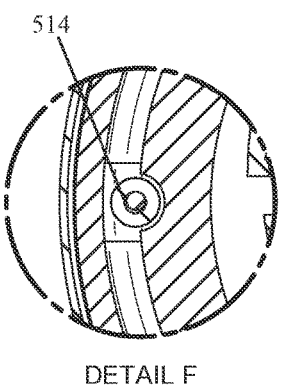
FIG. 10D is a is a detail view of the connection between the heat sink and the body.
Figure 11A:
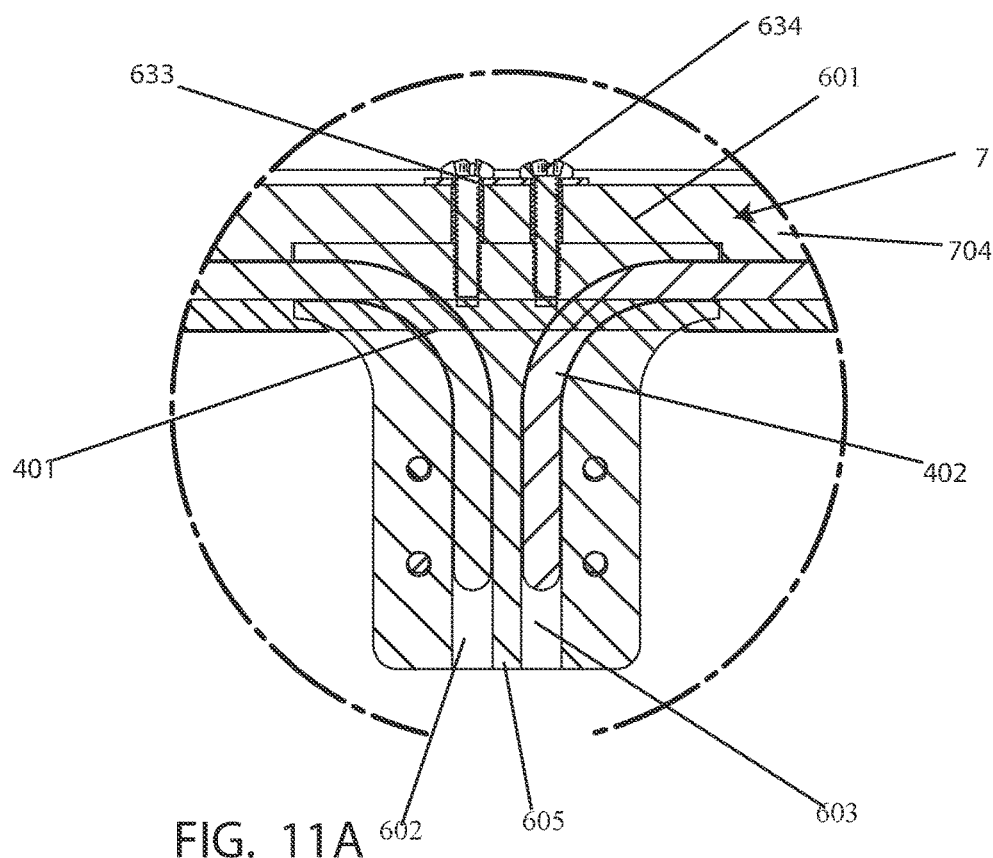
FIG. 11A is a side view of the heat sink with the heat pipes.

FIG. 10B is a cross-sectional view of the light taken along line B-B which shows reflectors 1101 and 1201 positioned inside of the body and which also shows heat sink body 601 as well as screws such as screw 514 for securing these reflectors to the body 501, this is shown in greater detail in detail F of FIG. 10D. FIG. 10C shows detail D which shows a closer up view of detail E of FIG. 10A which shows screw 515 connecting outer flange 703 to body 501 and also shows a connection of outer rim 902 of lens 9 to the outer flange 703. As shown the body FIG. 11A is a side view of the heat sink with the heat pipes. In this view, there is shown screws 634 and 633 which are configured to clamp the cross brace 704 of heat sink ring 7 to heat sink body 6 with heat pipes 401 and 402 extending between them. The heat pipes 401 and 402 are positioned inside of respective channels 602 and 603 of heat sink block 601 and are separated by section 605.

Figure 11B:
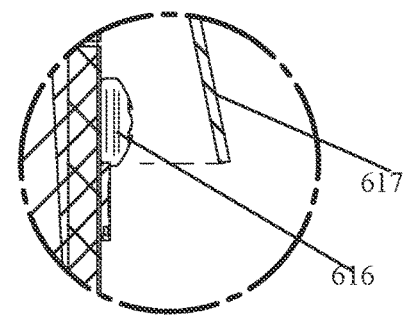
FIG. 11B is a side view of the contact for the heat sink

FIG. 11B is a side view of the contact for the heat sink which shows contact 626 configured to be contacted by plate blocker 725.

Figure 11C:
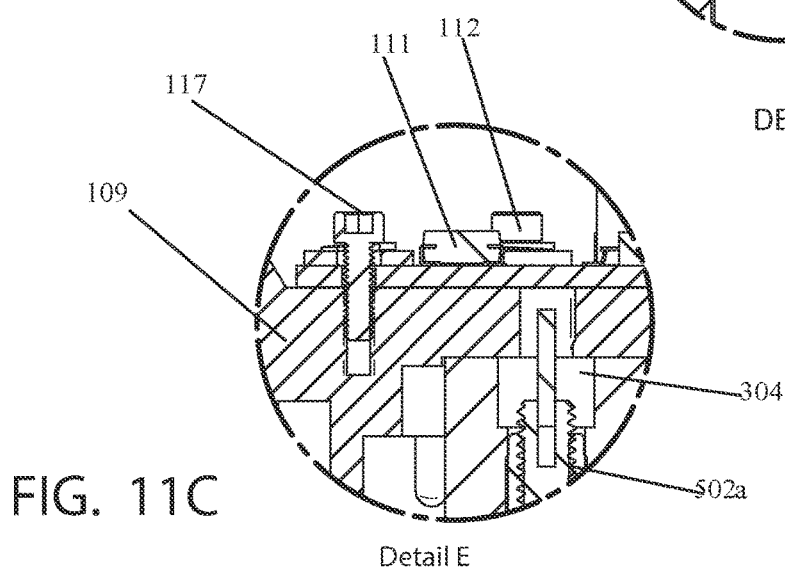
FIG. 11C is a side view of the connection between the circuit board and the body.

FIG. 11C is a side view of the connection between the motherboard and the body shown by detail E of FIG. 8A. In this view motherboard 109 is coupled to ring section 507 via a screw 117. In addition, a pole mount body 304 is shown coupled to screw 310 which is then coupled to an associated prong or contact.

Figure 12A:
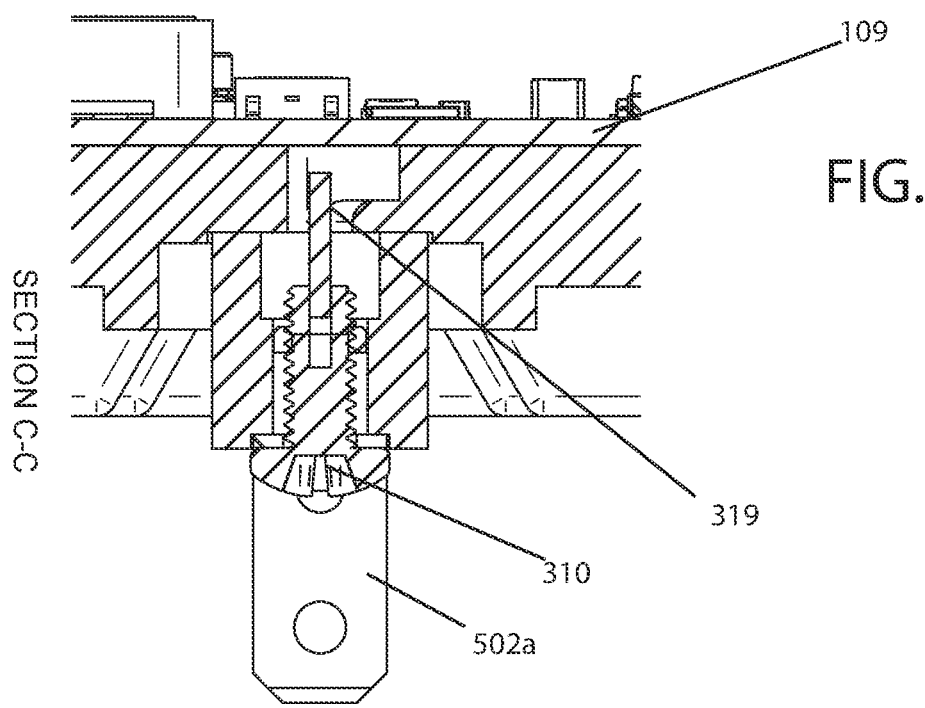
FIG. 12A is a side view of the contacts for powering the circuit board.
Figure 12B:
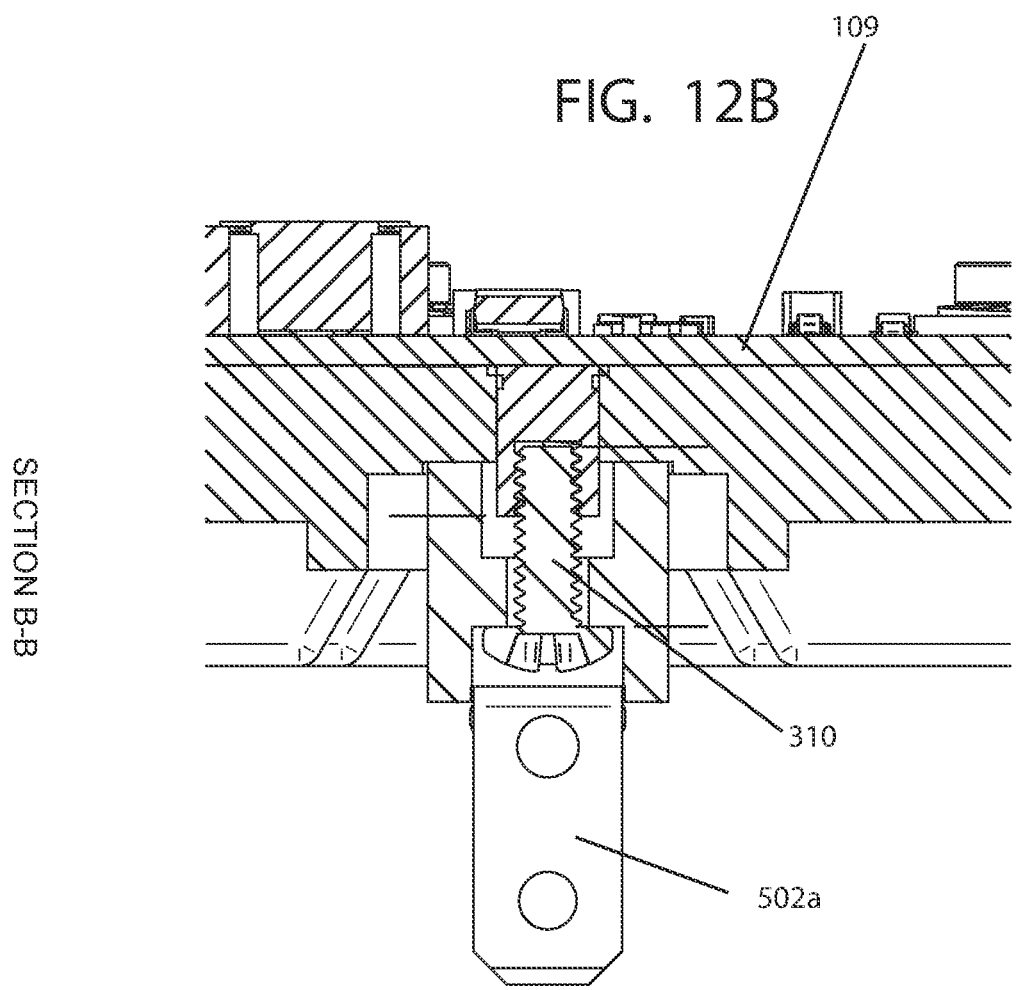
FIG. 12B is another side view of the contacts in communication with the circuit board.

FIGS. 12A and 12B show cross-sectional views of the connection between a prong or contact 502*a* and the screw 310 as well as extending contact 319 into motherboard 109 through ring section 507. In this way power extending from the prong can reach the motherboard 109 inside of the housing.

Figure 13A:
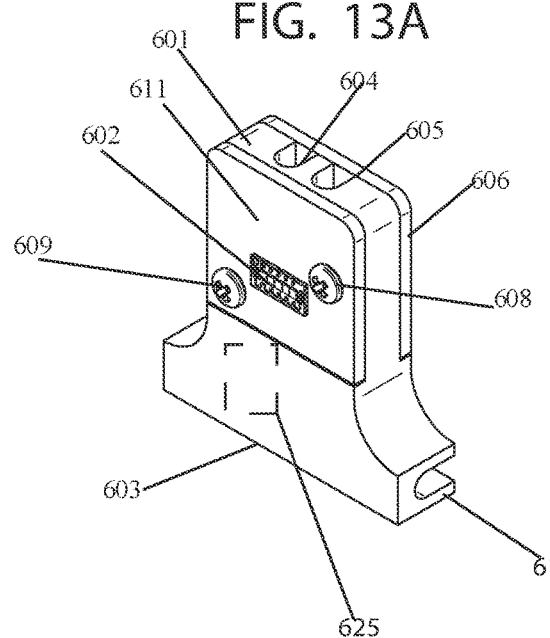
FIG. 13A is a perspective view of the body of the heat sink.
Figure 13B:
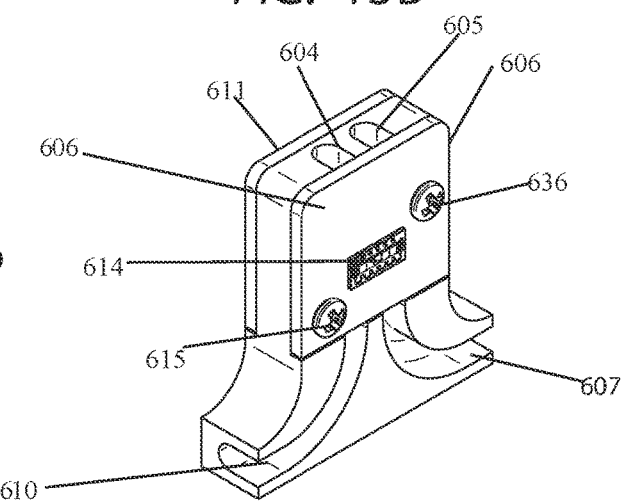
FIG. 13B is another perspective view of the body of the heat sink.
Figure 13C:
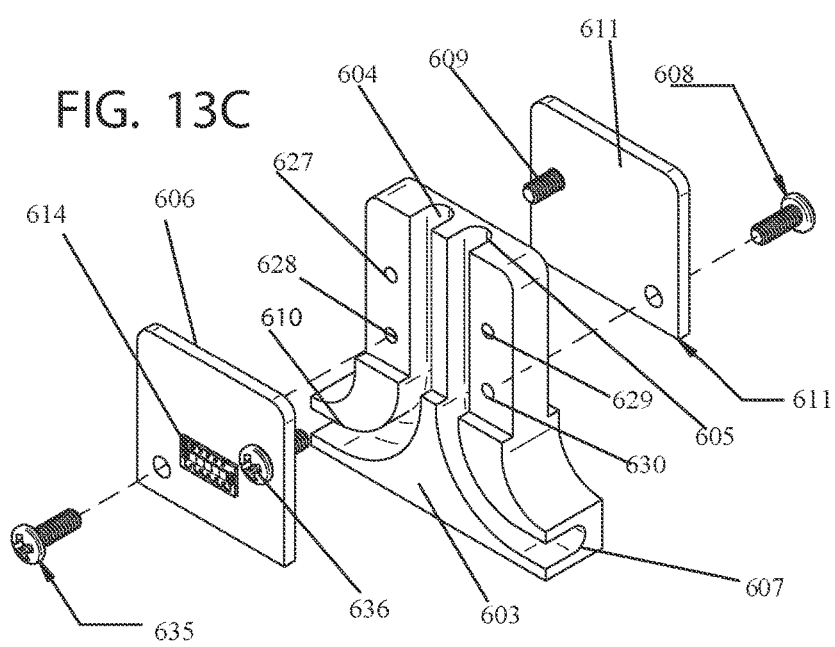
FIG. 13C is an exploded perspective view of the heat sink.

FIG. 13A is a perspective view of the body of the heat sink, in this view there is a heat sink body which has heat sink plates 606 and 611. The heat sink body 601 includes channels 604 and 605 which are separated by a dividing portion of the body 603. Plates 606 and 611 are configured to contain LED circuit boards 602 and 614 (See FIG. 13B). Channels 604 and 605 extend into a curved region 607 and 610 which are also separated by a dividing portion of the body 603. A plurality of screw holes 627, 628, 629, and 630 are configured to receive a plurality of screws 608, 609, 635 and 636. These screws are configured to couple the plates 606 and 611 to the block 601 as shown in exploded view of FIG. 13C. FIG. 13A also shows an optional heater element 625 such as a resister which can be heated via an electric charge coming from circuit board 1 which heats heater 625 up and then sends heat through the associated heat pipes to heat up the light without having to light the associated LED lights up. In this way, less power is required to heat the light when a user only desires to heat the lamp or light body up such as the region inside between base or body 5 and lens 9.

Figure 14A:
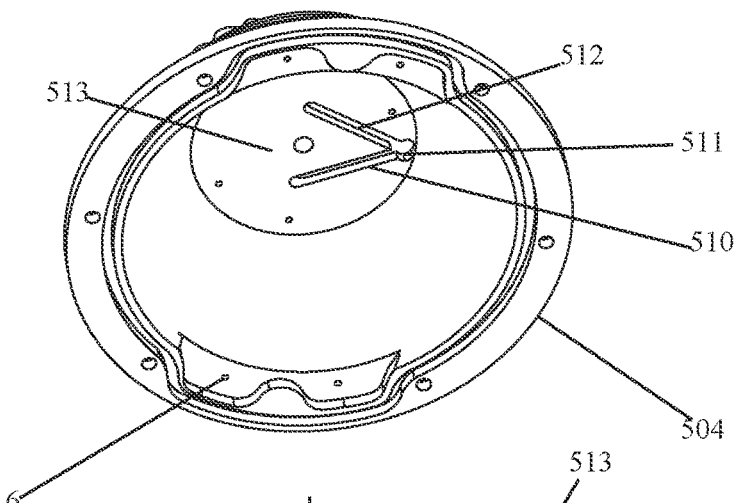
FIG. 14A is a perspective view of the body of the light.

FIG. 14A is a perspective view of the body of the light with this view there is shown a rim section 504, a bottom section 513, and inner side walls 515. There is a shelf 516 which includes screw holes 514 which are configured to receive screws for coupling the base to the reflectors 11 and 12 (See FIG. 1). There are also channels 510, 511 and 512 which are set into a bottom face 513, and an outer rim 516 which is configured to be coupled to heat sink ring 7.

Figure 14B:
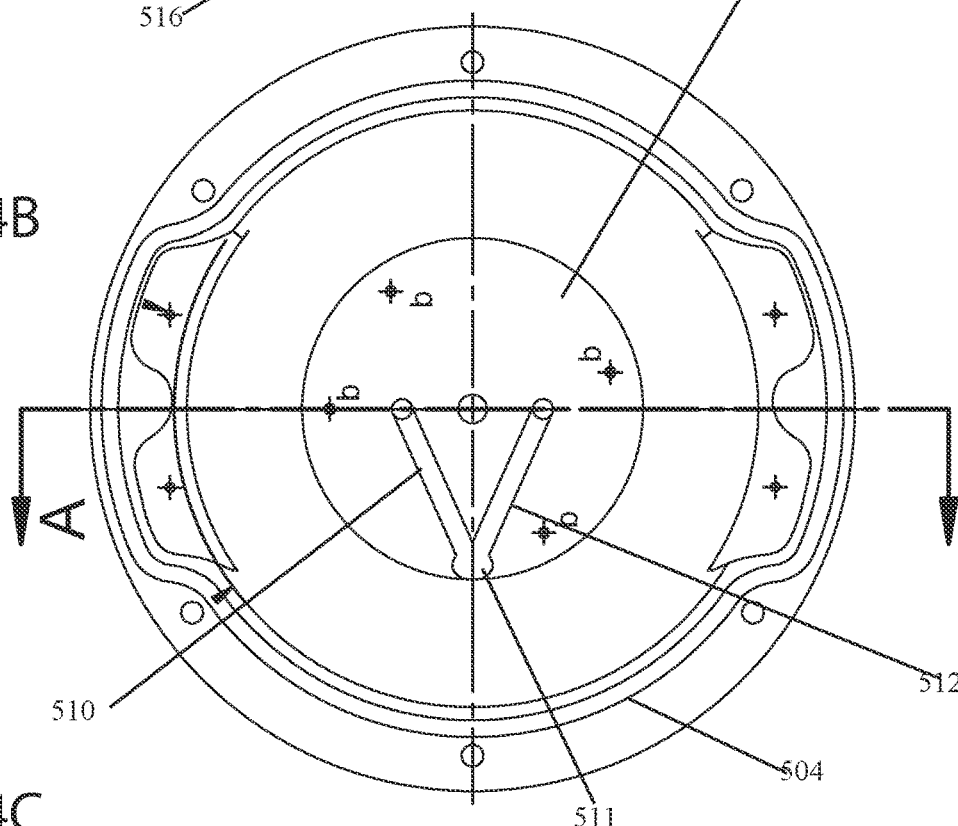
FIG. 14B is a top view of the body of the light showing section line A-A.

FIG. 14B is a top view of the body of the light showing section line A-A; in this view channels 510, 511 and 512 are shown in bottom face 513.

Figure 14C:
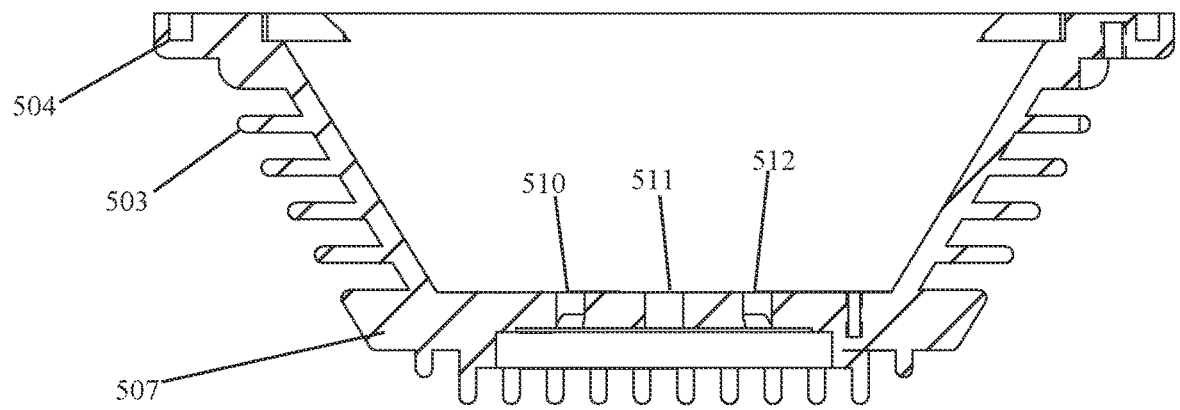
FIG. 14C is a cross-sectional view of the body taken along section line A-A.

FIG. 14C is a cross-sectional view of the body taken along section line A-A which shows channels 510, 511 and 512 disposed in ring section 507 of base 5. Base or body 5 includes fins 503 as well as flange section 504.

Figure 15A:
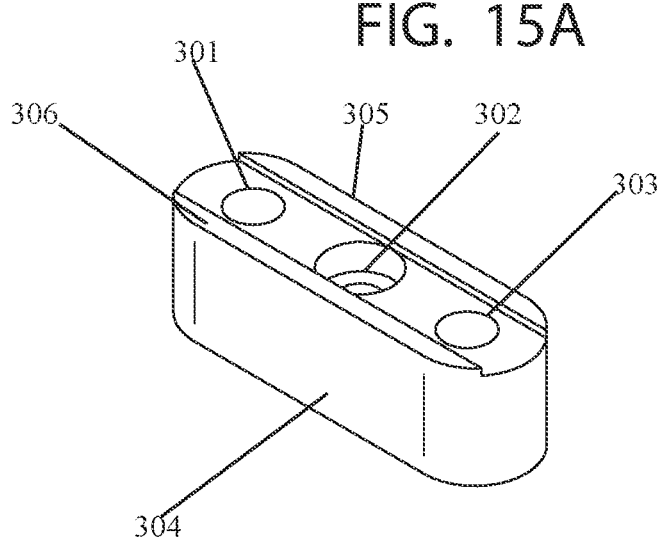
FIG. 15A is a perspective view of the contact block for the light.
Figure 15B:
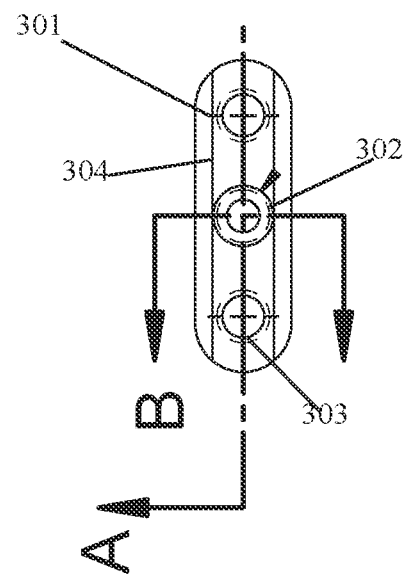
FIG. 15B is a top view of the contact block for the light having section line A-A shown therein.
Figure 15C:
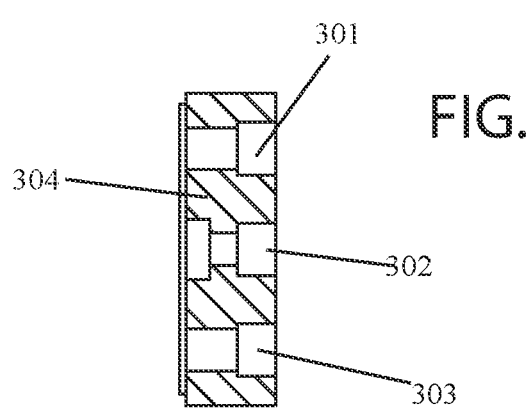
FIG. 15C is a side cross-sectional view taken along line A-A.

FIG. 15A is a perspective view of the pole mount 3 for the light wherein this contact block includes a block body 304, a plurality of holes 301, 302, and 303 as well as rims 305 and 306. The contacts or prongs 502*a* are configured to fit through contact holes 301 and 303. FIG. 15B shows the top view of this contact body 304 having holes 301, 302, and 303. FIG. 15C is a side cross-sectional view taken along line A-A which shows holes 301 and 303 for receiving contacts as well as hole 302 for receiving a fastener such as a screw to lock the pole mount body 304 to the base.

Figure 16A:
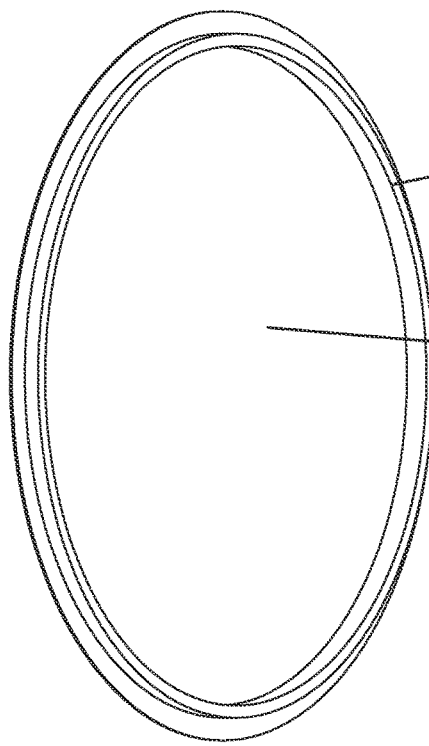
FIG. 16A is a perspective view of the lens.
Figure 16C:
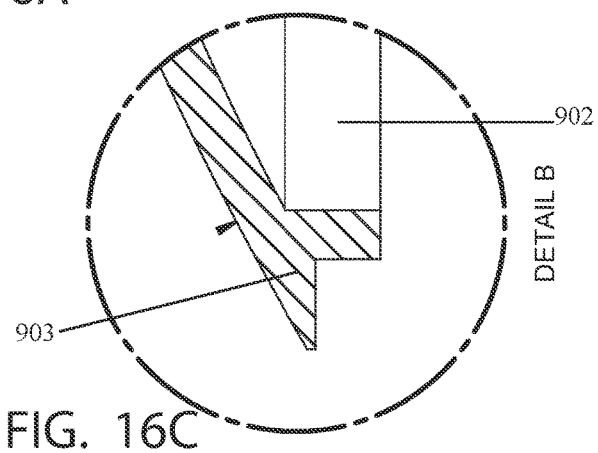
FIG. 16C is a detail view of the lens.
Figure 16B:
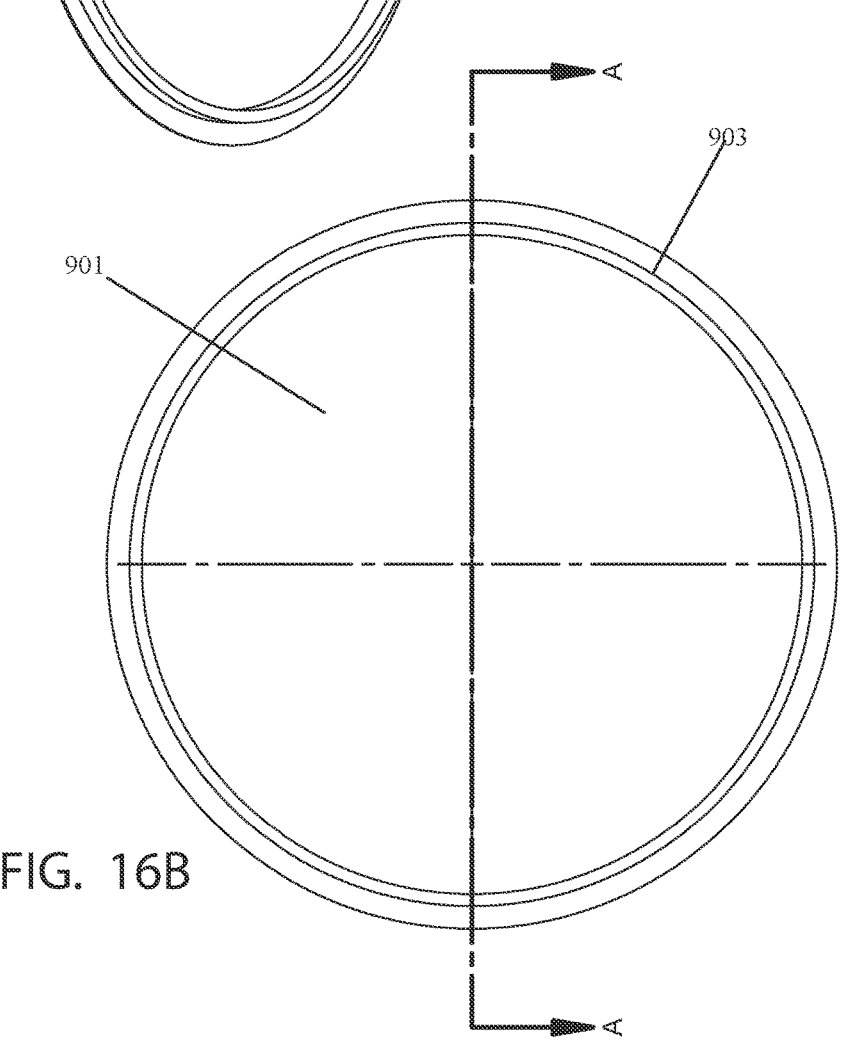
FIG. 16B is a front side view of the lens.
Figure 16D:
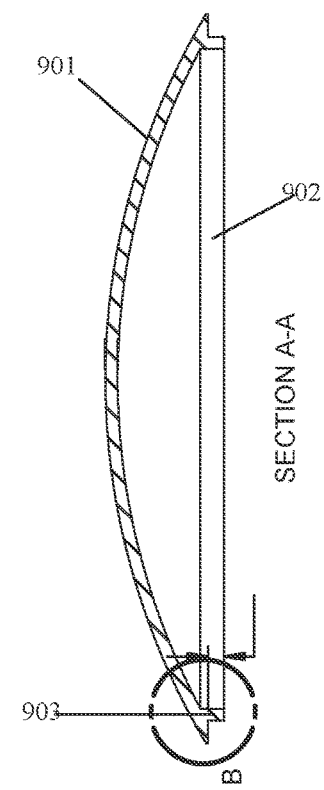
FIG. 16D is a side cross-sectional view of the lens taken along line A-A shown in FIG. 16B.

FIGS. 16A and 16B are respectively a perspective view and a top view of the lens 9. In this view there is shown a lens body 901 and an outer rim 902. FIG. 16C shows a side cross-sectional view of the lens taken along line A-A shown in FIG. 16B: This view shows lens body 901, and outer rim 902. It also shows inner rim 903 as well. FIG. 16D shows a detail view which shows a detailed view of the outer rim 902 and the inner rim 903. The outer rim 902 is configured to mesh with the heat sink ring 7 when the device is assembled.

Figure 17:
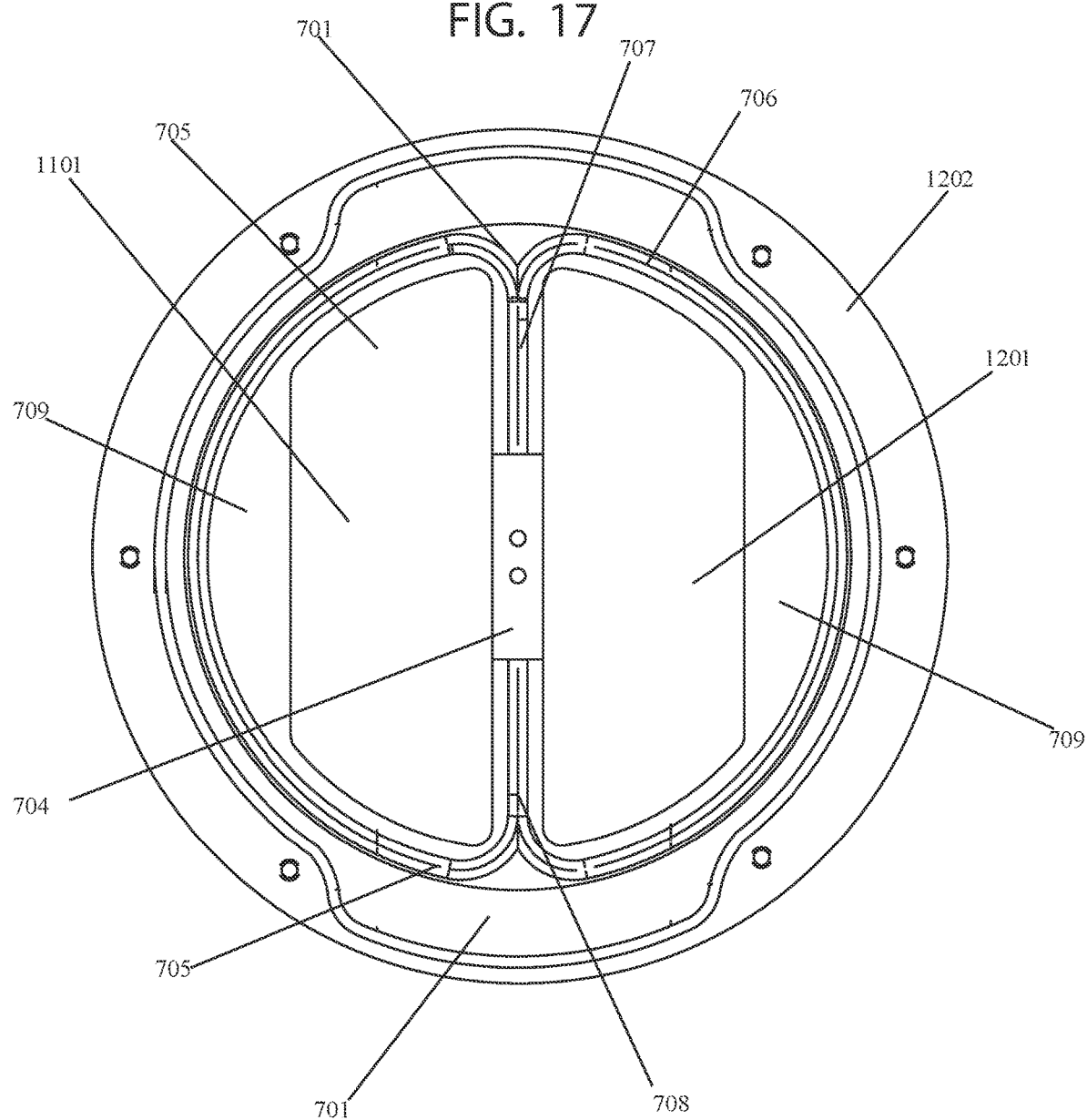
FIG. 17 is a top view of the light with the cover or lens removed.

FIG. 17 is a top view of the light with the cover or lens removed. In this view there is shown heat sink ring 7 with reflectors 1101 and 1201 disposed therein. With this view there is shown body section 701 having bridge 704 which channels 705, 706, 707, and 708. There are also shelf sections 1109 and 1209 of the respective reflectors. Disposed in the body section 701 are reflectors 1101 and 1201. These reflectors are shown in greater detail in FIGS. 18A-18C.

Figure 18A:
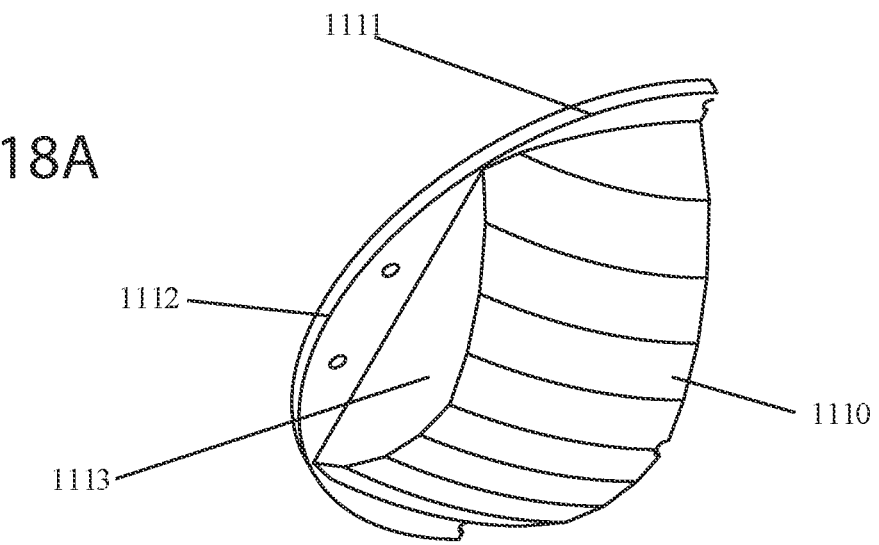
FIG. 18A is a perspective view of one of the reflectors.
Figure 18B:
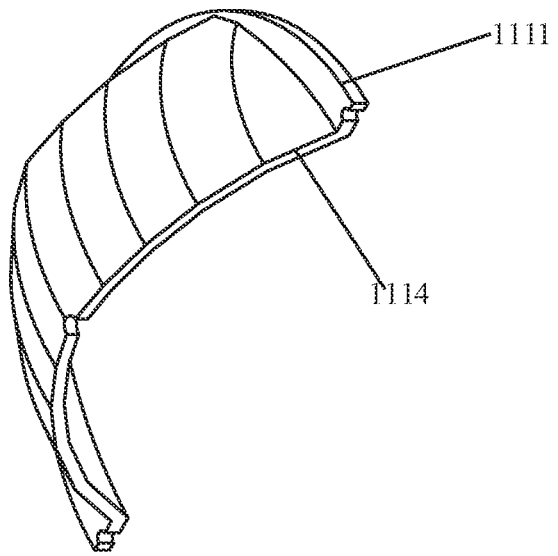
FIG. 18B is an end-perspective view of the reflector of FIG. 18A.
Figure 18C:
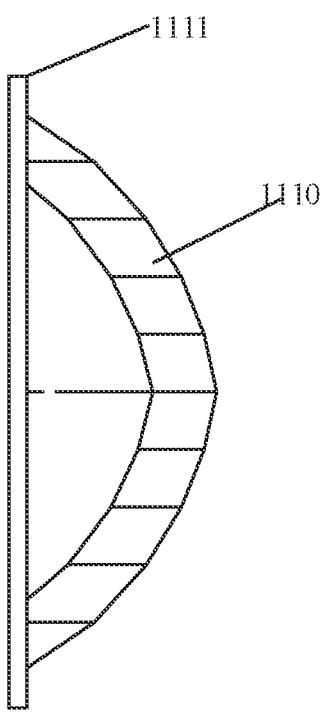
FIG. 18C is a side view of the reflector of FIG. 18A.

FIG. 18A is a perspective view of one of the reflectors; 1101 which includes a shelf section 1109, body portion 1110 a rim 1111. There is also a separate face 1113 positioned transverse to shelf section 1109. FIG. 18B is an end-perspective view of the reflector of FIG. 18A, which shows rim 1111, body 1110, and rim 1114. FIG. 18C is a side view of the reflector of FIG. 18A, which shows rim 1111 as well as body section 1110.

Figure 19:
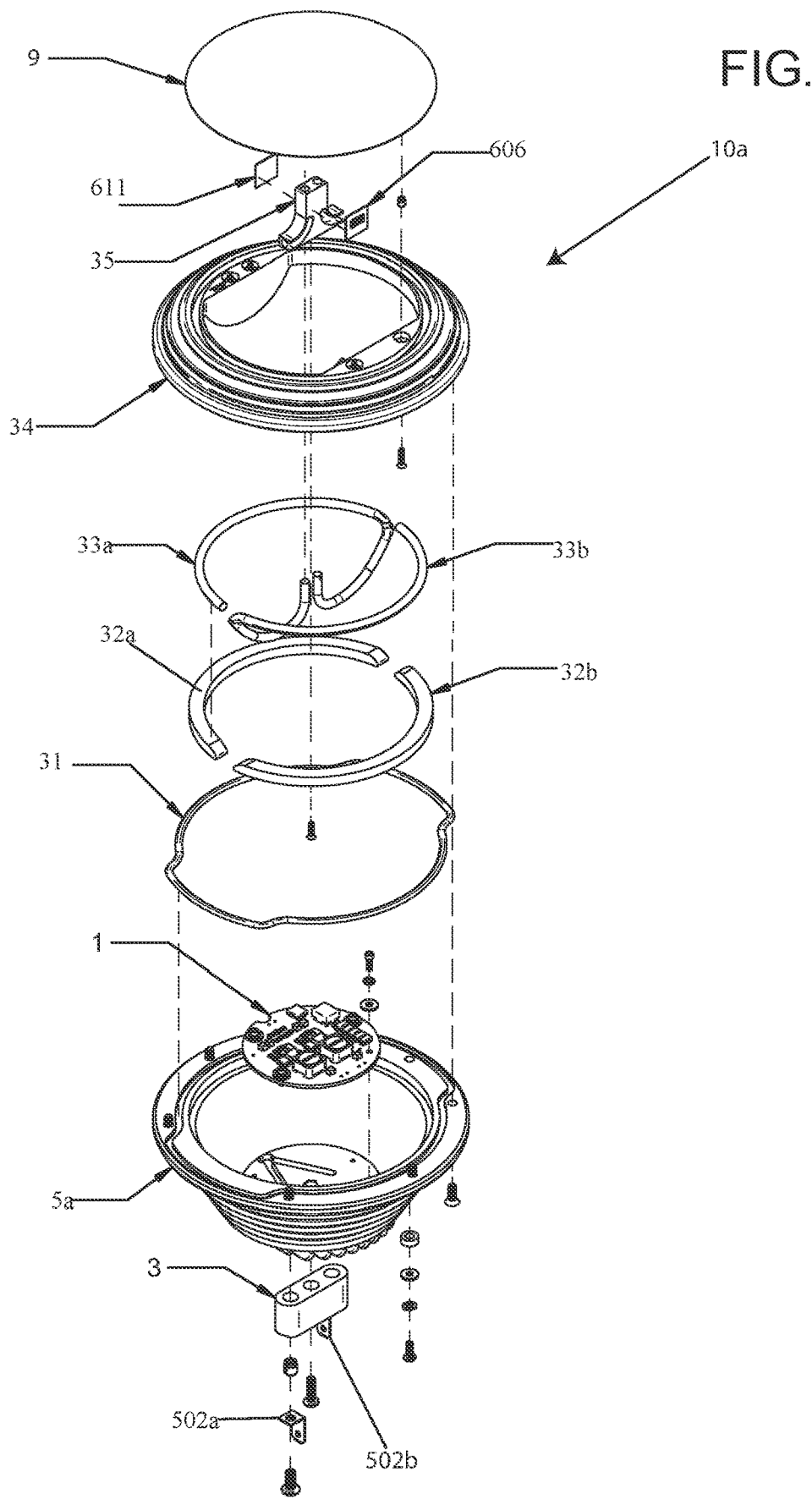
FIG. 19 is an exploded view of another embodiment.

FIG. 19 is an exploded perspective view of a second embodiment, wherein this view shows light embodiment 10*a* having base 5*a* at one end and lens 9 at the opposite end. A plurality of LED plates 611 and 606 housing associated LEDs are coupled to a heat sink 35. Heat sink 35 is positioned inside of base 5*a*. A heat sink in the form of heat sink ring 34 is configured to be coupled to base 5*a*. Base 5*a*, heat sink ring 34 and heat sink 35 all form heat sinks configured to draw heat away from LED plates 606 and 611 as well as to heat up the light. Heat pipes 33*a* and 33*b* are configured to be disposed inside of base 5*a*. Heat pipes 33*a* and 33*b* are configured as cylindrical tubes having a fluid disposed inside of them. When the heat at one end of the pipe reaches a particular temperature, the fluid becomes a gas and is expanded to the opposite end of the pipe wherein the opposite end of the pipe is coupled to a heat sink as well. For example, a first end of heat pipes 33*a* and 33*b* is coupled to heat sink 35. A second end of heat pipes 33*a* and 33*b* is coupled to heat sink 34. Heat is transferred from heat sink 35 to heat sink 34 for the purpose of cooling heat sink 35 and thereby cooling LED plates 606 and 611 as well as their associated LEDs. The heat that is transferred is also used to heat up the entire light 10*a* including base 5*a*, which can then be used to remove condensation/water/fluid as well as ice which may impair the functioning of the light.

Heat pipes 33*a* and 33*b* extend in three different planes, particularly from a front position on the light when coupled to heat sink 35, to a back position adjacent to base 5*a*, and then back to the front position coupled to or adjacent to heat sink ring 34.

This design also includes rings 32*a* and 32*b* which are positioned adjacent to/coupled to heat pipes 33*a* and 33*b*. In addition, there is also a gasket 31 which is coupled to base 5*a* and positioned between base 5*a* and lens 9. This design also includes circuit board 1 as well as a pole mount 3, and contacts 502*a* and 502*b*. In addition, there are shown a plurality of screws, nuts, and washers which are configured to couple the different parts together.

Figure 20A:
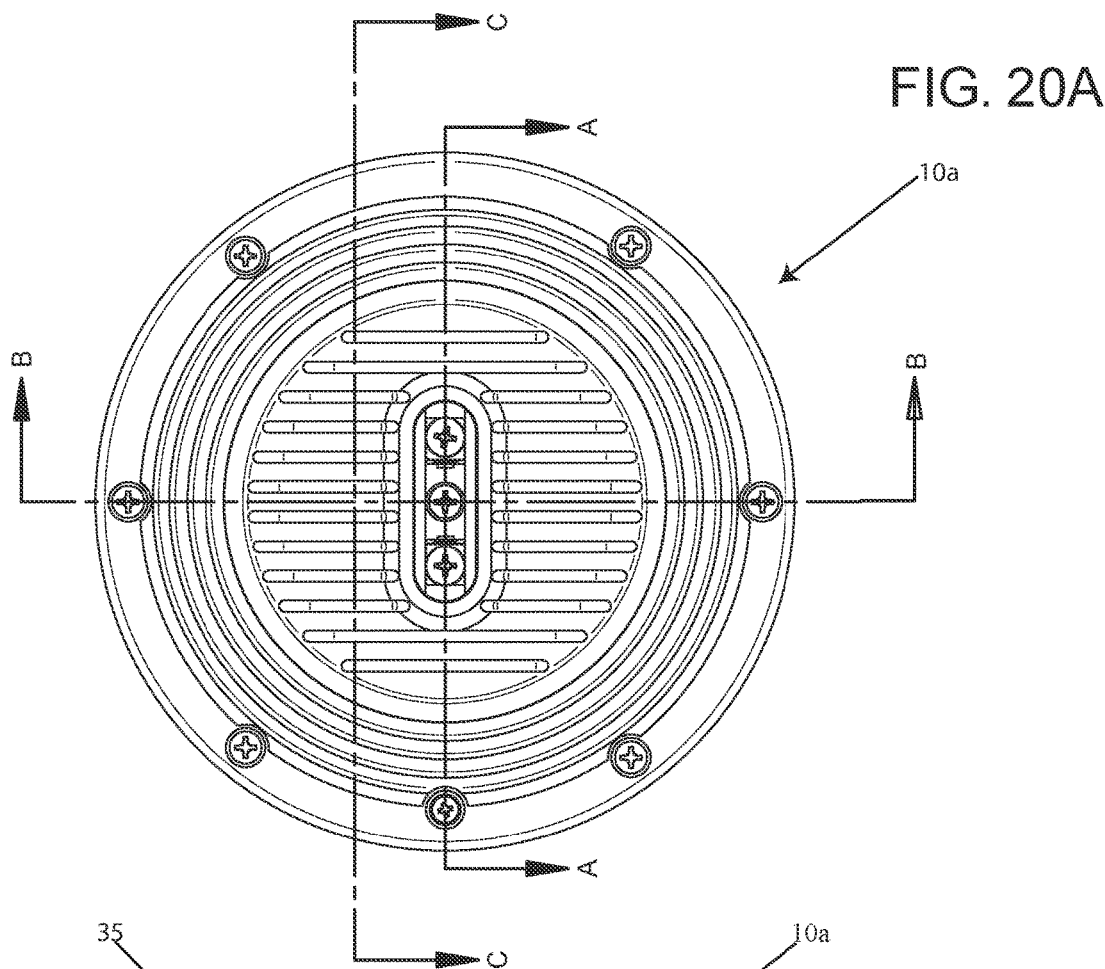
FIG. 20A is a bottom view with cross-section lines A-A, B-B, and C-C therein.
Figure 20B:
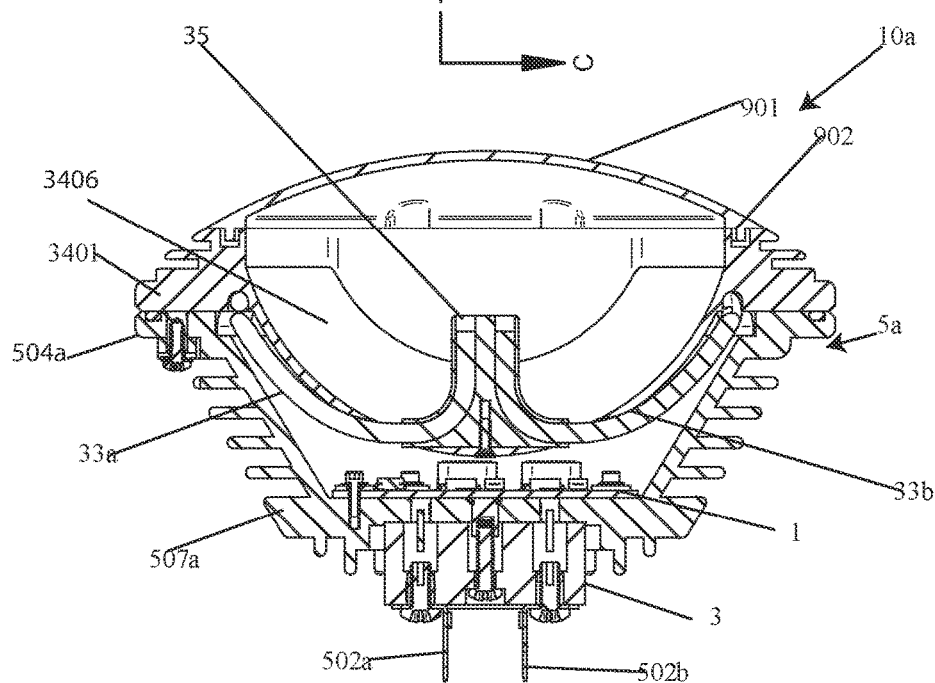
FIG. 20B is a first cross-section taken along the lines A-A.

FIG. 20A is a bottom view of the embodiment 10*a* as shown in FIG. 19. There is a plurality of cross-section lines A-A, B-B and C-C shown. Thus, FIG. 20B shows a first cross-sectional view taken along section A-A. In this view, lens 9 shows lens body 901, as well as an outer rim 902. This view shows heat sink ring having a body section 3401 and a reflector section 3406. Body section 3401 is coupled to flange section 504*a* of body or base 5. Heat pipes 33*a* and 33*b* are shown extending from heat sink 35 to heat sink 34, particularly to heat sink body 3401. There is also another flange region 507*a* which forms an opposite end of base or body 5. Coupled to flange region 507*a* is circuit board 1. In addition, coupled to flange region 507*a* is pole mount 3 as well as contacts 502*a* and 502*b*.

Figure 21A:
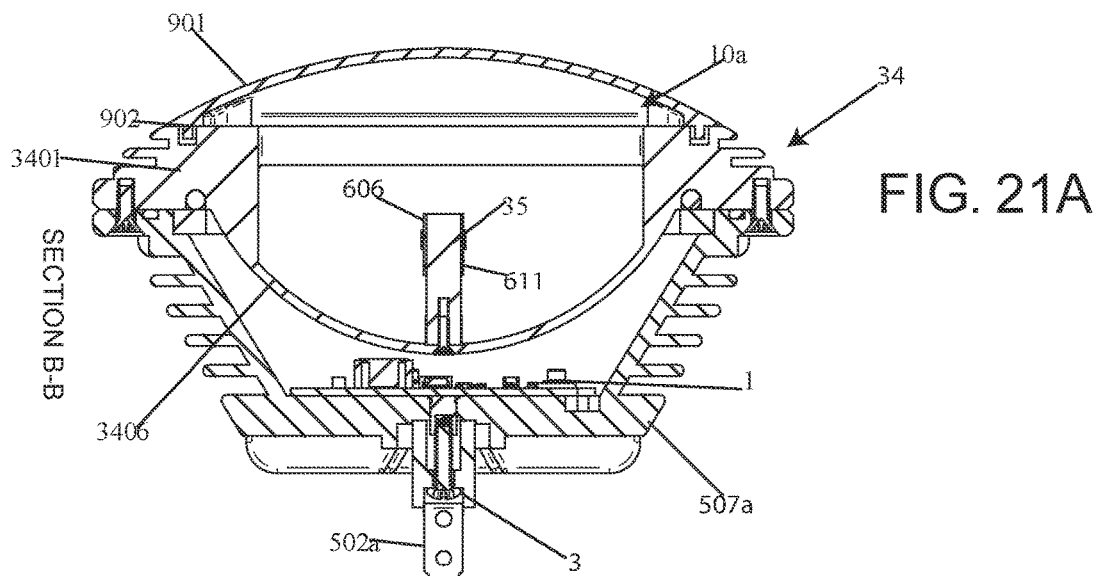
FIG. 21A is a cross-section taken along the line B-B.

FIG. 21A shows a cross-sectional view of the embodiment 10*a* taken along the line B-B which shows a view that is rotated approximately 90 degrees from the section line A-A. In this view there is shown lens body 901 having an outer rim 902. Outer rim 902 is coupled to body section 3401 of heat sink ring 34. Body section 3401 is coupled to flange region 504*a* while reflectors 3406 are shown disposed adjacent to heat sink 35. Flange section 507*a* is shown coupled to pole mount 3 which is coupled to contact 502*a*. Disposed inside of the enclosure of the light formed from base or body 5 and lens 9 is heat sink 35 having lens plates 606 and 611 coupled to it.

Figure 21B:
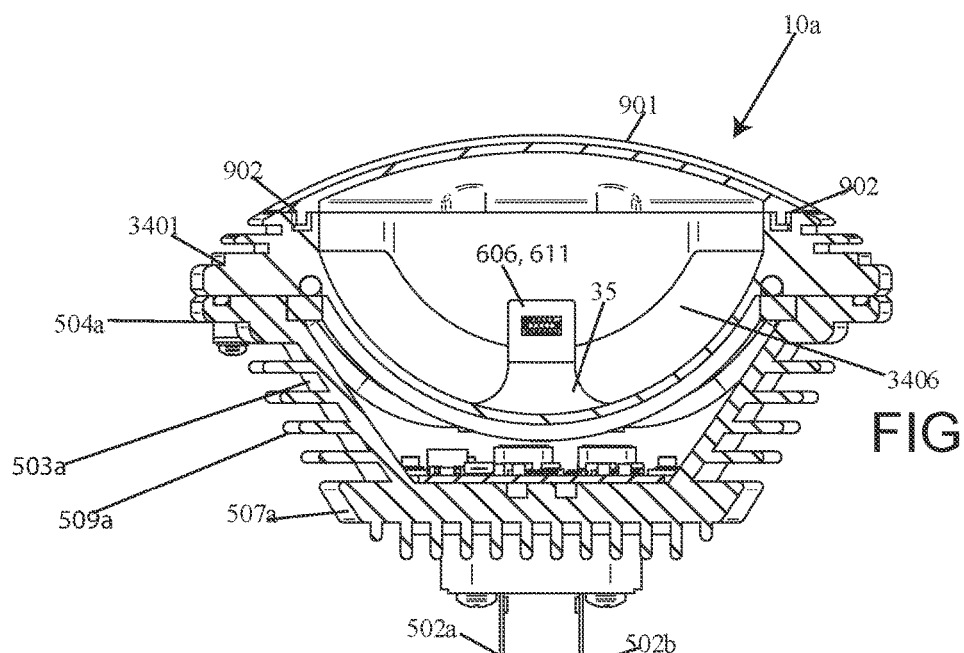
FIG. 21B is a cross-section taken along the line C-C.

FIG. 21B shows another side cross-sectional view taken along line C-C. In this view there is shown lens body 901 which includes outer rim 902. Outer rim 902 is coupled to heat sink ring body 3401. Heat sink ring body 3401 is coupled to flange region 504*a*. In addition, extending around heat sink 35 is reflector 3406 which is configured to reflect light from LEDs on LED plates 606 and 611. Disposed between flange section 504 and flange region 507*a* is body region 503 which includes fins 509*a*. Coupled to flange region 507*a* is pole mount 3 which is coupled to contacts 502*a* and 502*b*.

Figure 22A:
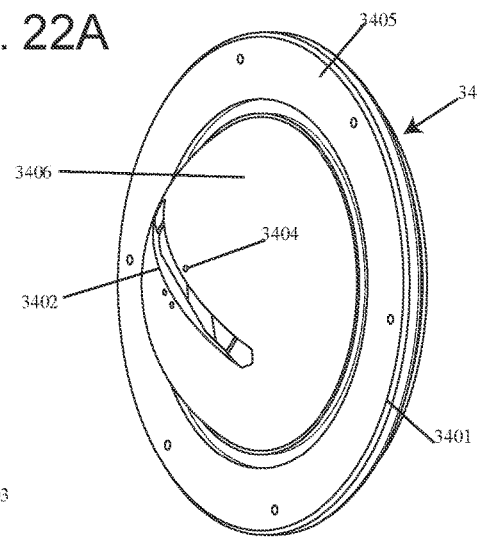
FIG. 22A is a bottom perspective view of a reflector body.

FIG. 22A shows a bottom perspective view of the combination of the reflector and heat sink 34. This reflector/heat sink combination includes a body section 3401, a reflector section 3406 as well as an opening 3402 and screw holes 3404. A bottom surface 3405 is configured to be coupled to flange region 504*a*.

Figure 22B:
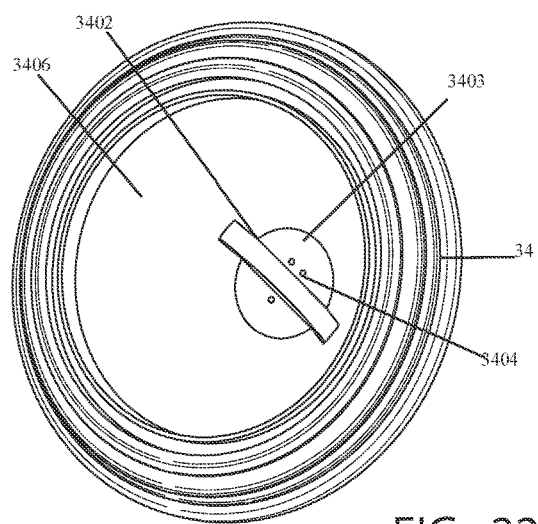
FIG. 22B is a top perspective view of the reflector body.
Figure 22D:
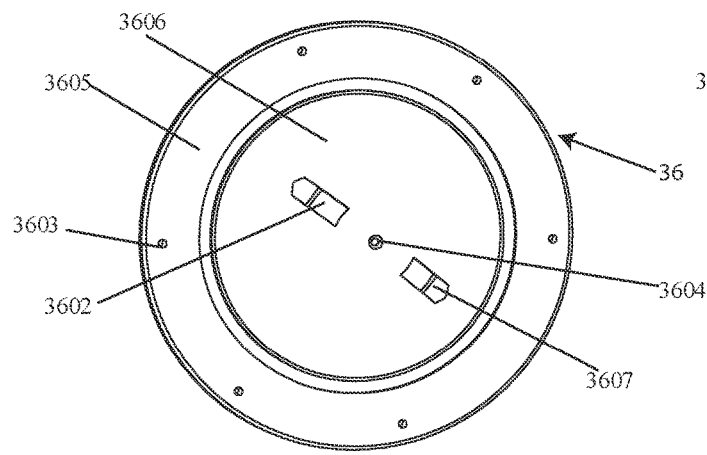
FIG. 22D is the back side view of the heat sink of FIG. 22C.

FIG. 22B shows a front perspective view of the heat sink reflector which includes a reflective dome shaped surface 3406, an opening in the form of a rectangular opening 3402, a bottom flattened mounting portion 3403 as well as holes 3404 for receiving screws for allowing a heat sink such as heat sink 35 to be coupled thereto. This dome shaped reflector region is substantially spherical which allows for a substantially uniform reflection of light out through lens 9.

Figure 22C:
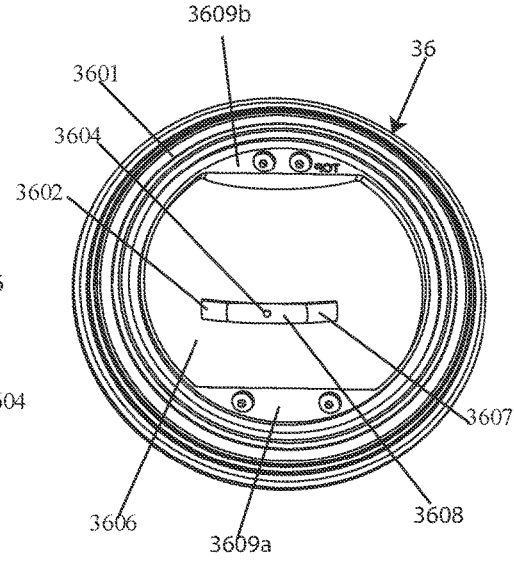
FIG. 22C is a top view of the heat sink which includes a reflector.

FIG. 22C is a top view of the heat sink 36 which includes a reflector. This heat sink 36 is similar to heat sink 34 and can be used in place of heat sink 34. There is a body section 3601, an opening 3602 and another opening 3607 wherein these openings are configured to receive associated heat pipes such as ends 3305 (See FIGS. 26A, 26B and 26C). With the back-side view 22D there is shown hole 3604, as well as hole 3603. Hole 3603 is configured for securing the heat sink 36 to the base 5*a*. Hole 3604 is configured for securing the heat sink 35 to the reflector section 3606. There is also a flange section 3605 which houses hole 3603 wherein this flange section is for fitting over a flange region 504*a* which is at a front end of base 5*a*. In addition, with the front-end view, there is shown bridge 3608 spanning between the two openings 3602 and 3607. There are also shelves 3609*a* and 3609*b* which have screw holes, and which are also configured for securing the heat sink 36 to the base 5*a*.

Figure 23A:
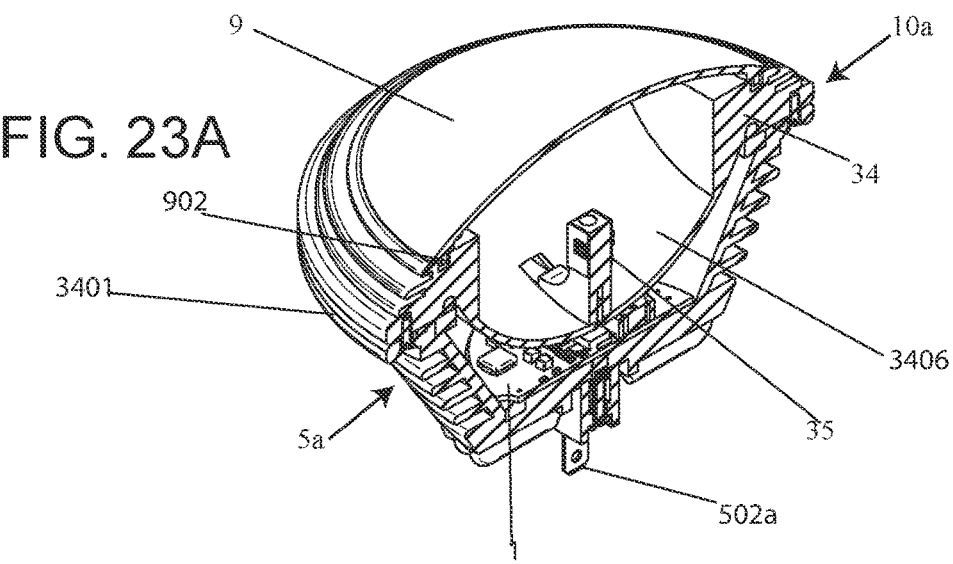
FIG. 23A is a perspective view of a cross section of the embodiment of FIG. 19.
Figure 23B:
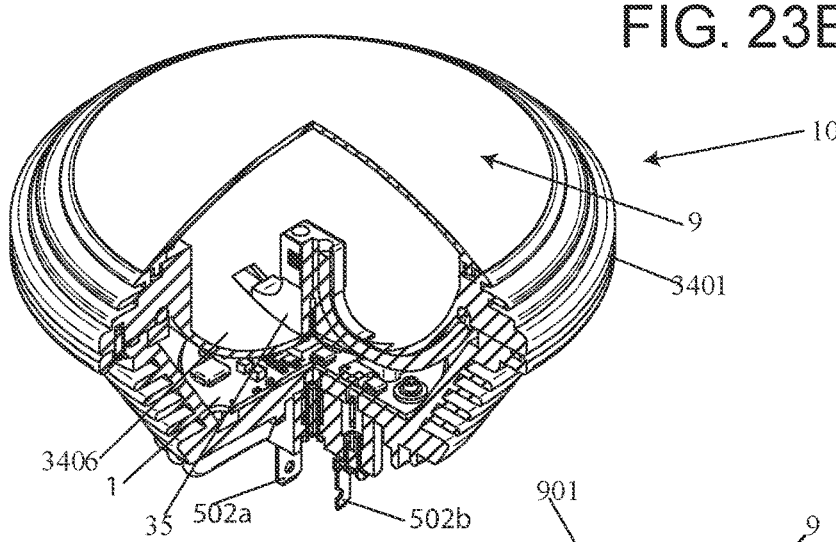
FIG. 23B is a perspective view of a quarter taken out of the embodiment of FIG. 19.
Figure 23C:
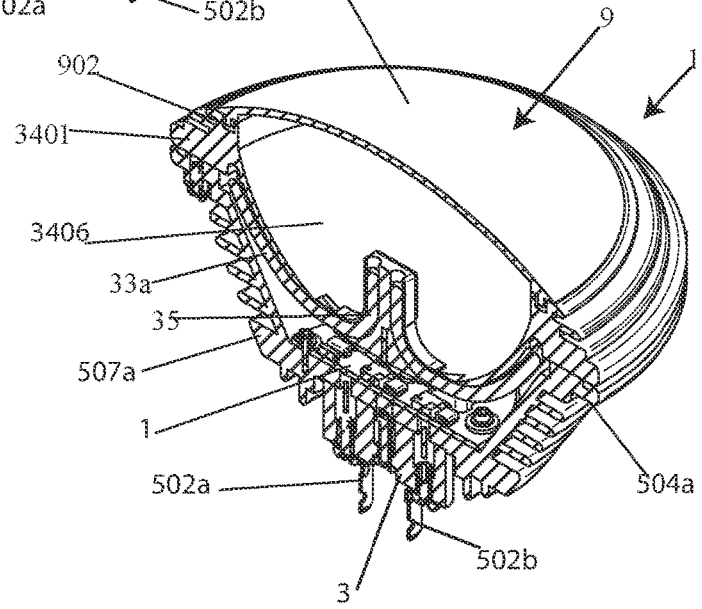
FIG. 23C is another top perspective view of the embodiment of FIG. 19.

FIGS. 23A, 23B and 23C are perspective cross-sectional views which show lens 9 having body 901 and edge section or outer rim 902. This lens edge section or outer rim 902 is coupled to the heat sink ring 34 at body 3401. Reflector 3406 is shown positioned adjacent to heat sink 35 which has LEDs coupled to it. A shown heat pipes 33*a* and 33*b* extend from heat sink 35 to heat sink 34. Coupled to flange section 507*a* is motherboard 1. In addition, prongs or contacts 502*a* and 502*b* are coupled to pole mount 3 which is coupled to base or body 5*a*.

Figure 24:
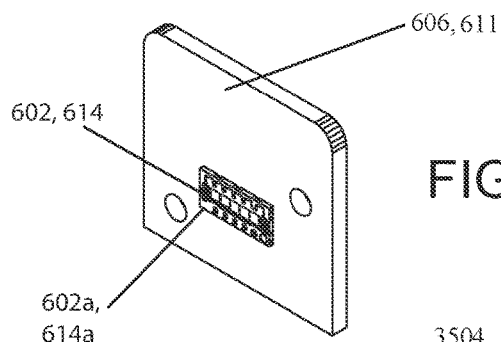
FIG. 24 is a perspective view of a heat sink plate and LED.

FIG. 24 shows a perspective view of LED plate 606 and or 6011 which has LEDs 602 and 614 disposed on it respectively. LEDs 602 and 614 are mounted on a LED board 602*a* and/or 614*a* which is fastened to a respective LED plate 606 and/or 611. LED plate 606 and/or 611 draws heat away from their respective LED board.

FIGS. 25A, 25B, 25C and 25D show the different perspective views of heat sink 35. Heat sink 35 includes a body section 3501, openings 3503 and 3504 which form channels to receive the associated heat pipes 33*a* and 33*b*. There are also opposite openings 3508 and 3509 which feed into openings 3503 and 3504 respectively. These openings are curved to allow a curved or bending heat pipe to extend therein. A plurality of tabs 3505 and 3510 extend laterally outside of the body 3501. Tab 3505 includes holes 3506 and 3507 while tab 3510 includes hole 3513. These holes are configured to allow screws or fasteners to be placed therein to fasten the heat sink to the other heat sink 34 wherein these screws insert into holes 3404 (see FIGS. 22A and 22B) FIG. 25D also shows a heater 3511 which is disposed in side of the heat sink body 3501, wherein as described above with respect to heater 625, this optional separate heater can be in the form of a resistor which is heated from a feed from the circuit board 1 which then heats up the heat sink 35 which then passes that heat through the associated heat pipes throughout the body of the light which is bound by the base or body 5*a* and lens 9*a*.

FIGS. 26A and 26B show heat pipes 33*a* and 33*b*. Each of these heat pipes has a particular shape that extends in at least three planes. For example, there is a first body portion 3301 which is curved, this body portion extends to an end 3302. Body portion 3301 is configured to be coupled to and/or between body or base 5*a* and ring heat sink 34. Body portion 3301 extends into a bend 3303 which allows the heat pipes 33*a* and 33*b* to extend from flange section 504*a* to flange region 507*a*. This extension in section 3304 which is also curved, then extends into end section 3305 which then angles back into extending region 3305 which extends into heat sink 35.

FIG. 27 shows the two heat pipes which show respective body portions 3301*a*, and 3301*b*, ends 3302*a*, and 3302*b*, bends 3303*a* and 3303*b*, sections 3304*a* and 3304*b*, and end sections 3305*a* and 3305*b*. Accordingly, heat from heat sink 35 is generated and passed into end 3305 or ends 3305*a* and 3305*b* which then causes fluid inside of heat pipes 33*a* and 33*b* to absorb this heat, as the heat is accumulated, the liquid changes state to a gas and is passed to the opposite end 3302 such as ends 3302*a* and 3302*b* which are much cooler. Along the way the heat pipes are in contact with heat sink ring 34 as well as base 5*a* where this energy is passed into these heat sinks. Base 5*a* serves as a heat sink as well.

Figure 28:
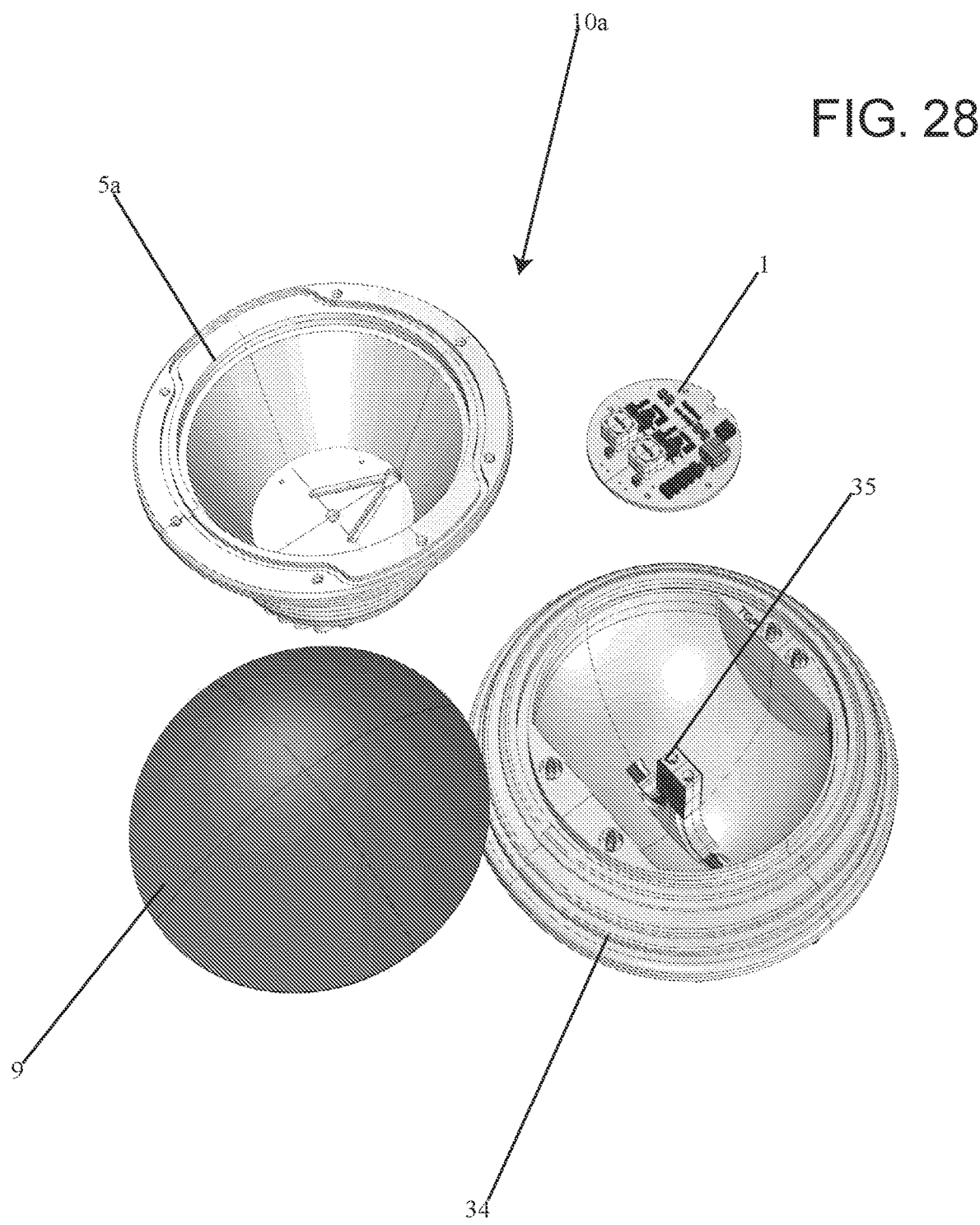
FIG. 28 is an exploded three-dimensional view of the embodiment of FIG. 19.

FIG. 28 is a three-dimensional view of the embodiment 10*a* which shows base 5*a*, motherboard or circuit board 1, lens 9, heat sink ring 34 as well as heat sink 35 all separated from each other to provide for better viewing of the components.

FIGS. 29A and 29B are views of the reflector/heat sink 40. Heat sink 40 is configured for another embodiment which is for multiple heat pipes such as four heat pipes. For example, heat sink 40 includes a body section 4001, a central opening 4002 a reflector section 4006 which is substantially spherical, or dome shaped. There is also a back-flange section 4003 which is configured to allow the heat sink 40 to be coupled to the base 5*a*. A plurality of holes 4007 are in the flange section 4003 for securing the heat sink to the base 5*a*. The dome reflector section has a flattened region 4004 which has drill holes 4005 in it, these drill holes are for receiving the heat sink such as heat sink 41 shown in FIGS. 30A and 30B.

Figure 30A:
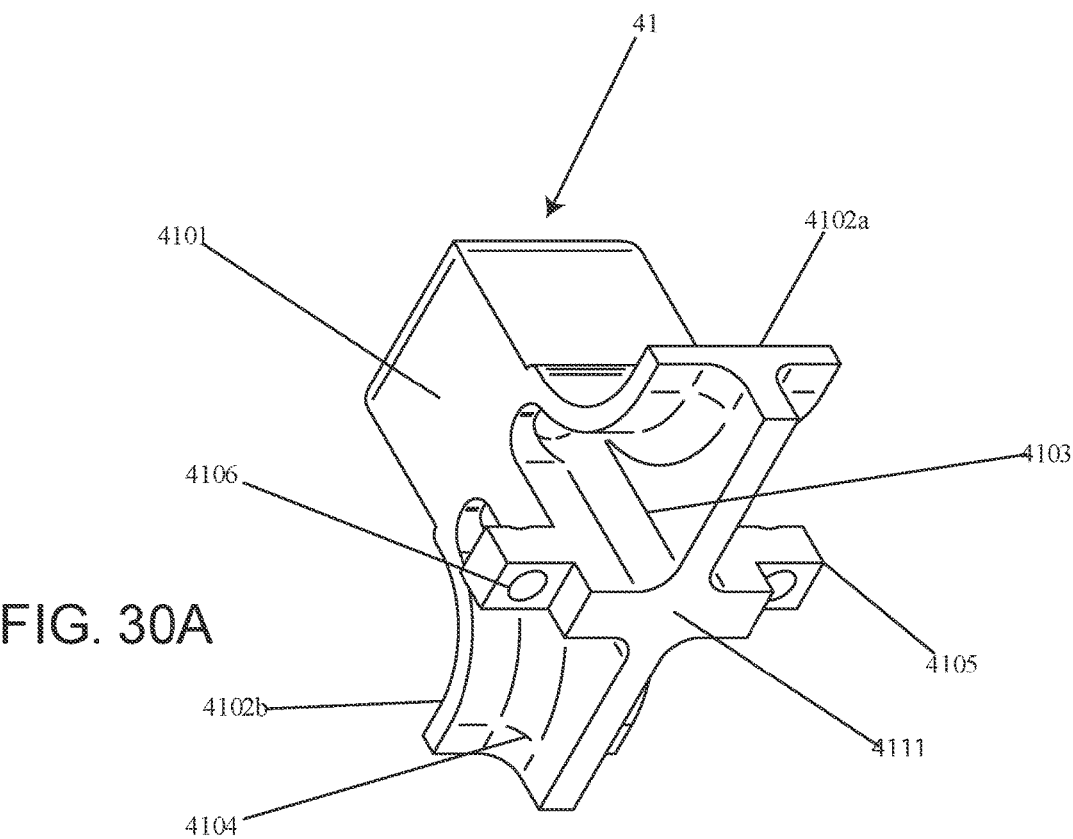
FIG. 30A is a bottom perspective view of the heat sink of the third embodiment.
Figure 30B:
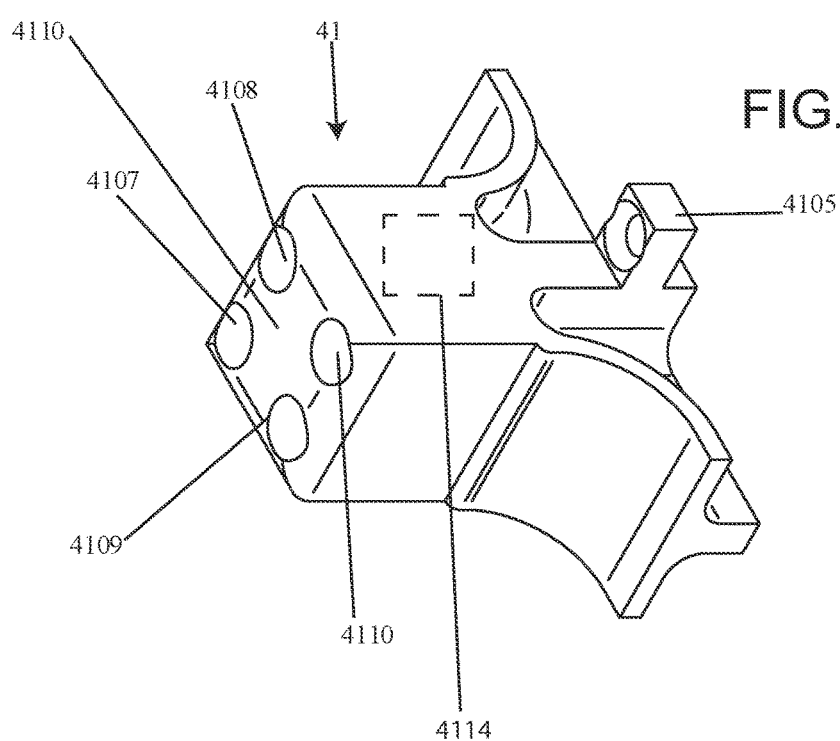
FIG. 30B is a top perspective view of the heat sink of the third embodiment.

FIGS. 30A and 30B show the heat sink 41 in a bottom perspective view and a top perspective view respectively. This heat sink 41 includes a body section 4101 and wings 4102*a* and 4102*b*. There are also mounting flanges 4105 and 4106 as well as channels 4103 and 4104 for receiving the heat pipes. In addition, there is a central divider 4111 which is configured to divide these channels 4103 and 4104 apart from each other. Each of these mounting flanges 4105 and 4106 include respective holes which are configured to receive screws. As shown by FIG. 30B there is a top face 4110 which includes holes 4107, 4108, 4109 and 4110 which are configured to receive the respective heat pipes. FIG. 30B shows the embedded heater 4114 which can be selectively heated from an associated circuit board 1 wherein this heater much like heater 625 and heater 3511 is an optional heater which can be made from a pure resistor or other type of heating element so that the heat sink 41 can be selectively heated with electrical current passing from circuit board 1 and into heat sink 41.

FIGS. 31A and 31B show bottom perspective view and a top perspective view respectively of the heat sink plate for housing the different LED boards. For example, there is a five faced heat sink plate device which includes a first top face 4201, a second face 4202, a third face 4203, a fourth face 4204, and a fifth face 4205. On each of these faces are associated LED circuit boards having respective LED lights. For example, there is a first LED light board 4206 on the first face 4201, a second LED light board 4207 on the second face 4202, a third LED light board 4208 on face 4203, a fourth LED light board 4209 on face 4204, and a fifth LED light board 4210 on face 4205. Essentially this heat sink plate has five sides similar to a six-sided cube with one face missing.

Figure 32:
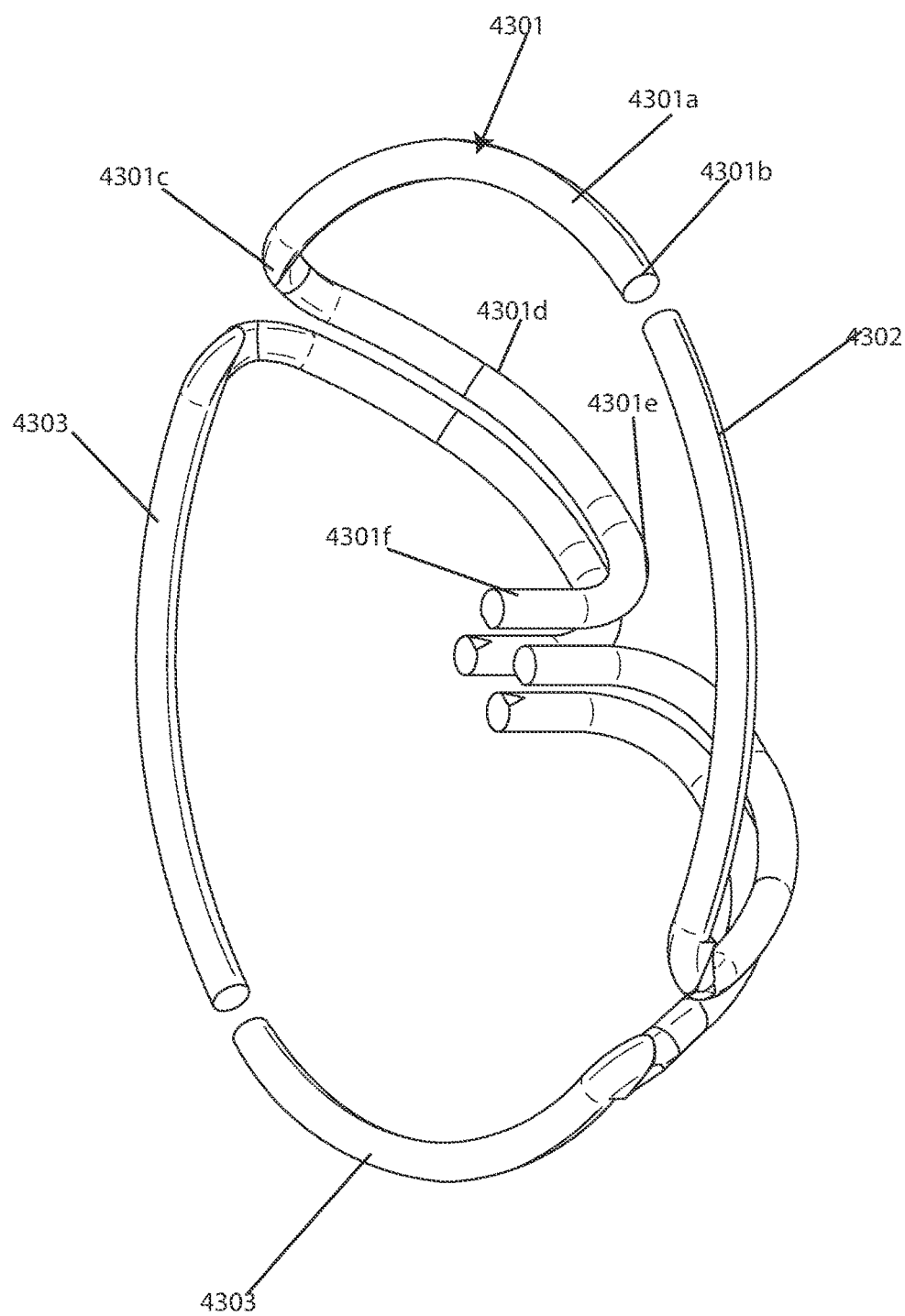
FIG. 32 is a perspective view of the four heat pipes.

FIG. 32 shows a perspective view of the different heat pipes which include heat pipes 4301, 4302, 4303, and 4304. Each of these heat pipes includes a plurality of different sections such as a body section 4301*a*, a first end section 4301*b*, a bend section 4301*c*, a lower body section 4301*d*, another bend section 4301*e* and second end 4301*f*. Heat from the heat sink 41, is conducted to the heat pipe 43 such that it enters end 4301*f* and then causes a fluid inside of the heat pipe to turn into a gas and then expand and extend from this end 4301*f* to opposite distal end 4301*b*. End 4301*f* is disposed inside of heat sink 41. The bend section 4301*e* causes the heat pipe to extend in another plane, across and behind the reflector region 4006 such that the heat pipe extends into region of body section 4301*d* and up to another bend region 4301*c* and across body region 4301*a*, and into opposite end 4301*b* which is disposed between heat sink 40 and base 5*a*. Thus, with four (4) different heat pipes more heat is dissipated from heat sink 41 and on to heat sink 40 and base 5*a* which is essentially a heat sink as well. the heat extends throughout the body of this light and therefore is configured to heat the light throughout the entire body of the light so as to remove moisture as well as to melt an outer shell or lens 9 on the light.

FIG. 33A is a bottom perspective view of the lens 44. Lens 44 includes a main lens body section 4401, a rim section 4402, a cone region 4403, and an open end 4404 which is configured to receive the light emanating from LED light board 4206 of the associated LED light (See FIG. 31B). Lens 44 also includes a substantially dome shaped region 4407 which is elevated above cone 4403 as well.

Figure 34A:
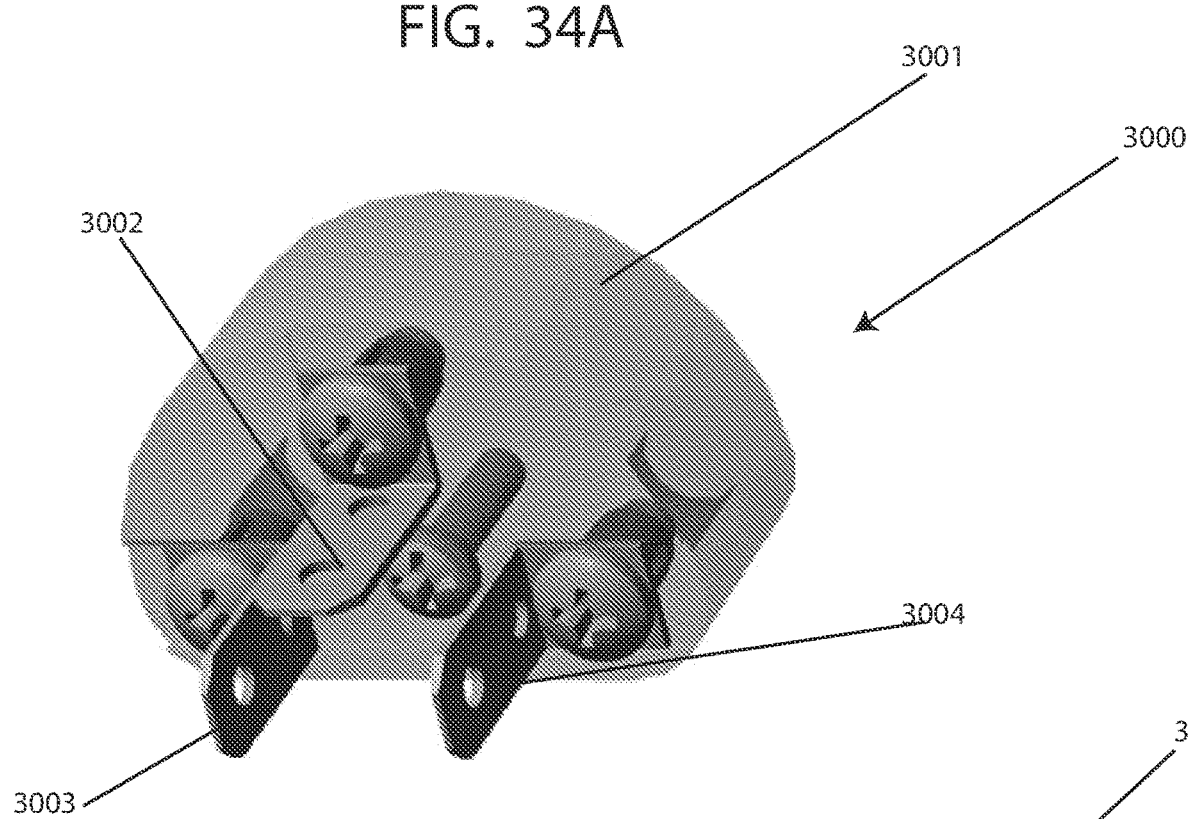
FIG. 34A is a perspective view of a first set of contacts.
Figure 34B:
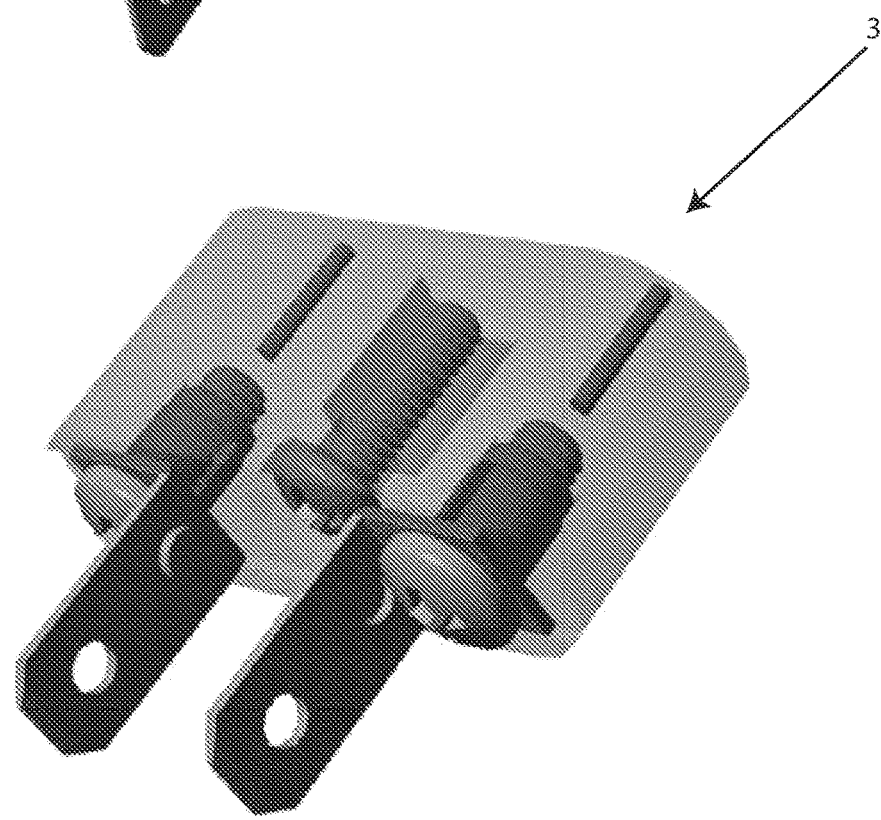
FIG. 34B is a perspective view of a second set of contacts.

As shown above, the headlights can be made from multiple different designs. For example, FIG. 34A is a perspective view of a first set of contacts 3000 which includes a block 3001, and a plurality of contacts 3002, 3003, and 3004. Thus, this is a three-prong block of contacts for use with any of the above or below headlamps. With a three-prong outlet, there can be three different contacts such as 3002, 3003, and 3004 which can be any one of phase, neutral and/or ground. FIG. 34B shows that there is a two-prong set of contacts, contact block or pole block 3 as shown above. As described above this contact block can be used with any of the above different headlights or below different headlights as well.

Figures 35A, 35B:
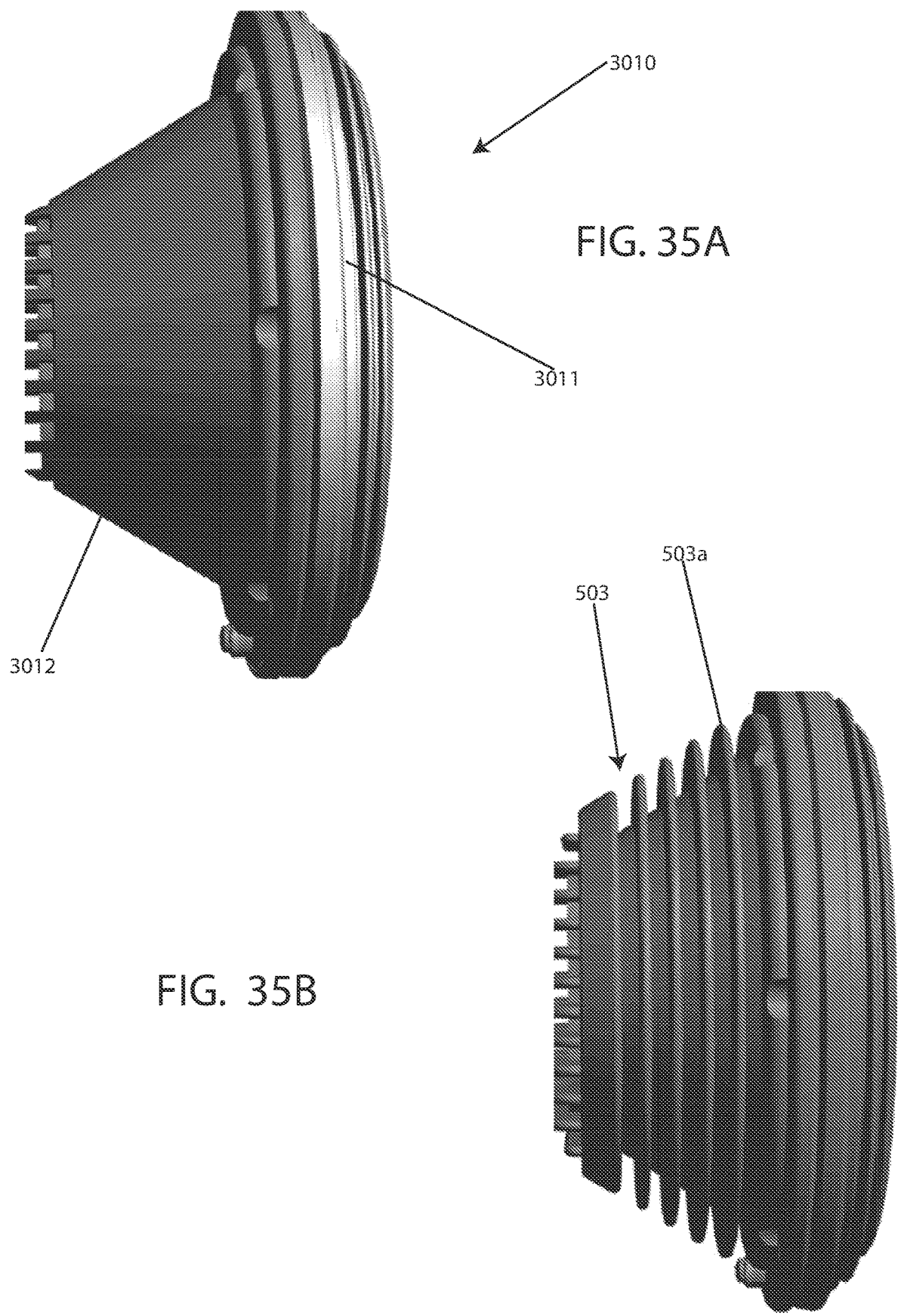
FIG. 35A is a side view of a first body for the light.
FIG. 35B is a side view of a second body for the light.

FIG. 35A is a side view of a first body 3012 for the light 3010 which is coupled to a front heat sink 3011 and wherein this first body 3012 has few fins and a smooth side body. Alternatively, FIG. 35B is a side view of a second body 503 for the light wherein this second body 503 has side fins 503*a* as well to facilitate heat transfer to the outside air.

Figure 36A:
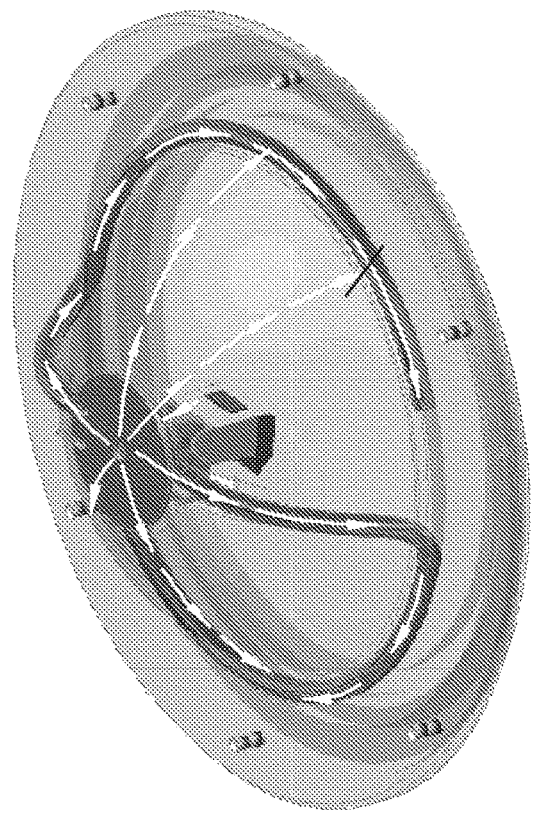
FIG. 36A is a perspective view of a first flow pattern for a heat pipe.
Figure 36B:
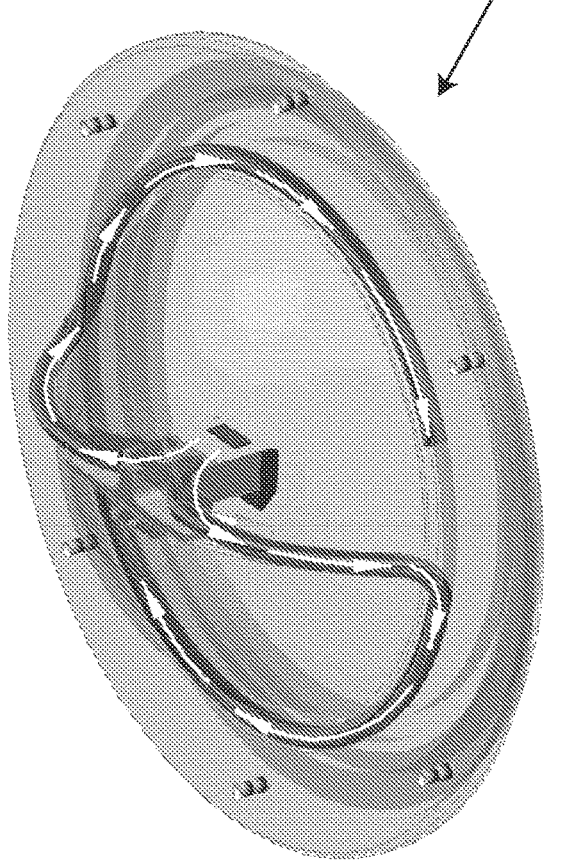
FIG. 36B is a perspective view of a second flow pattern for a heat pipe.

FIG. 36A is a perspective view of a first flow pattern for a heat pipe which shows heat pipes 33*a* and 33*b* which allow for a transfer of heat from a back circuit board to a front of the light. FIG. 36B also shows this feature.

Figure 37A:
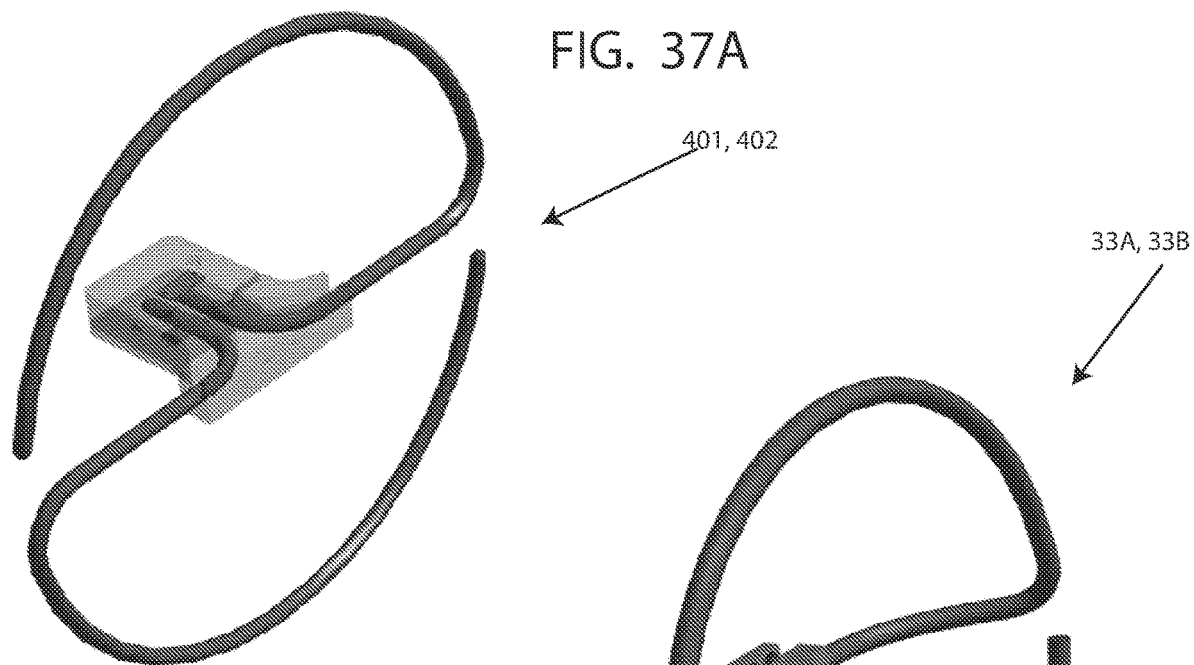
FIG. 37A is a perspective view of a first set of heat pipes.
Figure 37B:
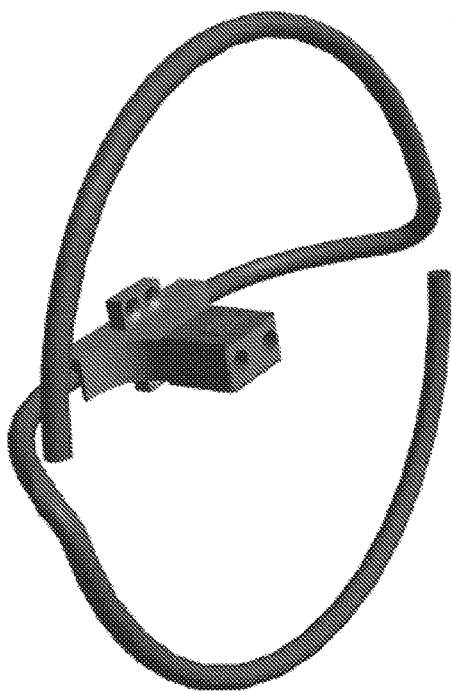
FIG. 37B is a perspective view of a second set of heat pipes.
Figure 37C:
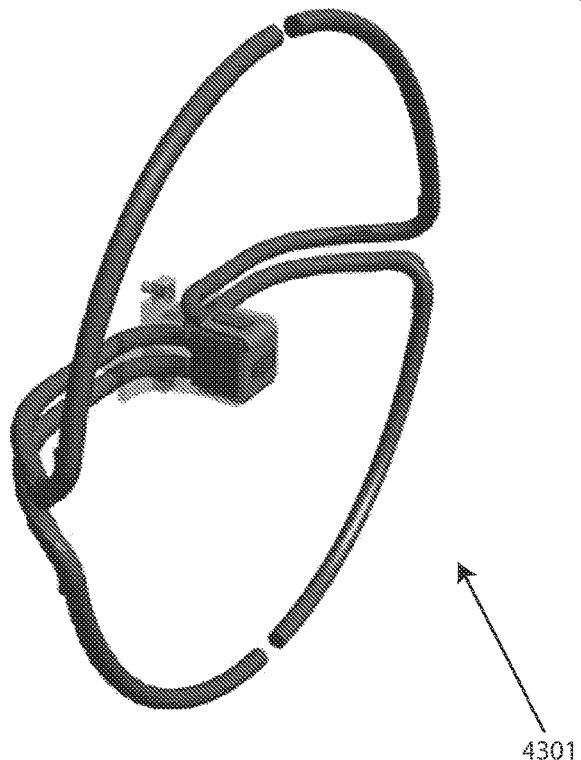
FIG. 37C is a perspective view of a third set of heat pipes.

FIG. 37A is a perspective view of a first set of heat pipes 401, and 402 while FIG. 37B is a perspective view of a second set of heat pipes 33a, 33b while FIG. 37C is a perspective view of a third set of heat pipes 4301.

Figure 38A:
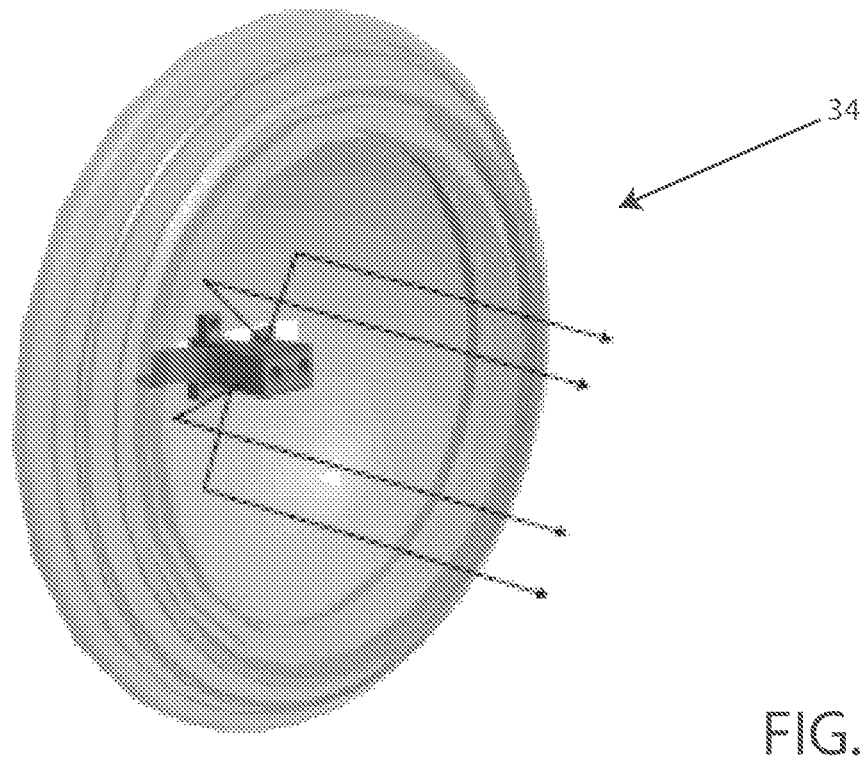
FIG. 38A is a front perspective view of the reflective pattern of a reflector.
Figure 38B:
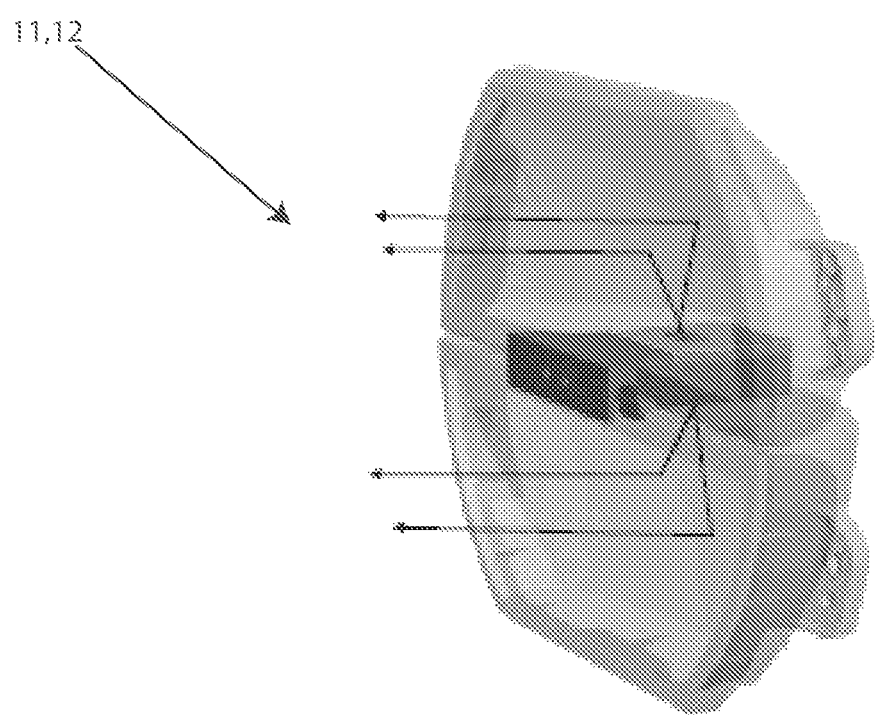
FIG. 38B is a front perspective view of a reflective pattern of another reflector.
Figure 39A:
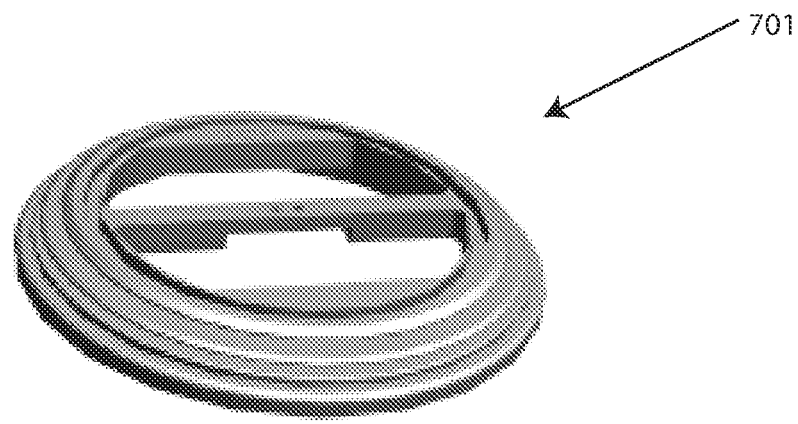
FIG. 39A is a top perspective view of a front heat sink.
Figure 39B:
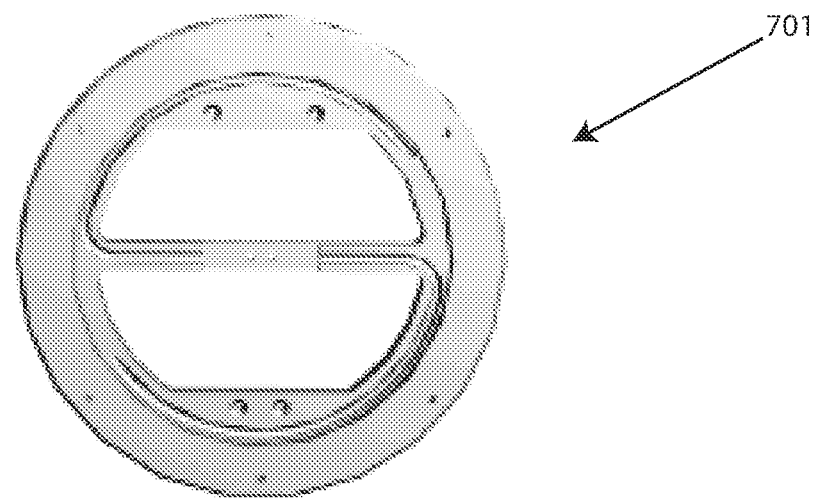
FIG. 39B is a front view a of a front heat sink.

FIG. 38A is a front perspective view of the reflective pattern of a reflector 34, while FIG. 38B is a front perspective view of a reflection pattern of another set of reflectors 11, 12. FIGS. 39A and 39B is a view of a heat sink 701 which can be used with reflectors 11 and 12 of FIG. 38A.

FIGS. 40A and 40B a front perspective view of a back heat sink and a side view of the heat sink 40.

Figure 41A:
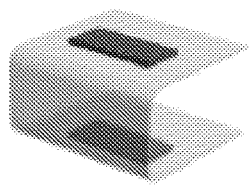
FIG. 41A is a perspective view of a LED mount.
Figure 41B:
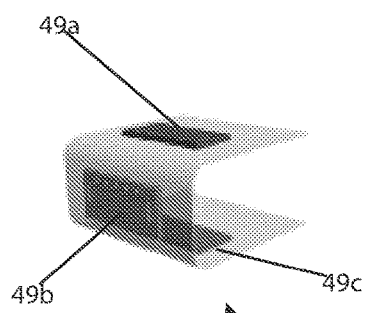
FIG. 41B is a perspective view of another LED mount.
Figure 41C:
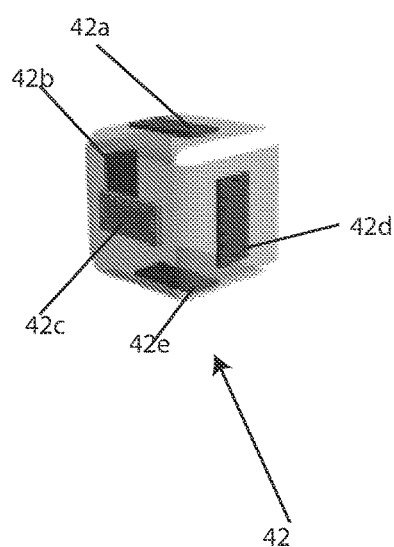
FIG. 41C is a perspective view of another LED mount.

FIG. 41A is a perspective view of a LED mount having LED's 606, and 811; FIG. 41B is a perspective view of another LED mount 49 which has LED's 49a, 49b and 49c. FIG. 41C is a view of an LED array including LED's 42a, 42b, 42c, 42d and 42e making this LED array 42 a 5 LED array system.

Figure 42A:
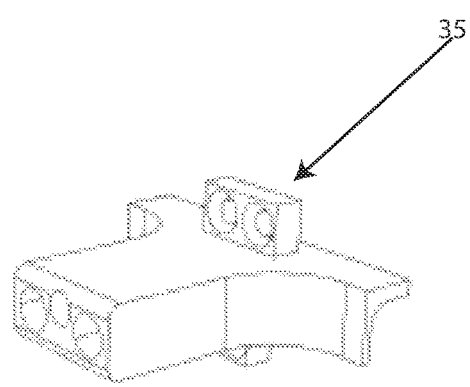
FIG. 42A is a front-side perspective view of a heat sink.
Figure 42B:
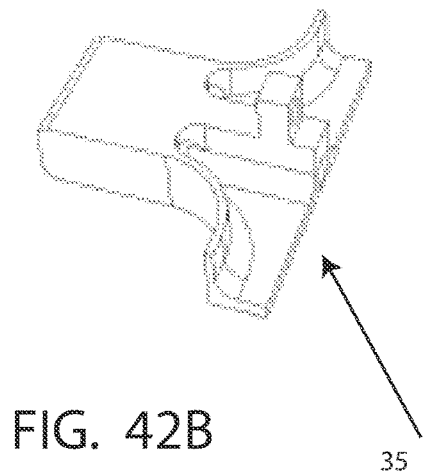
FIG. 42B is a back-side perspective view of a heat sink.
Figure 42C:
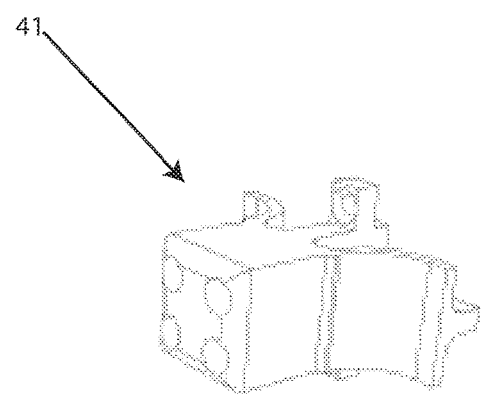
FIG. 42C is a front-side perspective view of a second heat sink.
Figure 42D:
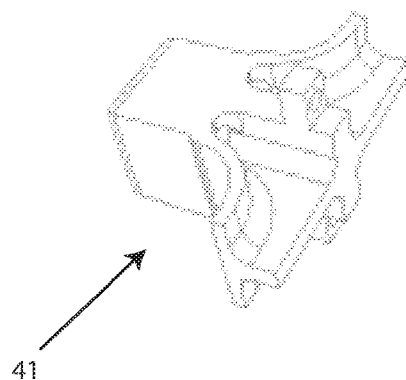
FIG. 42D is a back-side perspective view of the second heat sink.

FIG. 42A is a front-side perspective view of a heat sink 35, while FIG. 42B is a back-side perspective view of this heat sink 35. An alternative heat sink can be used, wherein heat sink 41 is shown in FIG. 42C is a front-side perspective view while FIG. 42D is a back-side perspective view of the second heat sink 41.

Figure 43A:
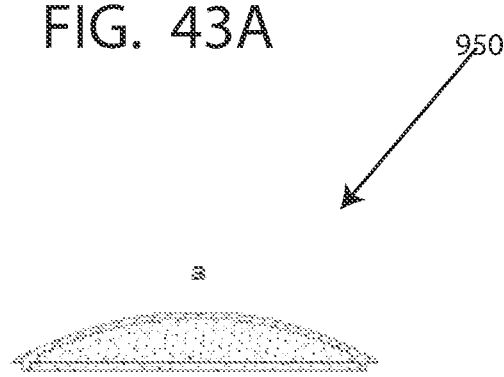
FIG. 43A is a side view of a lens.
Figure 43C:
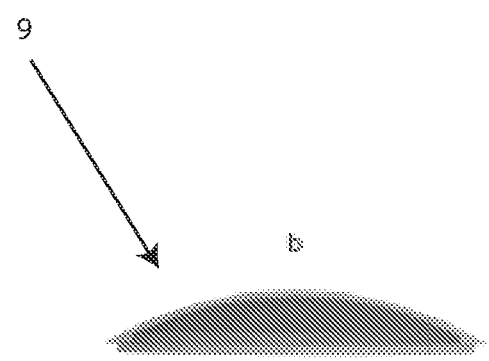
FIG. 43C is a side view of a lens.
Figure 43B:
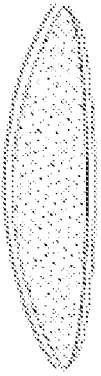
FIG. 43B is another side view of the lens of FIG. 43A.
Figure 43D:
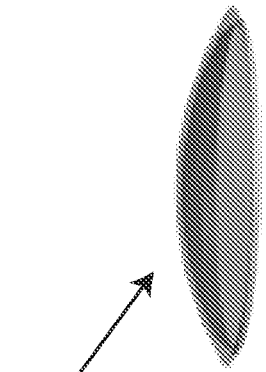
FIG. 43D is another side view of the lens.
Figure 44A:
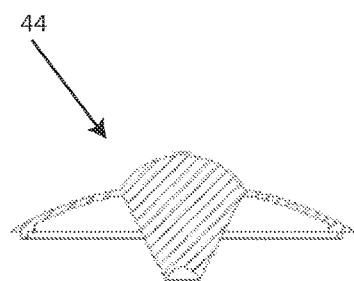
FIG. 44A is a side cross-sectional view of a lens.
Figure 44B:
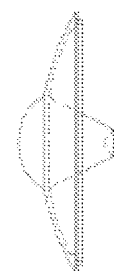
FIG. 44B is a side view of the lens of FIG. 44B.
Figure 44C:
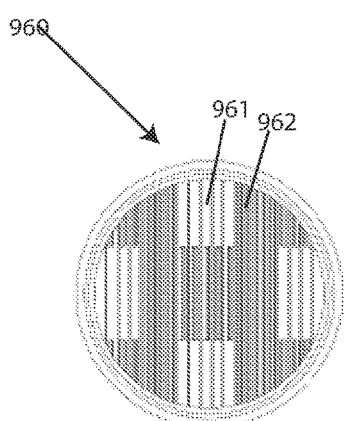
FIG. 44C is a front view of another lens.
Figure 44D:
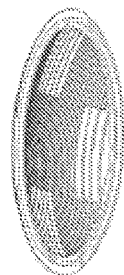
FIG. 44D is a side view of the lens.
Figure 44E:
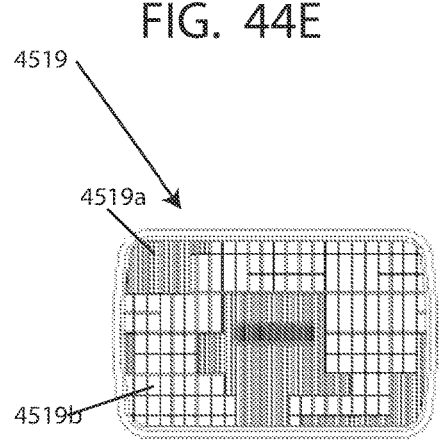
FIG. 44E is a front view of another lens.
Figure 44F:
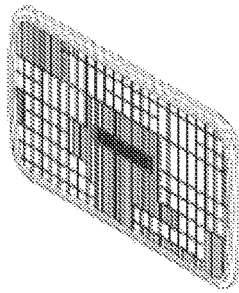
FIG. 44F is a side perspective view of another lens.
Figure 45:
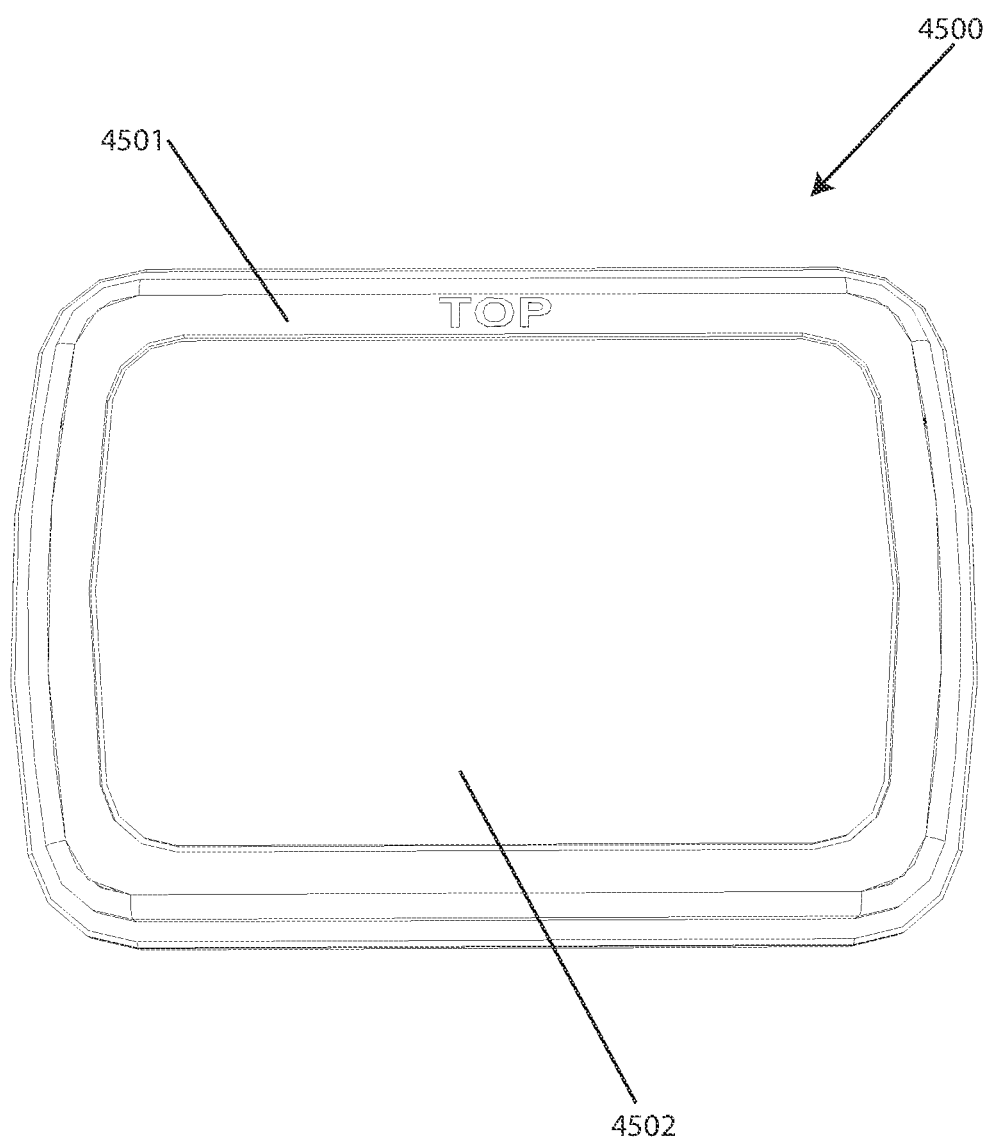
FIG. 45 is a front view of another headlight.
Figure 46:
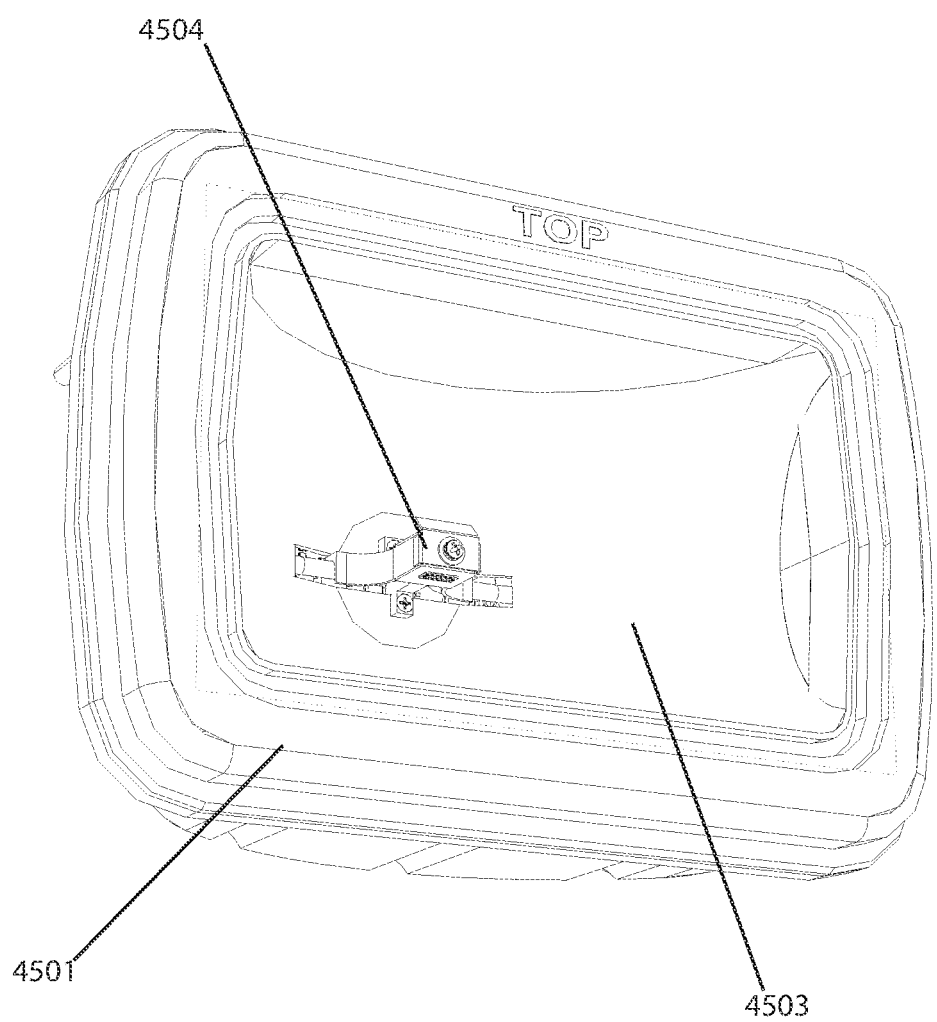
FIG. 46 is a perspective view of the headlight of FIG. 45.

FIG. 43A is a side view of a lens 950 while; FIG. 43B is another side view of the lens 950 of FIG. 43A. This lens can have nanoparticles interspersed within this lens. This lens can be used in place of any of the other above shown lenses with any of the above or below embodiments. FIG. 43C is a side view of a lens 9, while FIG. 43D is another side view of the lens 9 which can be used in place of any of the above lenses as well. FIG. 44A is a side cross-sectional view of a lens; FIG. 44B is a side view of the lens 44 of FIG. 44B; FIG. 44C is a front view of another lens 960 which has different lenses 961, and 962 which are different angled lenses; FIG. 44D is a side view of the lens 960. FIG. 44E is a front view of another lens 4519 which includes different angled lenses 4519a and 4519b. FIG. 44F is a side perspective view of lens 4519;

FIG. 45 is a front view of another headlight 4500 which has a front heat sink 4501 and a lens 4502. FIG. 46 is a perspective view of the headlight of FIG. 45, which allows for a front heat sink 4501 and a reflector 4503, and a heat sink 4504 which has LEDs.

Figure 47:
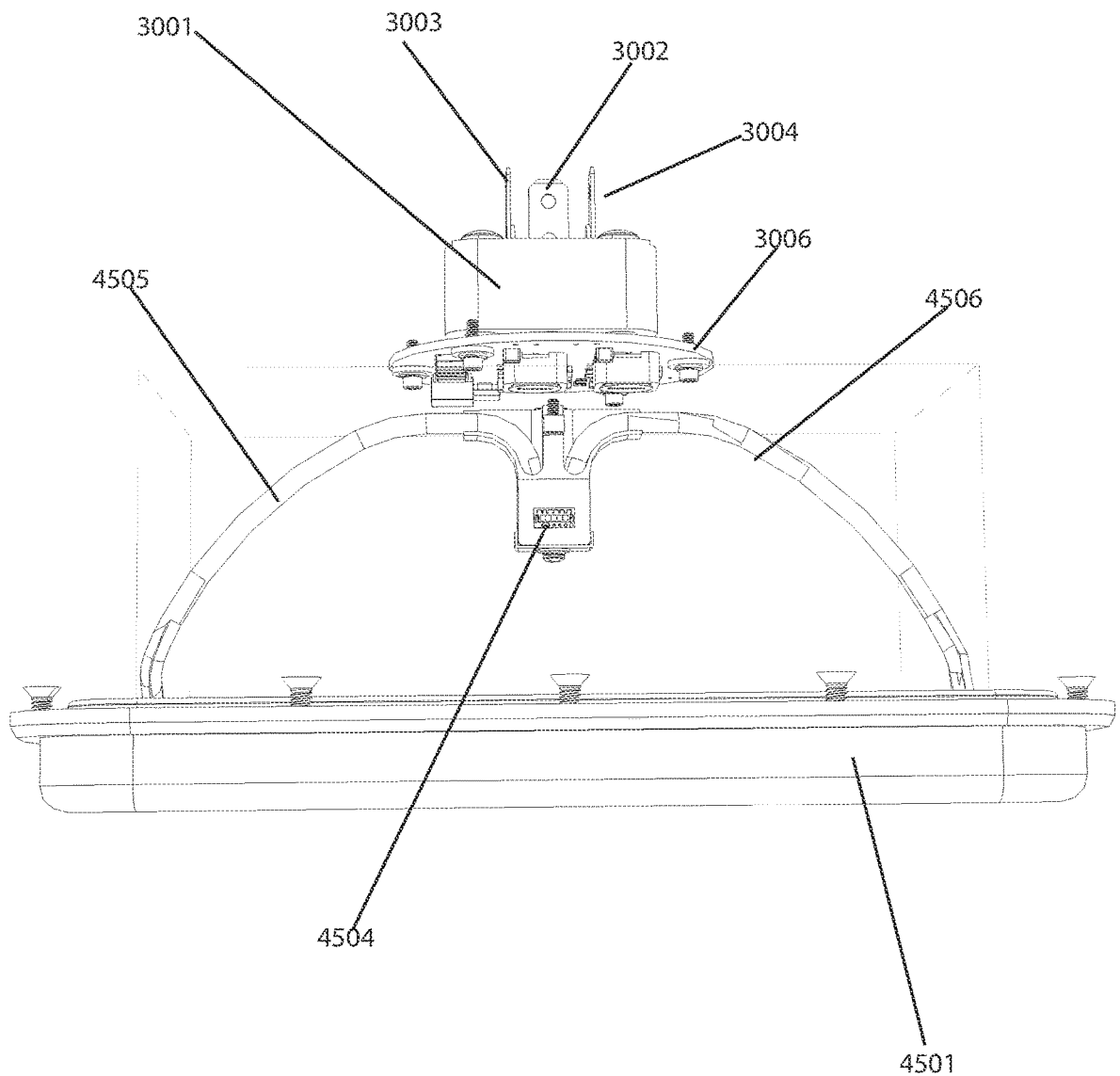
FIG. 47 is a side view of the headlight of FIG. 45.
Figure 48:
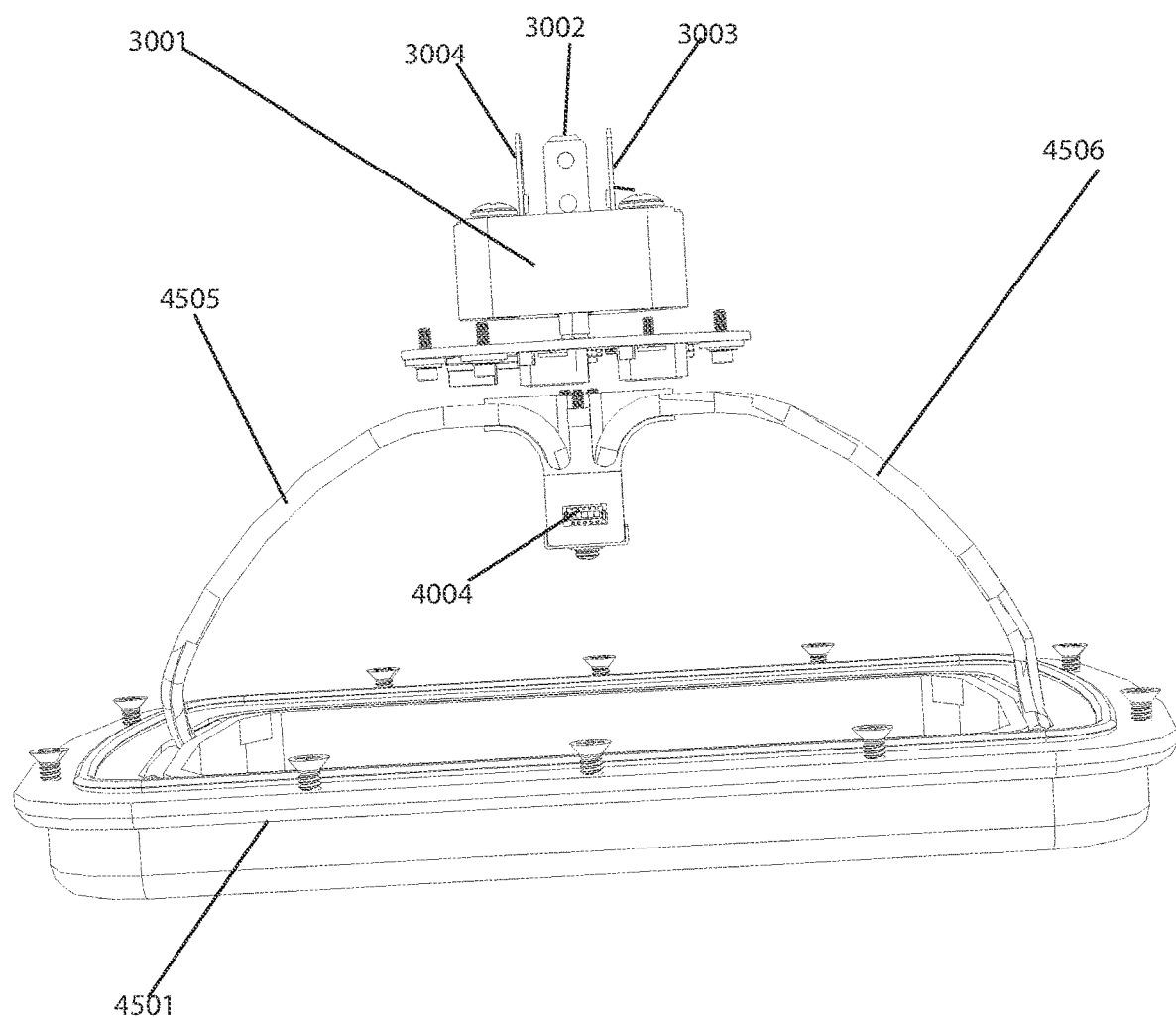
FIG. 48 is a side view of the headlight of FIG. 45.

FIG. 47 is a side view of the headlight of FIG. 45. While FIG. 48 is a side perspective view of this headlight 4500. These views show front heat sink 4501 which has heat pipes coupled to it 4505 and 4506 which are also coupled to heat sink 4504 as well. These heat pipes 4505 and 4506 are therefore configured to connect heat sink 4501 and heat sink 4504. Contact block 3001 includes three different contacts 3002, 3003, and 3004 as well which are configured to feed power to a circuit board 3006.

Figure 49A:
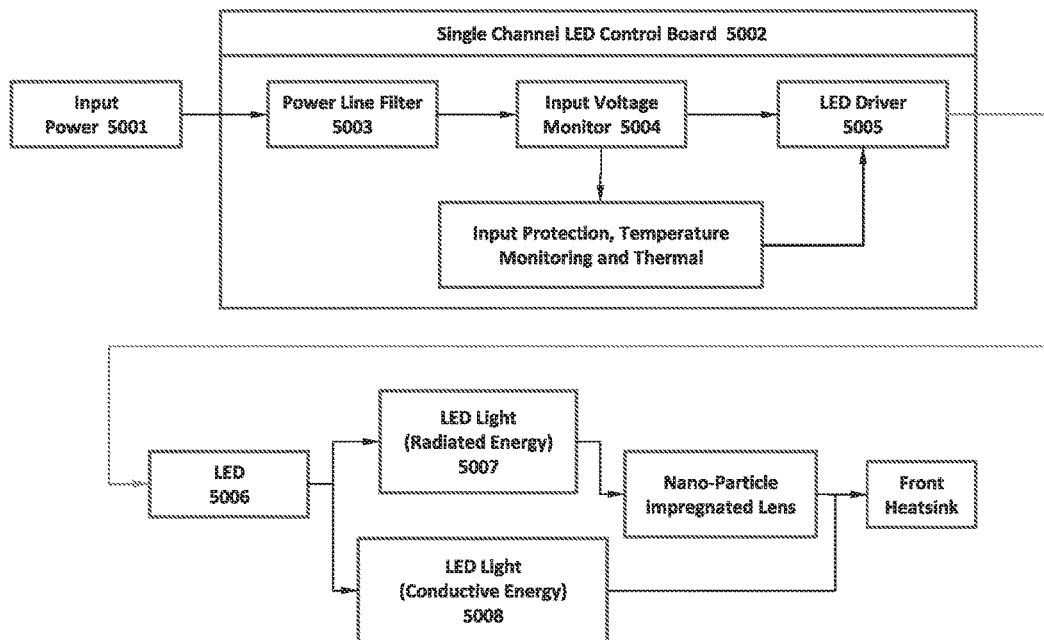
FIG. 49A is a block diagram of an electrical system for a headlight.

FIG. 49A is a block diagram of an electrical system for a 5000 headlight which include the light's energy flow. This block diagram is configured to take power in, turn on the light, and enable it to perform its primary function, and all subsequent sub functions. For example, this electrical system includes an input power 5001 in the form of contacts in a contact block such as block 3001 comprising contacts 3002, 3003, and 3004 or contact or pole block or pole mount 3, comprising contacts 52a and 52b. This input power 5001, provides power to a motherboard 5002 such as motherboard or processor 101, or 3006. On this motherboard 5002 is a line filter 5003, an input monitor 5004, a thermal monitoring and thermal protection circuit and an LED driver 5005. The LED driver takes the power from the input power, regulates it and then sends it on to the LED such as LED 5006. This LED can be any one of the LED's shown above such as LEDS 49a, 49b, 49c, or LED's 42a, 42b, 42c, 42d or 42e, or LED's 4206, 4207, 4208, 4209, or 4210 or LED's 602, 614, 602a, or 614a. These LEDs such as LED 5006 then generates light in the form of radiated energy 5007, and heat in the form of conducted energy 5008 to an associated tombstone heat sink FIGS. 42a, 42B, 42C, and 42D. These heat sinks 42a thru 42D then transfer heat via the associated heat pipes such as through heat pipes 401, 402, 33a, 33b, or 4301 (See FIG. 37A, 37B, or 37C). The heat pipes then transfer the heat to the associated ring heat sink such as ring c heatsinks 701 or 40 shown in FIGS. 39A, 39B, 40A and 40B. The radiated light is then sent to the lens 5009 such as any one of lenses 44, 960, or 4519 such as shown in FIG. 44A, 44B, 44C, 44D, 44E, or 44F.

Figure 49B:
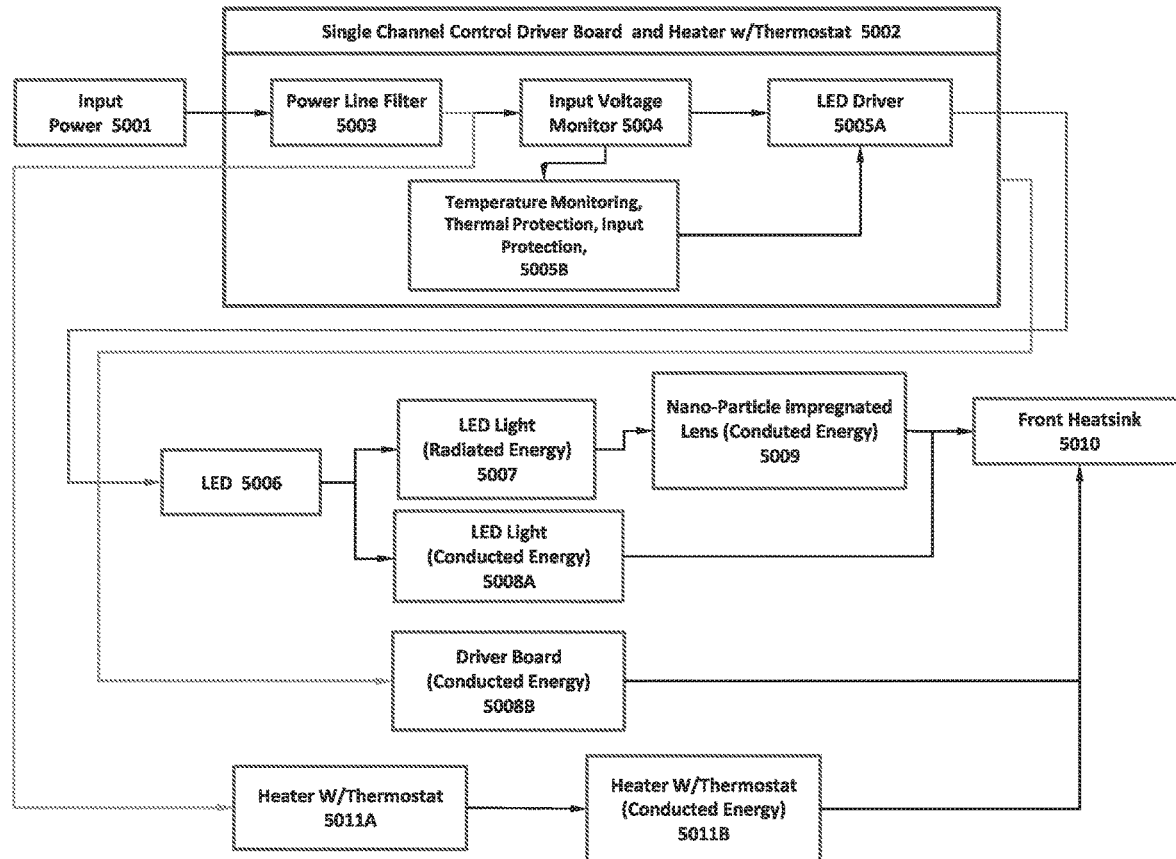
FIG. 49B is a block diagram of an electrical system for a headlight.

FIG. 49B is a block diagram of an electrical system for a headlight which includes all of the components listed in FIG. 49A, but it also includes a heater 5011A used as a heat generator 5011B such as a resistor and/or coil which takes power from input power 5001 and translates this power into heat. Additionally, driver board 5002, transfers its heat losses 5008B via heatpipes FIGS. 37A, 37B, and FIG. 37C.

Figure 50:
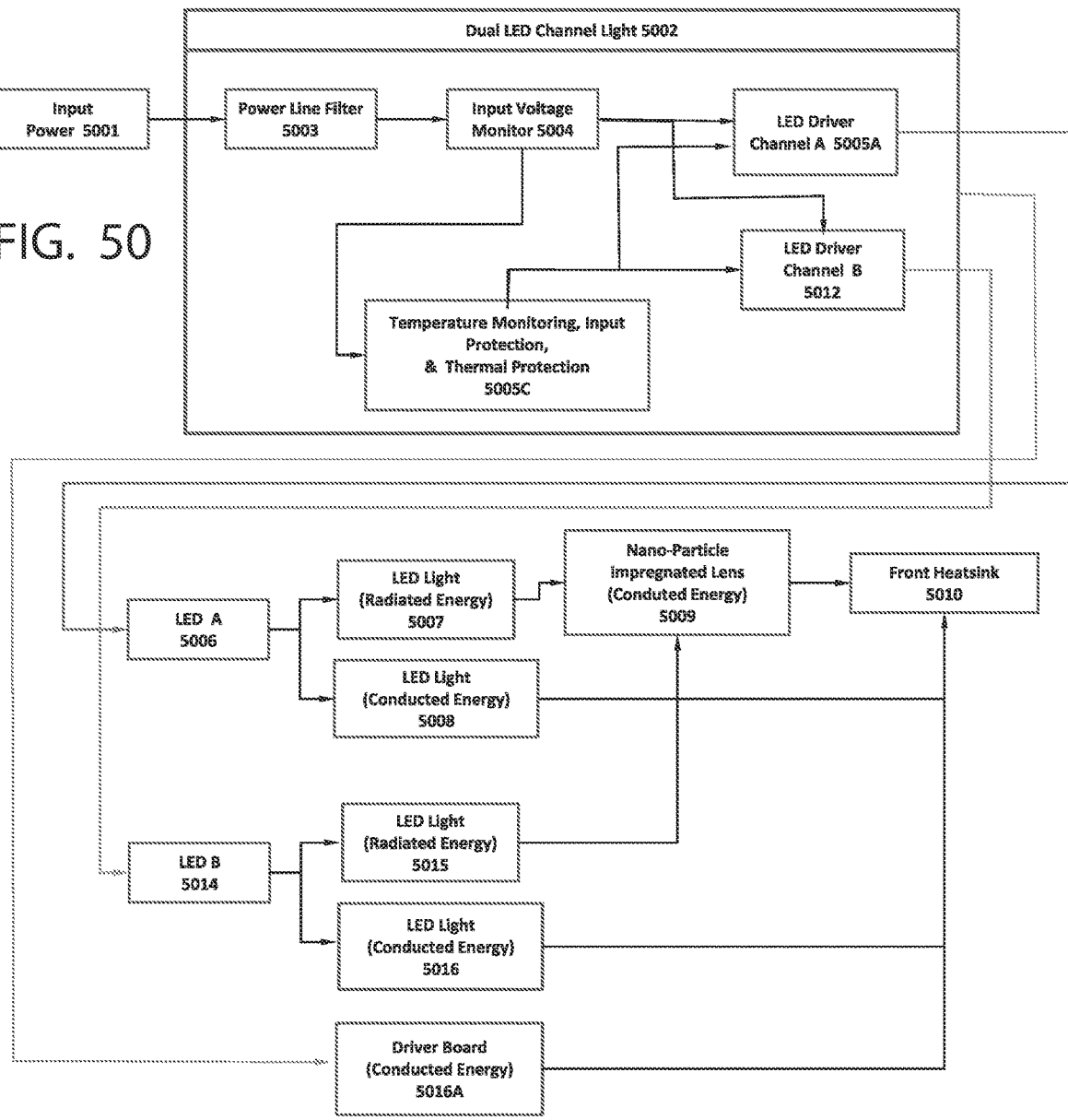
FIG. 50 is another block diagram for the electrical system for the headlight.
Figure 51:
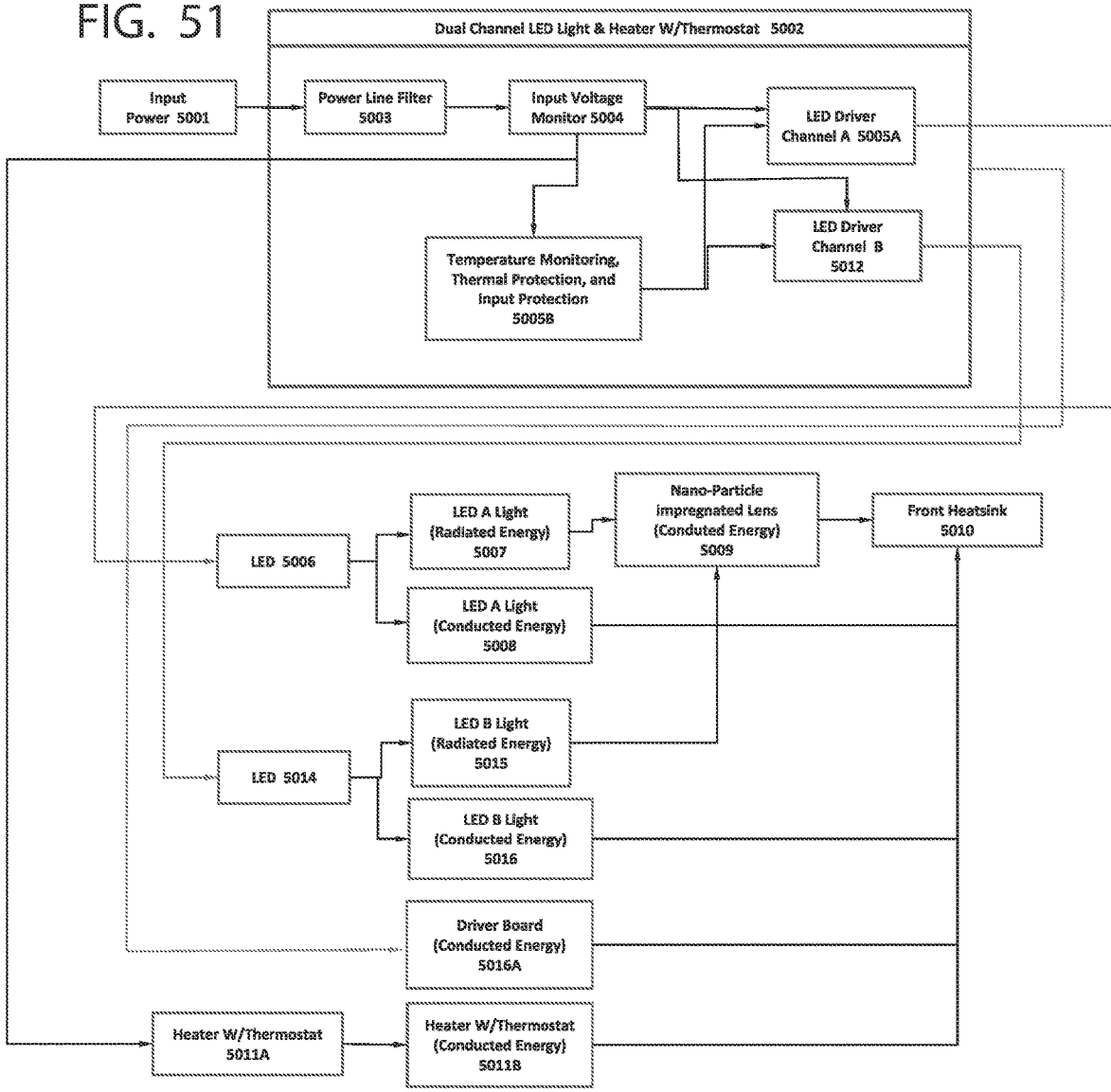
FIG. 51 is another block diagram for the electrical system for the headlight.

FIG. 50 is another block diagram for the electrical system for the headlight which includes the light's energy flow. This block includes all of the elements shown in FIG. 49A but it also includes an additional LED driver 5012 which is configured to drive a separate LED such as LED 5014 disposed on motherboard 5002, which as described above transfers light in the form of light radiated energy 5015 and heat in the form of heat conducted energy 5016 to the remaining components such as the lens 5009 and the associated ring heatsink 5010 in the manner described above. LED 5014 is similar to LED 5006 in which it represents the above listed LED's such as LEDS 49a, 49b, 49c, or LED's 42a, 42b, 42c, 42d or 42e, or LED's 4206, 4207, 4208, 4209, or 4210 or LED's 602, 614, 602a, or 614a. Additionally, driver board 5002, transfers its heat losses 5008B via heatpipes FIGS. 37A, 37B, and FIG. 37C. FIG. 51 is another block diagram for the electrical system for the headlight which includes the components shown in both FIG. 50 as well as the additional components shown in FIG. 49B which include an additional heater 5011 with thermostat 5011A which transfers conducted energy 5011B.

Figure 52:
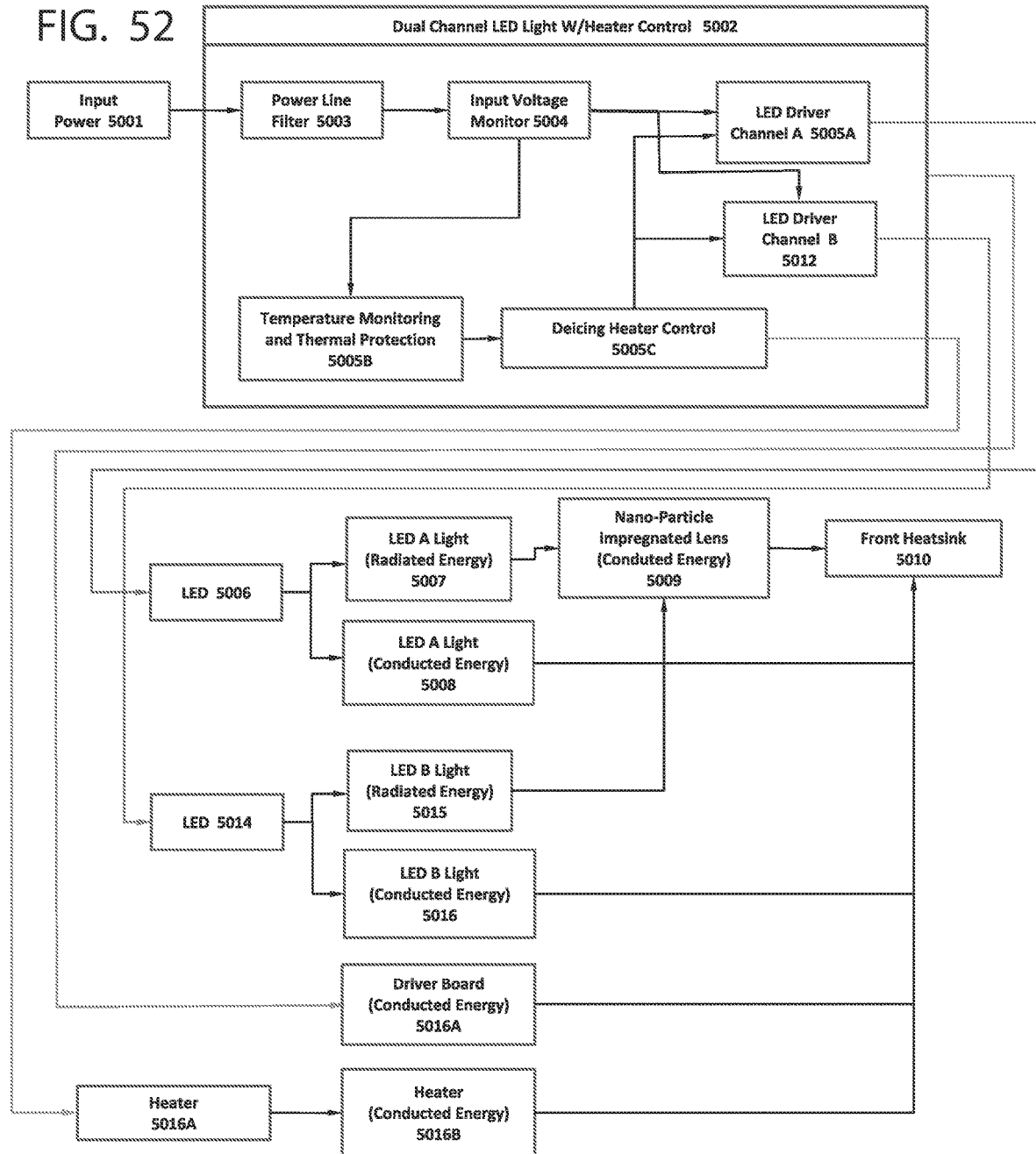
FIG. 52 is another block diagram for the electrical system for the headlight.
Figure 53:
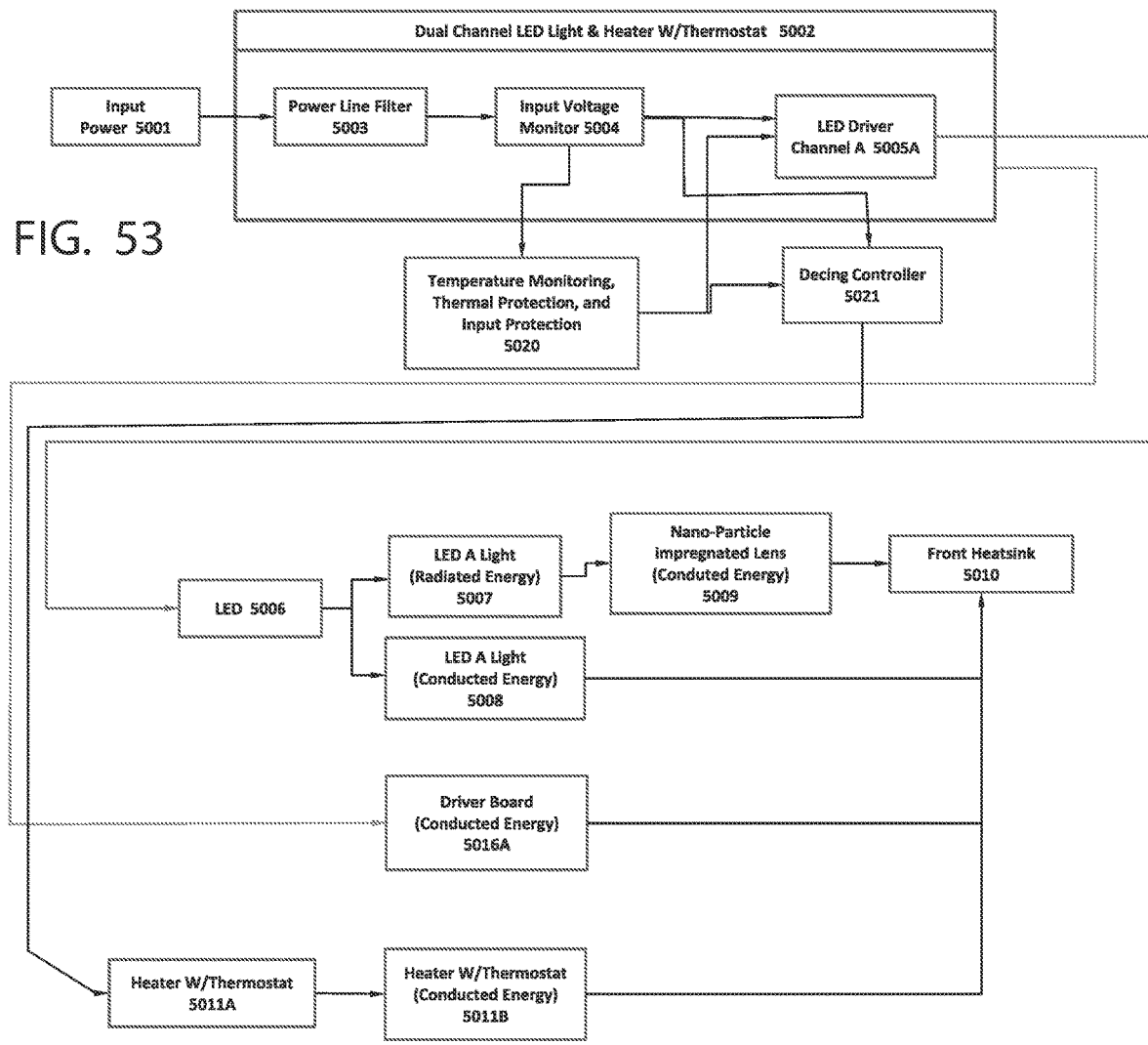

FIG. 52 is another block diagram for the electrical system for the headlight, which also includes all of the components listed above in FIG. 51, but it also includes a separate temperature sensor and a de-icing system 5019 which can be used to activate the power output from input power 5001, and pass this heater 5011A and generates conducted heat energy 5016B FIG. 53 is another block diagram for the electrical system for the headlight which includes the heat flow diagram and the components listed in FIG. 52 however, in this design, the temperature sensor is not disposed on the motherboard but off of the motherboard 5002 such that this temperature sensor is a temperature sensor 5020 disposed on a different region such as on a heat sink or housing of the headlight. The de-icing controller 5021 can also be disposed separate from the motherboard 5002.

Figure 54:
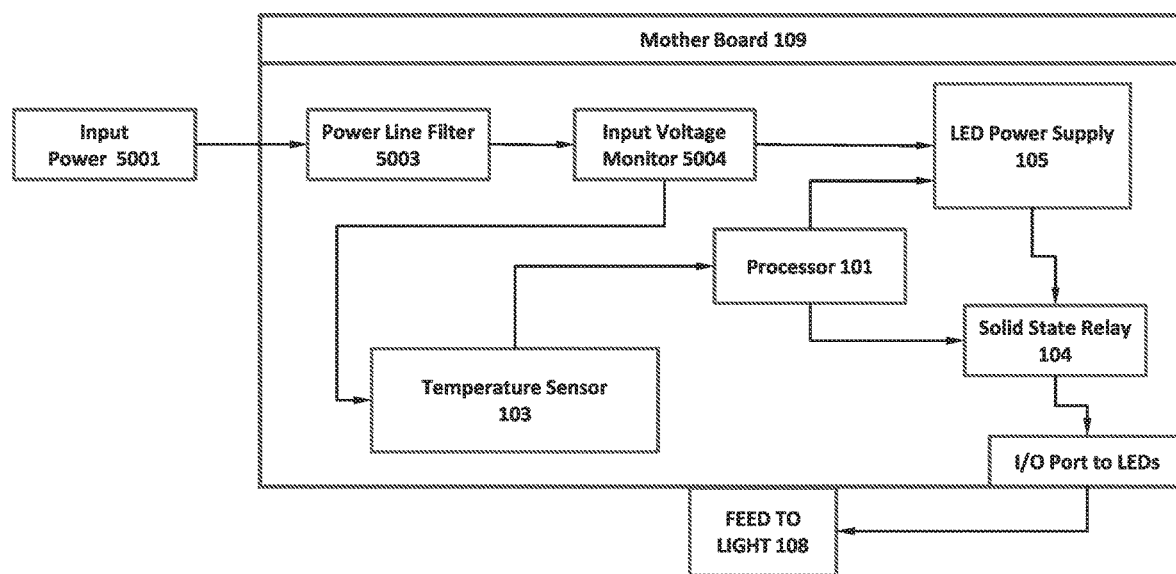

Another embodiment can include FIG. 54 shows a schematic block diagram of the circuit board 1. The entire light, either light 10 or 10a is configured to be controlled by circuit board 1. Circuit board 1 includes at least one processor 101, at least one temperature sensor 103, at least one solid state relay 104, configured to activate the light or LED through a feed to the light 108 . . . There is at least one power supply 105 which is in contact with contacts 502a and 502b. There is also an I/O port 107 which is configured to receive instructions from a control panel or the solid-state relay wherein a user then switches on the light or sends instructions to the motherboard 109. Motherboard 109 is configured to allow the above components to communicate with each other and to be powered by the power supply 105.

Figure 55:
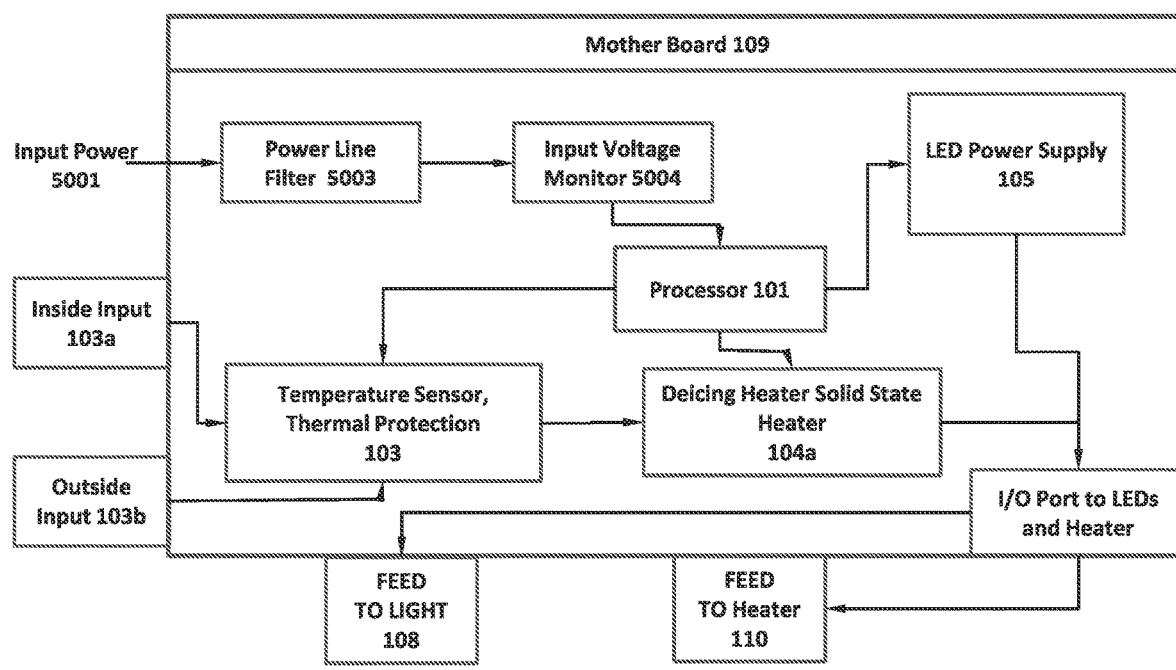

FIG. 55 shows a feed to the heater 110 wherein this feed is a separate feed depending on the transistor or switch 104a. solid state relay 104a is configured different from transistor or switch 104 in that switch 104 it selectively turns on or off as instructed by processor 101. However, switch 104a selectively turns on or off either or both the feed to the light 108 as well as the feed to heater 110. Thus, processor 101 can selectively activate LED lights such as lights on boards 4206, 4207, 4208, 4209 and 4210 or lights 602, 614 (See FIG. 0.24) or lights 602, 614 (See FIGS. 13A and 13B.) This embodiment also includes an inside input 103a and an outside input or sensors 103b which feed into the temperature sensor 103, so that the temperature sensor 103 can determine both the temperature inside of the light body (formed by Lens 9 and body 5 or 5a) or outside of the light body.

Figure 56:
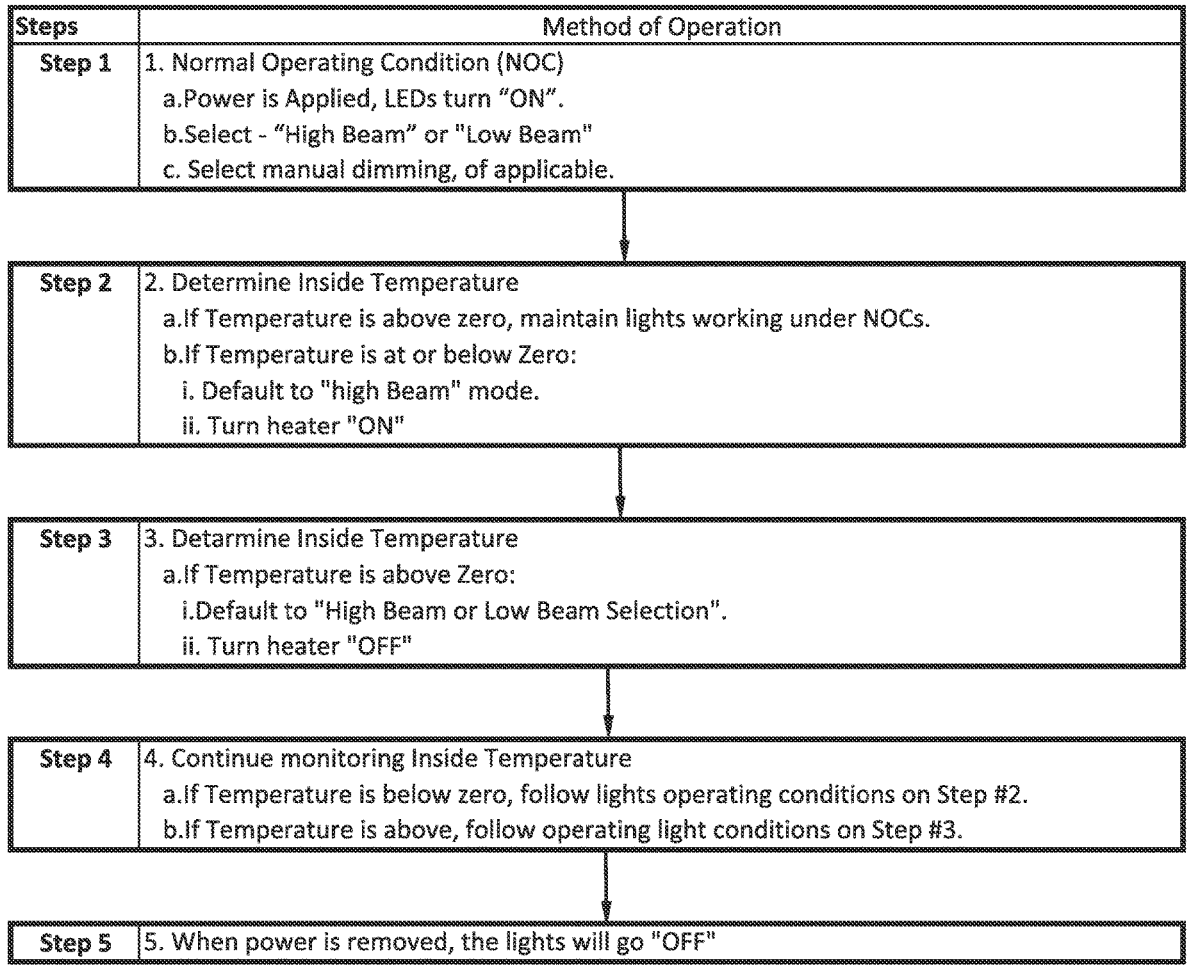

FIG. 56 shows a flow chart for method of operation of the headlight and one process for controlling the heater during extreme weather conditions. For example, in extreme cold weather environments, a light can have moisture build up even frost and/or snow or ice buildup on the outside of the body of the light. Therefore, so that the light can be free of water obstructions and be clear and visible, the system such as processor 101 can be configured to in Step 1, when input power 5001 is fed into the light, the LEDs will turn "ON", the vehicle operator will select a high beam or low beam setting. The vehicle operator will also be able to dimming the light as necessary. Next Step 2, the temperature sensor 103 will send a signal to the processor 101 indicating the temperature inside and outside of the light. If the temperature is above zero degrees, the processor 101 will maintain the LEDs working normally. If the temperature sensor indicates that temperature is below zero, the processor 101 will turn on the heater 5016A. Step 3, when the temperature in the ring heatsink 701 is above zero degrees, the processor 101 turn "OFF" heater 5016A.

FIG. 57 discloses a new embodiment which shows a base 5140 at one end and a lens 5111 at another end. Disposed between the base 5140 and lens 5111 there is a heat sink tombstone 5101 disposed under the lens which is configured to house LED lights. This heat sink tombstone 5101 is disposed in a reflective bowl. The bowl 5117 is disposed inside of base 5140. Disposed around the reflective bowl is a heat sink ring 5108. A pin 5116 and a screw 5118 are configured to set the tombstone heat sink 5101 in place. There is also a round heater 5106 which is configured to set within the ring heatsink 5108. This round heater 5106 is in contact the ring heatsink and when power is applied generates heat, therefore, increasing the temperature heatsink ring 5108. Heat pipes 5107 are configured to transfer heat from the LED lights in the tombstone to the heat sink ring 5108. These heat pipes 5107 are configured to transfer heat via a heated fluid from one end to another end along the pipe as disclosed above with the other disclosed heat pipes. Disposed adjacent to these heat pipes 5107 is a gasket 5113.

A plate 5110 is also configured to transfer heat away from the motherboard 5102 and through heat transfer gap pad film 5114 them thru the heatpipes 5107 and finally to ring heatsink 5108. In addition coupled to the tombstone is a motherboard 5102 which has electronic components configured to control the lighting of the LED lights, as well as for the selective energizing of heater ring 5106. The motherboard is secured to the base 5110 via screw 5103, washer 5132 and nut 5130. In addition, there is also an insulating washer 5115 and an angled contact 5121 which are configured to secure the power connection with prongs 5126 and insulating plate 5104 to the base 5140. At least one screw 5109 is also configured to secure the base 5140 with the heat ring 5108 as well. In addition a plurality of screws and washers are also configured to secure the base to the heat sink ring 5108. There is a bolt 5119, a spacer 5125, a washer 5131, another lock washer 5133 as well as bolt 5122 which is configured to insert through spacer 5125, washer 5131, and washer 5133 used for the purposes setting the light's proper orientation. There is also a back insulation plate 5104 which is configured to be secured to base 5140. Back insulation plate 5104 has contact prongs 5126 and is secured to base 5140 via at least one rivet 5112.

Figure 58A:
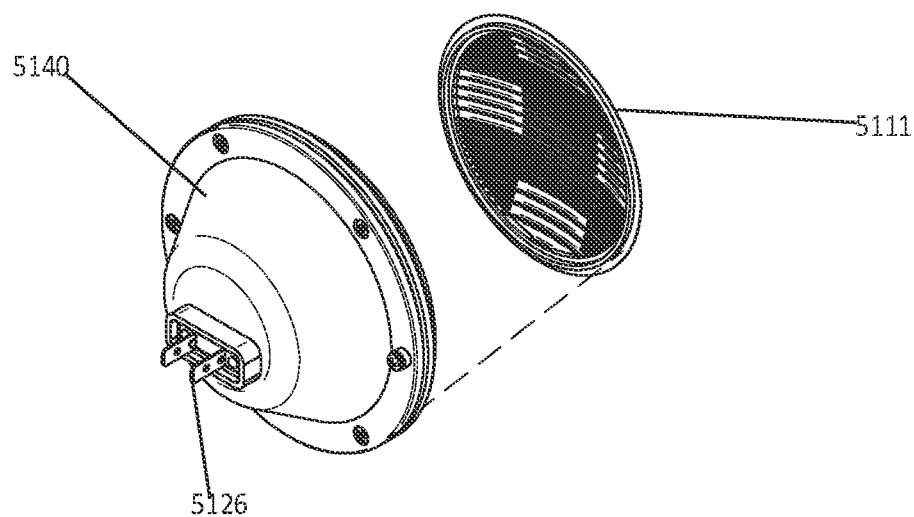

FIG. 58A is a side exploded view of a head lamp 5100 which includes a base 5140 having prongs 5126 and a lens 5111. Infused in lens 5111 are metallic nanoparticles which are configured to capture radiated heat from the LEDs, heating the lens and then transfer such heat to the sink ring 5108 to the glass of the lens 5111. Because there are nanoparticles that are heat conducting in the lens, heat is transferred to the front of the lens and then to the heat sink ring.

Figure 58B:
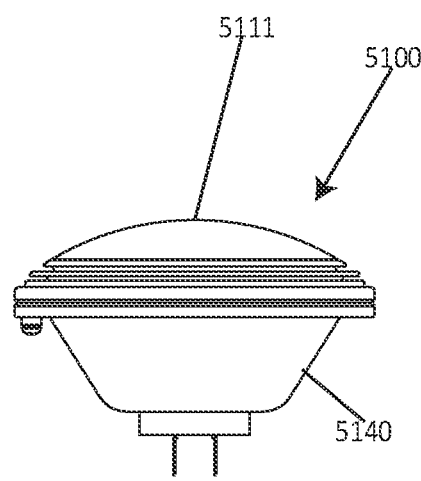
Figure 58C:
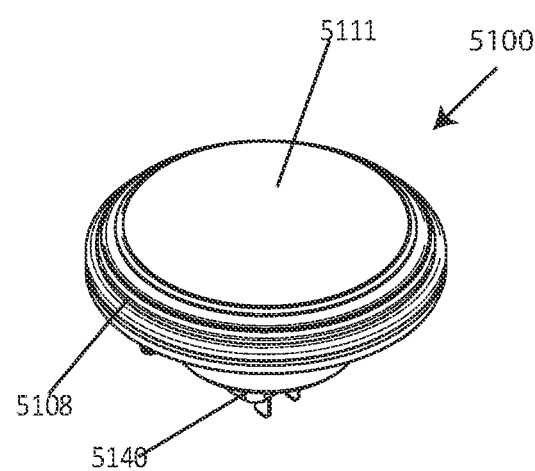

In addition FIG. 58B shows a side view of a head light 5100 which includes a lens 5111 and a base 5140. FIG. 58C shows a perspective view of a headlight 5100 with a lens 5111 and a base 5140, which is coupled to a heat sink ring 5108.

Figure 59:
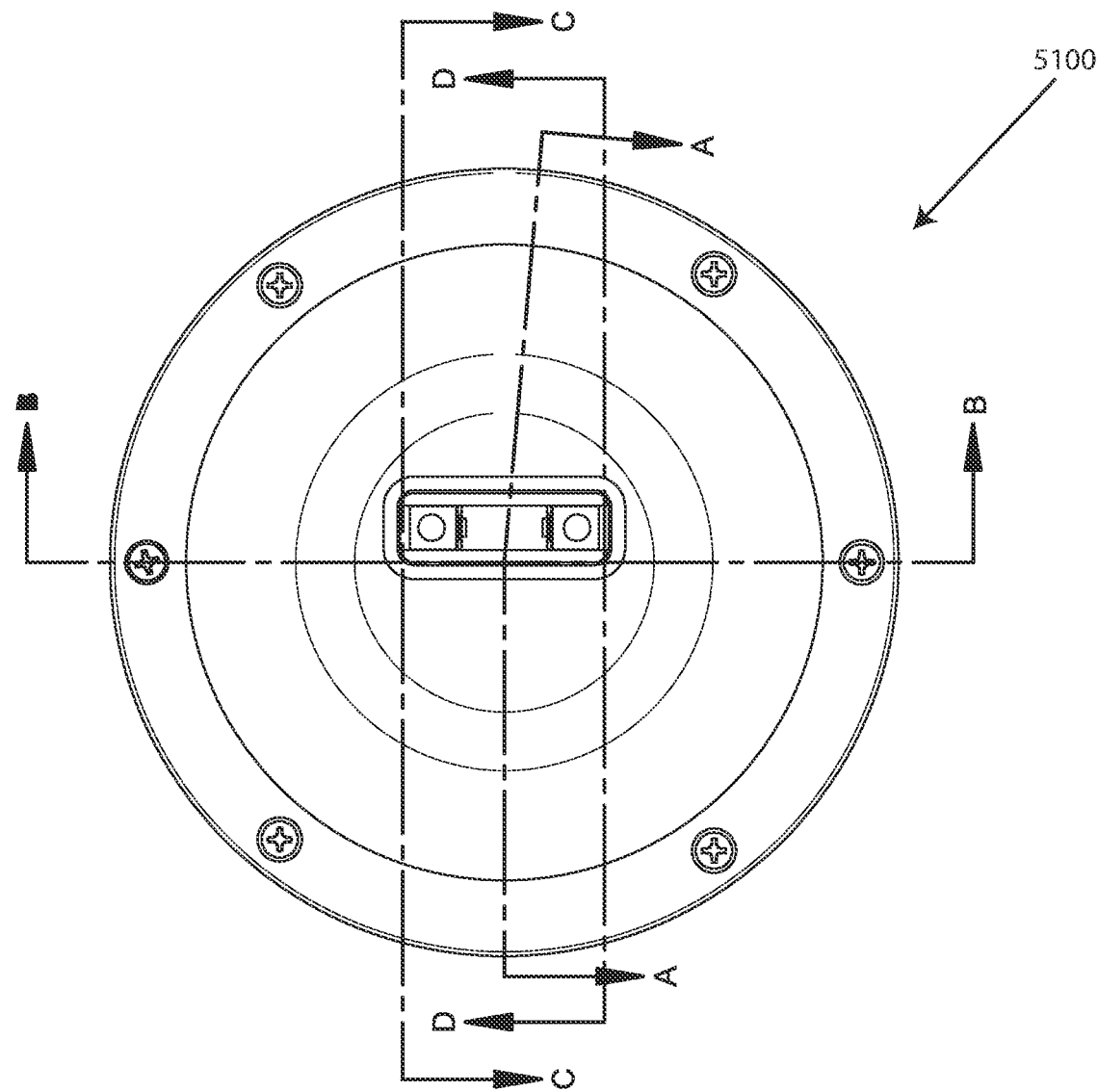

FIG. 59 shows a bottom view of the embodiment 5100 which shows cross sectional lines A-A, B-B, C-C, D-D.

Figure 60A:
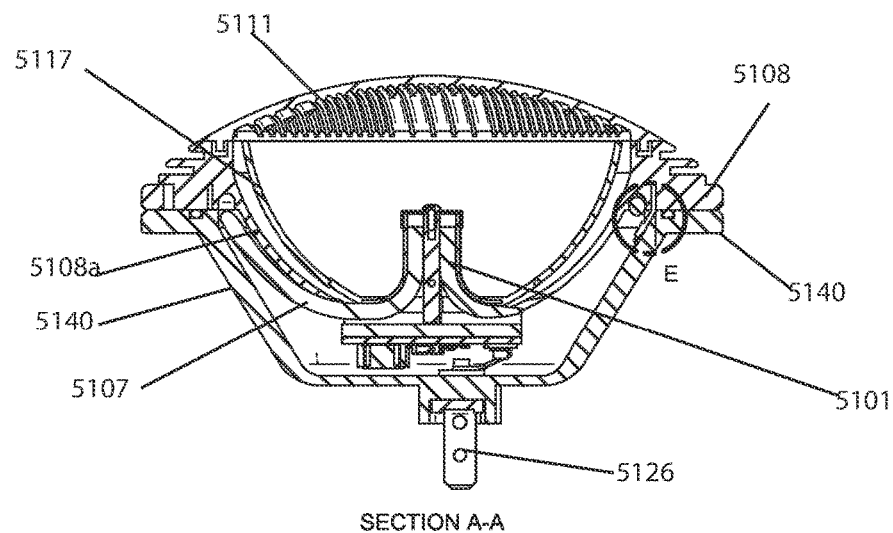

FIG. 60A shows a cross-sectional view through section line A-A which shows lens 5111 and which is coupled to the heat sink ring 5108. As shown the reflective bowl 5117 is set inside of the base 5140 and is coupled to the heat sink ring 5108. Disposed in the middle and surrounded by the reflective bowl 5117 is the tombstone 5101 which is configured to hold the LED lights. There is also shown a heat pipe 5107 which extends down from one end connected to heat sink ring 5108 and at the other end to the tombstone 5101. The heat sink ring 5108 includes a bowl portion 5108a as well wherein the reflective bowl 5117 sits therein. There is also shown contact prongs 5126 which extend down from the base 5140.

Figure 60B:
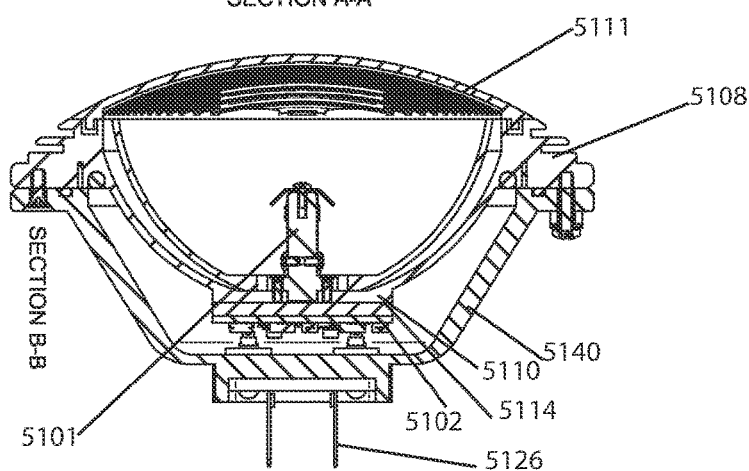

FIG. 60B shows a side cross-sectional view along the lines B-B which shows lens 5111 set on heat sink ring 5108 which sits on base 5140. There is tombstone 5101 which sits on plates 5110, 5114 and motherboard 5102. In addition coupled to base 5140 are contact prongs 5126 which allow the headlight to plug into power.

Figure 60C:
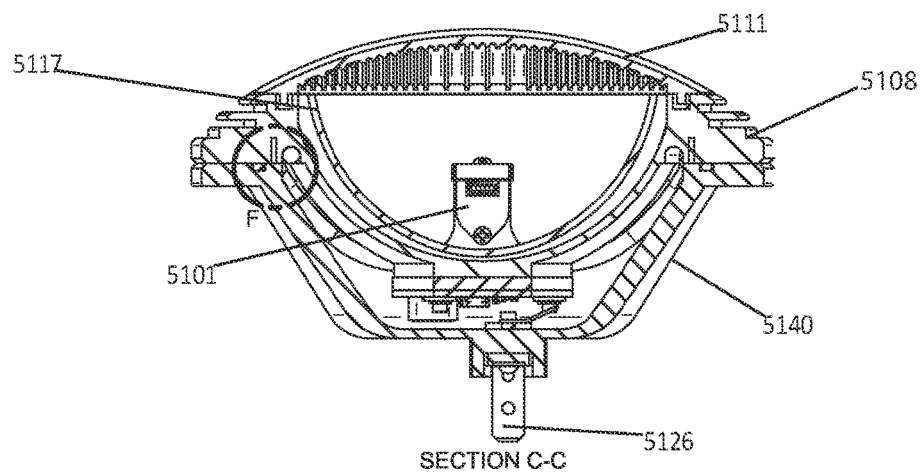

FIG. 60C shows a side view of headlight 5100. This side view shows lens 5111, reflector bowl 5117, tombstone 5101, contact prongs 5126, base 5140 and heat sink ring 5108, wherein heat sink ring 5108 is coupled to bowl 5140 and tombstone 5101 is coupled to heat sink bowl 5108, while reflector bowl 5117 is coupled to heat sink ring 5108.

FIG. 61A shows detail F which shows a close up view which is a connection between heat sink ring 5108 and base 5140. There is also shown heater ring 5106, heat pipe 5107, and gasket 5113 positioned between ring 5108 and bowl 5140. FIG. 61B shows Detail E which shows heat sink ring 5108 coupled to base 5140 with heat pipe 5107 gasket 5113 positioned between heat sink ring 5108 and base 5140.

FIG. 62 shows a side view of the light 5100 which includes base 5140 which is coupled to lens 5111 via heat sink ring 5108. There is shown tombstone 5101 which is coupled to base 5140 via ring heat sink 5108. There is also shown motherboard 5102 which is in communication with contact prongs 5126 such that prongs 5126 feed power to motherboard 5102 which then feeds power onto tombstone 5101. Thus, the heat generated by the LED light is absorbed by the tombstone, passed to the heat pipes 5107 and then on to the heat sink 5108 as well as on to the base 5140.

FIG. 63 shows an exploded view of the headlight which shows reflective bowl 5117 which sits inside of heat sink ring 5108. The heat sink ring 5108 sits in base 5140. Tombstone 5101 which is coupled to associated with heat pipe 5107. There is also shown the heater ring 5106 which is disposed adjacent to the gasket 5113. gasket 5113 is configured to sit in side of a slot 5141 in base 5140. Different plates including board mount plate 5110, intermediate electrical insulation plate 5114 and motherboard 5102 are stacked together but still separated by screws and washer 5103, 5132, and 5130. There is also a set of contact prongs 5126 coupled to base 5140 and configured to feed power to base motherboard 5102. There is a 5102.1 pointing to screw 5103 but not described.

FIG. 64 shows a cut away view of a portion of the light which includes heat ring 5108. Heat pipe 5107 is shown coupled to heat ring 5108. There is also shown motherboard 5102 which is coupled to the heat ring 5108. There is also shown tombstone 5101 as well as LED light 5101.10 as well. There is also shown reflective bowl 5117.

FIG. 65A shows an exploded view of the tombstone 5101 which includes a tombstone base 5101.2 which is secured to adjacent objects via a pin 5101.3 and screw 5101.5 which passes through countersink hole 5101.8. There is also a U-shaped plate 5101.1 which includes LED 5101.10. Disposed below plate 5101.1 is tombstone base 5101.2 which has holes 5101.25 and 5101.26. There is a top hood 5101.4 which has wings 5101.4a and 5101.4b which extend out over LED lights 5101.10. Hood 5101.4 is secured by screw 5101.7.

FIG. 65B is a perspective view of tombstone 5101 which includes screw 5101.7 hood section 5101.4, wings 5101.4a and 5101.4b. Tombstone 5101 has base 5101.2 which includes wings 5101.21 and 5101.22. Each of these wings are configured to receive heat pipes which extend down through holes 5101.25 and 5101.26. There is also a block 5101.9 which is configured to secure the tombstone 5101 to the adjacent components.

FIG. 66A shows a side view of the tombstone 5101 which includes a tombstone base 5101.2. There is shown LED lights 5101.10 which are coupled to tombstone base 5101.2. Hood 5101.4 includes wings 5101.4a and 5101.4b. These wings reflect the light back from the LED lights such as lights 5101.10 so that the light is reflected back to the reflective bowl 5117. There is shown screws 5101.6b and 5101.6a which are configured to couple the LED to the tombstone 5101.2. Additional blocks 5101.9 and 5101.9a are shown extending out from tombstone block 5101.2. These blocks 5101.9 and 5101.9a are configured to lock the tombstone to an adjacent block such as to heat sink ring 5108.

FIGS. 66B, 66C and 66D show the different components of the tombstone, which shows the two different wings 5101.21 and 5101.22. There is also shown hood 5101.4 having wings or leafs 5101.4a and 5101.4b wherein the hood is secured by screw 5101.7. Light such as LED light 5101.10 is shown coupled to tombstone block 5101.2 via screw 5101.6a. Additional side blocks 5101.9 and 5101.8 extend out from the side of the tombstone and allow the tombstone 5101 to be secured to adjacent components such as to the heat sink ring.

FIG. 67 shows a perspective view of another embodiment 6000 which shows a lens 6010 which is configured to be coupled to heat sink ring 6009. Disposed inside of the housing of the headlight is a reflector unit comprising dual reflector units 6015 and 6016 which sit inside of the base 6006. There is also a reflector or hood 6014 and a lens 6011 which reflect and diffuse light from a LED circuit board 6008 which is coupled to a tombstone heat sink 6008. There are also heat pipes 6005 which are disposed at least partially inside of the tombstone heat sink 6008 wherein this heat sink and heat pipes are configured to draw heat away from the LED circuit board 6002. When a LED circuit board heats up it is important to draw the heat away from this circuit board in order to avoid thermal meltdown. The lens 6011 is a block lens that has a triangular cross section and sits underneath a hood 6014 which focuses the reflected light back onto the reflectors or reflector units 6015 and 6016.

There is also a heat sink plate 6007 which draws heat from the motherboard 6001 from intermediate dielectric insulation thermal gap pad film 6013 through heat plate 6007 and onto the heat pipes 6005. There is also a gasket 6012 which is configured to sit inside of base 6006 and which is configured to receive and seal the heat sink ring 6009 to the base 6006. The base 6006 is also configured to conduct heat as well. Thus, the heat from motherboard 6001, as well as heat from the LED lights such as from the LED light board 6008, is then transferred through the heat pipes 6005 to the heat sink ring 6009, to the lens 6010 which has conductive nanoparticles such as steel or other metallic nanoparticles a well as pass heat onto the base 6006 thereby heating up the entire headlight 6000 which would then result in the defrosting of the headlight as well as facilitate the removal of or entirely remove the ice, snow and frost from the headlight.

FIG. 68A is a side cross-sectional view of the light 6000 which includes a lens 6010 a heat sink ring 6009 shown coupled to base 6006. Reflectors 6016 and 6015 are also shown as well as lenses 6011, backlight reflectors 6014 are positioned above these lenses 6011. A cluster of LEDs 6080 is shown positioned below lens 6011 wherein the light from the LED light shines through the lens 6011 into reflector 6014 and then is bounced back towards the reflectors 6015 and 6016. This light is then projected as reflected light though lens 6010 and out from the headlight.

FIG. 68B shows a side view through detail G shown in FIG. 68A, wherein this view shows a side rotated view of the lens 6011 positioned adjacent to a LED light 6080 and covered by backlight reflector 6014.

FIG. 69 is a side view of a portion of the headlight which shows circuit board 6001 which contains a microprocessor configured to turn on or off the LED light 6080, as well as LED light plate 6008, and an individual LED light 6080 is shown. Reflector or lens 6011 is also shown positioned adjacent to LED light wherein this reflector is covered by reflective hood 6014. Heatpipe 6005 is configured in a circular pattern to uniformly distribute the heat about heatsink ring 5108.

FIG. 70 is an upside down view which shows a side exploded perspective view of the embodiment 6000 which shows lens 6010, tombstone heat sink 6002, a different hood reflector 6014 formed as a one piece hood, as well as heat sink ring 6009. There is also shown prongs 6026 which are configured to plug into a power source and which provide power to the motherboard 6001.

FIG. 71 is a rotated view which is a side cut-away view which shows motherboard 6001, a reflector 6016, heat sink ring 6009, heat pipe 6005 showing its conveyance of heat away from the LED 6008, onto the tombstone heat sink 6002, through the heatpipes 6005 and towards the outer periphery as well as to the heat sink ring 6009.

FIGS. 72A and 72B shows the tombstone frontal mount heatsink ring configuration. FIGS. 73A and 73B shows the tombstone rear mount configuration for both lighting tombstone elements 6025 or 6026 of the headlight. For example there is shown in FIGS. 72A and 72B an exploded view and an assembled view respectively of a tombstone heat sink 6002, an LED board 6008, LED lights 6080, lens 6011 as well as reflector 6014. The reflector 6014 is a double plate or two plate reflector formed in a substantially V-shape. This design allows for a closer distance between the LEDs and the heatsink ring, however, two reflectors are needed.

With the embodiment shown in FIGS. 73A and 73B there is shown a substantially U-shaped reflector plate 6021, a substantially U-shaped LED motherboard 6082 which wraps around tombstone heat sink 6022. With this design, the heat pipes reach all the way up to the LED motherboard 608a to draw heat away from the LED motherboard from the rear of the headlight. This design allows for the use of a unique single bowl reflector 5117. This LED motherboard includes a conductive backing to draw heat away from the LED lights 6083.

Thus, there is shown a headlight which is powered by a LED light wherein the heat from the LED light is transferred to the adjacent heat pipe 5107 which then transferred heat to the adjacent heat sink ring to de-ice the headlight.

Because this heat is transferred to the heat sink ring 5108 it is then transferred onto the lens 5111, the heat sink ring 5108 and the lens are de-iced and kept clear or ice. Alternatively, if additional heat is needed or if it is not necessary to use the LED lights, a heater ring 5106 is configured to be electrically coupled to motherboard 5102 such that motherboard 5102 sends power onto heater ring 5106 to further increase the temperature of the heat sink ring 5108 which then passes heat onto the lens 5111 to melt any amount of ice build up in front the headlight.

Each and every one of the components of each and every one of the embodiments is interchangeable with the other components of the other embodiments. For example, each of the heat pipes is interchangeable with the heat pipes of the other embodiments, each of the lenses is interchangeable with the lenses of the other embodiments, each of the motherboards is interchangeable with the motherboards of the other embodiments, and each of the tombstone heat sinks is interchangeable with the tombstone heatsinks of the other embodiments. Each and every one of the LED or LED boards is interchangeable with the other embodiments. Each and every one of the heat sink rings is interchangeable with the other heat sink rings. Each and every one of the reflectors is interchangeable with the other reflectors of the other embodiments.

Thus, there is shown that all the heat generated by each heat source, can be transferred forward to the front via heat pipes 33a or 33b then using the ring heatsink 34 to dissipate such heat onto the environment.

FIG. 74A shows another embodiment 7000 of the invention which shows a base or body 7004 having prongs 7001 extending out from a back region of the base 7004. Base 7004 can have fins such as fin 7014. There is a reflector 7006 which is positioned within the base 7004. There is a heatsink ring 7018 which is coupled to the base 7004 and which has a rim 7021. A lens 7009 has a rim 7008 and is coupled to the heatsink ring 7018 opposite the base 7004. A dual driver board 7011 is coupled to base 7004. There is a heatsink 7010 which is tombstone shaped (but which can be of any shape) coupled to the dual driver board 7011. Heatsink 7010 is configured to draw heat away from the dual driver board 7011. On either side of the heatsink are LED boards 7020.1 and 7020.2. Two LED arrays are on each of the LED boards, 7020.1 and 7020.2 respectively.

Each LED board, 7020.1 and 7020.2 contains two identical LED arrays, 7024.1 and 7024.2. Two screws 7025 fasten the LED boards, 7020.1 and 7020.2, onto the tombstone heatsink, 7010. In addition, two connectors, 7022, is positioned on LED boards, 7020.1 and 7020.2, and are configured to connect the LED boards coming from the dual driver board, 7022, which feeds power the LED arrays, 7024.1 and 7024.2, positioned on each LED Board. This dual driver board, 7011 is configured as a driving device to power the LED light arrays such as lights 7024.1, 7024.2.

There is also shown reflectors 7012 and 7013 which are used to reflect the light from the LED light arrays 7024.1 and 7024.2. The center portion of the reflectors redirects the LED light from array 7024.1 onto the center focal point 7026.

FIG. 74B is a similar view to that of FIG. 74A wherein in FIG. 74B the light that is reflected is from outer LED light arrays 7024.2. This is because only the outer lights of each of the arrays are used as shown in greater detail in FIG. 75. Thus in FIG. 74A the inner lights are set to shine to a focal point 7026. In FIG. 74B the outer lights are set to shine to two different focal points 7027 and 7028, using the reflective surface which to the right and left of the center portion of the reflector.

FIG. 75 shows the wiring embodiment 7050 of LED boards 7020.1 and LED Board 7020.2 which are fastened onto tombstone heatsink 7010. LED boards 7020.1 and LED board 7020.2 are energized by separate drivers 8002 and 8003. Drivers 8002 and 8003 are coupled to connectors 7022.1 and 7023.1 drive LED array 7024.1. Drivers 8002 and 8003 are coupled to connectors 7022.1 and 7022.2 to drive LED array 2074.2. Connector 7022.1 is configured to connect to the inner LEDs 7024.1c, 7024.1d, and 7024.1e. Connector 7023.1 is configured to connect to LEDS 7024.1a and 7024.1b. Similarly connector 7022.2 is configured to connect to LEDs 7024.2c, 7024.2d, and 7024.2d. Connector 7023.2 is configured to connect to LEDs 7024.2a, and 7024.2b As stated above connector 7022.1 is configured to connect to LEDS 7024.1a and 7024.1b on LED board 7023.1, and LEDs 7024.2a and 7024.2b which are the outer LED's on LED board 7023.2. Connectors 7022.1 and 7023.1 are connected via lines 8007 and 8008 which are driven by driver 8002 fed through circuit 8005. Driver 8003 is configured to drive circuit 8006 which is connected to lines 8009 and 8010. Lines 8013 and 8014 feed into circuit 7022.2 while lines 8011 and 8012 feed into circuit 7023.2. Connector 7022.2 connects to LED's 7024.2a and 7024.2b while circuit 7023.2 drives LED's 7024.2c, 7024.2d, and 7024.2e. Thus, with this design, the different LED's can be fed by different lines and used to run the light such that the light either has a singular central focal point 7027 shown in FIG. 74A or a double focal point such as focal points 7027 and 7028 shown in FIG. 74B for a more widely dispersed lighting effect. Thus, the outer LEDs when lit such as LEDs 7024.1a and 70241.b and 7024.2a and 7024.2b create a dual focal point light shown in FIG. 74B while the inner LEDs of 7024.1c, 7024.1d, and 7024.1e or 7024.2c, 7024.2d, and 7024.2e when lit create a singular focal point. In addition, because the central LEDs can be driven separately from the outer LEDs the center LEDs can be made brighter or dimmer relative to the outer LEDs.

FIG. 76 is a view of the three dimensional model shown in FIGS. 74A and 74B. This view shows heatsink 7010 with heatpipes 7030, 7032. On LED Board 7020.1 there are LED's 7024 as well as connector 7022. There are two screws 7025.1 and 7025.2. A cross-member or rim 7021, bridges or supports front annular heatsink 7018.

FIG. 77 is another view of another embodiment which includes a plurality of heatpipes 7030 and 7032 which feed through tombstone heatsink 7010. There is a dual driver board 7011 which is coupled to tombstone heatsink 7010. In addition, there is a LED board 7020.1 which is coupled to tombstone heatsink 7010. Heatpipes 7030 and 7032 are fed through channels 7033.1 and 7033.2 in tombstone heatsink 7010. Coupled to tombstone heatsink 7010 and to LED board 7020.1 are synthetic jets including synthetic jet or synthetic jet 7040 and synthetic jet 7042. These synthetic jets drive the cooling material through the heatpipes 7030 and 7032 to move heat from the back of the headlight to a forward position on the headlight.

Similarly, FIG. 78 shows another view of this embodiment which shows heatsink 7010 with channels 7033.1 and 7033.2 for receiving the heatpipes 7030 and 7032. Each of these heatpipes 7030 and 7032 have respective couplings such as coupling 7029 for heatpipe 7030 while a coupling 7033 is for heatpipe 7032. This view shows synthetic jet 7040 coupled to heatpipe 7030 adjacent to heatsink 7010 while synthetic jet 7042 is coupled to heatsink 7010 as well as to heatpipe 7032.

FIG. 79 shows another view of the pipe-heatsink configuration wherein heatpipes 7030 and 7032 are coupled to a tombstone heatsink 7010. Tombstone Heatsink 7010 includes sections 7010.2, 7010.3 which is configured to connect to LED boards, 7010.4 which is a base, and a bottom having screw holes 7010.5 for connecting to a light blocker plate used to block the forward light back to the reflector so that the light can be focused on the three focal points. There is also shown couplings 7029 and 7034 for the heatpipes as well.

FIG. 80 shows a bottom perspective view of the driver board 7011 as well as LED board 7020 which are coupled together via heatsink 7010. Heatpipe 7030 has check valve 7029 while heatpipe 7032 has another check valve 7034. Heatpipe 7030 is extending through channel 7033.1 while heatpipe 7032 extends through channel 7033.2. There is shown an array of LED's 7024.1. In addition, there is shown synthetic jets 7040 and 7042 which are used to drive the cooling material through the heatpipes 7030 and 7032 respectively. When the light is activated, synthetic jets begin to oscillate and causing fluid motion through the heatpipes. The moving fluid picks up the heat generated by the LED and driver boards attached to the tombstone heatsink 7010. With the aid of the synthetic jets, heatpipes then carry the heated fluid onto the front heatsink where the heat is dissipated on the environment.

FIG. 81 shows the fluid reservoir inside the heatpipe system including heatpipes 7030 and 7032. For a fluid system to work, there has to be a reservoir of fluid within the system that will enable the heatpipe piping system to always remain primed, the darker shaded regions of the heatpipes are the sections with the fluid. The system also has two check valves or couplings 7029 and 7034 that restricts the fluid to flow in only one direction. The fluid system allows the synthetic jets fluid to freely move fluid from the hot side of the system such as adjacent to the tombstone heatsink 7010 having end 7010.4 and screw holes 7010.5 to the cold side of the system, away from the heatsink 7010 eventually allowing the fluid to deposit the heat in the front heatsink's fins, and from heatsink fins, moving the heat onto the environment using natural convection. There are also shown two synthetic jets 7040 and 7042 as well coupled to the heatsink 7010 and which is configured to drive fluid through the heatpipes.

FIG. 82, shows an embodiment of a synthetic jet which is an actuator that move fluid by oscillating a membrane with piezo device to ingest a fluid into and expulse a fluid out of a cavity across an orifice. This synthetic jet 7040 includes a first section 7040.1 and a second section 7040.2 wherein these two sections are coupled together. An input port 7040.3 is configured to allow fluid to flow therein, and an output port 7040.4 is configured to allow fluid to flow out from the synthetic jet.

FIG. 83, shows an embodiment of a synthetic jet positioned under the driver board 7011. This position allow for a much larger synthetic jet able to displace a large volume of fluid. There is a cabinet 7060 coupled to the board 7011. Cabinet 7060 is configured to house synthetic jets (not shown in this diagram). Coupled to the cabinet 7060 is heatsink 7010 as well. Heatpipes 7030 and 7032 have one way valves or couplers or check valves 7029 and 7034 respectively. A section 7030.1 of heatpipe 7030 has fluid in it, while another section 7032.1 of heatpipe 7032 has fluid in it as well.

FIG. 84 shows a 180 degree view of FIG. 83, which shows the synthetic jet in relation to the LED boards 7020. In this view LED array 7024 is shown, while heatpipes 7030 and 7032 are shown feeding into heatsink 7010. These heatpipes also feed into cabinet 7060 as well. Heat is drawn from circuit board 7011 and 7020 to heatsink 7010 and cabinet 7060 (having synthetic jets not shown) and then transferred to heatpipes 7030 and 7032 so that the heat is transferred from a back of the headlight to a forward position of the headlight thereby heating up the body of the headlight as well as the lens of the headlight and also drawing heat away from the respective circuit boards 7011 and 7020 as well.

FIG. 85A is a bottom view of a dual synthetic jet shown in FIGS. 83 and 84. For example, the dual synthetic jet 8020 includes a body or housing section 8022 which has a plurality of ports such as port 8024, 8026, 8028, and 8029. Heatpipe 7032 is coupled to port 8026 at a first end and to port 8029 at a second end. Heatpipe 7030 is coupled to port 8024 at a first end and to port 8028 at a second end (see FIG. 84 for reference).

FIG. 85B shows the upper view of the dual synthetic jet in an exploded view which shows a synthetic jet #1 top cover 8030 being removed from housing 8022 to expose a bladder 8032 inside of a bladder housing section 8036. Bladder housing 8022 has openings or ports 8024 and 8028. On the opposite side synthetic jet #2 8034 shown adjacent to synthetic jet #1 8030 and which is on the far side of divider wall 8031.

FIG. 85C is a transparent view of the dual synthetic jet 8020 which shows housing 8022, bladders 8032 and 8042 separated by dividing wall 8031. In addition, there are also shown ports 8024, 8028, 8026 and 8029. These bladders 8032, and 8042 are configured to selectively oscillate producing a pulsed jet reaction which drives the fluid through the heatpipes and around the perimeter of the heatsink ring.

FIG. 85D shows a side cross-sectional view taken along line A-A which shows bladders 8032, and 8042 as well as body or housing section 8022. There is shown ports 8028 and 8029 as well as ports 8024, and 8026. In this view the bladders 8032 and 8042 are shown unmoved, however as shown in FIG. 85E the bladder 8032 is shown oscillating asynchronous (or opposite) to bladder 8042.

FIGS. 86-94 disclose an additional embodiment of the FC Headlight, allows for a lighting control feature to increase or decrease light intensity, or turn "OFF" any sector of the forward lighting pattern. The lighting control system individually controls a single LED and/or LED arrays using multiple LED drivers and/or multiplex system. The application will look to solve a common problem of being limited to static light distribution pattern instead of controllable light intensity pattern whereby the right, left, and center beams are fully controllable high intensity, low intensity, and having the ability to turn "OFF" the right side, the left side, or the center section of the light forward light pattern. During a vehicular emergency of safety condition, high intensity side illumination is needed to illuminate a side area in order to reduce the risk of human injury such as a car breakdown, side snow plow vision, and/or higher illumination when driving around severely curved roads.

The headlight's lighting control system allows independent controls of the different arrays, and allows for directional and intensity control of any light beam sector.

For example, there is a center LED array which allows for an increase in light intensity to a Hi Beam Level. This also allows for a lower light intensity to a Lo beam Level. This also allows for a turning the center of the light "OFF", when the center is not required, or is blinding oncoming traffic or pedestrian, or workers which maybe be maintaining a rail track.

There is also a Left LED Array which allows for an increase light intensity to a Hi Beam Level, a Lower light intensity to a Lo beam Level and a Turn Light "OFF", when the is not required, or is blinding oncoming traffic or pedestrians.

There is also a Right LED Array which allows for an Increase light intensity to a Hi Beam Level, a Lower light intensity to a Lo beam Level and Turn Light "OFF", when the is not required, or is blinding oncoming traffic or pedestrians.

For example, FIG. 86A is a side view of a light 7000 having a reflector 7006, a lens 7009 a circuit board 7020.1 coupled to a heat sink. FIG. 86B is a view of the circuit board 7020.1 and FIG. 86C is a view of the circuit board 7020.2 disposed opposite circuit board 7020.1. In this view, the center LED array of lights which is the central 6 LEDS (See FIGS. 92 and 93) which is the center six lights 7024.1c, 7024.1d, 7024.1e, 7024.2c, 7024.2d, 7024.2e on the two separate light boards 7020.1 and 7020.2 housing arrays 7024.1 and 7024.2. With the lights being lit as set forth in FIG. 86A, this produces a center mass beam 7026, as well as two side beams 7027 and 7028.

FIG. 87A is a view of another light 7000 which has reflector 7006, lens 7009, motherboard 7020.1 shown. FIG. 87B shows motherboard 7020.1 and FIG. 87C shows motherboard 7020.2. In this view both the center lights 7024.1c, 7024.1d, 7024.1e, 7024.2c, 7024.2d, 7024.2e on the two separate light boards 7020.1 and 7020.2 as well as two outside lights 7024.1b and 7024.2b are lit as well allowing for both the center array and the left side array to be lit thereby creating center mass beam 7026, center right side beam 7037, and left side beam 7031 on the light boards 7020.1 in FIG. 87B and 7020.2 in 87C.

FIG. 88A is a representation of an array where all of the lights are lit including the center array of six lights 7024.1c, 7024.1d, 7024.1e, 7024.2c, 7024.2d, 7024.2e as well as the outside lights of 7024.1a, and 7024.2a, and 7024.1b and 7024.2b. Thus, all ten lights are lit including the center LED array, a left LED array and a right LED array on the light boards 7020.1 in FIG. 88B and 7020.2 in 88C.

FIG. 89A is a representation of the center LED array which is the center six lights 7024.1c, 7024.1d, 7024.1e, 7024.2c, 7024.2d, 7024.2e on the two separate light boards 7020.1 and 7020.2 as well as lights 7024.1a and 7024.2a. on the light boards 7020.1 in FIG. 89B and 7020.2 in 89C. The lighting of these arrays include the creation of light beams 7031, 7026, and 7039.

FIG. 90A is a view of a light 7000 having a reflector 7006 and a lens 7009 wherein the left side light arrays being lit as shown in FIGS. 90B and 90C wherein lights 7024.1b and 7024.2b are lit on board 7020.1 and 7020.2 to create beam 7039.

FIG. 91A is a view of a light 7000 having a reflector 7006 and a lens 7009 wherein light boards 7020.1 and 7020.2 shown in FIGS. 91B and 91C respectively are lit such that the right side array is lit with the lighting of lights 7024.1a and 7024.2a on the light boards 7020.1 and 7020.2 thereby creating light beam 7031.

FIG. 92 is a view of a light 7000 having a reflector 7006 and a lens 7009 wherein a light board 7020.1 and 7020.2 are shown in FIGS. 92B and 92C. Light beams 7031 and 7039 are created such that lights 7024.1a, 7024.1b, 7024.2a and 7024.2b are lit thereby creating light beams 7031 and 7039. However, the center beam is in the "OFF" condition, thereby, it is unable to blind oncoming traffic and/or field working personnel.

FIG. 93 is a view of a layout of the circuit board 7020.1 and also of the circuit board 7020.2. There is also shown a driver board comprising a first driver 8002 and a second driver 8003 which can be activated with switches 8005 and 8006 respectively. This view also shows boards 7020.1 and 7020.2 each having LED arrays 7024.1 and 7024.2. Board 70201 has switches 7022.1 and 7023.1 while board 7020.2 has switches 7022.2 and 7023.2. The switches are designed to let particular lights be lit as shown in greater detail in FIG. 75. The switches indicated above are controlled by one or more controllers such as controller 7080 wherein the dashed lines show lines of communication between the controller 7080 and any one of the switches such as switches 7022.1, 7023.1, 7022.2, 7023.2, 8005, and 8006. The controller 7080 can be disposed on any one of the circuit boards identified above. The controller can also be in wireless communication with any one of the switches as well.

FIG. 94 is a view of the combined light arrays 7025 which includes light array 7024.1 and 7024.2. Light array 7024.1 includes lights 7024.1a, 7024.1b, 7024.1c, 7024.1d and 7024.1e. Light array 7024.2 includes lights 7024.2a, 7024.2b, 7024.2c, 7024.2d, and 7024.2e.

Thus, there is shown a compact, system which can selectively transport heat using synthetic jets to the heatsink ring 7018 where heat is dispersed into the atmosphere as the fluid travels under the heatsink ring's fins thereby exhausting the heat generated by driver board 7011 and the two LED boards 7020.1 and 7020.2. During severe cold weather conditions the heat dispersed thru the fins melts any build up of moisture, snow, or ice from lens 7009. Cold fluid the returns back to the hot region to continue the cooling cycle.

Accordingly, while several embodiments of the present invention have been shown and described, it is obvious that many changes and modifications may be made thereunto without departing from the spirit and scope of the invention.

What is claimed is:

1. A forward cooling headlight comprising:
 a body;
 a lens coupled to said body;

a heatsink coupled to said body wherein said heatsink extends radially outside of said body and said lens and comprises annular fins;
a continuous closed-loop heatpipe,
at least two lights;
at least one signal in communication with said at least two lights;
at least one controller in communication with said at least one signal, said at least one controller for selectively switching "ON" at least one of the at least two lights;
wherein said at least two lights are coupled to said heatsink, and wherein said heatpipe is coupled to said heatsink at a first end and to said body at a second end wherein said heatsink draws heat away from said light, and wherein said heatpipe draws heat away from said heatsink and towards said body.

2. The forward cooling headlight as in claim 1, wherein said body has a first end which is adjacent to said heatsink and a second end which is coupled to said lens.

3. The forward cooling headlight as in claim 1, further comprising at least one synthetic jet, wherein said at least one synthetic jet is coupled to said heatpipe.

4. The forward cooling headlight as in claim 1, further comprising at least one additional heatpipe.

5. The forward cooling headlight as in claim 4, further comprising at least one additional synthetic jet coupled to said at least one additional heatpipe.

6. The forward cooling headlight as in claim 5, wherein said heatpipe and said additional heatpipe each contain fluid forming a reservoir wherein the reservoir allows the heatpipe piping system to remain primed, wherein said at least one synthetic jet and said at least one additional synthetic jet are configured to move said fluid through said heatpipe and said additional heatpipe respectively from a hot side of the system to a cold side of the system.

7. The forward cooling headlight as in claim 6, wherein the synthetic jet has a bladder configured to expand or contract to drive the fluid through the heatpipe.

8. The forward cooling headlight as in claim 1, wherein said body is substantially semi-spherical in shape.

9. The forward cooling headlight as in claim 8, further comprising a circular rim coupled to the body.

10. The forward cooling headlight as in claim 9, further comprising at least one additional heatpipe, wherein the circular rim is formed from a thermally conductive material, and wherein the circular rim is coupled to at least one of the heatpipe and the additional heatpipe.

11. The forward cooling headlight as in claim 1, further comprising at least one valve coupled to the heatpipe, wherein the at least one valve is a one-way valve.

12. The forward cooling headlight as in claim 1, further comprising a plurality of light drivers, comprising a first light driver and a second light driver, and wherein said at least two lights, comprising a first light and a second light, wherein said first light driver is configured to drive said first light and said second light driver is configured to drive said second light and wherein the forward cooling headlight further comprises at least one reflector, wherein said at least one reflector is configured to reflect said first light and said second light and wherein said signal is a PWM digital signal for selectively switching on the lights.

13. The forward cooling headlight as in claim 12, wherein said first light is an outer light, and said second light is an inner light, wherein when said first light is lit, it provides a first focal point after reflecting off of said at least one reflector and wherein when said second light is lit, it provides a second focal point after reflecting off of said at least one reflector.

14. The forward cooling headlight as in claim 12, further comprising a driver board, wherein said plurality of light drivers are disposed on said driver board.

15. The forward cooling headlight as in claim 13, further comprising a light board, wherein said at least two lights are disposed on said light board.

16. The forward cooling headlight as in claim 15, further comprising an additional light board, wherein a first light array comprising said first light and said second light are coupled to said first light board and a second light array is coupled to said second light board wherein said light board and said additional light board are disposed on opposite sides of said heat sink.

17. The forward cooling headlight as in claim 16, wherein said first light array comprises a plurality of lights comprising at least two outer lights and at least one inner light.

18. The forward cooling headlight as in claim 17, wherein said second light array comprises a plurality of lights comprising at least two outer lights and at least one inner light.

19. The forward cooling headlight as in claim 18, wherein when said inner lights on said first light array and said second light array are lit, it creates a substantially singular focal point of light from the headlight.

20. The forward cooling headlight as in claim 18, wherein when said outer lights on said first array and on said second array are lit, it creates at least two focal points of light from the headlight.

* * * * *